(12) United States Patent
Nakagami

(10) Patent No.: US 10,085,034 B2
(45) Date of Patent: *Sep. 25, 2018

(54) IMAGE CODING APPARATUS AND METHOD

(71) Applicant: SONY CORPORATION, Tokyo (JP)

(72) Inventor: Ohji Nakagami, Tokyo (JP)

(73) Assignee: SONY CORPORATION, Tokyo (JP)

(*) Notice: Subject to any disclaimer, the term of this patent is extended or adjusted under 35 U.S.C. 154(b) by 84 days.

This patent is subject to a terminal disclaimer.

(21) Appl. No.: 14/420,068

(22) PCT Filed: Jun. 27, 2014

(86) PCT No.: PCT/JP2014/067121
§ 371 (c)(1),
(2) Date: Feb. 6, 2015

(87) PCT Pub. No.: WO2015/005137
PCT Pub. Date: Jan. 15, 2015

(65) Prior Publication Data
US 2015/0195532 A1   Jul. 9, 2015

(30) Foreign Application Priority Data
Jul. 12, 2013  (JP) ................................. 2013-146807

(51) Int. Cl.
 H04N 7/12 (2006.01)
 H04N 19/33 (2014.01)
 (Continued)

(52) U.S. Cl.
 CPC ........... H04N 19/33 (2014.11); H04N 19/115 (2014.11); H04N 19/117 (2014.11);
 (Continued)

(58) Field of Classification Search
 CPC .. H04N 19/115; H04N 19/593; H04N 19/187; H04N 19/137
 (Continued)

(56) References Cited

U.S. PATENT DOCUMENTS 9,686,543 B2 * 6/2017 Lee ..................... H04N 19/30
9,686,544 B2 * 6/2017 Lee ..................... H04N 19/30
(Continued)

FOREIGN PATENT DOCUMENTS

WO  WO 2014/104725 A1  7/2014
WO  WO 2014/205067 A1  12/2014
(Continued)

OTHER PUBLICATIONS

International Search Report dated Sep. 2, 2014 in PCT/JP2014/067121.
(Continued)

Primary Examiner — Tung Vo
(74) Attorney, Agent, or Firm — Oblon, McClelland, Maier & Neustadt, L.L.P.

(57) ABSTRACT

An image coding apparatus and method capable of suppressing a decrease in coding efficiency. The image coding apparatus includes: a coding unit that codes image data configured by plural layers; an interlayer prediction-related information generating unit that generates information relating to an interlayer prediction of the current slice in a case a layer of the current slice is an enhancement layer, and a slice type of current slice is a P slice or a B slice; and a transmission unit that transmits coded data of the image data generated by the coding unit and the information relating to the interlayer prediction generated by the interlayer prediction-related information generating unit. The apparatus and method, for example, may be applied to an image coding apparatus that scalably codes image data or an image
(Continued)

decoding apparatus that decodes coded data acquired by performing scalable coding of the image data.

9 Claims, 67 Drawing Sheets

(51) Int. Cl.
| | | |
|---|---|---|
| H04N 19/70 | (2014.01) | |
| H04N 19/159 | (2014.01) | |
| H04N 19/187 | (2014.01) | |
| H04N 19/115 | (2014.01) | |
| H04N 19/137 | (2014.01) | |
| H04N 19/593 | (2014.01) | |
| H04N 19/59 | (2014.01) | |
| H04N 19/117 | (2014.01) | |
| H04N 19/124 | (2014.01) | |
| H04N 19/15 | (2014.01) | |
| H04N 19/61 | (2014.01) | |
| H04N 19/105 | (2014.01) | |
| H04N 19/174 | (2014.01) | |
| H04N 19/172 | (2014.01) | |

(52) U.S. Cl.
CPC .......... *H04N 19/124* (2014.11); *H04N 19/137* (2014.11); *H04N 19/15* (2014.11); *H04N 19/159* (2014.11); *H04N 19/187* (2014.11); *H04N 19/59* (2014.11); *H04N 19/593* (2014.11); *H04N 19/61* (2014.11); *H04N 19/70* (2014.11); *H04N 19/105* (2014.11); *H04N 19/172* (2014.11); *H04N 19/174* (2014.11)

(58) Field of Classification Search
USPC .................................................. 375/240.25
See application file for complete search history.

(56) References Cited

U.S. PATENT DOCUMENTS

| | | | | |
|---|---|---|---|---|
| 2006/0262985 A1* | 11/2006 | Chen | ................... | H04N 19/105 382/240 |
| 2008/0007438 A1* | 1/2008 | Segall | ................... | H04N 19/176 341/61 |
| 2008/0008235 A1* | 1/2008 | Segall | ................... | H04N 19/61 375/240.01 |
| 2008/0008241 A1* | 1/2008 | Park | ................... | H04N 19/63 375/240.16 |
| 2008/0008247 A1* | 1/2008 | Segall | ................... | H04N 19/70 375/240.18 |
| 2008/0008394 A1* | 1/2008 | Segall | ................... | H04N 19/176 382/238 |
| 2008/0031345 A1* | 2/2008 | Segall | ................... | H04N 19/30 375/240.19 |
| 2008/0031346 A1* | 2/2008 | Segall | ................... | H04N 19/30 375/240.19 |
| 2008/0031347 A1* | 2/2008 | Segall | ................... | H04N 19/46 375/240.19 |
| 2008/0089597 A1* | 4/2008 | Guo | ................... | H04N 19/30 382/238 |
| 2009/0080535 A1* | 3/2009 | Yin | ................... | H04N 19/63 375/240.26 |
| 2009/0110073 A1* | 4/2009 | Wu | ................... | H04N 7/50 375/240.15 |
| 2009/0187960 A1* | 7/2009 | Lee | ................... | H04N 7/17318 725/131 |
| 2009/0274214 A1* | 11/2009 | Yoon | ................... | H04N 19/159 375/240.16 |
| 2009/0285306 A1* | 11/2009 | Leonardi | ................ | H04N 19/46 375/240.18 |
| 2009/0323804 A1* | 12/2009 | Gao | ................... | H04N 19/105 375/240.02 |
| 2010/0046622 A1* | 2/2010 | Doser | ................... | H04N 19/105 375/240.13 |
| 2010/0091840 A1* | 4/2010 | Gao | ................... | H04N 19/105 375/240.2 |
| 2010/0135393 A1* | 6/2010 | Ying Gao | ........ | H04N 19/00315 375/240.15 |
| 2012/0075436 A1* | 3/2012 | Chen | ................... | H04N 19/597 348/51 |
| 2012/0155538 A1* | 6/2012 | Hutter | ................... | H04N 19/105 375/240.12 |
| 2013/0091154 A1* | 4/2013 | Lu | ................... | H04N 21/234327 707/755 |
| 2013/0097334 A1* | 4/2013 | Wu | ................... | H04L 65/608 709/231 |
| 2013/0208792 A1* | 8/2013 | He | ................... | H04N 19/00569 375/240.12 |
| 2014/0119440 A1* | 5/2014 | Lee | ................... | H04N 19/503 375/240.12 |
| 2014/0119441 A1* | 5/2014 | Lee | ................... | H04N 19/11 375/240.12 |
| 2014/0177711 A1* | 6/2014 | Kang | ................... | H04N 19/597 375/240.12 |
| 2014/0219338 A1* | 8/2014 | Komiya | ........... | H04N 19/00321 375/240.02 |
| 2014/0301459 A1* | 10/2014 | Boyce | ................... | H04N 19/105 375/240.12 |
| 2015/0010050 A1* | 1/2015 | Chen | ................... | H04N 19/105 375/240.02 |
| 2015/0016502 A1* | 1/2015 | Rapaka | ................... | H04N 19/50 375/240.02 |
| 2015/0016531 A1* | 1/2015 | Hannuksela | ........... | H04N 19/70 375/240.16 |
| 2015/0016548 A1* | 1/2015 | Lee | ................... | H04N 19/117 375/240.27 |
| 2015/0063437 A1* | 3/2015 | Murakami | ........... | H04N 19/169 375/240.02 |
| 2015/0071356 A1* | 3/2015 | Kim | ................... | H04N 19/513 375/240.16 |
| 2015/0110473 A1* | 4/2015 | Wang | ................... | H04N 19/136 386/341 |
| 2015/0139320 A1* | 5/2015 | Wang | ................... | H04N 19/70 375/240.15 |
| 2015/0139323 A1* | 5/2015 | Lee | ................... | H04N 19/44 375/240.16 |
| 2015/0146787 A1* | 5/2015 | Hendry | ................ | H04N 19/513 375/240.16 |
| 2015/0172667 A1* | 6/2015 | Hendry | ................ | H04N 19/105 375/240.25 |
| 2015/0181233 A1* | 6/2015 | Ramasubramonian | ..................... H04N 19/52 375/240.16 |
| 2015/0195572 A1* | 7/2015 | Chen | ................... | H04N 19/517 375/240.16 |
| 2015/0296211 A1* | 10/2015 | Chuang | ................ | H04N 19/187 375/240.12 |
| 2015/0326881 A1* | 11/2015 | Ikai | ................... | H04N 19/117 375/240.12 |
| 2015/0358629 A1* | 12/2015 | Choi | ................... | H04N 19/70 375/240.02 |
| 2016/0029033 A1* | 1/2016 | Park | ................... | H04N 19/30 375/240.12 |
| 2016/0029091 A1* | 1/2016 | Le Floch | ....... | H04N 21/234345 375/240.26 |
| 2016/0050424 A1* | 2/2016 | Choi | ................... | H04N 19/70 375/240.12 |
| 2016/0134868 A1* | 5/2016 | He | ................... | H04N 19/112 375/240.02 |
| 2016/0165260 A1* | 6/2016 | Lee | ................... | H04N 19/30 375/240.12 |
| 2016/0191928 A1* | 6/2016 | Lee | ................... | H04N 19/30 375/240.02 |
| 2016/0198169 A1* | 7/2016 | Lee | ................... | H04N 19/30 375/240.12 |
| 2016/0227232 A1* | 8/2016 | Choi | ................... | H04N 19/105 |

(56) References Cited

U.S. PATENT DOCUMENTS

| | | | |
|---|---|---|---|
| 2016/0330442 A1* | 11/2016 | Lee | H04N 19/105 |
| 2016/0330458 A1* | 11/2016 | Lee | H04N 19/187 |
| 2017/0238004 A1* | 8/2017 | Lee | H04N 19/503 |
| | | | 375/240.12 |

FOREIGN PATENT DOCUMENTS

| WO | WO 2015/002887 A1 | 1/2015 |
|---|---|---|
| WO | WO 2015/005331 A1 | 1/2015 |

OTHER PUBLICATIONS

Sachin Deshpande, "Comments on SHVC and MV-HEVC" Joint Collaborative Team on Video Coding (JCT-VC) of ITU-T SG 16 WP 3 and ISO/IEC JTC 1/SC 29/WG 11 [JCTVC-N0195], 2013, 10 Pages.

Yong He, et al., "On SHVC High Level Syntax" Joint Collaborative Team on Video Coding (JCT-VC) of ITU-T SG 16 WP 3 and ISO/IEC JTC 1/SC 29/WG 11 [JCTVC-N0217rl], 2013, 9 Pages.

Ye-Kui Wang, et al., "MV-HEVC/SHVC HLS: On signalling and derivation of inter-layer RPS (combining aspects of JCTVC-M0046 and JCTVC-M0269)" Joint Collaborative Team on Video Coding (JCT-VC) of ITU-T SG 16 WP 3 and ISO/IEC JTC 1/SC 29/WG 11 [JCTVC-M0458], Apr. 2013, 5 Pages.

Benjamin Bross, et al., "High Efficiency Video Coding (HEVC) text specification draft 10 (for FDIS & Consent)" Joint Collaborative Team on Video Coding (JCT-VC) of ITU-T SG 16 WP 3 and ISO/IEC JTC 1/SC 29/WG 11 [JCTVC-L1003_v4] Jan. 2013, 324 Pages.

Gerhard Tech, et al., "MV-HEVC Draft Text 4" Joint Collaborative Team on 3D Video Coding Extension Development of ITU-T SG 16 WP 3 and ISO/IEC JTC 1/SC 29/WG 11 [JCT3V-D1004-v4] Apr. 2013, 63 Pages.

Jianle Chen, et al., "SHVC Working Draft 2" Joint Collaborative Team on Video Coding (JCT-VC) of ITU-T SG16 WP3 and ISO/IEC JTC1/SC29/WG11 [JCTVC-M1008_v3] Apr. 2013, 67 Pages.

Extended European Search Report dated Feb. 23, 2017 in Patent Application No. 14823488.3.

Jill Boyce et al., "High-level Syntax Modifications for SHVC", Joint Collaborative Team on Video Coding (JCT-VC) of ITU-T SG 16 WP 3 and ISO/IEC JTC 1/SC 29/WG 11, 13th Meeting: Incheon, KR, Document: JCTVC-M0046, Apr. 18-26, 2013, 12 pages.

Jianle Chen et al., "SHVC Working Draft 2" Joint Collaborative Team on Video Coding (JCT-VC) of ITU-T SG16 WP3 and ISO/IEC JTC1/SC29/WG11, 13th Meeting: Incheon, KR, Document: JCTVC-M1008_v1, Apr. 18-26, 2013, 53 pages.

Communcation pursuant to Article 94(3) EPC issued in corresponding European Application No. 14 823 488.3 dated Nov. 17, 2017.

Choi et al., "3D-HEVC HLS: On Slice Header," Samsung Electronics Co., Ltd., ISO/IEC JTC1/SC29/WG11, Geneva, Switzerland, May 2012.

An et al., "On Signaling of Several Syntax Elements in Slice Header," MediaTek, Inc., Joint Collaborative Team on Video Coding of ITU-T SG 16 WP 3 and ISO/IEC JTC 1/SC 29/WG 11, 9$^{th}$ Meeting, Geneva, CH, Apr. 27-May 7, 2012.

Office Action issued Mar. 29, 2018 in Japanese Patent Application No. 2015-505760, with English translation, citing documents AO-AQ therein, 10 pages.

Office Action dated May 15, 2018 in Chinese Patent Application No. 201480002300.1 (with English translation).

* cited by examiner

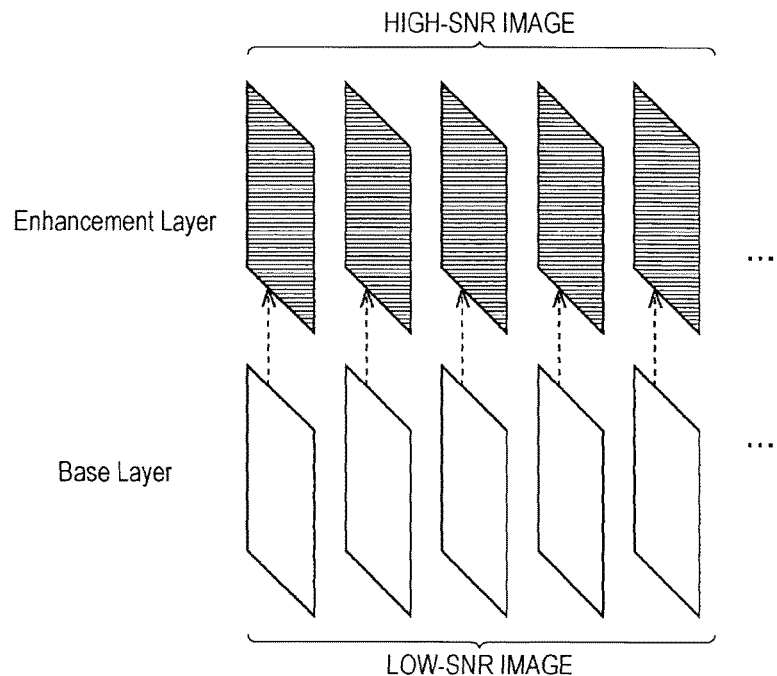

| slice_segment_header() { | Descriptor |
|---|---|
| ..... | |
| if(nuh_layer_id>0 && NumDirectRefLayers[nuh_layer_id]>0) { | |
|   inter_layer_pred_enabled_flag | u(1) |
|   if(inter_layer_pred_enabled_flag && NumDirectRefLayers[nuh_layer_id]>1) { | |
|     if(!max_one_active_ref_layer_flag) | |
|       num_inter_layer_ref_pics_minus1 | u(v) |
|     for(i=0; i<NumActiveRefLayerPics; i++) | |
|       inter_layer_pred_layer_idc[i] | u(v) |
|   } | |
| } | |
| if(NumSamplePredRefLayers[nuh_layer_id]>0 && NumActiveRefLayerPics>0) | |
|   inter_layer_sample_pred_only_flag | u(1) |
| ..... | |
| } | |

FIG. 7 inter_layer_pred_enabled_flag equal to 1 specifies that inter-layer prediction may be used in decoding of the current picture. inter_layer_pred_enabled_flag equal to 0 specifies that inter-layer prediction is not used in decoding of the current picture. When not present, the value of inter_layer_pred_enabled_flag is inferred to be equal to 0.

num_inter_layer_ref_pics_minus1 plus 1 specifies the number of pictures that may be used in decoding of the current picture for inter-layer prediction. The length of the num_inter_layer_ref_pics_minus1 syntax element is Ceil(Log2(NumDirectRefLayers [nuh_layer_id]))bits. The value of num_inter_layer_ref_pics_minus1 shall be in the range of 0 to NumDirectRefLayers[nuh_layer_id] - 1,inclusive.

The variable NumActiveRefLayerPics is derived as follows:

if(nuh_layer_id = = 0 || NumDirectRefLayers[nuh_layer_id] = = 0 || !inter_layer_pred_enabled_flag)
        NumActiveRefLayerPics = 0
    else if(max_one_active_ref_layer_flag || NumDirectRefLayers[nuh_layer_id] = = 1)
        NumActiveRefLayerPics = 1
    else
        NumActiveRefLayerPics = num_inter_layer_ref_pics_minus1 + 1

All slices of a coded picture shall have the same value of NumActiveRefLayerPics.

inter_layer_pred_layer_idc[i] specifies the variable, RefPicLayerId[i],representing the nuh_layer_id of the i-th picture that may be used by the current picture for inter-layer prediction. The length of the syntax element inter_layer_pred_layer_idc[i]is Ceil (Log2(NumDirectRefLayers[nuh_layer_id])) bits.The value of inter_layer_pred_layer_idc[i]shall be in the range of 0 to NumDirectRefLayers [nuh_layer_id] - 1, inclusive.When not present, the value of inter_layer_pred_layer_idc [i] is inferred to be equal to 0.

When i is greater than 0,inter_layer_pred_layer_idc[i] shall be greater than inter_layer_pred_layer_idc[i - 1]. [Ed.(JB): This restriction was imposed to make behavior match the earlier design of increasing entries, but is an area noted for future study.]

The variables RefPicLayerId [ i ] for each value of i in the range of 0 to NumActiveRefLayerPics - 1, inclusive, NumActiveMotionPredRefLayers, and ActiveMotionPredRefLayerId [ j ] for each value of j in the range of 0 to NumActiveMotionPredRefLayers - 1, inclusive, are derived as follows:

for(i = 0, j = 0; i < NumActiveRefLayerPics;i++)
        RefPicLayerId[i] = RefLayerId[nuh_layer_id][inter_layer_pred_layer_idc[i]]
        if(MotionPredEnabledFlag[nuh_layer_id][inter_layer_pred_layer_idc[i]])
            ActiveMotionPredRefLayerId[j++] = RefLayerId[nuh_layer_id][inter_layer_pred_layer_idc[i]]
    }
    NumActiveMotionPredRefLayers = j All slices of a picture shall have the same value of inter_layer_pred_layer_idc[ i ] for each value of i in the range of 0 to NumActiveRefLayerPics - 1, inclusive.

It is a requirement of bitstream conformance that for each value of i in the range of 0 to NumActiveRefLayerPics - 1,inclusive, either of the following two conditions shall be true:

- The value of max_tid_il_ref_pics_plus1[ LayerIdxInVps[RefPicLayerId[i]]] is greater than TemporalId.
- The values of max_tid_il_ref_pics_plus1[ LayerIdxInVps[RefPicLayerId[i]]] and TemporalId are both equal to 0 and the picture in the current access unit with nuh_layer_id equal to RefPicLayerId[i] is an IRAP picture.

It is a requirement of bitstream conformance that for each value of i in the range of 0 to NumActiveRefLayerPics - 1,inclusive, the value of SamplePredEnabledFlag[ nuh_layer_id ] [ RefPicLayerId [ i ] ] or MotionPredEnabledFlag[ nuh_layer_id ] [ RefPicLayerId[ i ] ] shall be equal to 1.

[Ed. (JB): In future extensions, the above requirement may be changed. (YK): Just to understand: in which scenarios this requirement may be changed? (MH): If a new inter-layer prediction type is introduced in a future extension, there may be a reference layer which is only used as reference for this new inter-layer prediction type but not for inter-layer sample or motion prediction.]

inter_layer_sample_pred_only_flag equal to 1 specifies that inter prediction is not used in decoding of the current picture. inter_layer_sample_pred_only_flag equal to 0 specifies that inter prediction may be used in decoding of the current picture. When not present, the value of inter_layer_sample_pred_only_flag is inferred to be equal to 0.

The variable InterRefEnabledInRPLFlag is derived as follows:.

- If NumSamplePredRefLayers [ nuh_layer_id ] is greater than 0 and NumActiveRefLayerPics is greater than 0, InterRefEnabledInRPLFlag is set equal to !inter_layer_sample_pred_only_flag.
- Otherwise, InterRefEnabledInRPLFlag is set equal to 1

FIG. 9

| slice_segment_header() { | Descriptor |
|---|---|
| . . . . . | |
| if(slice_type = = P \|\| slice_type = = B) { | |
|   if(nuh_layer_id>0 && NumDirectRefLayers[nuh_layer_id]>0) { | |
|     inter_layer_pred_enabled_flag | u(1) |
|     if(inter_layer_pred_enabled_flag && NumDirectRefLayers[nuh_layer_id]>1) { | |
|       if(!max_one_active_ref_layer_flag) | |
|         num_inter_layer_ref_pics_minus1 | u(v) |
|       for(i=0; i<NumActiveRefLayerPics; i++) | |
|         inter_layer_pred_layer_idc[i] | u(v) |
|     } | |
|   } | |
|   if(NumSamplePredRefLayers[nuh_layer_id]>0 && NumActiveRefLayerPics>0) | |
|     inter_layer_sample_pred_only_flag | u(1) |
| . . . . . | |
| } | |

FIG. 11

| slice_segment_header() { | Descriptor |
|---|---|
|  |  |
| . . . . . |  |
|  |  |
|   if(nuh_layer_id>0 && NumDirectRefLayers[nuh_layer_id]>0) { |  |
|     inter_layer_pred_enabled_flag | u(1) |
|     if(inter_layer_pred_enabled_flag && NumDirectRefLayers[nuh_layer_id]>1) { |  |
|       if(!max_one_active_ref_layer_flag) |  |
|         num_inter_layer_ref_pics_minus1 | u(v) |
|       if(NumDirectRefLayers[nuh_layer_id] != NumActiveRefLayerPics) |  |
|         for(i=0;i<NumActiveRefLayerPics;i++) |  |
|           inter_layer_pred_layer_idc[i] | u(v) |
|     } |  |
|   } |  |
|   if(NumSamplePredRefLayers[nuh_layer_id]>0 && NumActiveRefLayerPics>0) |  |
|     inter_layer_sample_pred_only_flag | u(1) |
|  |  |
| . . . . . |  |
|  |  |
| } |  |

FIG. 12 inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil( Log2( NumDirectRefLayers[nuh_layer_id] )) bits. The value of inter_layer_pred_layer_idc[i] shall be in the range of 0 to NumDirectRefLayers[ nuh_layer_id ] - 1, inclusive. When not present, the value of inter_layer_pred_layer_idc[i] is inferred to be equal to i

FIG. 15

| seq_parameter_set_rbsp() { | Descriptor |
|---|---|
|  |  |
| . . . . . |  |
|  |  |
|     if(nuh_layer_id>1 && NumDirectRefLayers[nuh_layer_id]>0) { |  |
|         num_inter_layer_ref_pic_sets | ue(v) |
|         for(i=0;i<num_inter_layer_ref_pic_sets;i++) |  |
|             inter_layer_ref_pic_set(i) |  |
|     } |  |
|  |  |
| . . . . . |  |
|  |  |
| } |  |
|  |  |
|  |  |

FIG. 16

| inter_layer_ref_pic_set(stRpsIdx) { | Descriptor |
|---|---|
|     if(!max_one_active_ref_layer_flag) |  |
|         num_inter_layer_ref_pics_minus1 | u(v) |
|         for(i=0;i<=num_inter_layer_ref_pics_minus1;i++) |  |
|             inter_layer_pred_layer_idc[i] | u(v) |
| } |  |

FIG. 17

| slice_segment_header() { | Descriptor |
|---|---|
|  |  |
| . . . . . |  |
|  |  |
|     if(nuh_layer_id>0 && NumDirectRefLayers[nuh_layer_id]>0) { |  |
|         inter_layer_pred_enabled_flag | u(1) |
|         if(inter_layer_pred_enabled_flag && NumDirectRefLayers[nuh_layer_id]>1) { |  |
|             inter_layer_ref_pic_set_sps_flag | u(1) |
|             if(! inter_layer_ref_pic_set_sps_flag) |  |
|                 inter_layer_ref_pic_set(num_inter_layer_ref_pic_sets) |  |
|             else if(num_inter_layer_ref_pic_sets>1) |  |
|                 inter_layer_ref_pic_set_idx | u(v) |
|         } |  |
|         if(NumActiveRefLayerPics>0) |  |
|             inter_layer_sample_pred_only_flag | u(1) |
|     } |  |
|  |  |
|  |  |
| . . . . . |  |
|  |  |
| } |  |

FIG. 18 num_inter_layer_ref_pic_sets specifies the number of inter_layer_ref_pic_set( ) syntax structures included in the SPS. The value of num_inter_layer_ref_pic_sets shall be in the range of 0 to 64, inclusive.

NOTE 5 – A decoder should allocate memory for a total number of num_inter_layer_ref_pic_sets + 1 inter_layer_ref_pic_set( ) syntax structures since there may be an inter_layer_ref_pic_set( ) syntax structure directly signalled in the slice headers of a current picture. An inter_layer_ref_pic_set( )syntax structure directly signalled in the slice headers of a current picture has an index equal to num_inter_layer_ref_pic_sets.

FIG. 19

An inter_layer_ref_pic_set(stRpsIdx)syntax structure may be present in an SPS or in a slice header. Depending on whether the syntax structure is included in a slice header or an SPS, the following applies:

- If present in a slice header, the inter_layer_ref_pic_set(stRpsIdx)syntax structure specifies the inter-layer RPS of the current picture (the picture containing the slice), and the following applies:
  - The content of the inter_layer_ref_pic_set(stRpsIdx)syntax structure shall be the same in all slice headers of the current picture.
  - The value of stRpsIdx shall be equal to the syntax element num_inter_layer_ref_pic_sets in the active SPS.
  - The inter-layer RPS of the current picture is also referred to as the num_inter_layer_ref_pic_sets-th candidate inter-layer RPS in the semantics specified in the remainder of this subclause.
- Otherwise(present in an SPS), the inter_layer_ref_pic_set(stRpsIdx)syntax structure specifies a candidate inter-layer RPS, and the term "the current picture" in the semantics specified in the remainder of this subclause refers to each picture that has inter_layer_ref_pic_set_idx equal to stRpsIdx in a CVS that has the SPS as the active SPS.

num_inter_layer_ref_pics_minus1 plus 1 specifies the number of pictures that may be used in decoding of the current picture for inter-layer prediction. The length of the num_inter_layer_ref_pics_minus1 syntax element is Ceil( Log2( NumDirectRefLayers[ nuh_layer_id ] ) ) bits. The value of num_inter_layer_ref_pics_minus1 shall be in the range of 0 to NumDirectRefLayers[ nuh_layer_id ] - 1, inclusive. When not present, the value of num_inter_layer_ref_pics_minus1 is inferred to be equal to 0.

The variable NumActiveRefLayerPics is derived as follows:

```
if(nuh_layer_id = = 0 || NumDirectRefLayers[nuh_layer_id] = = 0 || !inter_layer_pred_enabled_flag)
    NumActiveRefLayerPics = 0
else if(max_one_active_ref_layer_flag || NumDirectRefLayers[nuh_layer_id] = = 1)
    NumActiveRefLayerPics = 1
else
    NumActiveRefLayerPics = num_inter_layer_ref_pics_minus1 + 1
```

All slices of a coded picture shall have the same value of NumActiveRefLayerPics.

NOTE-If NumActiveRefLayerPics is equal to NumDirectRefLayers[nuh_layer_id], it is not necessary to send inter_layer_ref_pic_set (stRpsIdx) syntax structure.

inter_layer_pred_layer_idc[i]specifies the variable, RefPicLayerId[i], representing the nuh_layer_id of the i-th picture that may be used by the current picture for inter-layer prediction. The length of the syntax element inter_layer_pred_layer_idc[ i ] is Ceil(Log2( NumDirectRefLayers[nuh_layer_id]))bits. The value of inter_layer_pred_layer_idc[ i ] shall be in the range of 0 to NumDirectRefLayers[nuh_layer_id] - 1, inclusive. When not present, the value of inter_layer_pred_layer_idc[i]is inferred to be equal to 0.

When i is greater than 0, inter_layer_pred_layer_idc[ i ] shall be greater than inter_layer_pred_layer_idc[ i - 1 ].

The variables RefPicLayerId[ i ] for each value of i in the range of 0 to NumActiveRefLayerPics - 1, inclusive, NumActiveMotionPredRefLayers, and ActiveMotionPredRefLayerId[ j ] for each value of j in the range of 0 to NumActiveMotionPredRefLayers - 1, inclusive, are derived as follows:

```
for(i = 0,j = 0;i < NumActiveRefLayerPics;i++){
    RefPicLayerId[i] = RefLayerId[ nuh_layer_id][inter_layer_pred_layer_idc[i]]
    if(MotionPredEnabledFlag[ nuh_layer_id ][ inter_layer_pred_layer_idc[i]])
        ActiveMotionPredRefLayerId[j++] = RefLayerId[ nuh_layer_id][inter_layer_pred_layer_idc[i]]
}
NumActiveMotionPredRefLayers = j
```

All slices of a picture shall have the same value of inter_layer_pred_layer_idc[ i ] for each value of i in the range of 0 to NumActiveRefLayerPics - 1, inclusive.

It is a requirement of bitstream conformance that for each value of i in the range of 0 to NumActiveRefLayerPics-1, inclusive, either of the following two conditions shall be true:

- The value of max_tid_il_ref_pics_plus1[ LayerIdxInVps[ RefPicLayerId[ i ] ] ] is greater than TemporalId.
- The values of max_tid_il_ref_pics_plus1[LayerIdxInVps[ RefPicLayerId[i]]]and TemporalId are both equal to 0 and the picture in the current access unit with nuh_layer_id equal to RefPicLayerId[ i ] is an IRAP picture It is a requirement of bitstream conformance that for each value of i in the range of 0 to NumActiveRefLayerPics-1, inclusive, the value of SamplePredEnabledFlag[nuh_layer_id][RefPicLayerId[i]]or MotionPredEnabledFlag[nuh_layer_id][RefPicLayerId[i]]shall be equal to 1.

FIG. 20 inter_layer_ref_pic_set_sps_flag equal to 1 specifies that the inter-layer RPS of the current picture is derived based on one of the inter_layer_ref_pic_set( )syntax structures in the active SPS that is identified by the syntax element inter_layer_ref_pic_set_idx in the slice header. inter_layer_ref_pic_set_sps_flag equal to 0 specifies that the inter-layer RPS of the current picture is derived based on the inter_layer_ref_pic_set( ) syntax structure that is directly included in the slice headers of the current picture.When num_inter_layer_ref_pic_sets is equal to 0, the value of inter_layer_ref_pic_set_sps_flag shall be equal to 0.

inter_layer_ref_pic_set_idx specifies the index,into the list of the inter_layer_ref_pic_set( )syntax structures included in the active SPS, of the inter_layer_ref_pic_set( )syntax structure that is used for derivation of the inter-layer RPS of the current picture. The syntax element inter_layer_ref_pic_set_idx is represented by Ceil( Log2( num_inter_layer_ref_pic_sets))bits. When not present,the value of inter_layer_ref_pic_set_idx is inferred to be equal to 0.The value of inter_layer_ref_pic_set_idx shall be in the range of 0 to num_inter_layer_ref_pic_sets - 1, inclusive.

The variable CurrRpsIdx is derived as follows:

- If inter_layer_ref_pic_set_sps_flag is equal to 1, CurrRpsIdx is set equal to inter_layer_ref_pic_set_idx.
  - Otherwise, CurrRpsIdx is set equal to num_inter_layer_ref_pic_sets.

FIG. 21

| slice_segment_header() { | Descriptor |
|---|---|
|   first_slice_segment_in_pic_flag | u(1) |
|   if(nal_unit_type >= BLA_W_LP && nal_unit_type <= RSV_IRAP_VCL23) | |
|     no_output_of_prior_pics_flag | u(1) |
|   slice_pic_parameter_set_id | ue(v) |
|   if(!first_slice_segment_in_pic_flag) { | |
|     if(dependent_slice_segments_enabled_flag) | |
|       dependent_slice_segment_flag | u(1) |
|     slice_segment_address | u(v) |
|   } | |
|   if(!dependent_slice_segment_flag) { | |
|     if(num_extra_slice_header_bits>0) | |
|       discardable_flag | u(1) |
|     for(i=1;i<num_extra_slice_header_bits;i++) | |
|       slice_reserved_flag[i] | u(1) |
|     slice_type | ue(v) |
|     if(output_flag_present_flag) | |
|       pic_output_flag | u(1) |
|     if(separate_colour_plane_flag == 1) | |
|       colour_plane_id | u(2) |
|     if(nal_unit_type != IDR_W_RADL && nal_unit_type != IDR_N_LP) { | |
|       slice_pic_order_cnt_lsb | u(v) |
|       short_term_ref_pic_set_sps_flag | u(1) |
|       if(!short_term_ref_pic_set_sps_flag) | |
|         short_term_ref_pic_set(num_short_term_ref_pic_sets) | |
|       else if(num_short_term_ref_pic_sets>1) | |
|         short_term_ref_pic_set_idx | u(v) |
|       if(long_term_ref_pics_present_flag) { | |
|         if(num_long_term_ref_pics_sps>0) | |
|           num_long_term_sps | ue(v) |
|         num_long_term_pics | ue(v) |
|         for(i=0;i<num_long_term_sps+num_long_term_pics;i++) { | |
|           if(i<num_long_term_sps) { | |
|             if(num_long_term_ref_pics_sps>1) | |
|               lt_idx_sps[i] | u(v) |
|           } else { | |
|             poc_lsb_lt[i] | u(v) |
|             used_by_curr_pic_lt_flag[i] | u(1) |
|           } | |
|           delta_poc_msb_present_flag[i] | u(1) |
|           if(delta_poc_msb_present_flag[i]) | |
|             delta_poc_msb_cycle_lt[i] | ue(v) |
|         } | |
|       } | |
|       if(sps_temporal_mvp_enabled_flag) | |

FIG. 22

| | |
|---|---|
| slice_temporal_mvp_enabled_flag | u(1) |
| } | |
| if(sample_adaptive_offset_enabled_flag) { | |
|     slice_sao_luma_flag | u(1) |
|     slice_sao_chroma_flag | u(1) |
| } | |
| if( slice_type = = P \|\| slice_type = = B) { | |
|     if(nuh_layer_id>0 && NumDirectRefLayers[nuh_layer_id]>0) { | |
|         inter_layer_pred_enabled_flag | u(1) |
|         if(inter_layer_pred_enabled_flag && NumDirectRefLayers[nuh_layer_id]>1) { | |
|             if (!max_one_active_ref_layer_flag) | |
|                 num_inter_layer_ref_pics_minus1 | u(v) |
|             if (NumDirectRefLayers[nuh_layer_id]!=NumActiveRefLayerPics) | |
|                 for (i=0;i<NumActiveRefLayerPics;i++) | |
|                     inter_layer_pred_layer_idc[i] | u(v) |
|         } | |
|     } | |
|     if (NumSamplePredRefLayers[nuh_layer_id]>0 && NumActiveRefLayerPics>0) | |
|         inter_layer_sample_pred_only_flag | u(1) |
|     num_ref_idx_active_override_flag | u(1) |
|     if(num_ref_idx_active_override_flag) { | |
|         num_ref_idx_l0_active_minus1 | ue(v) |
|         if(slice_type = = B) | |
|             num_ref_idx_l1_active_minus1 | ue(v) |
|     } | |
|     if(lists_modification_present_flag && NumPocTotalCurr>1) | |
|         ref_pic_lists_modification() | |
|     if(slice_type = = B) | |
|         mvd_l1_zero_flag | u(1) |
|     if(cabac_init_present_flag) | |
|         cabac_init_flag | u(1) |
|     if(slice_temporal_mvp_enabled_flag) { | |
|         if(nuh_layer_id>0 && NumActiveMotionPredRefLayers>0) | |
|             alt_collocated_indication_flag | u(1) |
|         if(alt_collocated_indication_flag) | |
|             if(NumActiveMotionPredRefLayers>1) | |
|                 collocated_ref_layer_idx | ue(v) |
|         else { | |
|             if(slice_type = = B) | |
|                 collocated_from_l0_flag | u(1) |
|             if((collocated_from_l0_flag && num_ref_idx_l0_active_minus1>0) \|\| | |
|               (!collocated_from_l0_flag && num_ref_idx_l1_active_minus1>0)) | |
|                 collocated_ref_idx | ue(v) |
|         } | |
|     } | |
|     if((weighted_pred_flag && slice_type = = P) \|\| | |
|         (weighted_bipred_flag && slice_type = = B)) | |

FIG. 23

| | |
|---|---|
| pred_weight_table() | |
| five_minus_max_num_merge_cand | ue(v) |
| } | |
| slice_qp_delta | se(v) |
| if(pps_slice_chroma_qp_offsets_present_flag) { | |
| slice_cb_qp_offset | se(v) |
| slice_cr_qp_offset | se(v) |
| } | |
| if(deblocking_filter_override_enabled_flag) | |
| deblocking_filter_override_flag | u(1) |
| if(deblocking_filter_override_flag) { | |
| slice_deblocking_filter_disabled_flag | u(1) |
| if(!slice_deblocking_filter_disabled_flag) { | |
| slice_beta_offset_div2 | se(v) |
| slice_tc_offset_div2 | se(v) |
| } | |
| } | |
| if(pps_loop_filter_across_slices_enabled_flag && | |
| (slice_sao_luma_flag \|\| slice_sao_chroma_flag \|\| | |
| !slice_deblocking_filter_disabled_flag)) | |
| slice_loop_filter_across_slices_enabled_flag | u(1) |
| } | |
| if(tiles_enabled_flag \|\| entropy_coding_sync_enabled_flag) { | |
| num_entry_point_offsets | ue(v) |
| if(num_entry_point_offsets>0) { | |
| offset_len_minus1 | ue(v) |
| for(i=0; i<num_entry_point_offsets; i++) | |
| entry_point_offset_minus1[i] | u(v) |
| } | |
| } | |
| if(slice_segment_header_extension_present_flag) { | |
| slice_segment_header_extension_length | ue(v) |
| for(i=0; i<slice_segment_header_extension_length; i++) | |
| slice_segment_header_extension_data_byte[i] | u(8) |
| } | |
| byte_alignment() | |
| } | |

FIG. 24 inter_layer_pred_layer_idc[i] specifies the variable, RefPicLayerId[i], representing the nuh_layer_id of the i-th picture that may be used by the current picture for inter-layer prediction. The length of the syntax element inter_layer_pred_layer_idc[i] is Ceil( Log2( NumDirectRefLayers[ nuh_layer_id ] ) ) bits. The value of inter_layer_pred_layer_idc[i] shall be in the range of 0 to NumDirectRefLayers[ nuh_layer_id ] - 1, inclusive. When not present, the value of inter_layer_pred_layer_idc[i] is inferred to be equal to i.

FIG. 25

| seq_parameter_set_rbsp() { | Descriptor |
|---|---|
| sps_video_parameter_set_id | u(4) |
| sps_max_sub_layers_minus1 | u(3) |
| sps_temporal_id_nesting_flag | u(1) |
| profile_tier_level (sps_max_sub_layers_minus1) | |
| sps_seq_parameter_set_id | ue(v) |
| chroma_format_idc | ue(v) |
| if(chroma_format_idc == 3) | |
|     separate_colour_plane_flag | u(1) |
| pic_width_in_luma_samples | ue(v) |
| pic_height_in_luma_samples | ue(v) |
| conformance_window_flag | u(1) |
| if(conformance_window_flag) { | |
|     conf_win_left_offset | ue(v) |
|     conf_win_right_offset | ue(v) |
|     conf_win_top_offset | ue(v) |
|     conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for(i=(sps_sub_layer_ordering_info_present_flag ? 0:sps_max_sub_layers_minus1); i <= sps_max_sub_layers_minus1; i++) { | |
|     sps_max_dec_pic_buffering_minus1[i] | ue(v) |
|     sps_max_num_reorder_pics[i] | ue(v) |
|     sps_max_latency_increase_plus1[i] | ue(v) |
| } | |
| log2_min_luma_coding_block_size_minus3 | ue(v) |
| log2_diff_max_min_luma_coding_block_size | ue(v) |
| log2_min_transform_block_size_minus2 | ue(v) |
| log2_diff_max_min_transform_block_size | ue(v) |
| max_transform_hierarchy_depth_inter | ue(v) |
| max_transform_hierarchy_depth_intra | ue(v) |
| scaling_list_enabled_flag | u(1) |
| if(scaling_list_enabled_flag) { | |
|     sps_scaling_list_data_present_flag | u(1) |
|     if(sps_scaling_list_data_present_flag) | |
|         scaling_list_data() | |
| } | |
| amp_enabled_flag | u(1) |
| sample_adaptive_offset_enabled_flag | u(1) |
| pcm_enabled_flag | u(1) |
| if(pcm_enabled_flag) { | |
|     pcm_sample_bit_depth_luma_minus1 | u(4) |
|     pcm_sample_bit_depth_chroma_minus1 | u(4) |
|     log2_min_pcm_luma_coding_block_size_minus3 | ue(v) |

FIG. 26

| | |
|---|---|
| log2_diff_max_min_pcm_luma_coding_block_size | ue(v) |
| pcm_loop_filter_disabled_flag | u(1) |
| } | |
| num_short_term_ref_pic_sets | ue(v) |
| for(i=0;i<num_short_term_ref_pic_sets;i++) | |
|   short_term_ref_pic_set(i) | |
| long_term_ref_pics_present_flag | u(1) |
| if(long_term_ref_pics_present_flag) { | |
|   num_long_term_ref_pics_sps | ue(v) |
|   for(i=0;i<num_long_term_ref_pics_sps;i++) { | |
|     lt_ref_pic_poc_lsb_sps[i] | u(v) |
|     used_by_curr_pic_lt_sps_flag[i] | u(1) |
|   } | |
| } | |
| if(nuh_layer_id>1 && NumDirectRefLayers[nuh_layer_id]>0) { | |
|   num_inter_layer_ref_pic_sets | ue(v) |
|   for(i=0;i<num_inter_layer_ref_pic_sets;i++) | |
|     inter_layer_ref_pic_set(i) | |
| } | |
| sps_temporal_mvp_enabled_flag | u(1) |
| strong_intra_smoothing_enabled_flag | u(1) |
| vui_parameters_present_flag | u(1) |
| if(vui_parameters_present_flag) | |
|   vui_parameters() | |
| sps_extension_flag | u(1) |
| if(sps_extension_flag) | |
|   while(more_rbsp_data()) | |
|     sps_extension_data_flag | u(1) |
| rbsp_trailing_bits() | |
| } | |

FIG. 27

| | Descriptor |
|---|---|
| inter_layer_ref_pic_set(stRpsIdx) { | |
|   if(!max_one_active_ref_layer_flag) | |
|     num_inter_layer_ref_pics_minus1 | u(v) |
|   for(i=0;i<=num_inter_layer_ref_pics_minus1;i++) | |
|     inter_layer_pred_layer_idc[i] | u(v) |
| } | |

FIG. 28

| slice_segment_header() { | Descriptor |
|---|---|
|   first_slice_segment_in_pic_flag | u(1) |
|   if(nal_unit_type >= BLA_W_LP && nal_unit_type <= RSV_IRAP_VCL23) | |
|     no_output_of_prior_pics_flag | u(1) |
|   slice_pic_parameter_set_id | ue(v) |
|   if(!first_slice_segment_in_pic_flag) { | |
|     if(dependent_slice_segments_enabled_flag) | |
|       dependent_slice_segment_flag | u(1) |
|     slice_segment_address | u(v) |
|   } | |
|   if(!dependent_slice_segment_flag) { | |
|     if(num_extra_slice_header_bits>0) | |
|       discardable_flag | u(1) |
|     for(i=1;i<num_extra_slice_header_bits;i++) | |
|       slice_reserved_flag[i] | u(1) |
|     slice_type | ue(v) |
|     if(output_flag_present_flag) | |
|       pic_output_flag | u(1) |
|     if(separate_colour_plane_flag == 1) | |
|       colour_plane_id | u(2) |
|     if(nal_unit_type != IDR_W_RADL && nal_unit_type != IDR_N_LP) { | |
|       slice_pic_order_cnt_lsb | u(v) |
|       short_term_ref_pic_set_sps_flag | u(1) |
|       if(!short_term_ref_pic_set_sps_flag) | |
|         short_term_ref_pic_set(num_short_term_ref_pic_sets) | |
|       else if(num_short_term_ref_pic_sets>1) | |
|         short_term_ref_pic_set_idx | u(v) |
|       if(long_term_ref_pics_present_flag) { | |
|         if(num_long_term_ref_pics_sps>0) | |
|           num_long_term_sps | ue(v) |
|         num_long_term_pics | ue(v) |
|         for(i=0;i<num_long_term_sps+num_long_term_pics;i++) { | |
|           if(i<num_long_term_sps) { | |
|             if(num_long_term_ref_pics_sps>1) | |
|               lt_idx_sps[i] | u(v) |
|           }else{ | |
|             poc_lsb_lt[i] | u(v) |
|             used_by_curr_pic_lt_flag[i] | u(1) |
|           } | |
|           delta_poc_msb_present_flag[i] | u(1) |
|           if(delta_poc_msb_present_flag[i]) | |
|             delta_poc_msb_cycle_lt[i] | ue(v) |
|         } | |
|       } | |
|       if(sps_temporal_mvp_enabled_flag) | |
|         slice_temporal_mvp_enabled_flag | u(1) |
|     } | |

FIG. 29

| if(sample_adaptive_offset_enabled_flag) { | |
|---|---|
| slice_sao_luma_flag | u(1) |
| slice_sao_chroma_flag | u(1) |
| } | |
| if(slice_type = = P || slice type = = B) { | |
| if(nuh_layer_id>0 && NumDirectRefLayers[nuh_layer_id]>0) { | |
| inter_layer_pred_enabled_flag | u(1) |
| if(inter_layer_pred_enabled_flag && NumDirectRefLayers[nuh_layer_id]>1) { | |
| inter_layer_ref_pic_set_sps_flag | u(1) |
| if(!inter_layer_ref_pic_set_sps_flag) | |
| inter_layer_ref_pic_set(num_inter_layer_ref_pic_sets) | |
| else if(num_inter_layer_ref_pic_sets>1) | |
| inter_layer_ref_pic_set_idx | u(v) |
| } | |
| if(NumActiveRefLayerPics>0) | |
| inter_layer_sample_pred_only_flag | u(1) |
| } | |
| num_ref_idx_active_override_flag | u(1) |

FIG. 30

| | |
|---|---|
| if(num_ref_idx_active_override_flag) { | |
|   num_ref_idx_l0_active_minus1 | ue(v) |
|   if(slice_type = = B) | |
|     num_ref_idx_l1_active_minus1 | ue(v) |
| } | |
| if(lists_modification_present_flag && NumPocTotalCurr>1) | |
|   ref_pic_lists_modification() | |
| if(slice_type = = B) | |
|   mvd_l1_zero_flag | u(1) |
| if(cabac_init_present_flag) | |
|   cabac_init_flag | u(1) |
| if(slice_temporal_mvp_enabled_flag) { | |
|   if(nuh_layer_id>0 && NumActiveMotionPredRefLayers>0) | |
|     alt_collocated_indication_flag | u(1) |
|   if(alt_collocated_indication_flag) | |
|     if(NumActiveMotionPredRefLayers>1) | |
|       collocated_ref_layer_idx | ue(v) |
|   else { | |
|     if(slice_type = = B) | |
|       collocated_from_l0_flag | u(1) |
|     if((collocated_from_l0_flag && num_ref_idx_l0_active_minus1>0) \|\| <br> (!collocated_from_l0_flag && num_ref_idx_l1_active_minus1>0)) | |
|       collocated_ref_idx | ue(v) |
|   } | |
| } | |
| if((weighted_pred_flag && slice_type = = P) \|\| <br>(weighted_bipred_flag && slice_type = = B)) | |
|   pred_weight_table() | |
|   five_minus_max_num_merge_cand | ue(v) |
| } | |
| slice_qp_delta | se(v) |
| if(pps_slice_chroma_qp_offsets_present_flag) { | |
|   slice_cb_qp_offset | se(v) |
|   slice_cr_qp_offset | se(v) |
| } | |
| if(deblocking_filter_override_enabled_flag) | |
|   deblocking_filter_override_flag | u(1) |
| if(deblocking_filter_override_flag) { | |
|   slice_deblocking_filter_disabled_flag | u(1) |
|   if(!slice_deblocking_filter_disabled_flag) { | |
|     slice_beta_offset_div2 | se(v) |
|     slice_tc_offset_div2 | se(v) |
|   } | |
| } | |
| if(pps_loop_filter_across_slices_enabled_flag && <br>(slice_sao_luma_flag \|\| slice_sao_chroma_flag \|\| <br>!slice_deblocking_filter_disabled_flag)) | |
|   slice_loop_filter_across_slices_enabled_flag | u(1) |

FIG. 31

| | |
|---|---|
| } | |
| if( tiles_enabled_flag \|\| entropy_coding_sync_enabled_flag) { | |
|     num_entry_point_offsets | ue(v) |
|     if(num_entry_point_offsets>0) { | |
|         offset_len_minus1 | ue(v) |
|         for(i=0;i<num_entry_point_offsets;i++) | |
|             entry_point_offset_minus1[i] | u(v) |
|     } | |
| } | |
| if(slice_segment_header_extension_present_flag) { | |
|     slice_segment_header_extension_length | ue(v) |
|     for(i=0;i<slice_segment_header_extension_length;i++) | |
|         slice_segment_header_extension_data_byte[i] | u(8) |
| } | |
| byte_alignment() | |
| } | |
| | |

FIG. 32 num_inter_layer_ref_pic_sets specifies the number of inter_layer_ref_pic_set( )syntax structures included in the SPS. The value of num_inter_layer_ref_pic_sets shall be in the range of 0 to 64, inclusive.
NOTE 5 – A decoder should allocate memory for a total number of num_inter_layer_ref_pic_sets + 1 inter_layer_ref_pic_set( ) syntax structures since there may be an inter_layer_ref_pic_set( )syntax structure directly signalled in the slice headers of a current picture. An inter_layer_ref_pic_set( )syntax structure directly signalled in the slice headers of a current picture has an index equal to num_inter_layer_ref_pic_sets.

FIG. 33

An inter_layer_ref_pic_set(stRpsIdx) syntax structure may be present in an SPS or in a slice header. Depending on whether the syntax structure is included in a slice header or an SPS, the following applies:

- If present in a slice header, the inter_layer_ref_pic_set(stRpsIdx) syntax structure specifies the inter-layer RPS of the current picture (the picture containing the slice), and the following applies:
  - The content of the inter_layer_ref_pic_set(stRpsIdx) syntax structure shall be the same in all slice headers of the current picture.
  - The value of stRpsIdx shall be equal to the syntax element num_inter_layer_ref_pic_sets in the active SPS.
  - The inter-layer RPS of the current picture is also referred to as the num_inter_layer_ref_pic_sets-th candidate inter-layer RPS in the semantics specified in the remainder of this subclause.
- Otherwise(present in an SPS), the inter_layer_ref_pic_set(stRpsIdx) syntax structure specifies a candidate inter_layer RPS, and the term "the current picture" in the semantics specified in the remainder of this subclause refers to each picture that has inter_layer_ref_pic_set_idx equal to stRpsIdx in a CVS that has the SPS as the active SPS.

num_inter_layer_ref_pics_minus1 plus 1 specifies the number of pictures that may be used in decoding of the current picture for inter-layer prediction. The length of the num_inter_layer_ref_pics_minus1 syntax element is Ceil( Log2( NumDirectRefLayers[ nuh_layer_id ] ) ) bits. The value of num_inter_layer_ref_pics_minus1 shall be in the range of 0 to NumDirectRefLayers[ nuh_layer_id ] − 1, inclusive. When not present, the value of num_inter_layer_ref_pics_minus1 is inferred to be equal to 0.

The variable NumActiveRefLayerPics is derived as follows:

```
if( nuh_layer_id = = 0 || NumDirectRefLayers[ nuh_layer_id ] = = 0 || !inter_layer_pred_enabled_flag )
    NumActiveRefLayerPics = 0
else if( max_one_active_ref_layer_flag || NumDirectRefLayers[ nuh_layer_id ] = = 1 )
    NumActiveRefLayerPics = 1
else
    NumActiveRefLayerPics = num_inter_layer_ref_pics_minus1 + 1
```

All slices of a coded picture shall have the same value of NumActiveRefLayerPics.

NOTE − If NumActiveRefLayerPics is equal to NumDirectRefLayers[nuh_layer_id], it is not necessary to send inter_layer_ref_pic_set( stRpsIdx ) syntax structure.

inter_layer_pred_layer_idc[ i ] specifies the variable, RefPicLayerId[ i ], representing the nuh_layer_id of the i-th picture that may be used by the current picture for inter-layer prediction. The length of the syntax element inter_layer_pred_layer_idc[ i ] is Ceil( Log2( NumDirectRefLayers[ nuh_layer_id ] )) bits. The value of inter_layer_pred_layer_idc[ i ] shall be in the range of 0 to NumDirectRefLayers[nuh_layer_id] − 1, inclusive. When not present, the value of inter_layer_pred_layer_idc[ i ] is inferred to be equal to i.

When i is greater than 0, inter_layer_pred_layer_idc[ i ] shall be greater than inter_layer_pred_layer_idc[ i − 1 ].

The variables RefPicLayerId[ i ] for each value of i in the range of 0 to NumActiveRefLayerPics − 1, inclusive, NumActiveMotionPredRefLayers, and ActiveMotionPredRefLayerId[ j ] for each value of j in the range of 0 to NumActiveMotionPredRefLayers − 1, inclusive, are derived as follows:

```
for( i = 0, j = 0; i < NumActiveRefLayerPics; i++)
    RefPicLayerId[ i ] = RefLayerId[ nuh_layer_id ][ inter_layer_pred_layer_idc[ i ] ]
    if( MotionPredEnabledFlag[ nuh_layer_id ][ inter_layer_pred_layer_idc[ i ] ] )
        ActiveMotionPredRefLayerId[ j++ ] = RefLayerId[ nuh_layer_id ][ inter_layer_pred_layer_idc[ i ] ]
}
NumActiveMotionPredRefLayers = j
```

All slices of a picture shall have the same value of inter_layer_pred_layer_idc[ i ] for each value of i in the range of 0 to NumActiveRefLayerPics − 1, inclusive.

It is a requirement of bitstream conformance that for each value of i in the range of 0 to NumActiveRefLayerPics − 1, inclusive, either of the following two conditions shall be true:

- The value of max_tid_il_ref_pics_plus1[ LayerIdxInVps[ RefPicLayerId[ i ] ] ] is greater than TemporalId.
- The values of max_tid_il_ref_pics_plus1[LayerIdxInVps[ RefPicLayerId[i]]] and TemporalId are both equal to 0 and the picture in the current access unit with nuh_layer_id equal to RefPicLayerId[ i ] is an IRAP picture.

It is a requirement of bitstream conformance that for each value of i in the range of 0 to NumActiveRefLayerPics − 1, inclusive, the value of SamplePredEnabledFlag[ nuh_layer_id ][ RefPicLayerId[ i ] ] or MotionPredEnabledFlag[ nuh_layer_id ][ RefPicLayerId[ i ] ] shall be equal to 1.

FIG. 34 inter_layer_ref_pic_set_sps_flag equal to 1 specifies that the inter-layer RPS of the current picture is derived based on one of the inter_layer_ref_pic_set( ) syntax structures in the active SPS that is identified by the syntax element inter_layer_ref_pic_set_idx in the slice header. inter_layer_ref_pic_set_sps_flag equal to 0 specifies that the inter-layer RPS of the current picture is derived based on the inter_layer_ref_pic_set( )syntax structure that is directly included in the slice headers of the current picture. When num_inter_layer_ref_pic_sets is equal to 0, the value of inter_layer_ref_pic_set_sps_flag shall be equal to 0.

inter_layer_ref_pic_set_idx specifies the index, into the list of the inter_layer_ref_pic_set( ) syntax structures included in the active SPS, of the inter_layer_ref_pic_set( ) syntax structure that is used for derivation of the inter-layer RPS of the current picture. The syntax element inter_layer_ref_pic_set_idx is represented by Ceil( Log2( num_inter_layer_ref_pic_sets ) ) bits. When not present, the value of inter_layer_ref_pic_set_idx is inferred to be equal to 0. The value of inter_layer_ref_pic_set_idx shall be in the range of 0 to num_inter_layer_ref_pic_sets − 1, inclusive.

The variable CurrRpsIdx is derived as follows:

- If inter_layer_ref_pic_set_sps_flag is equal to 1, CurrRpsIdx is set equal to inter_layer_ref_pic_set_idx.

- Otherwise, CurrRpsIdx is set equal to num_inter_layer_ref_pic_sets.

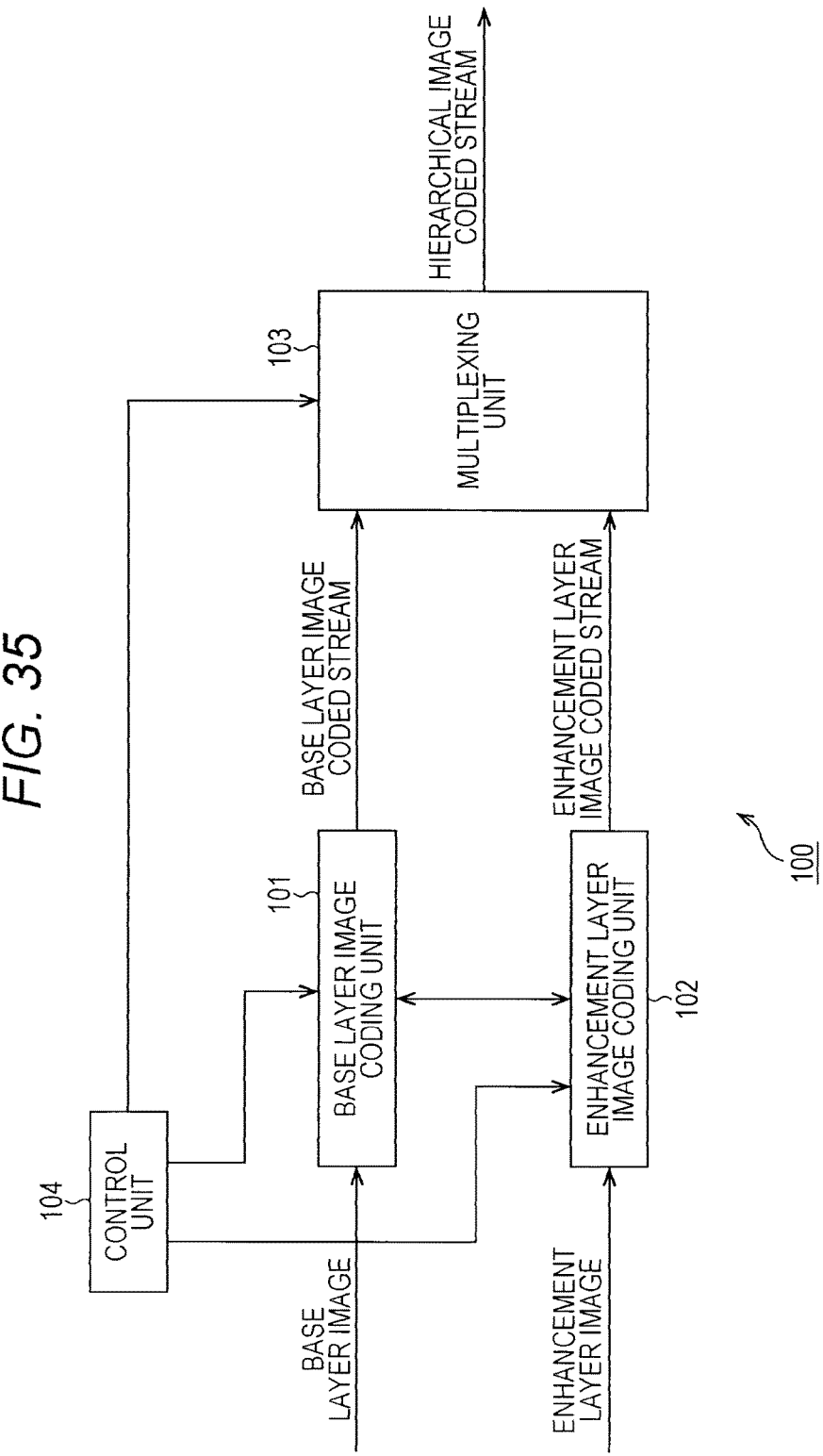

FIG. 69

```
<?xml version="1.0"?>
<MPD
 xmlns:xsi="http://www.w3.org/2001/XMLSchema-instance"
 xmlns="urn:mpeg:DASH:schema:MPD:2011"
 xsi:schemaLocation="urn:mpeg:DASH:schema:MPD:2011 DASH-MPD.xsd"
 type="static"
 mediaPresentationDuration="PT3256S"
 minBufferTime="PT1.2S"
 profiles="urn:mpeg:dash:profile:isoff-on-demand:2011">

<BaseURL>http://cdn1.example.com/</BaseURL>
 <BaseURL>http://cdn2.example.com/</BaseURL>

<Period>
  <!--English Audio-->
  <AdaptationSet mimeType="audio/mp4" codecs="mp4a.0x40" lang="en" subsegmentAlignment="true" subsegmentStartsWithSAP="1" >
   <ContentProtection schemeIdUri="urn:uuid:70606953-656C-5244-4048-656164657221" />
   <Representation id="1" bandwidth="64000">
    <BaseURL>7657412343.mp4</BaseURL>
   </Representation>
   <Representation id="2" bandwidth="32000">
    <BaseURL>3463640346.mp4</BaseURL>
   </Representation>
  </AdaptationSet>
  <!--Video-->
  <AdaptationSet mimeType="video/mp4" codecs="avc1.460228" subsegmentAlignment="true" subsegmentStartsWithSAP="2" >
   <ContentProtection schemeIdUri="urn:uuid:70606953-656C-5244-4048-656164657221" />
   <Representation id="6" bandwidth="256000" width="320" height="240">
    <BaseURL>8563456473.mp4</BaseURL>
   </Representation>
   <Representation id="7" bandwidth="512000" width="320" height="240">
    <BaseURL>5636363634.mp4</BaseURL>
   </Representation>
   <Representation id="8" bandwidth="1024000" width="640" height="480">
    <BaseURL>5624656736.mp4</BaseURL>
   </Representation>
   <Representation id="9" bandwidth="1384000" width="640" height="480">
    <BaseURL>4132564.mp4</BaseURL>
   </Representation>
   <Representation id="A" bandwidth="1536000" width="1280" height="720">
    <BaseURL>8804562.mp4</BaseURL>
   </Representation>
   <Representation id="B" bandwidth="2048000" width="1280" height="720">
    <BaseURL>2353574.mp4</BaseURL>
   </Representation>
  </AdaptationSet>
 </Period>
</MPD>
```

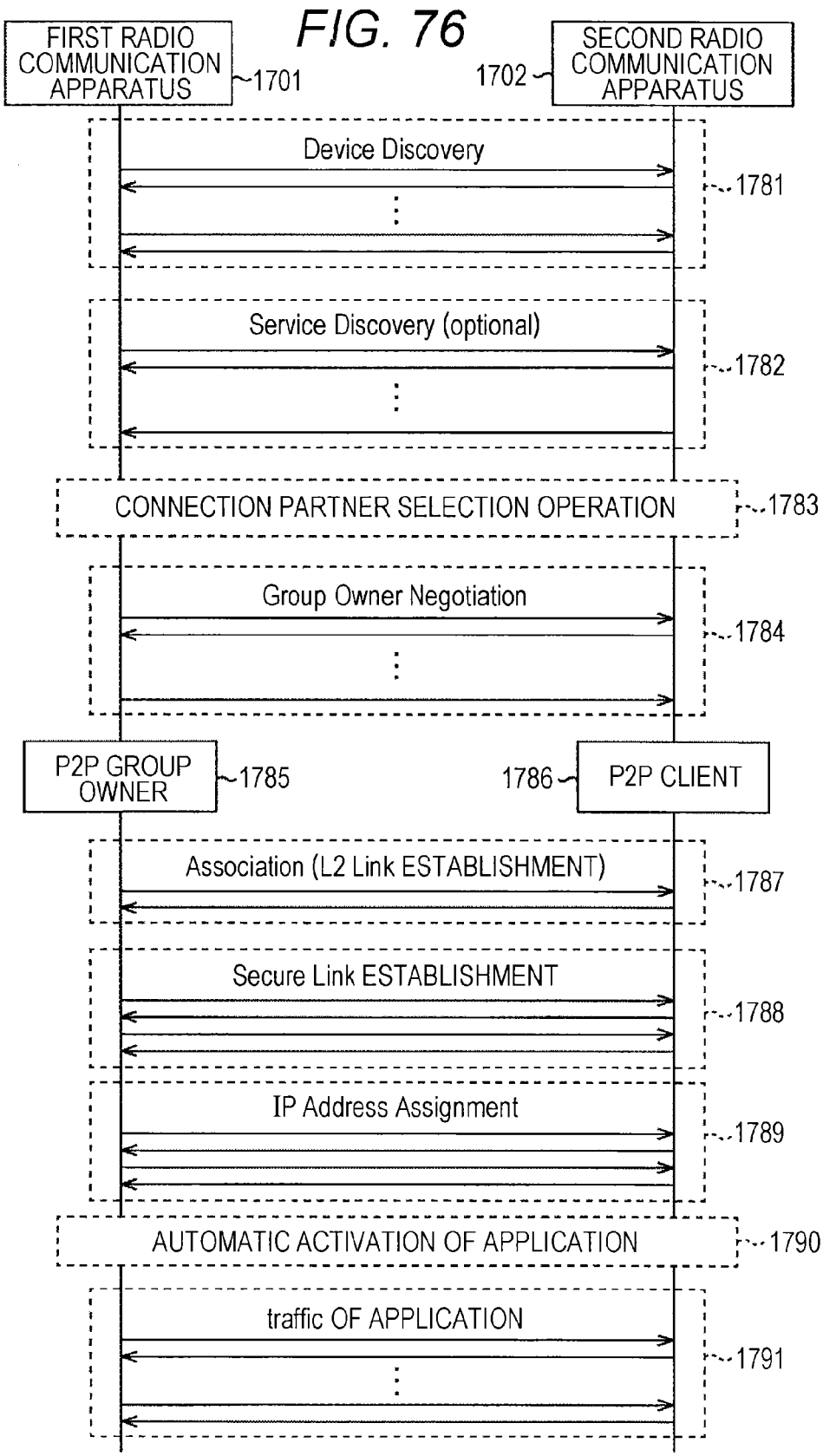

IMAGE CODING APPARATUS AND METHOD

TECHNICAL FIELD

The present disclosure relates to an image coding apparatus and method, and more particularly, to an image coding apparatus and method capable of suppressing a decrease in the coding efficiency.

BACKGROUND ART

Recently, in order to improve the coding efficiency more than that of MPEG-4 Part 10 (Advanced Video Coding; hereinafter, referred to as AVC), standardization of an coding system called High Efficiency Video Coding (HEVC) has been progressed by Joint Collaboration Team-Video Coding (JCTVC) that is a joint standards organization of International Telecommunication Union Telecommunication Standardization Sector (ITU-T) and International Organization for Standardization/International Electrotechnical Commission (ISO/IEC) (for example, see Patent Document 1).

In addition, a high-level syntax (HL syntax) structure of, for example, a video parameter set (VPS), a sequence parameter set (SPS), a picture parameter set (PPS), a slice header, and the like, which is common to extended standards, has been proposed (for example, see Non-Patent Document 2, and Non-Patent Document 3).

CITATION LIST

Non-Patent Document

Non-Patent Document 1: Benjamin Bross, Woo-Jin Han, Jens-Rainer Ohm, Gary J. Sullivan, Ye-Kui Wang, Thomas Wiegand, "High Efficiency Video Coding (HEVC) text specification draft 10 (for FDIS & Last Call)", JCTVC-L1003_v34, Joint Collaborative Team on Video Coding (JCT-VC) of ITU-T SG 16 WP 3 and ISO/IEC JTC 1/SC 29/WG 11 12th Meeting: Geneva, CH, 14-23 Jan. 2013

Non-Patent Document 2: Gerhard Tech, Krzysztof Wegner, Ying Chen, Miska Hannuksela, Jill Boyce, "MV-HEVC Draft Text 4", JCT3V-D1004-v4, Joint Collaborative Team on 3D Video Coding Extension Development of ITU-T SG 16 WP 3 and ISO/IEC JTC 1/SC 29/WG 114th Meeting: Incheon, KR, 20-26 Apr. 2013 Non-Patent Document 3: Jianle Chen, Jill Boyce, Yan Ye, Miska M. Hannuksela, "SHVC Working Draft 2", JCTVC-M1008_v3, Joint Collaborative Team on Video Coding (JCT-VC) of ITU-T SG16 WP3 and ISO/IEC JTC1/SC29/WG1113th Meeting: Incheon, KR, 18-26 April 2013

SUMMARY OF THE INVENTION

Problems to be Solved by the Invention

However, in the case of the techniques proposed in Non-Patent Document 2 and Non-Document 3, while information relating to an interlayer prediction is transmitted in the slice header, at that time, an unnecessary syntax is transmitted as well. Accordingly, the coding amount of the slice header unnecessarily increases, and thus, there is concern that the coding efficiency decreases.

The present disclosure is made in consideration of such a situation and is for suppressing a decrease in the coding efficiency.

Solutions to Problems

According to an aspect of the present technology, there is provided an image coding apparatus including: a reference layer designation information generating unit that generates reference layer designation information designating a layer that is referred to in an interlayer prediction in a case where a maximum number of another layer referred to at the time of performing the interlayer prediction and the number of another layer referred to at the time of performing the interlayer prediction, which are set for the whole image data configured by a plurality of layers, do not coincide with each other; and a coding unit that codes the image data.

In addition, a prediction control unit that controls the interlayer prediction based on the reference layer designation information generated by the reference layer designation information generating unit may be further included.

In addition, a transmission unit that transmits the reference layer designation information with a slice header may be further included.

The reference layer designation information generating unit may generate the reference layer designation information in a case where a current layer is not layer 0, and the number of reference layers of the current layer is not "0".

In addition, an interlayer predictability information generating unit that generates interlayer predictability information representing whether an interlayer prediction is permitted may be further included.

In addition, the reference layer designation information generating unit may further generate the reference layer designation information in a case where the interlayer prediction is represented to be permitted by the interlayer predictability information, and the number of the reference layers of the current layer is plural.

A reference layer number information generating unit that generates reference layer number information representing the number of another layer referred to at the time of performing the interlayer prediction may be further included.

The reference layer number information generating unit may generate the reference layer number information in a case where the number of referable layers in the interlayer prediction is not limited to single.

According to another aspect of the present technology, there is provided an image coding method including: generating reference layer designation information designating a layer that is referred to in an interlayer prediction in a case where a maximum number of another layer referred to at the time of performing the interlayer prediction and the number of another layer referred to at the time of performing the interlayer prediction, which are set for the whole image data configured by a plurality of layers, do not coincide with each other; and coding the image data.

According to an aspect of the present technology, reference layer designation information designating a layer that is referred to in an interlayer prediction is generated in a case where a maximum number of another layer referred to at the time of performing the interlayer prediction and the number of another layer referred to at the time of performing the interlayer prediction, which are set for the whole image data configured by a plurality of layers, do not coincide with each other, and the image data is coded.

Effects of the Invention

According to the present disclosure, an image can be encoded and decoded. Particularly, an increase in the load for encoding or decoding can be suppressed.

BRIEF DESCRIPTION OF DRAWINGS

FIG. 5 is a diagram that illustrates an example of scalable coding of a signal-to-noise ratio.
FIG. 6 is a diagram that illustrates an example of the syntax of a slice header.
FIG. 7 is a diagram that illustrates an example of the semantics of a slice header.
FIG. 9 is a diagram that illustrates an example of the syntax of a slice header.
FIG. 11 is a diagram that illustrates an example of the syntax of a slice header.
FIG. 12 is a diagram that illustrates an example of the semantics of a slice header.
FIG. 15 is a diagram that illustrates an example of the syntax of a sequence parameter set.
FIG. 16 is a diagram that illustrates an example of the syntax of an interlayer reference picture set.
FIG. 17 is a diagram that illustrates an example of the syntax of a slice header.
FIG. 18 is a diagram that illustrates an example of the semantics of a sequence parameter set.
FIG. 19 is a diagram that illustrates an example of the semantics of an interlayer reference picture set.
FIG. 20 is a diagram that illustrates an example of the semantics of a slice header.
FIG. 21 is a diagram that illustrates an example of the syntax of a slice header.
FIG. 22 is a diagram following FIG. 21 that illustrates an example of the syntax of a slice header.
FIG. 23 is a diagram following FIG. 22 that illustrates the syntax of a slice header.
FIG. 24 is a diagram that illustrates an example of the semantics of a slice header.
FIG. 25 is a diagram that illustrates an example of the syntax of a sequence parameter set.
FIG. 26 is a diagram following FIG. 25 that illustrates an example of the syntax of a sequence parameter set.
FIG. 27 is a diagram that illustrates an example of the syntax of an interlayer reference picture set.
FIG. 28 is a diagram that illustrates an example of the syntax of a slice header.
FIG. 29 is a diagram following FIG. 28 that illustrates an example of the syntax of a slice header.
FIG. 30 is a diagram following FIG. 29 that illustrates an example of the syntax of a slice header.
FIG. 31 is a diagram following FIG. 30 that illustrates an example of the syntax of a slice header.
FIG. 32 is a diagram that illustrates an example of the semantics of a sequence parameter set.
FIG. 33 is a diagram that illustrates an example of the semantics of an interlayer reference picture set.
FIG. 34 is a diagram that illustrates an example of the semantics of a slice header.
FIG. 35 is a block diagram that illustrates an example of the main configuration of an image coding apparatus.

FIG. 69 is an explanatory diagram that illustrates a specific example of an MPD.

FIG. 76 is a sequence chart that illustrates an example of a communication process performed by each apparatus of a radio communication system.

MODE FOR CARRYING OUT THE INVENTION

Figure 1:
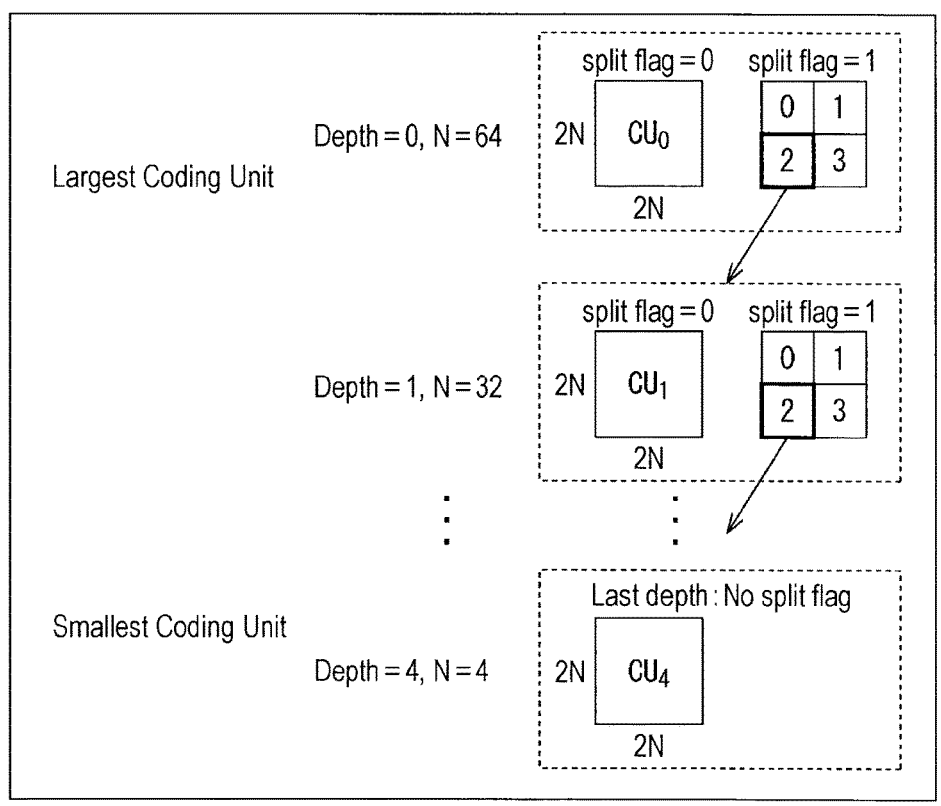
FIG. 1 is a diagram that illustrates a configuration example of a coding unit.

Hereinafter, embodiments (hereinafter, referred to as embodiments) for performing the present disclosure will be described. The description will be presented in the following order.

1. First Embodiment (Decrease in Redundancy of Slice Header)
2. Second Embodiment (Image Coding apparatus)
3. Third Embodiment (Image Decoding apparatus)
4. Fourth Embodiment (Multiple Viewpoint Image Coding and Multiple Viewpoint Image Decoding apparatus)
5. Fifth Embodiment (Computer)
6. Sixth Embodiment (Application Example)
7. Seventh Embodiment (Application Example of Scalable Coding)
8. Eighth Embodiment (Set/Unit/Module/Processor)
9. Ninth Embodiment (Application Example of Content Reproduction System of MPEG-DASH)
10. Tenth Embodiment (Application Example of Radio Communication System of Wi-Fi Standard)

1. First Embodiment

<Flow of Standardization of Image Coding>

Recently, image information is handled as digital data, and, at that time, for the purpose of transmitting and accumulating information with high efficiency, devices are widely used which compress and code an image by employing a coding system compressing data through an orthogonal transform such as a discrete cosine transform and a motion compensation by using redundancy that is specific to the image information. Examples of such a coding system include Moving Picture Experts Group (MPEG) and the like.

Particularly, MPEG2 (ISO/IEC 13818-2) is defined as a general-purpose image coding system and is a standard covering both an interlaced scanning image and a sequential scanning image and a standard resolution image and a high definition image. For example, currently, MPEG2 is widely used for a broad range of applications for professional uses and consumer uses. By using the MPEG2 compression system, for example, in the case of an interlaced scanning image of the standard resolution having 720×480 pixels, a code amount (bit rate) of 4 to 8 Mbps is assigned. In addition, by using the MPEG2 compression system, for example, in the case of an interlaced scanning image of high resolution having 1920×1088 pixels, a code amount (bit rate) of 18 to 22 Mbps is assigned. Accordingly, a high compression rate and a satisfactory picture quality can be realized.

The MPEG2 is mainly targeted for high image quality coding that is mainly appropriate for a broadcast but does not comply with a coding system having a code amount (bit rate) lower than that of MPEG1, in other words, having a compression rate higher than that of MPEG1. However, it is considered that the number of such requests will be increased in the future in accordance with the wide use of portable terminals, and standardization of an MPEG4 coding system was made in accordance therewith. Its standard relating to an image coding system was approved on December, 1998 as ISO/IEC 14496-2.

Furthermore, in recent years, for the initial purpose of image coding for television conferences, H.26L International Telecommunication Union Telecommunication Standardization Sector (ITU-T) Q6/16 Video Coding Expert Group (VCEG)) has been standardized. It is known that H.26L requires a more calculation amount due to the coding process and the decoding process thereof than that of a conventional coding system such as MPEG2 or MPEG4 and realizes higher coding efficiency. In addition, currently, as part of activities of MPEG4, a standard realizing higher coding efficiency by introducing functions not supported according to H.26L based on H.26L has been made as Joint Model of Enhanced-Compression Video Coding.

As a schedule of the standardization thereof, in March, 2003, an international standard was made based on names of H.264 and MPEG-4 Part 10 (Advanced Video Coding; hereinafter, referred to as AVC).

In addition, as an extension of H.264/AVC, standardization of Fidelity Range Extension (FRExt) including coding tools required for a business use and 8×8 DCT and a quantization matrix defined in MPEG-2, which are called RGB, 4:2:2, and 4:4:4, has been completed in February, 2005. In this way, a coding system capable of representing a film noise included in a movie is formed by using H.264/AVC, and H.264/AVC is on a stage of being used in a broad range of applications of Blu-Ray Disc (trademark) and the like.

However, recently, the number of requests for coding having a further higher compression rate such as a request for compressing an image of about 4000×2000 pixels that are four times the number of pixels of a high definition image and a request for delivering a high definition image in an environment having a limited transmission capacity such as the Internet has been increased. For this reason, reviews for improving the coding efficiency have been continuously made by the VCEG affiliated with the ITU-T described above.

Thus, currently, for the purpose of further improving the coding efficiency to be higher than that of the AVC, standardization of a coding system called High Efficiency Video Coding (HEVC) has been progressed by a Joint Collaboration Team-Video Coding (JCTVC) that is a joint standardization organization of the ITU-T and the International Organization for Standardization/International Electrotechnical Commission (ISO/IEC). Regarding the HEVC standard, a committee draft that is a draft-edition specification was issued in January, 2013 (for example, see Non-Patent Document 1).

<Coding System>

Hereinafter, the present technology will be described in the case of being applied to image coding/decoding of the High Efficiency Video Coding (HEVC) system as an example.

<Coding Unit>

In the Advanced Video Coding (AVC) system, a hierarchical structure configured by a macro block and a sub macro block is defined. However, a macro block of 16×16 pixels is not optimal for a large image frame called Ultra High Definition (UHD; 4000 pixels×2000 pixels) that becomes a target for a next-generation coding system.

In contrast to this, in the HEVC system, as illustrated in FIG. 1, a coding unit (CU) is defined.

A CU is also called a Coding Tree Block (CTB) and is a partial area of a picture unit that achieves a role similar to that of the macro block in the AVC system. While the macro block is fixed to the size of 16×16 pixels, the size of the CU is not fixed but is designated in image compression information in each sequence.

For example, in the sequence parameter set (SPS) included in coded data that is an output, a maximum size (Largest Coding Unit (LCU)) and a minimum size (Smallest Coding Unit (SCU)) of the CU are defined.

Within each LCU, by setting split-flag=1 in a range not under the size of the SCU, the LCU can be split into CUs having a smaller size. In the example illustrated in FIG. 1, the size of the LCU is 128, and a largest hierarchical depth is 5. When the value of split flag is "1", the CU having a size of 2N×2N is split into CUs each having a size of N×N at a hierarchy one level below.

Furthermore, the CU is split into prediction units (PUs) that are areas (partial areas of an image in units of pictures) that are processing units of an intra prediction or an inter prediction and is split into transform units (TUs) that are areas (partial areas of an image in units of pictures) that are processing units of an orthogonal transform. At present, in the HEVC system, 16×16 and 32×32 orthogonal transforms can be used in addition to 4×4 and 8×8 orthogonal transforms.

As in the HEVC system described above, in the case of a coding system in which a CU is defined, and various processes are performed in units of CUs, it may be considered that a macro block of the AVC system corresponds to an LCU, and a block (sub block) corresponds to a CU. In addition, a motion compensation block of the AVC system may be considered to correspond to a PU. However, since the CU has a hierarchical structure, generally, the size of the LCU of the highest hierarchy is set to be larger than that of the macro block of the AVC system such as 128×128 pixels.

Thus, hereinafter, an LCU is assumed to include a macro block of the AVC system as well, and a CU is assumed to include a block (sub block) of the AVC system as well. In other words, a "block" used in the description presented below represents an arbitrary partial area within the picture, and the size, the shape, the characteristic, and the like thereof are not specifically limited. In other words, a "block", for example, includes arbitrary areas such as a TU, a PU, an SCU, a CU, an LCU, a sub block, a macro block, and a slice. It is apparent that a partial area (processing unit) other than those is also included therein. In addition, a case where the size, the processing unit, or the like needs to be limited will be appropriately described.

In this specification, a Coding Tree Unit (CTU) is assumed to be a unit that includes a Coding Tree Block (CTB) of a CU of a largest number (LCU) and a parameter at the time of processing at the LCU base (level) thereof. In addition, a Coding Unit (CU) configuring the CTU is assumed to be a unit that includes a Coding Block (CB) and a parameter at the time of processing at the CU base (level) thereof.

<Mode Selection>

In the AVC and HEVC coding systems, in order to attain higher coding efficiency, selection of an appropriate prediction mode is significant.

As an example of such a selection system, there is a method in which the selection system is embedded in reference software (published at http://iphome.hhi.de/suehring/tml/index.htm) of H.264/MPEG-4AVC called a JM (Joint Model).

In the JM, a mode determination method for determining two modes including a high complexity mode and a low complexity mode to be described below can be selected. In any one of the modes, a cost function value relating to each prediction mode. Mode is calculated, and a prediction mode having a smallest cost function value is selected as an optimal mode for the block or the macro block.

The cost function in the high complexity mode is represented below as in Equation (1).

[Mathematical Formula 1]

$$\text{Cost}(\text{Mode} \in \Omega) = D + \lambda * R \qquad (1)$$

Here, $\Omega$ is a universal set of candidate modes used for coding the block or the macro block, D is differential energy between a decoded image and an input image in a case where coding is performed in the prediction mode. In addition, $\lambda$ is a Lagrange undefined multiplier given as a function of a quantization parameter. R is a total code amount of a case where coding is performed in the mode that includes the orthogonal transform coefficient.

In other words, when coding is performed in the high complexity mode, in order to calculate the above-described parameters D and R, a provisional encoding process needs to be performed once for all the candidate modes, and accordingly, a larger calculation amount is necessary.

A cost function in the low complexity mode is represented below as in Equation (2).

[Mathematical Formula 2]

$$\text{Cost}(\text{Mode} \in \Omega) = D + QP2\text{Quant}(QP) * \text{HeaderBit} \quad (2)$$

Here, D, different from that of the case of the high complexity mode, is differential energy between a predicted image and an input image. In addition, QP2Quant (QP) is given as a function of a quantization parameter QP, and HeaderBit is a code amount relating to information belonging to a header such as a motion vector and a mode that does not include an orthogonal transform coefficient.

In other words, in the low complexity mode, while a prediction process needs to be performed for each candidate mode, a decoded image is not necessary, and the coding process does not need to be performed. For this reason, the low complexity mode can realize a calculation amount lower than that of the high complexity mode.

<Hierarchical Coding>

Figure 2:
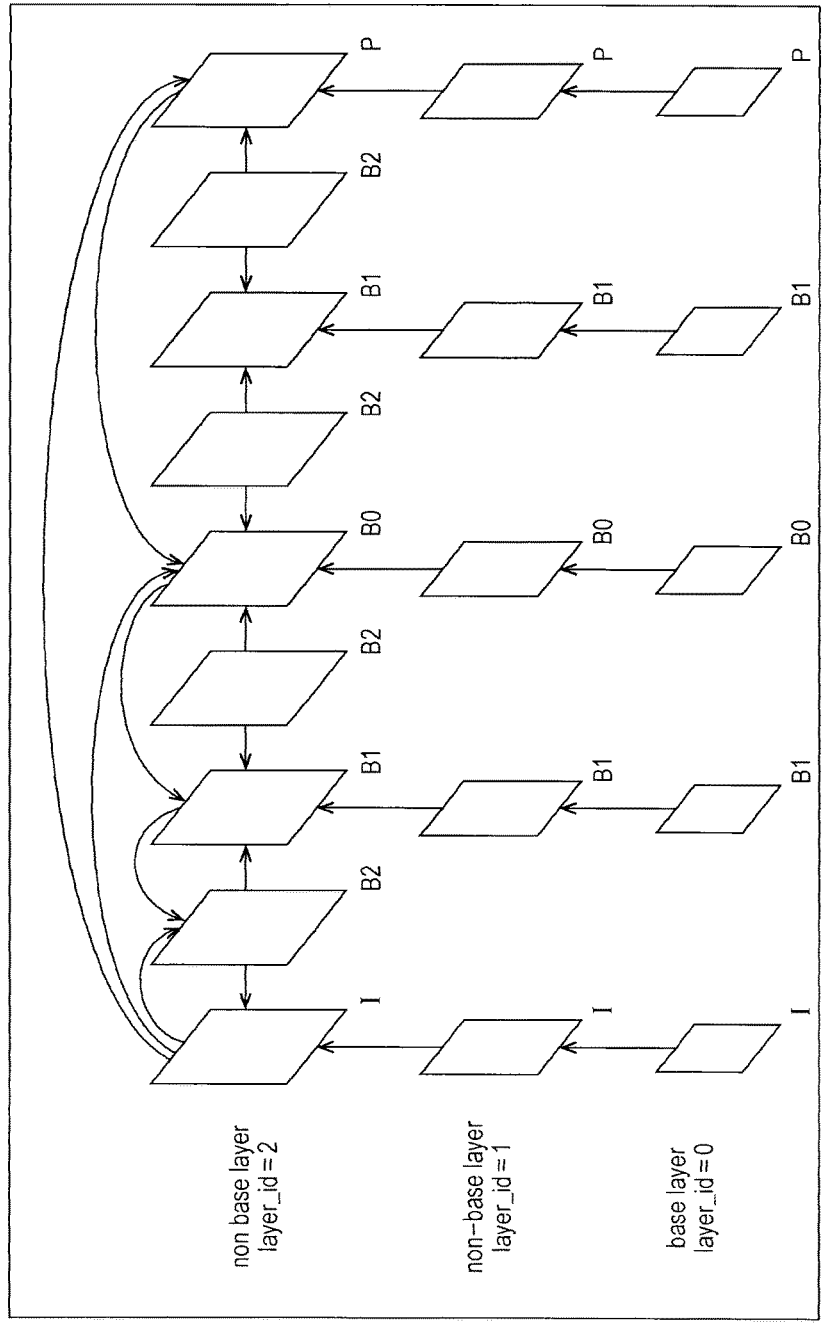
FIG. 2 is a diagram that illustrates an example of a hierarchical image coding system.

The image coding systems such as MPEG2 and AVC described until now have a scalability function. Scalable coding (hierarchical coding) is a system in which an image is configured by a plurality of layers (hierarchizing), and coding is performed for each layer. FIG. 2 is a diagram that illustrates an example of a hierarchical image coding system.

As illustrated in FIG. 2, in the hierarchizing an image, one image is divided into a plurality of hierarchies (layers) by referring to a predetermined parameter having the scalability function. In other words, the hierarchized image (hierarchical image) includes a plurality of hierarchies (layers) having mutually-different values of the predetermined parameter. The plurality of layers of the hierarchical image is configured by a base layer coding and decoding using an image of the base layer without using an image of another layer and a non-base layer (also referred to as an enhancement layer) coding and decoding using an image of another layer. The non-base layer may be configured to use an image of the base layer or use an image of another non-base layer.

Generally, in order to reduce redundancy, the non-base layer is configured by data (differential data) of a differential image between the image of the non-base layer and an image of another layer. For example, in a case where one image is hierarchized into two layers including a base layer and a non-base layer (also referred to as an enhancement layer), an image having a quality lower than the original image is acquired by using only the data of the base layer, and the original image (in other words, a high-quality image) is acquired by composing the data of the base layer and the data of the non-base layer.

By hierarchizing the image in this way, images of various qualities can be easily acquired according to the situation. For example, as in a case where, to a terminal having a low processing capability such as a mobile phone, image compression information of only a base layer is transmitted, and a moving image having low spatial/temporal resolution or a low image quality is reproduced, and, to a terminal having a high processing capability such as a television set or a personal computer, image compression information of an enhancement layer in addition to the base layer is transmitted, and a moving image having high space/time resolution or a high image quality is reproduced, the image compression information according to the capability of the terminal or the network can be transmitted from a server without performing trans-code processing.

<Scalable Parameter>

Figure 3:
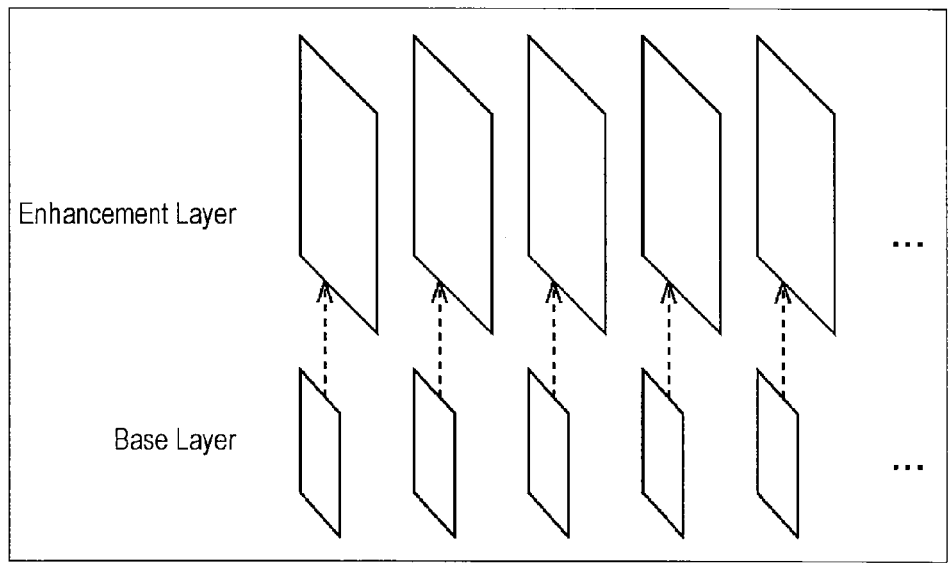
FIG. 3 is a diagram that illustrates an example of spatial scalable coding.

In such hierarchical image coding/hierarchical image decoding (scalable coding/scalable decoding), a parameter having the scalability function is arbitrary. For example, spatial resolution as illustrated in FIG. 3 may be set as the parameter (spatial scalability). In the case of this spatial scalability, the resolution of the image is different for each layer. In other words, as illustrated in FIG. 3, each picture is hierarchized into two hierarchies of the base layer having spatial resolution lower than the original image and the enhancement layer capable of acquiring the original image (original spatial resolution) by being composed with the image of the base layer. It is apparent that the number of hierarchies is an example, and the picture can be hierarchized using an arbitrary number of hierarchies.

Figure 4:
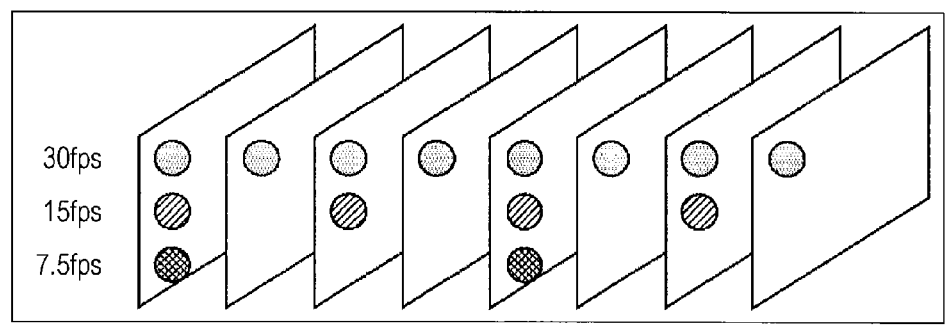
FIG. 4 is a diagram that illustrates an example of temporal scalable coding.

As a parameter having such scalability, for example, temporal resolution as illustrated in FIG. 4 may be applied (temporal scalability). In the case of this temporal scalability, the frame rate is different for each layer. In other words, in this case, as illustrated in FIG. 4, since an image is hierarchized into layers having mutually-different frame rates, by adding a layer of a high frame rate to a layer of a low frame rate, a moving image having a higher frame rate can be acquired, and, by adding all the layers, the original moving image (the original frame rate) can be acquired. Here, the number of hierarchies is an example, and the image can be hierarchized for an arbitrary number of hierarchies.

In addition, as a parameter having such scalability, for example, a Signal to Noise ratio (SNR) may be applied (SNR scalability). In the case of this SNR scalability, the SN ratio is different for each layer. In other words, as illustrated in FIG. 5, each picture is hierarchized into two hierarchies including a base layer having an SNR lower than the original image and an enhancement layer capable of acquiring the original image (original SNR) by being composed with an image of the base layer. In other words, in the base layer image compression information, information relating to an image having a low PSNR is transmitted, and, by adding enhancement layer image compression information thereto, an image having a high PSNR can be rebuilt. It is apparent that the number of hierarchies is an example, and the image can be hierarchized for an arbitrary number of hierarchies.

It is apparent that a parameter having the scalability may be other than those of the examples described above. For example, there is bit-depth scalability in which a base layer is configured by an 8-bit image, and, by adding an enhancement layer thereto, an image of 10 bits is acquired.

In addition, there is chroma scalability in which a base layer is configured by a component image of the 4:2:0 format, and a component image of the 4:2:2 format is acquired by adding an enhancement layer thereto.

<Hi-Level Syntax of Extended Standard>

For example, as described in Non-Patent Document 2 or Non-Patent Document 3, a high level syntax (HL syntax) structure of, for example, a Video Parameter Set (VPS), a Sequence Parameter Set (SPS), a Picture Parameter Set (PPS), a SliceHeader, or the like that is common to the extended standard of the HEVC described above has been proposed.

In Non-Patent Document 2 or Non-Patent Document 3, transmission of information relating to an interlayer prediction in the slice header has been proposed. FIG. 6 is a diagram that illustrates an example of the syntax of information, which relates to an interlayer prediction, of a slice header. FIG. 7 is a diagram that illustrates an example of the semantics of the slice header.

As illustrated in FIG. 6, in the slice header, as information relating to an interlayer prediction, information of inter_layer_pred_enabled_flag, num_inter_layer_ref_pics_minus1, inter_layer_pred_layer_idc[i], inter_layer_sample_pred_only_flag, and the like is transmitted.

inter_layer_pred_enabled_flag is interlayer predictability information that represents whether an interlayer prediction is permitted for the current slice that is a processing target. In a case where value thereof is "0", an interlayer prediction cannot be used in the generation of a predicted image.

num_inter_layer_ref_pics_minus1 is reference layer number information that represents the number of reference layers that are reference targets in an interlayer prediction of the current slice. The number of layers acquired by adding one to this value is the number of reference layers in an interlayer prediction of the current slice. The number of reference layers is defined also in the video parameter set (VPS) (NumDirectRefLayers[N]). num_inter_layer_ref_pics_minus1 defines the number of reference layers to be a value acquired by subtracting one from the value thereof or less. In other words, the reference layer number information (num_inter_layer_ref_pics_minus1+1) defines the number of reference layers selected for the current slice among the reference layers defined in the video parameter set (VPS).

In addition, NumDirectRefLayers[N] is information representing a maximum value of layer numbers that can be referred to in an interlayer prediction for a layer N. In other words, a layer from layer 0 to the value thereof can be referred to.

inter_layer_pred_layer_idc[i] is reference layer designation information that designates layers as reference layers in the interlayer prediction of the current slice. In addition, inter_layer_pred_layer_idc[i] can designate layer 0 to a layer designated in NumActiveRefLayerPics as reference layers.

NumActiveRefLayerPics is active layer number information that represents the number of layers that can be designated as reference layers (that are in an active state) in the interlayer prediction of the current slice. In a case where the layer (the current layer (nuh_layer_id)) of the current slice is layer 0 (nuh_layer_id==0), the reference layer number of the current layer is 0 (NumDirectRefLayers[nuh_layer_id]==0), or the interlayer prediction is not permitted (inter_layer_pred_enabled_flag), the value of NumActiveRefLayerPics is 0. On the other hand, in a case where only one picture is used for the inter layer prediction of each picture of a Coded Video Sequence (CVS) (max_one_active_ref_layer_flag) or a maximum value of the layer numbers that can be referred to in the interlayer prediction of the current layer that is defined in the video parameter set (VPS) is 1 (NumDirectRefLayers[nuh_layer_id]==1), the value of NumActiveRefLayerPics is 1. In the other cases, the value of NumActiveRefLayerPics is a value (num_inter_layer_ref_pics_minus1+1) acquired by adding one to the reference layer number information.

inter_layer_sample_pred_only_flag is inter predictability information that represents whether an inter prediction is permitted for the current slice. Ina case where the value thereof is 0, the inter prediction cannot be used in the generation of a predicted image.

In other words, in the information relating to an interlayer prediction that is transmitted from the coding side to the decoding side, the interlayer predictability information, the reference layer number information, the reference layer designation information, and the inter predictability information may be configured to be included. It is apparent that information other than these may be included therein in the information relating to an interlayer prediction, or some thereof may not be included therein.

As illustrated in FIG. 6, such information relating to an interlayer prediction is transmitted in a case where the current layer is not layer 0 (nuh_layer_id>0), and a layer that can be referred to is present in the interlayer prediction of the current layer (NumDirectRefLayers[nuh_layer_id]>0).

However, even in such a case, a case may be considered in which the information relating to an interlayer prediction described above is unnecessary. However, in the methods described in Non-Patent Document 2 or Non-Patent Document 3, the information relating to an interlayer prediction is transmitted without such a case being considered. Accordingly, unnecessary syntax is transmitted as well, and the code amount of the slice header is unnecessarily increased, whereby there is a possibility that the coding efficiency decreases.

Thus, by configuring the condition for transmitting the information relating to an interlayer prediction to be stricter, the redundancy of the slice header is reduced, and accordingly, the coding efficiency is improved. An example of a specific method will be described below.

<Control According to Slice Type>

According to the methods described in Non-Patent Document 2 or Non-Patent Document 3, for example, in the case of an Intra Random Access Point (IRAP) that is the lead of the Group of Pictures (GOP), the information of an interlayer prediction is controlled using the value of a nal unit type (nal_unit_type) so as not to transmit the information relating to an interlayer prediction.

Figure 8:
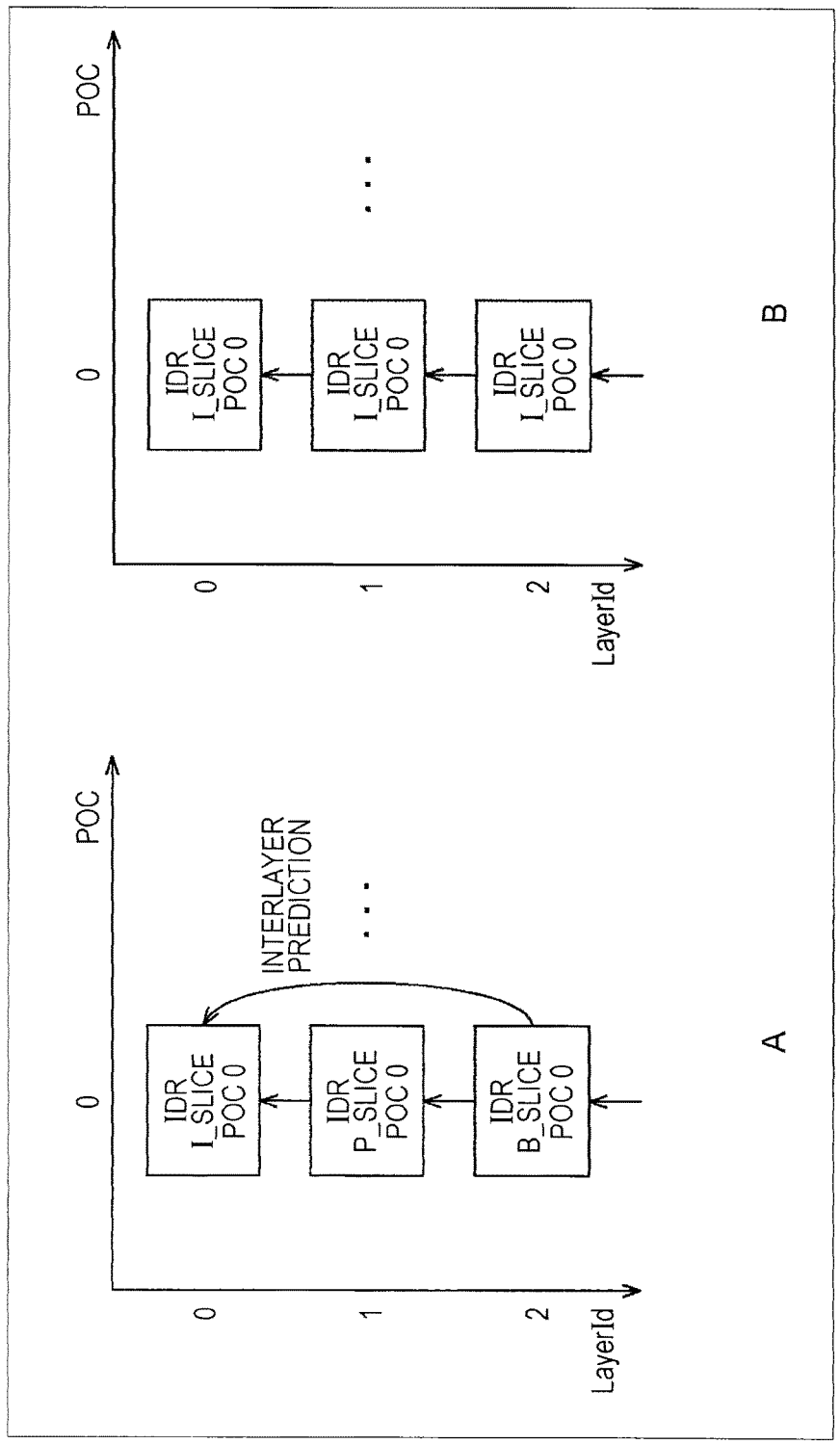
FIG. 8 is a diagram that illustrates an example of an interlayer prediction.

However, for example, as illustrated in A of FIG. 8, even in the case of an IRAP, a P slice or a B slice may be present, and in the P slice or the B slice, the interlayer prediction can be performed. In contrast to this, for example, as illustrated in B of FIG. 8, in a case where the IRAP is configured by all the I slices, the interlayer prediction is not performed.

In other words, it cannot be determined whether to perform an interlayer prediction based on only the value of the nal unit type (nal_unit_type). In a case where the interlayer prediction is not performed, the information relating to the interlayer prediction becomes redundant data. In other words, in such a case, when the information relating to an interlayer prediction is transmitted, the code amount of the slice header is unnecessarily increased, and thus, there is concern that the coding efficient decreases.

Thus, in the control of the transmission of the information relating to an interlayer prediction, the value of the slice type (slice_type) will be considered as well. In other words, in a case where the slice type is the P slice or the B slice, the information relating to an interlayer prediction is configured to be transmittable.

FIG. 9 illustrates an example of a part of the syntax of the slice header of such a case. As illustrated in FIG. 9, before the syntax that defines the information relating to an interlayer prediction, a conditional expression of "if (slice_type==P||slice_type==B) {" is added. In other words, only in a case where this conditional expression is true, the information relating to an interlayer prediction is transmitted.

By configuring as such, unnecessary transmission of the information relating to an interlayer prediction is suppressed, whereby a decrease in the coding efficiency can be suppressed.

<Control According to Number of Reference Layers>

Figure 10:
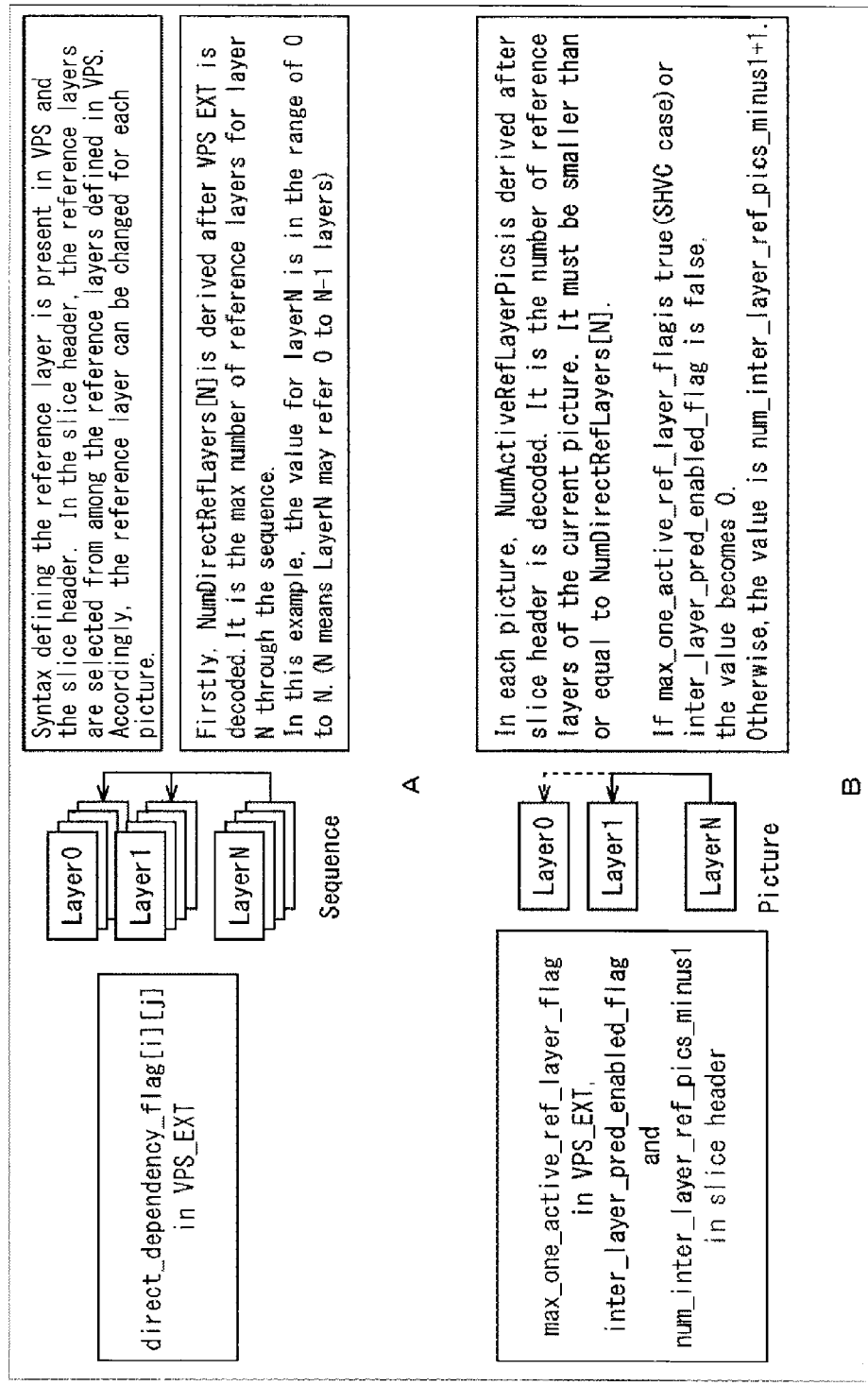
FIG. 10 is a diagram that illustrates an example of a method of setting a reference layer.

As described above, in the video parameter set (VPS) and the slice header, the syntax that defines the number of reference layers is present. In other words, for example, as illustrated in A of FIG. 10, the number of reference layers applied to the entire sequence is defined in the video parameter set (VPS). For example, as illustrated in B of FIG. 10, in the slice header, reference layers are selected from the reference layer group defined in the video parameter set (VPS). Accordingly, the reference layers can be changed for each picture.

In a case where the number of reference layers defined in the video parameter set (VPS) and the number of reference layers defined in the slice header are mutually the same, all the reference layers defined in the video parameter set (VPS) are defined as the reference layers of the current slice. In other words, in such a case, it is not necessary to designate layers to be used as the reference layers by using the reference layer designation information (inter_layer_pred_layer_idc[i]).

However, according to the methods described in Non-Patent Document 2 and Non-Patent Document 3, even in such a case, the reference layer designation information (inter_layer_pred_layer_idc[i]) is transmitted. In other words, the code amount of the slice header is unnecessarily increased, and there is concern that the coding efficiency decreases.

Thus, in a case where the number (NumDirectRefLayers[nuh_layer_id]) of reference layers defined in the video parameter set (VPS) and the number (the active layer number information (NumActiveRefLayerPics)) of reference layers defined in the slice header are not mutually the same, the reference layer designation information (inter_layer_pred_layer_idc[i]) is configured to be transmittable.

FIG. 11 illustrates a configuration example of a part of the syntax of the slice header of such a case. FIG. 12 illustrates an example of semantics of the slice header of such a case. As illustrated in FIG. 11, before syntax defining the reference layer designation information (inter_layer_pred_layer_idc[i]), a conditional equation of "if(NumDirectRefLayers[nuh_layer_id] !=NumActiveRefLayerPics)" is added. In other words, only in a case where this condition is true, the information relating to an interlayer prediction is configured to be transmitted.

By configuring as such, unnecessary transmission of the reference layer designation information is suppressed, and accordingly, a decrease in the coding efficiency can be suppressed.

<Predefinition of Reference Pattern>

According to the methods described in Non-Patent Document 2 and Non-Patent Document 3, in each slice, the information relating to an interlayer prediction is transmitted. In other words, in each slice, all the layers to be used as reference layers are designated.

Figure 13:
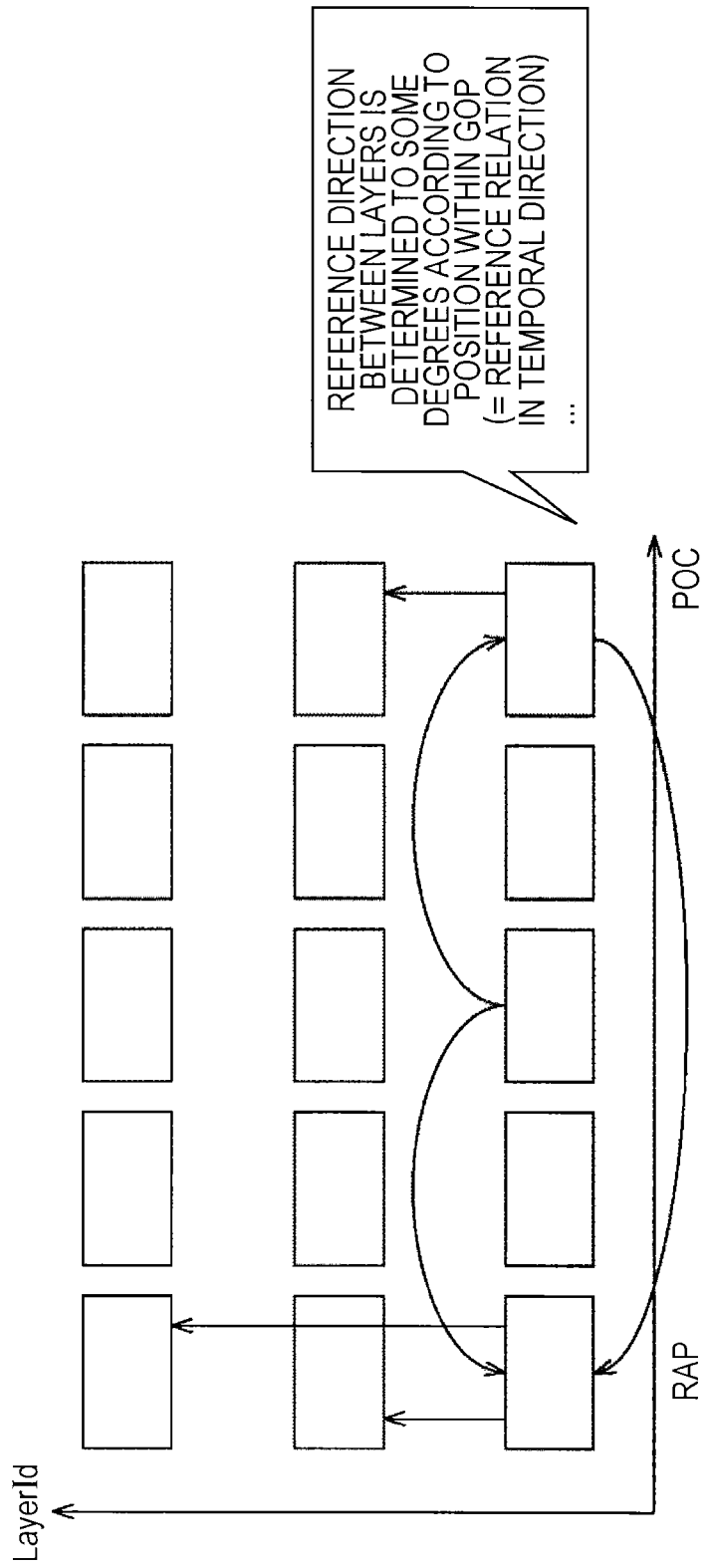
FIG. 13 is a diagram that illustrates an example of a reference relation of an interlayer prediction.

However, actually, the reference relation between layers, for example, as in the example illustrated in FIG. 13, easily tends to depend on the position (in other words, the reference relation in the time direction) within the GOP. In other words, there are many cases where the reference relation in the interlayer direction is determined based on the position of the current slice within the GOP.

Accordingly, by defining (fixing) a reference relation (in other words, a pattern of setting layers to be used as reference layers (also referred to as an interlayer reference picture set)) between layers having a high occurrence frequency in advance and designating a corresponding fixed reference relation (the interlayer reference picture set) using an index in each slice, the code amount can be decreased to be smaller than that of a case where all the reference layers are designated for each slice as in the method described in Non-Patent Document 2 or Non-Patent Document 3. In other words, a decrease in the coding efficiency can be suppressed.

The interlayer reference picture set is transmitted with being included in the sequence parameter set (SPS) so as to be usable in the entire sequence (all the slices within the sequence). In addition, in a case where a corresponding reference relation is not present in the predefined interlayer reference picture set for the current slice, an interlayer reference picture set for the current slice may defined in the slice header thereof.

Figure 14:
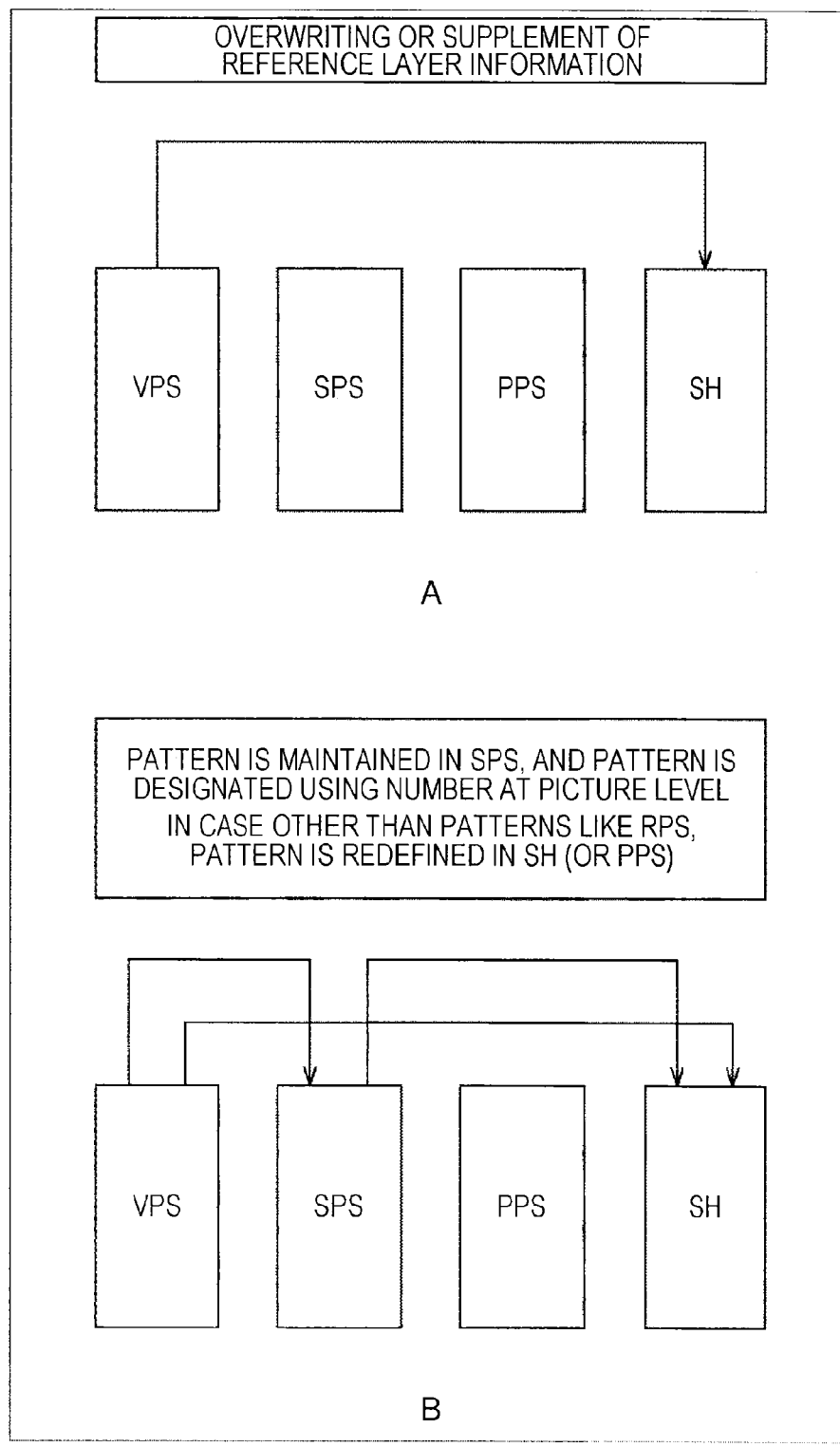
FIG. 14 is a diagram that illustrates an example of a method of setting a reference layer.

In other words, according to the methods described in Non-Patent Document 2 and Non-Patent Document 3, as illustrated in A of FIG. 14, while overwriting or supplement of the reference layer information defined in the video parameter set (VPS) is performed in each slice header, as illustrated in B of FIG. 14, the patterns (interlayer reference picture sets) of the reference relation is maintained in the sequence parameter set (SPS), and, at the picture level (each slice), the pattern is designated using an index (for example, an identification number). Like the RPS (Reference Picture Set), in the case of a pattern other than the patterns (interlayer reference picture set) of the reference relation maintained in the sequence parameter set (SPS), a pattern (interlayer reference picture set) of reference relation dedicated for the slice is defined in the slice header (or the picture parameter set (PPS)).

In addition, a plurality of the interlayer reference picture sets may be defined (by assigning indexes thereto, the number of the interlayer reference picture sets is arbitrary).

FIG. 15 illustrates a configuration example of a part of the syntax of the sequence parameter set (SPS) of such as case. FIG. 16 illustrates an example of the syntax that defines the interlayer reference picture set. FIG. 17 illustrates a configuration example of a part of the syntax of the slice header of such a case.

FIG. 18 illustrates an example of the semantics of the sequence parameter set (SPS) of such a case. FIG. 19 illustrates an example of the semantics that define the interlayer reference picture set. FIG. 20 illustrates a configuration example of a part of the semantics of the slice header of such a case.

As illustrated in FIG. 15, in the sequence parameter set (SPS), set number information (num_inter_layer_ref_pic_sets) representing the number of interlayer reference picture sets to be defined and interlayer reference picture sets (inter_layer_ref_pic_set(i)) corresponding to the number of the sets are set.

In each interlayer reference picture set, as illustrated in FIG. 16, reference layer number information (num_inter_layer_ref_pics_minus1) and reference layer designation information (inter_layer_pred_layer_idc[i]) corresponding to the number of reference layers are set.

In addition, as illustrated in FIG. 17, in the slice header, interlayer predictability information (inter_layer_pred_enabled_flag) and interlayer reference picture set use information representing whether or not the interlayer reference picture set is usable are set. In addition, in a case where the interlayer reference picture set is usable, an index (inter_layer_ref_pic_set_idx) designating an interlayer reference picture set is set. On the other hand, in a case where the interlayer reference picture set is not usable, an interlayer reference picture set (inter_layer_ref_pic_set(num_inter_layer_ref_pic_sets)) for the current slice is set. In addition, inter predictability information (inter_layer_sample_pred_only_flag) is set.

By configuring as such, the code amount of the information relating to an interlayer prediction can be reduced, whereby a decrease in the coding efficiency can be suppressed.

<Combination of Control>

As above, while three methods for controlling the information relating to an interlayer prediction have been described, for example, such methods may be combined to be used. For example, the method described in <Control according to Slice Type> and the method described in <Control according to Number of Reference Layers> may be combined to be used.

In addition, for example, the method described in <Control according to Slice Type> and the method described in <Predefinition of Reference Pattern> may be combined to be used. Furthermore, the method described in <Control according to Number of Reference Layers> and the method described in <Predefinition of Reference Pattern> may be combined to be used.

In addition, the method described in <Control according to Slice Type>, the method described in <Control according to Number of Reference Layers>, and the method described in <Predefinition of Reference Pattern> may be combined to be used.

Furthermore, the above-described methods and a method other than the methods may be combined together.

FIGS. 21 to 23 are diagrams that illustrate examples of the syntax of the slice header of a case where the method described in <Control according to Slice Type> and the method described in <Control according to Number of Reference Layers> are combined. FIG. 24 is a diagram that illustrates an example of the semantics of the slice header of the case.

In a portion represented in a slashed pattern in FIG. 22, the transmission (including the generation) of the information relating to an interlayer prediction is controlled.

By configuring as such, unnecessary transmission of the information relating to an interlayer prediction is suppressed, and unnecessary transmission of the reference layer designation information can be further suppressed, whereby a decrease in the coding efficiency can be suppressed more than that of the case of the method described in <Control according to Slice Type> or the case of the method described in <Control according to Number of Reference Layers>.

FIGS. 25 and 26 are diagrams that illustrate examples of the syntax of the sequence parameter set (SPS) of a case where the method described in <Control according to Slice Type>, the method described in <Control according to Number of Reference Layers>, and the method described in <Predefinition of Reference Pattern> are combined. FIG. 27 is a diagram that illustrates an example of the syntax setting the interlayer reference picture set of the case. FIGS. 28 to 31 are diagrams that illustrate examples of the syntax of the slice header of the case.

FIG. 32 is a diagram that illustrates an example of the semantics of the sequence parameter set (SPS) of such a case. FIG. 33 is a diagram that illustrates an example of the semantics of the interlayer reference picture set of such a case. FIG. 34 is a diagram that illustrates an example of the semantics of the slice header of such a case.

In a portion represented in a slashed pattern in FIG. 26, interlayer reference picture sets are defined, and parameters of each interlayer reference picture set are defined in FIG. 27. In addition, in a portion represented in a slashed pattern in FIG. 29, the transmission (including the generation) of the information relating to an interlayer prediction is controlled.

By configuring as such, unnecessary transmission of the information relating to an interlayer prediction is suppressed, unnecessary transmission of the reference layer designation information is further suppressed, and the code amount of the information relating to an interlayer prediction that is to be transmitted can be reduced, whereby a decrease in the coding efficiency can be suppressed more than that of the case of the method described in <Control according to Slice Type>, the case of the method described in <Control according to Number of Reference Layers>, or the case of the method described in <Predefinition of Reference Pattern>.

In addition, on the decoding side, by analyzing the header information including the information relating to an interlayer prediction by using a method similar to that of the control process of the information relating to an interlayer prediction on the coding side described above, the information relating to the interlayer prediction can be correctly analyzed, and the interlayer prediction can be correctly controlled based on the value of the information. Accordingly, the suppression of unnecessary transmission of the information relating to an interlayer prediction is realized, whereby a decrease in the coding efficiency can be suppressed.

It is apparent that the above-described combination of a plurality of the control methods can be applied similarly to the case of the coding side.

2. Second Embodiment

<Image Coding Apparatus>

Next, an apparatus realizing the present technology as above and a method thereof will be described. FIG. 35 is a diagram illustrating an image coding apparatus that is an embodiment of an image processing apparatus to which the present technology is applied. The image coding apparatus 100 illustrated in FIG. 35 is an apparatus that performs hierarchical image coding (scalable coding). As illustrated in FIG. 35, the image coding apparatus 100 includes: a base layer image coding unit 101; an enhancement layer image coding unit 102, a multiplexing unit 103; and a control unit 104.

The base layer image coding unit 101 codes a base layer image, thereby generating a base layer image coded stream. In addition, the enhancement layer image coding unit 102 codes an enhancement layer image, thereby generating an enhancement layer image coded stream. The multiplexing unit 103 multiplexes the base layer image coded stream generated by the base layer image coding unit 101 and the enhancement layer image coded stream generated by the enhancement layer image coding unit 102, thereby generating a hierarchical image coded stream. The multiplexing unit 103 transmits the generated hierarchical image coded stream to a decoding side.

The base layer image coding unit 101 supplies a decoded image (also referred to as a base layer decoded image) acquired in the coding process of the base layer to the enhancement layer image coding unit 102.

The enhancement layer image coding unit 102 acquires the base layer decoded image supplied from the base layer image coding unit 101 and stores the acquired base layer decoded image. The enhancement layer image coding unit 102 uses the stored base layer decoded image as a reference image for a prediction process in the coding of the enhancement layer.

The control unit 104 performs setting relating to the whole image data and controls the base layer image coding unit 101 and the enhancement layer image coding unit 102 based on the setting, thereby controlling the coding process of each layer. In addition, the control unit 104 generates a video parameter set (VPS) using the setting, supplies the video parameter set to the multiplexing unit 103, thereby transmitting the video parameter set to the decoding side. At that time, the video parameter set may be configured to be transmitted with being included in the hierarchical image coded stream or to be transmitted as data other than the hierarchical image coded stream.

The enhancement layer image coding unit 102 generates header information such as a sequence parameter set (SPS) and a slice header in accordance with the control (information of the video parameter set (VPS) supplied from the control unit 104) of the control unit 104.

<Base Layer Image Coding Unit>

Figure 36:
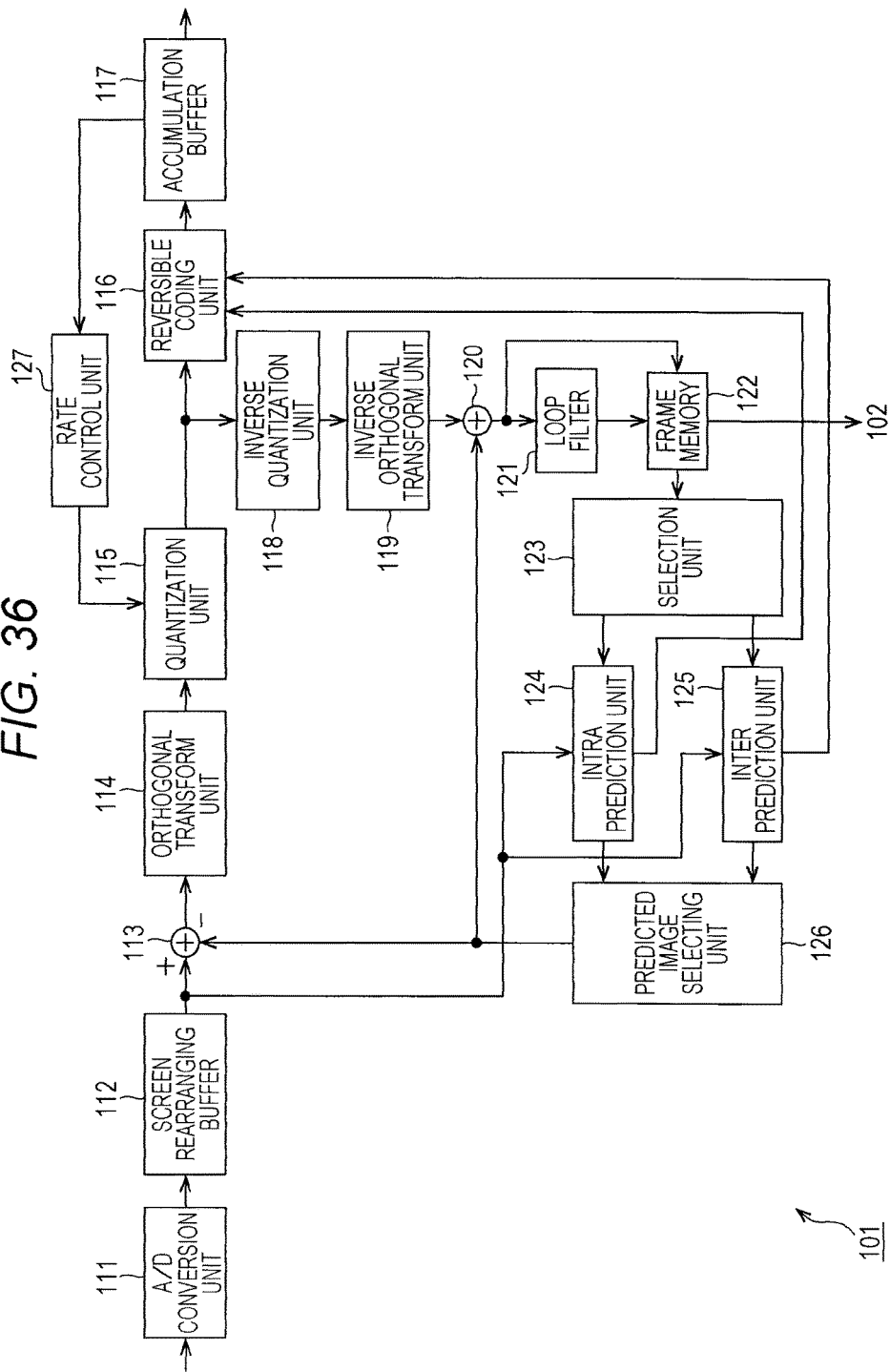
FIG. 36 is a block diagram that illustrates an example of the main configuration of a base layer image coding unit.

FIG. 36 is a block diagram that illustrates an example of the main configuration of the base layer image coding unit 101 illustrated in FIG. 35. As illustrated in FIG. 36, the base layer image coding unit 101 includes: an A/D conversion unit 111; a screen rearranging buffer 112; a calculation unit 113; an orthogonal transform unit 114; a quantization unit 115; a reversible coding unit 116; an accumulation buffer 117; an inverse quantization unit 118, and an inverse orthogonal transform unit 119. In addition, the base layer image coding unit 101 includes: a calculation unit 120; a loop filer 121; a frame memory 122; a selection unit 123; an intra prediction unit 124; an inter prediction unit 125; a predicted image selecting unit 126; and a rate control unit 127.

The A/D conversion unit 111 performs A/D conversion of input image data (base layer image information) and supplies the image data (digital data) after the conversion to the screen rearranging buffer 112, thereby storing the image data therein. The screen rearranging buffer 112 rearranges stored images of frames, which are arranged in order of display, in order of frames for coding in accordance with a Group Of Picture (GOP) and supplies the images acquired by rearranging the order of frames to the calculation unit 113. In addition, the screen rearranging buffer 112 supplies the images acquired by rearranging the order of frames also to the intra prediction unit 124 and the inter prediction unit 125.

The calculation unit 113 subtracts a predicted image supplied from the intra prediction unit 124 or the inter prediction unit 125 through the predicted image selecting unit 126 from an image read from the screen rearranging buffer 112 and outputs difference information thereof to the orthogonal transform unit 114. For example, in the case of an image for which intra coding is performed, the calculation unit 113 subtracts a predicted image supplied from the intra prediction unit 124 from an image read from the screen rearranging buffer 112. On the other hand, for example, in the case of an image for which inter coding is performed, the calculation unit 113 subtracts a predicted image supplied from the inter prediction unit 125 from an image read from the screen rearranging buffer 112.

The orthogonal transform unit 114 performs an orthogonal transform such as a discrete cosine transform or a Karhuren-Loeve transform for the difference information that is supplied from the calculation unit 113. The orthogonal transform unit 114 supplies transform coefficients thereof to the quantization unit 115.

The quantization unit 115 quantizes the transform coefficients supplied from the orthogonal transform unit 114. The quantization unit 115 sets quantization parameters based on information relating to a target value of a coding amount that is supplied from the rate control unit 127 and performs the quantization thereof. The quantization unit 115 supplies the quantized transform coefficients to the reversible coding unit 116.

The reversible coding unit 116 codes the quantized transform coefficients quantized by the quantization unit 115 using an arbitrary coding system. Since the coefficient data is quantized under the control of the rate control unit 127, the coding amount becomes the target value (or a value close to the target value) set by the rate control unit 127.

In addition, the reversible coding unit 116 acquires information representing the mode of the intra prediction and the like from the intra prediction unit 124 and acquires the information representing the mode of the inter prediction, difference motion vector information, and the like from the inter prediction unit 125. Furthermore, the reversible coding unit 116 appropriately generates a Network Abstraction Layer (NAL) unit of the base layer that includes the sequence parameter set (SPS), the picture parameter set (PPS), and the like.

The reversible coding unit 116 codes such various information items using an arbitrary coding system and configures the coded information as a part of coded data (also referred to as a coded stream). The reversible coding unit 116 supplies the coded data acquired by the coding process to the accumulation buffer 117, thereby accumulating the coded data therein.

Examples of the coding system of the reversible coding unit 116 include a variable length coding, arithmetic coding, and the like. As examples of the variable length coding, there are Context-Adaptive Variable Length Coding (CAVLC) defined in the H.264/AVC system and the like. As examples of the arithmetic coding, there is Context-Adaptive Binary Arithmetic Coding (CABAC) or the like.

The accumulation buffer 117 temporarily holds the coded stream (base layer coded stream) supplied from the reversible coding unit 116. In addition, the accumulation buffer 117 outputs the base layer coded stream that is stored at predetermined timing to the multiplexing unit 103 (FIG. 15). In other words, the accumulation buffer 117 serves also as a transmission unit that transmits the base layer coded stream.

In addition, the transform coefficients quantized by the quantization unit 115 are supplied also to the inverse quantization unit 118. The inverse quantization unit 118 performs inverse quantization of the quantized transform coefficients by using a method corresponding to the quantization process performed by the quantization unit 115. The inverse quantization unit 118 supplies the acquired transform coefficients to the inverse orthogonal transform unit 119.

The inverse orthogonal transform unit 119 performs an inverse orthogonal transform of the transform coefficients supplied from the inverse quantization unit 118 by using a method corresponding to the orthogonal transform process performed by the orthogonal transform unit 114. An output (restored difference information) for which the inverse orthogonal transform is performed is supplied to the calculation unit 120.

The calculation unit 120 adds a predicted image supplied from the intra prediction unit 124 or the inter prediction unit 125 through the predicted image selecting unit 126 to the restored difference information that is a result of the inverse orthogonal transform supplied from the inverse orthogonal transform unit 119, thereby acquiring an image (decoded image) that is locally decoded. The decoded image is supplied to the loop filter 121 or the frame memory 122.

The loop filter 121 includes a de-blocking filter, an adaptive loop filter, or the like and appropriately performs a filter process for a reconstruction image supplied from the calculation unit 120. For example, the loop filter 121 removes a block distortion of the reconstruction image by performing a de-blocking filter process for the reconstruction image. In addition, for example, the loop filter 121 performs a loop filter process using a Wiener filter for a result (a reconstruction image from which the block distortion is removed) of the de-blocking lock filter process, thereby improving the image quality. The loop filter 121 supplies a result of the filter process (hereinafter, referred to as a decoded image) to the frame memory 122.

Furthermore, the loop filter 121 may be configured to perform any other additional arbitrary filter process for the reconstruction image. In addition, the loop filter 121, as is necessary, may be configured to supply information such as filter coefficients used for the filter process and the like to the reversible coding unit 116 so as to code the information.

The frame memory 122 stores the supplied decoded image and supplies the stored decoded image to the selection unit 123 at predetermined timing as a reference image.

More specifically, the frame memory 122 stores the reconstruction image supplied from the calculation unit 120 and the decoded image supplied from the loop filter 121. The frame memory 122 supplies the stored reconstruction image to the intra prediction unit 124 through the selection unit 123 at predetermined timing or based on a request from an external unit such as the intra prediction unit 124 or the like. In addition, the frame memory 122 supplies the stored decoded image to the inter prediction unit 125 through the selection unit 123 at predetermined timing or based on a request from an external unit such as the inter prediction unit 125.

The selection unit 123 selects a supply destination of the reference image that is supplied from the frame memory 122. For example, in the case of the intra prediction, the selection unit 123 supplies the reference image (pixel values of the inside of the current picture or the base layer decoded image) supplied from the frame memory 122 to the intra prediction unit 124. On the other hand, for example, in the case of the inter prediction, the selection unit 123 supplies the reference image (the decoded image of the enhancement layer outside the current picture or the base layer decoded image) supplied from the frame memory 122 to the inter prediction unit 125.

The intra prediction unit 124 performs a prediction process for the current picture that is an image of a frame to be processed, thereby generating a predicted image. The intra prediction unit 124 performs this prediction process for every predetermined number of blocks (for blocks as processing units). In other words, the intra prediction unit 124 generates a predicted image of the current block, which is a processing target, of the current picture. At that time, the intra prediction unit 124 performs a prediction process (intra-screen prediction (also referred to as an intra prediction)) by using the reconstruction image supplied from the frame memory 122 through the selection unit 123 as a reference image. In other words, the intra prediction unit 124 generates a predicted image by using pixel values of the periphery of the current block included in the reconstruction image. The pixel values of the periphery that are used for this intra prediction are pixel values of pixels, which were processed in the past, of the current picture. As this intra prediction (in other words, as a method of generating a predicted image), a plurality of methods (also referred to as intra prediction modes) is prepared in advance as candidates. The intra prediction unit 124 performs the intra prediction in the plurality of intra prediction modes prepared in advance.

The intra prediction unit 124 generates predicted images in all the intra prediction modes that are candidates, evaluates a cost function value of each predicted image by using an input image supplied from the screen rearranging buffer 112, and selects an optimal mode. When the optimal intra prediction mode is selected, the intra prediction unit 124 supplies the predicted image generated in the optimal mode to the predicted image selecting unit 126.

In addition, as described above, the intra prediction unit 124 appropriately supplies intra prediction mode information representing the employed intra prediction mode and the like to the reversible coding unit 116 so as to code them.

The inter prediction unit 125 generates a predicted image by performing a prediction process for the current picture. The inter prediction unit 125 performs this prediction process for every predetermined number of blocks (blocks as processing units). In other words, the inter prediction unit 125 generates a predicted image of the current block, which is a processing target, of the current picture. At that time, the inter prediction unit 125 performs a prediction process by using image data of the input image supplied from the screen rearranging buffer 112 and image data of the decoded image supplied from the frame memory 122 as a reference image. This decoded image is an image (another picture other than the current picture) of frames processed before the current picture. In other words, the inter prediction unit 125 performs a prediction process (inter-screen prediction (also referred to as an inter prediction)) that generates a predicted image by using an image of another picture.

This inter prediction is configured by a motion prediction and a motion compensation. More specifically, the inter prediction unit 125 performs a motion prediction of the current block by using the input image and the reference image, thereby detecting a motion vector. Then, the inter prediction unit 125 performs a motion compensation process according to the detected motion vector by using the reference image, thereby generating a predicted image (inter predicted image information) of the current block. As this inter prediction (in other words, as a method of generating a predicted image), a plurality of methods (also referred to as inter prediction modes) is prepared in advance as candidates. The inter prediction unit 125 performs such an inter prediction in the plurality of inter prediction modes prepared in advance.

The inter prediction unit 125 generates prediction images in all the inter prediction modes that are candidates. The inter prediction unit 125 evaluates a cost function value of each predicted image by using the input image supplied from the screen rearranging buffer 112 and information of the generated difference motion vector and the like and selects an optimal mode. When the optimal inter prediction mode is selected, the inter prediction unit 125 supplies the predicted image generated in the optimal mode to the predicted image selecting unit 126.

The inter prediction unit 125 supplies information representing an employed inter prediction mode, information required for performing the process in the inter prediction mode at the time of decoding the coded data, and the like to the reversible coding unit 116 so as to code the information. As the required information, for example, there are information of the generated difference motion vector, a flag representing an index of a predicted motion vector as predicted motion vector information, and the like.

The predicted image selecting unit 126 selects a supply source of a predicted image to be supplied to the calculation unit 113 and the calculation unit 120. For example, in the case of the intra coding, the predicted image selecting unit 126 selects the intra prediction unit 124 as a supply source of a predicted image and supplies the predicted image supplied from the intra prediction unit 124 to the calculation unit 113 and the calculation unit 120. On the other hand, for example, in the case of the inter coding, the predicted image selecting unit 126 selects the inter prediction unit 125 as a supply source of a predicted image and supplies the predicted image supplied from the inter prediction unit 125 to the calculation unit 113 and the calculation unit 120.

The rate control unit 127 controls of the rate of the quantization operation performed by the quantization unit 115 based on the coding amount of the coded data accumulated in the accumulation buffer 117 such that an overflow or an underflow does not occur.

In addition, the frame memory 122 supplies the stored base layer decoded image to the enhancement layer image coding unit 102.

<Enhancement Layer Image Coding Unit>

Figure 37:
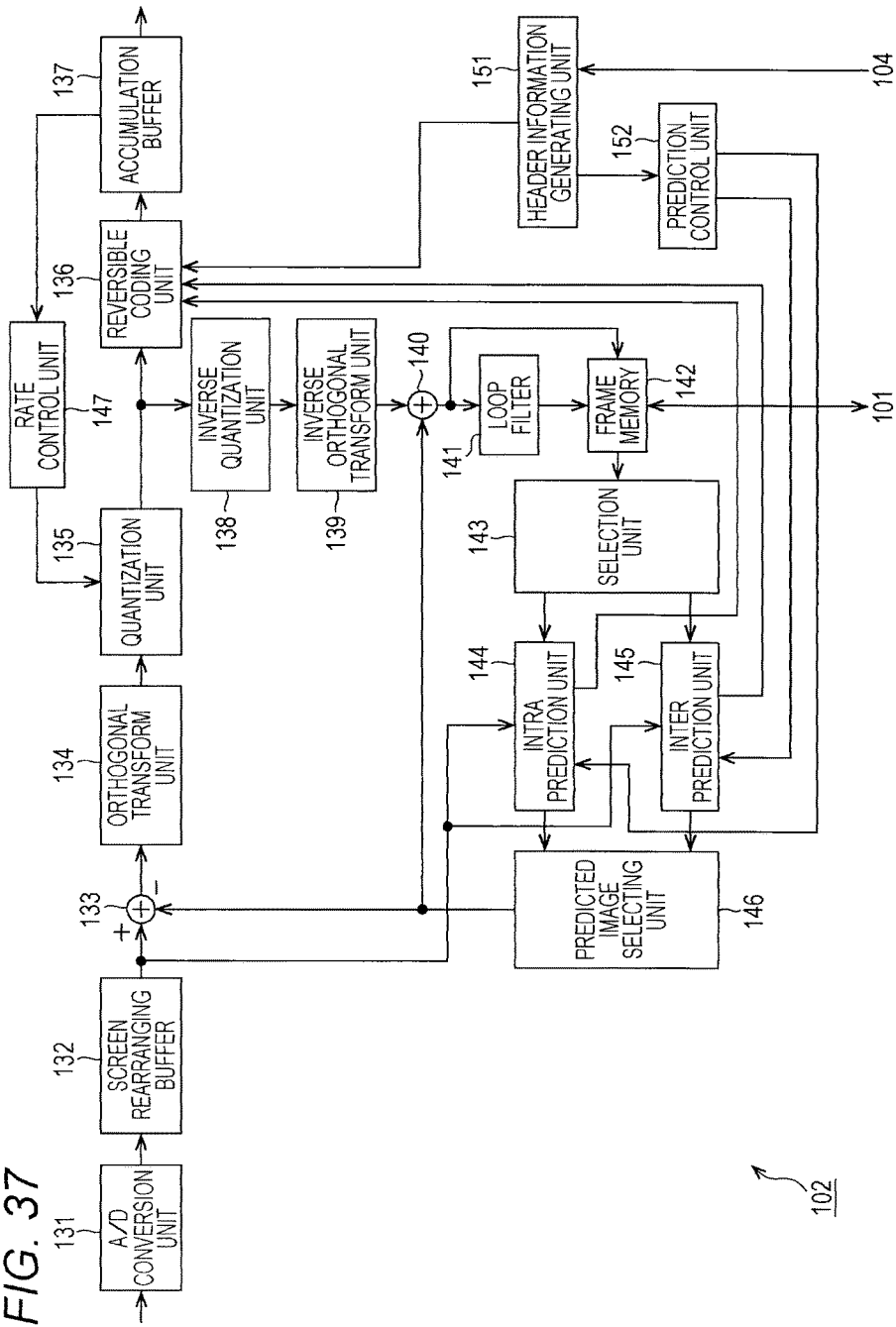
FIG. 37 is a block diagram that illustrates an example of the main configuration of an enhancement layer image coding unit.

FIG. 37 is a block diagram that illustrates an example of the main configuration of the enhancement layer image coding unit 102 illustrated in FIG. 35. As illustrated in FIG. 37, the enhancement layer image coding unit 102 has basically the same configuration as the base layer image coding unit 101 illustrated in FIG. 36.

In other words, the enhancement layer image coding unit 102, as illustrated in FIG. 37, includes: an A/D conversion unit 131; a screen rearranging buffer 132; a calculation unit 133; an orthogonal transform unit 134; a quantization unit 135; a reversible coding unit 136; an accumulation buffer 137; an inverse quantization unit 138, and an inverse orthogonal transform unit 139. In addition, the enhancement layer image coding unit 102 includes: a calculation unit 140; a loop filer 141; a frame memory 142; a selection unit 143; an intra prediction unit 144; an inter prediction unit 145; a predicted image selecting unit 146; and a rate control unit 147.

The A/D conversion unit 131 to the rate control unit 147 correspond to the A/D conversion unit 111 to the rate control unit 127 illustrated in FIG. 36 and perform processes similar to the processes of the corresponding processing units. However, each unit of the enhancement layer image coding unit 102 performs the process for coding the enhancement layer image information instead of the base layer. Thus, the above-presented description of the processes of the A/D conversion unit 111 to the rate control unit 127 in FIG. 36 may be applied to the A/D conversion unit 131 to the rate control unit 147. In such a case, data to be processed needs to be not the data of the base layer but the data of the enhancement layer. In addition, an input source of the data and the processing unit that is an output destination need to be replaced with corresponding processing units arranged inside the A/D conversion unit 131 to the rate control unit 147 in the description.

In addition, the frame memory 142 acquires abase layer decoded image supplied from the base layer image coding unit 101 and, for example, stores the acquired base layer decoded image as a long-term reference image or the like. This base layer decoded image, for example, is used as a reference image of an interlayer prediction in the prediction processes performed by the intra prediction unit 144 and the inter prediction unit 145.

In addition, the enhancement layer image coding unit 102 further includes a header information generating unit 151 and a prediction control unit 152.

The header information generating unit 151 generates various kinds of header information such as the sequence parameter set and the slice header in accordance with the control of the control unit 104 (in other words, by using the information of the video parameter set (VPS) and the like supplied from the control unit 104).

The header information generating unit 151, for example, appropriately generates information relating to an interlayer prediction by performing a control process as described in the first embodiment and includes the generated information in the header information such as the sequence parameter set (SPS) and the slice header.

The header information generating unit 151 supplies the generated header information to the reversible coding unit 136, thereby transmitting the header information to the decoding side. The reversible coding unit 136, for example, supplies the header information to the accumulation buffer 137 with being included in the enhancement layer image coding stream, thereby transmitting the header information to the decoding side.

The header information generating unit 151 supplies the interlayer prediction control information and the like, which are generated, to the prediction control unit 152. The prediction control unit 152 controls the interlayer prediction that is performed by the intra prediction unit 144 and the inter prediction unit 145 in accordance with a generated result (the generated information relating to the interlayer prediction or no-generation of the information relating to an interlayer prediction) of the information relating to the interlayer prediction.

The header information generating unit 151, for example, includes a CPU, a RAM, a ROM, and the like and executes the process described above, for example, by executing a program, which is read from the ROM or the like, using the RAM by using the CPU.

<Header Information Generating Unit>

Figure 38:
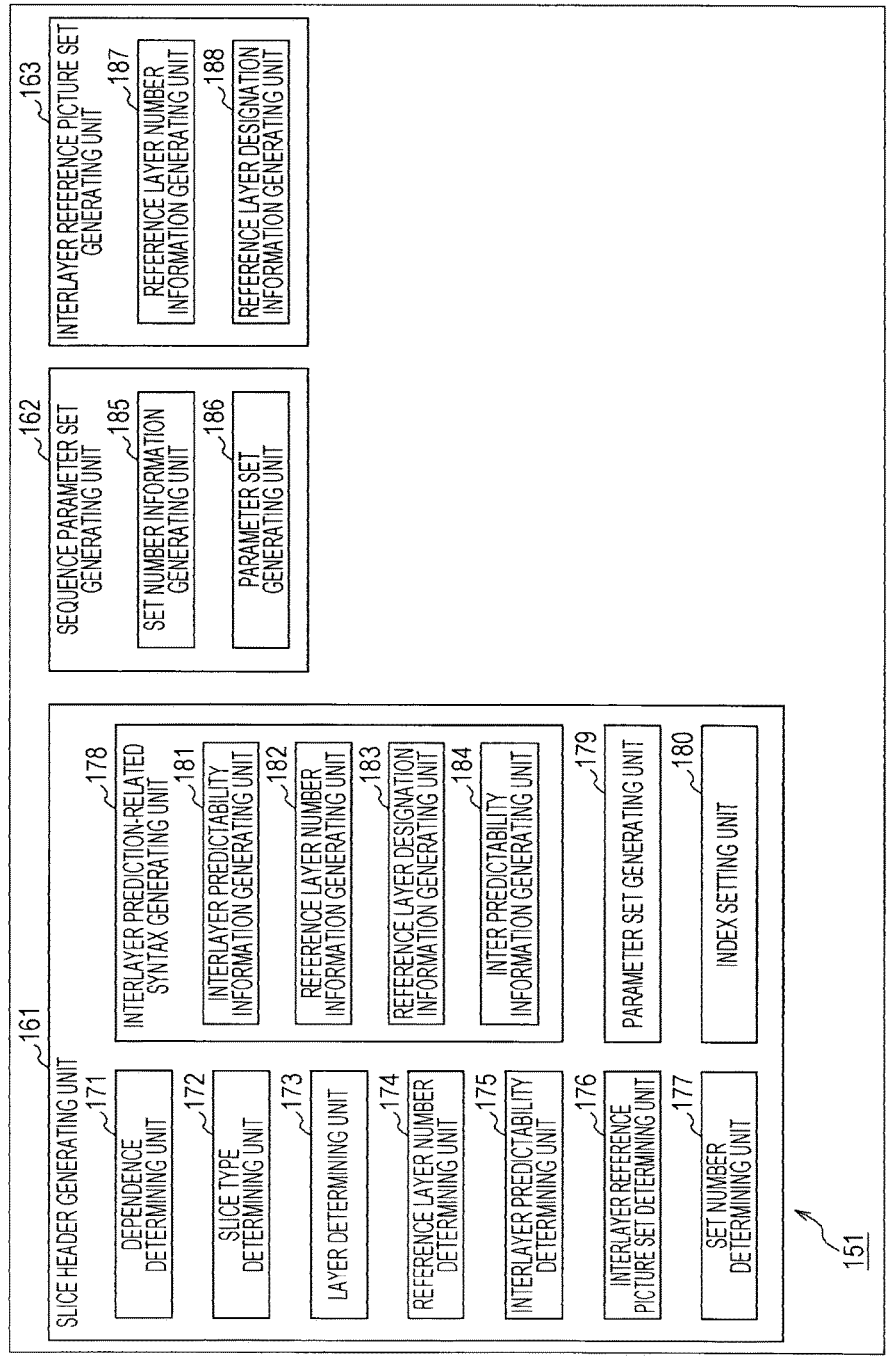
FIG. 38 is a block diagram that illustrates an example of the main configuration of a header information generating unit.

FIG. 38 is a block diagram that illustrates a configuration example of functional blocks included in the header information generating unit 151 illustrated in FIG. 37. In the header information generating unit 151, for example, the process described above is executed, for example, by executing a program read from the ROM or the like using the RAM by using the CPU, whereby various functional blocks illustrated in FIG. 38 are realized.

As illustrated in FIG. 38, the header information generating unit 151 includes: a slice header generating unit 161; a sequence parameter set generating unit 162; and an interlayer reference picture set generating unit 163.

The slice header generating unit 161 generates a slice header of the current slice. The sequence parameter set generating unit 162 generates a sequence parameter set (SPS) of a sequence (also referred to as a current sequence) to which the current slice belongs. The interlayer reference picture set generating unit 163 generates parameters that configure each interlayer reference picture set defined by the sequence parameter set generating unit 162.

The slice header generating unit 161 includes: a dependence determining unit 171; a slice type determining unit 172; a layer determining unit 173; a reference layer number determining unit 174; an interlayer predictability determining unit 175; an interlayer reference picture set determining unit 176; a set number determining unit 177; an interlayer prediction-related syntax generating unit 178; a parameter set generating unit 179; and an index setting unit 180.

The dependence determining unit 171 determines whether or not the slice header of the current slice is dependent on another slice. The slice type determining unit 172 determines a slice type of the current slice. The layer determining unit 173 makes a determination relating to the layer of the current slice. The reference layer number determining unit 174 makes a determination relating to the number of reference layers. The interlayer predictability determining unit 175 determines whether or not an interlayer prediction can be made. The interlayer reference picture set determining unit 176 determines whether or not a predefined interlayer reference picture set is used. The set number determining unit 177 determines the number of interlayer reference picture sets. The interlayer prediction-related syntax generating unit 178 performs a process relating to the generation of the information relating to the interlayer prediction. The parameter set generating unit 179 performs a process relating to the generation of an interlayer reference picture set. The index setting unit 180 performs a process relating to the generation of an index that designates the interlayer reference picture set.

The interlayer prediction-related syntax generating unit 178 includes: an interlayer predictability information generating unit 181; a reference layer number information generating unit 182; a reference layer designation information generating unit 183; and an inter predictability information generating unit 184.

The interlayer predictability information generating unit 181 performs a process relating to the generation of interlayer predictability information. The reference layer number information generating unit 182 performs a process relating to the generation of reference layer number information. The reference layer designation information generating unit 183 performs a process relating to the generation of reference layer designation information. The inter predictability information generating unit 184 performs a process relating to the generation of inter predictability information.

The sequence parameter set generating unit 162 includes a set number information generating unit 185 and a parameter set generating unit 186.

The set number information generating unit 185 generates set number information that represents the number of parameter sets (interlayer reference picture sets) defined in the sequence parameter set. The parameter set generating unit 186 generates (defines) a parameter set (interlayer reference picture set).

The interlayer reference picture set generating unit 163 includes a reference layer number information generating unit 187 and a reference layer designation information generating unit 188.

The reference layer number information generating unit 187 is a processing unit that performs a process similar to that of the reference layer number information generating unit 182 and generates reference layer number information of the interlayer reference picture set. The reference layer designation information generating unit 188 is a processing unit that performs a process similar to that of the reference layer designation information generating unit 183 and generates reference layer designation information that represents all the reference layers designated in the interlayer reference picture set.

As has been described in the first embodiment, there is a plurality of methods for controlling the information relating to an interlayer prediction, and the methods may be combined. Thus, among the functional blocks illustrated in FIG. 38, functional blocks that are not necessary for an employed control method or a combination of the methods may be omitted as is appropriate.

<Flow of Image Coding Process>

Next, the flow of each process executed by the image coding apparatus 100 as described above will be described.

First, an example of the flow of the image coding process will be described with reference to a flowchart represented in FIG. 39.

When the image coding process is started, the control unit 104 of the image coding apparatus 100 performs setting of the entire scalable coding process in Step S101.

In Step S102, the control unit 104 controls each of the base layer image coding unit 101 to the multiplexing unit 103 according to the setting performed in Step S101.

In Step S103, the control unit 104 generates a video parameter set (VPS) with the setting performed in Step S101 being reflected thereon.

In Step S104, the base layer image coding unit 101 codes image data of the base layer.

In Step S105, the enhancement layer image coding unit 102 codes image data of the enhancement layer.

In Step S106, the multiplexing unit 103 multiplexes a base layer image coded stream generated in Step S104 and an enhancement layer image coded stream generated in Step S105 (in other words, bit streams of each layer), thereby generating a hierarchical image coded stream of one system. In addition, the multiplexing unit 103 includes the video parameter set (VPS) generated in Step S103 in the hierarchical image coded stream as is necessary. The multiplexing unit 103 outputs the hierarchical image coded stream so as to be transmitted to the decoding side.

When the process of Step S106 terminates, the image coding apparatus 100 terminates the image coding process. By performing such an image coding process, one picture is processed. Thus, the image coding apparatus 100 repeatedly executes such an image coding process for each picture of layered moving image data. However, for example, processes that are not required to be performed for each picture such as the processes of Steps S101 to S103 are appropriately omitted.

<Flow of Base Layer Coding Process>

Next, an example of the flow of the base layer coding process executed by the base layer image coding unit 101 in Step S104 represented in FIG. 39 will be described with reference to a flowchart represented in FIG. 40.

When the base layer coding process is started, the A/D conversion unit 111 of the base layer image coding unit 101 performs A/D conversion of each frame (picture) of an input moving image in Step S121.

In Step S122, the screen rearranging buffer 112 stores the A/D-converted image acquired in Step S121 and rearranges the pictures from the display order to the coding order.

In Step S123, the intra prediction unit 124 performs an intra prediction process of the intra prediction mode.

In Step S124, the inter prediction unit 125 performs an inter prediction process in which a motion prediction, a motion compensation, and the like are performed in the inter prediction mode.

In Step S125, the predicted image selecting unit 126 selects a predicted image based on a cost function value and the like. In other words, the predicted image selecting unit 126 selects one of the predicted image generated through the intra prediction performed in Step S123 and the predicted image generated through the inter prediction performed in Step S124.

In Step S126, the calculation unit 113 calculates a difference between the input image of which the frame order is rearranged in the process of Step S122 and the predicted image selected in the process of Step S125. In other words, the calculation unit 113 generates image data of a difference image between the input image and the predicted image. The data amount of the image data of the difference image acquired as such is reduced to be smaller than that of the image data. Thus, compared to a case where the image is directly coded, the amount of data can be compressed.

In Step S127, the orthogonal transform unit 114 performs an orthogonal transform of the image data of the difference image that is generated by the process of Step S126.

In Step S128, the quantization unit 115 quantizes the orthogonal transform coefficients acquired by the process of Step S127 by using the quantization parameters calculated by the rate control unit 127.

In Step S129, the inverse quantization unit 118 performs inverse quantization of the quantized coefficients (also referred to as quantization coefficients) generated by the process of Step S128 in accordance with a characteristic corresponding to the characteristic of the quantization unit 115.

In Step S130, the inverse orthogonal transform unit 119 performs an inverse orthogonal transform of the orthogonal transform coefficients acquired by the process of Step S129.

In Step S131, the calculation unit 120 adds the predicted image selected by the process of Step S125 to the difference image restored by the process of Step S130, thereby generating image data of the reconstruction image.

In Step S132, the loop filter 121 performs a loop filter process for the image data of the reconstruction image generated by the process of Step S131. Accordingly, a block distortion and the like of the reconstruction image are removed.

In Step S133, the frame memory 122 stores data of the decoded image (base layer decoded image) acquired by the process of Step S132, the reconstruction image acquired by the process of Step S131, and the like.

In Step S134, the reversible coding unit 116 codes the quantized coefficients acquired by the process of Step S128. In other words, the reversible coding unit 116 performs reversible coding such as a variable-length coding or arithmetic coding for the data corresponding to the difference image.

In addition, at this time, the reversible coding unit 116 codes information relating to the prediction mode of the predicted image selected by the process of Step S125 and adds the difference image to the coded data acquired through the coding process. In other words, the reversible coding unit 116 codes the optimal intra prediction mode information supplied from the intra prediction unit 124, information according to the optimal inter prediction mode supplied from the inter prediction unit 125, and the like and adds the coded information to the coded data.

Furthermore, the reversible coding unit 116 sets and codes syntax elements of various nal units and the like and adds the coded syntax elements to the coded data.

In Step S135, the accumulation buffer 117 accumulates the coded data (the base layer image coded stream) acquired by the process of Step S134. The base layer image coded stream accumulated in the accumulation buffer 117 is appropriately read, is supplied to the multiplexing unit 103, is multiplexed with the enhancement layer image coded stream, and then, is transmitted to the decoding side through the transmission line or the recording medium.

In Step S136, the rate control unit 127 controls the rate of the quantization operation performed by the quantization unit 115 based on the coding amount (generated coding amount) of the coded data accumulated in the accumulation buffer 117 by the process of Step S135 such that an overflow or an underflow does not occur. In addition, the rate control unit 127 supplies information relating to the quantization parameters to the quantization unit 115.

In Step S137, the frame memory 122 supplies the stored base layer decoded image to an enhancement layer coding process.

Figure 39:
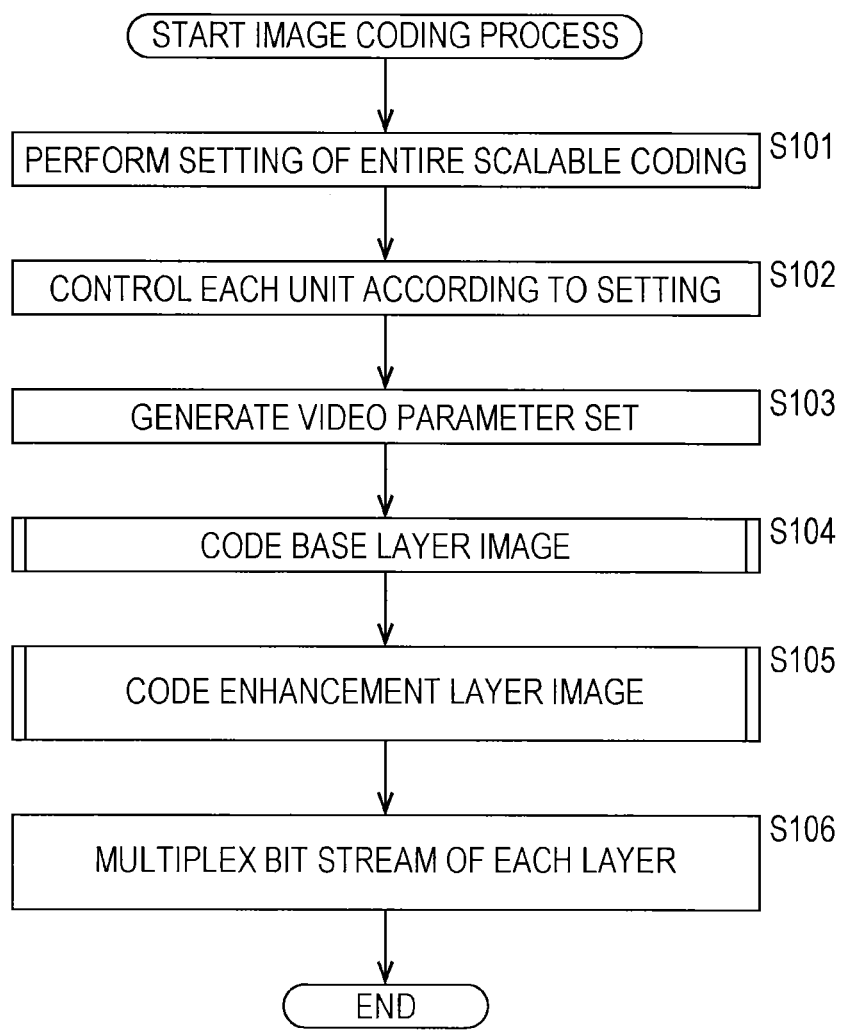
FIG. 39 is a flowchart that illustrates an example of the flow of an image coding process.

When the process of Step S137 terminates, the base layer coding process terminates, and the process is returned to the process illustrated in FIG. 39.

<Flow of Enhancement Layer Coding Process>

Next, an example of the flow of the enhancement layer coding process executed by the enhancement layer image coding unit 102 in Step S105 represented in FIG. 39 will be described with reference to a flowchart represented in FIG. 41.

When the enhancement layer coding process is started, the header information generating unit 151 of the enhancement layer image coding unit 102, for example, generates various kinds of header information such as the sequence parameter set (SPS), the slice header, and the like in Step S141.

In Step S142, the frame memory 142 acquires and stores the base layer decoded image. For example, the frame memory 142 stores the base layer decoded image in the long-term reference frame.

Figure 40:
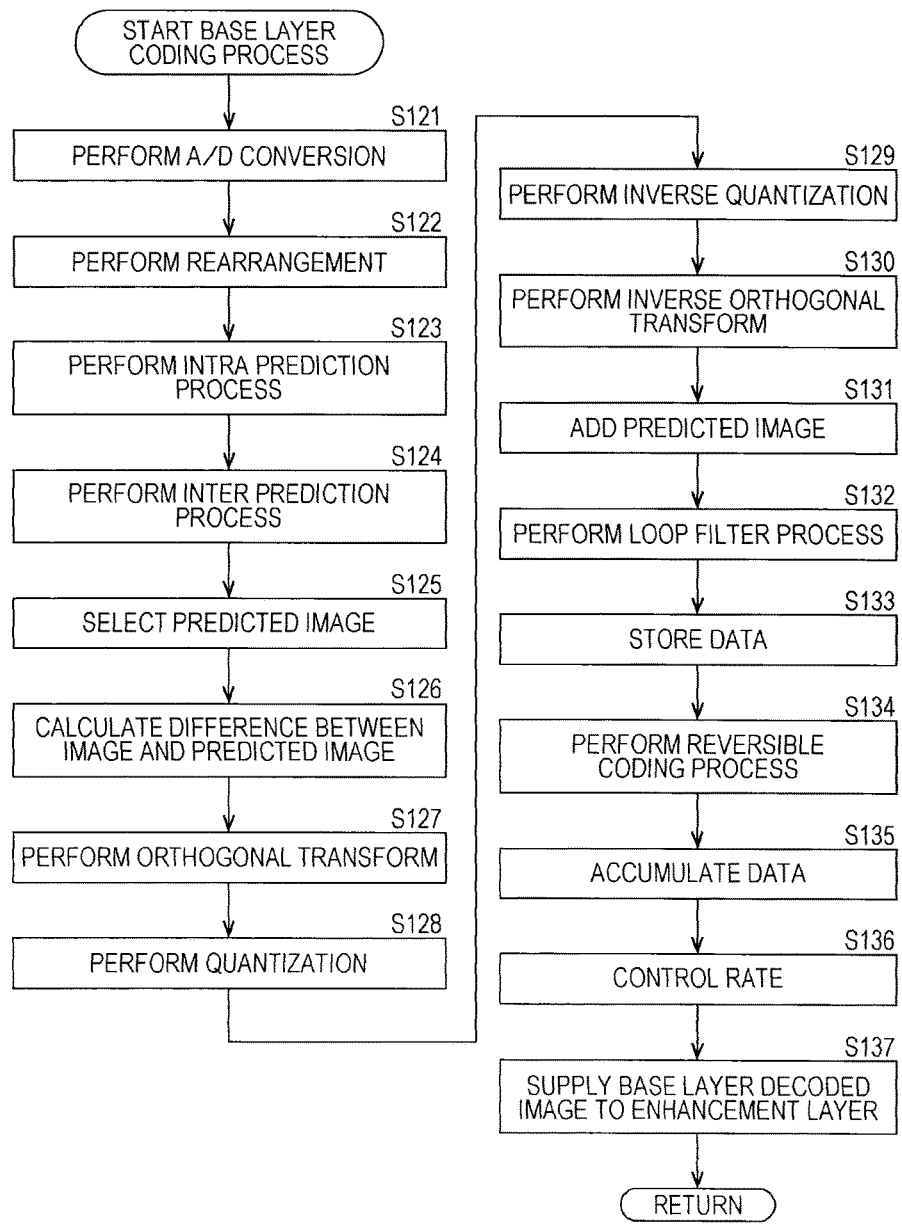
FIG. 40 is a flowchart that illustrates an example of the flow of a base layer coding process.

The processes of Steps S143 to S158 respectively correspond to the processes of Steps S121 to S136 represented in FIG. 40 and are performed in a basically similar manner as that of such processes. However, while each process of Steps S121 to S136 represented in FIG. 40 is performed for the base layer, each process of Steps S143 to S158 is performed for the enhancement layer.

When the process of Step S158 terminates, the enhancement layer coding process terminates, and the process is returned to the process represented in FIG. 39.

<Header Information Generating Process Relating to Interlayer Prediction>

Figure 41:
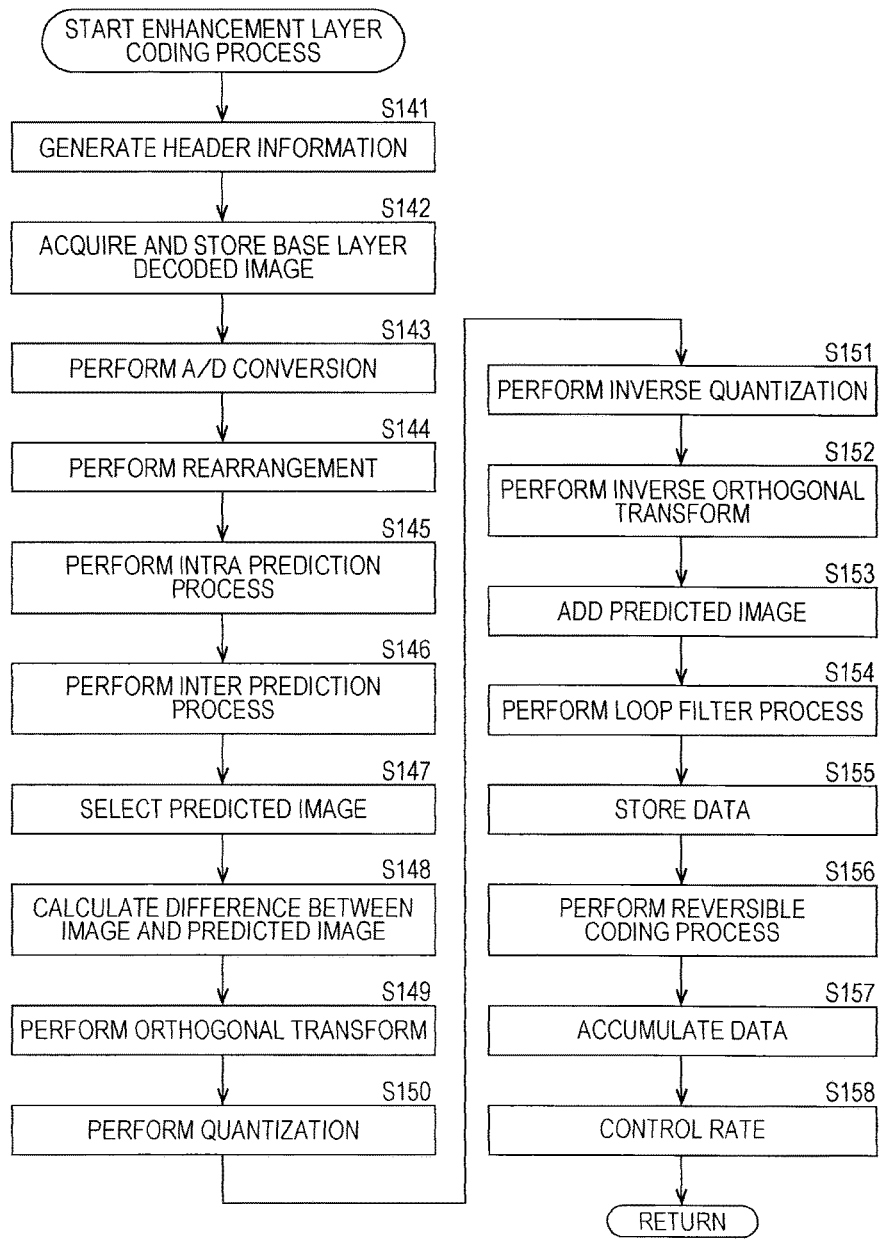
FIG. 41 is a flowchart that illustrates an example of the flow of an enhancement layer coding process.

The header information generating unit 151 and the prediction control unit 152 perform a header information generating process relating to an interlayer prediction in Step S141 represented in FIG. 41 and, as described in the first embodiment, perform generation of information relating to an interlayer prediction as the header information (slice header) and control of an interlayer prediction.

Figure 42:
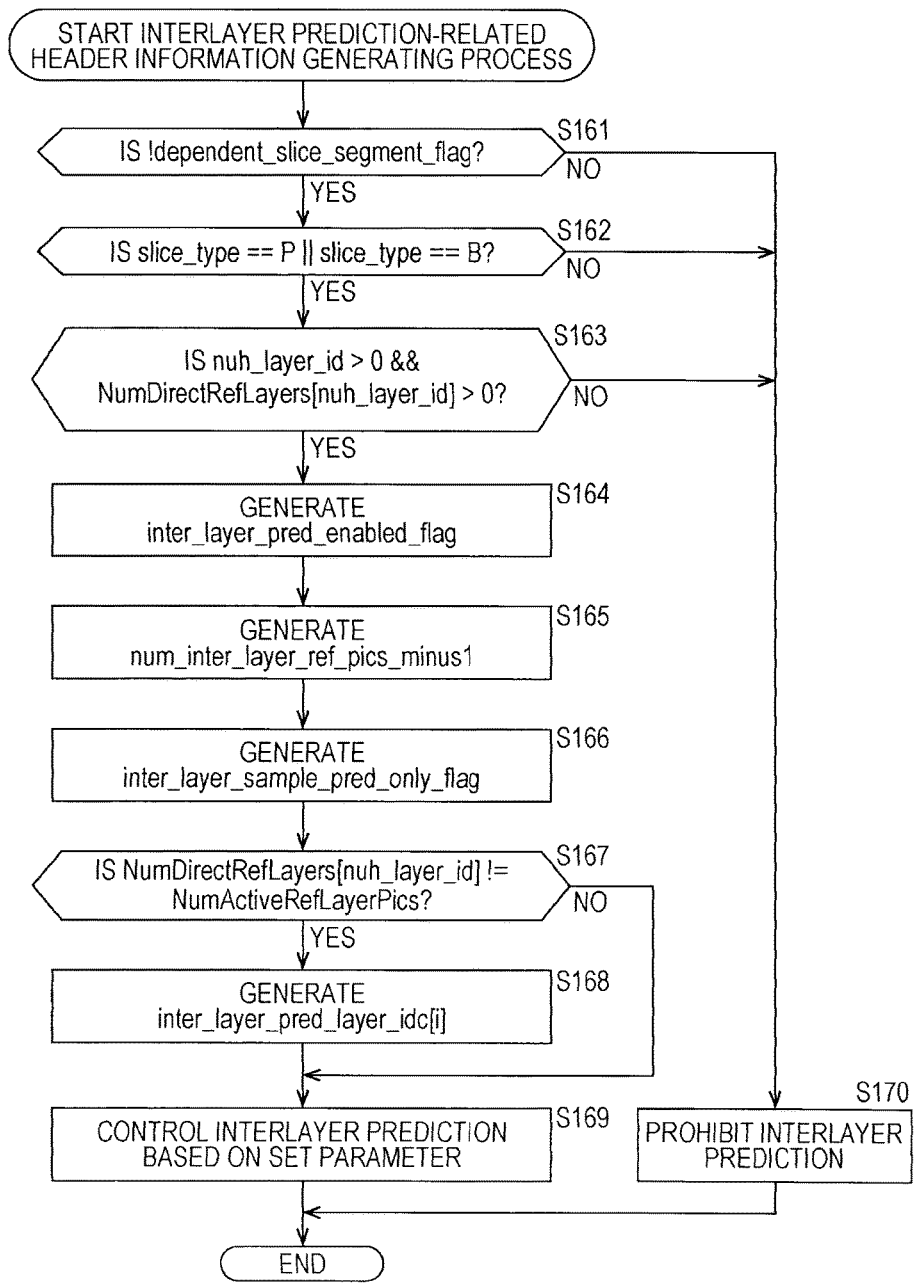
FIG. 42 is a flowchart that illustrates an example of the flow of a header information generating process relating to an interlayer prediction.

Next, an example of the flow of the header information generating process relating to an interlayer prediction will be described with reference to a flowchart represented in FIG. 42. In FIG. 42, the flow of the process of a case where the method described in <Control according to Slice Type> of the first embodiment and the method described in <Control according to Number of Reference Layers> are combined will be described.

When the header information generating process relating to an interlayer prediction is started, the dependence determining unit 171 determines whether or not the slice header of the current slice is dependent on any other slice in Step S161. In a case where the slice is determined to be dependent (!dependent_slice_segment_flag), the process proceeds to Step S162.

In Step S162, the slice type determining unit 172 determines whether or not the slice type of the current slice is a P slice or a B slice. In a case where the slice type of the current slice is determined to be the P slice or the B slice (slice_type==P||slice_type==B), the process proceeds to Step S163.

In Step S163, the layer determining unit 173 determines whether or not the layer of the current slice is an enhancement layer, and one or more layers are defined to be referable in the video parameter set (VPS). Ina case where it is determined that the layer of the current slice is an enhancement layer, and one or more layers are defined to be referable in the video parameter set (VPS) (nuh_layer_id>0 && NumDirectRefLayers[nuh_layer_id]>0), the process proceeds to Step S164.

In Step S164, the interlayer predictability information generating unit 181 generates interlayer predictability information (inter_layer_pred_enabled_flag) as the information relating to an interlayer prediction.

In Step S165, the reference layer number information generating unit 182 generates reference layer number information (num_inter_layer_ref_pics_minus1) as the information relating to the interlayer prediction.

In Step S166, the inter predictability information generating unit 184 generates inter predictability information (inter_layer_sample_pred_only_flag) as the information relating to the interlayer prediction.

In Step S167, the reference layer number determining unit 174 determines whether or not the number of reference layers defined in the video parameter set (VPS) and the number (active layer number information) of reference layers defined in the slice header are mutually the same. In a case where both the numbers of the reference layers are determined not to be mutually the same (NumDirectRefLayers[nuh_layer_id] !=NumActiveRefLayerPics), the process proceeds to Step S168.

In Step S168, the reference layer designation information generating unit 183 generates reference layer designation information (inter_layer_pred_layer_idc[i]) as the information relating to an interlayer prediction. When the process of Step S168 terminates, the process proceeds to Step S169.

In addition, in Step S167, in a case where the number of reference layers defined in the video parameter set (VPS) and the number (active layer number information) of reference layers defined in the slice header are determined to be mutually the same, the process of Step S168 is omitted, and the process proceeds to Step S169.

In Step S169, the prediction control unit 152 controls an interlayer prediction based on each parameter set by the header information generating unit 151 as above as the information relating to the interlayer prediction. When the process of Step S169 terminates, the header information generating process relating to the interlayer prediction terminates.

In addition, in Step S161, in a case where the slice header of the current slice is determined to be dependent on any other slice, the process proceeds to Step S170. In Step S162, in a case where the slice type of the current slice is determined to be the I slice, the process proceeds to Step S170. In Step S163, in a case where the layer of the current slice is determined to be the base layer or in a case where one or more layers are determined not to be defined to be referable in the video parameter set (VPS), the process proceeds to Step S170.

In Step S170, the prediction control unit 152 prohibits an interlayer prediction and controls such that an interlayer prediction is not performed in the intra prediction and the inter prediction.

When the process of Step S170 terminates, the header information generating process relating to the interlayer prediction terminates.

By executing each process as above, the image coding apparatus 100 can suppress unnecessary transmission of the information relating to the interlayer prediction and suppress a decrease in the coding efficiency.

In addition, in a case where only the method described in <Control according to Slice Type> is used, the process of Step S167 represented in FIG. 42 may be omitted. Furthermore, in a case where only the method described in <Control according to Number of Reference Layers> is used, the process of Step S162 represented in FIG. 42 may be omitted.

<Flow 2 of Header Information Generating Process relating to Interlayer Prediction>

Next, as another example of the header information generating process relating to the interlayer prediction, an example of a case where the method described in <Control according to Slice Type> of the first embodiment, the method described in <Control according to Number of Reference Layers>, and the method described in <Predefinition of Reference Pattern> are combined will be described with reference to a flowchart represented in FIG. 43.

When the header information generating process relating to the interlayer prediction is started, the set number information generating unit 185 generates set number information (num_inter_layer_ref_pic_sets) as the sequence parameter set in Step S181.

In Step S182, the parameter set generating unit 186 generates an interlayer reference picture set (inter_layer_ ef_ic_set(i)) as the sequence parameter set.

In Step S183, the reference layer number information generating unit 187 generates reference layer number information (num_inter_layer_ref_pics_minus1) as the interlayer reference picture set.

In Step S184, the reference layer designation information generating unit 188 generates reference layer designation information (inter_layer_pred_layer_idc[i]) as the interlayer reference picture set.

In Step S185, the slice type determining unit 172 and the layer determining unit 173 determine whether or not the layer of the current slice is an enhancement layer, and the slice type of the current slice is a P slice or a B slice. In a case where it is determined that the layer of the current slice is an enhancement layer (Layer_id>0), and the slice type of the current slice is determined to be a P slice or a B slice (slice_type==P||slice_type==B), the process proceeds to Step S186.

In Step S186, the interlayer predictability determining unit 175 determines whether or not an interlayer prediction can be made based on the syntax of the video parameter set (VPS) in the current slice. In a case where it is determined that the interlayer prediction can be made, the process proceeds to Step S187.

In Step S187, the interlayer reference picture set determining unit 176 determines whether or not a prediction is made based on the parameters of the sequence parameter set (SPS), in other words, the interlayer reference picture set. In a case where it is determined that the prediction is made, the process proceeds to Step S188.

In Step S188, the set number determining unit 177 determines whether or not a plurality of interlayer reference picture sets is present. In a case where a plurality of interlayer reference picture sets is determined to be present (num_inter_layer_ref_pic_sets>1), the process proceeds to Step S189.

In Step S189, the index setting unit 180 generates an index (inter_layer_ref_pic_set_idx) designating the interlayer reference picture set that is applied to the current slice as the slice header. When the process of Step S189 terminates, the process proceeds to Step S192.

In addition, in Step S188, in a case where the number of the interlayer reference picture set is determined to be single, the process proceeds to Step S190.

In Step S190, the index setting unit 180 omits the generation of the index (inter_layer_ref_pic_set_idx). In this case, even without any index, since only a zero-th parameter set (interlayer reference picture set) is present, the interlayer reference picture set is designated. When the process of Step S190 terminates, the process proceeds to Step S192.

In addition, in Step S187, in a case where the parameters of the sequence parameter set (SPS), in other words, the interlayer reference picture set is determined not to be used, the process proceeds to Step S191.

In Step S191, the parameter set generating unit 179 generates a parameter set (an interlayer reference picture set dedicated for the current picture) (inter_layer_ref_pic_set (num_inter_layer_ref_pic_sets)) dedicated for the current picture as the slice header. When the process of Step S191 terminates, the process proceeds to Step S192.

In Step S192, the prediction control unit 152 controls an interlayer prediction based on the parameter set (the interlayer reference picture set) set as above. When the process of Step S192 terminates, the header information generating process relating to the interlayer prediction terminates.

In addition, in Step S185, in a case where the layer determining unit 173 determines that the layer of the current slice is a base layer or determines that the slice type of the current slice is an I slice, the process proceeds to Step S193. Furthermore, in Step S186, in a case where it is determined that an interlayer prediction can be made based on the syntax of the video parameter set (VPS) in the current slice, the process proceeds to Step S193.

In Step S193, the prediction control unit 152 prohibits an interlayer prediction and controls such that an interlayer prediction is not performed in the intra prediction and the inter prediction.

When the process of Step S193 terminates, the header information generating process relating to the interlayer prediction terminates.

By executing each process as above, the image coding apparatus 100 can suppress unnecessary transmission of the information relating to the interlayer prediction and suppress a decrease in the coding efficiency.

Figure 43:
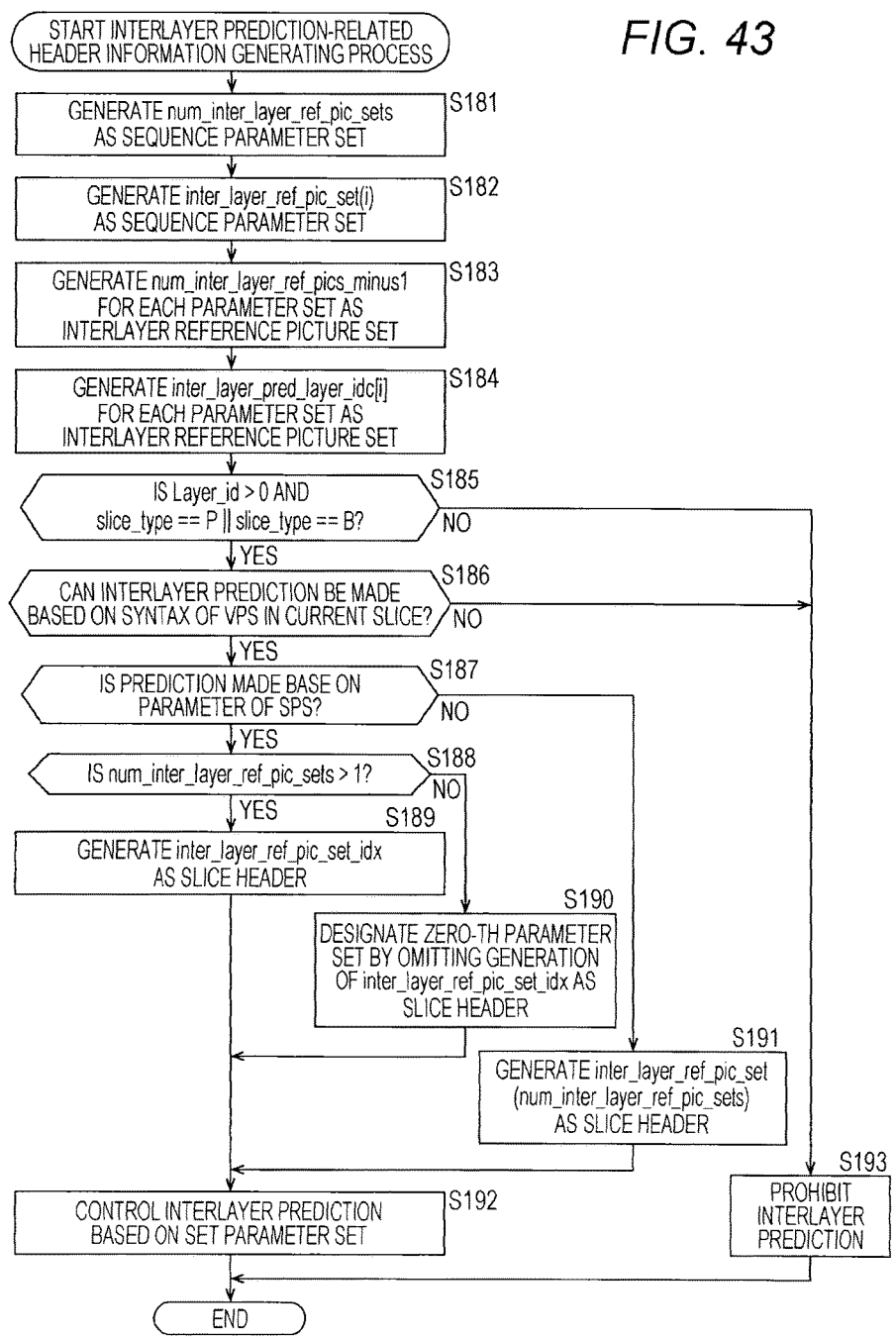
FIG. 43 is a flowchart that illustrates another example of the flow of a header information generating process relating to an interlayer prediction.

In addition, in the example illustrated in FIG. 43, a comparison between the numbers of reference layers, as in the process of Step S167 represented in FIG. 42, is performed in the semantics, and thus, the description thereof is omitted. It is apparent that, similar to the case illustrated in FIG. 42, the comparison may be performed using the syntax.

In a case where the method described in <Control according to Slice Type> is omitted, the process of Step S185 represented in FIG. 43 may be omitted. In addition, in a case where the method described in <Control according to Number of Reference Layer s> is omitted, in the process of Step S184 or S191 represented in FIG. 43, a comparison between the numbers of reference layers as in the process of Step S167 represented in FIG. 42 may be configured not be performed.

The configuration of the image coding apparatus 100 and the processing content of the image coding process are not limited to those described in the example presented above as long as the transmission of the information relating to the interlayer prediction can be controlled as described in the first embodiment.

3. Third Embodiment

<Image Decoding Apparatus>

Figure 44:
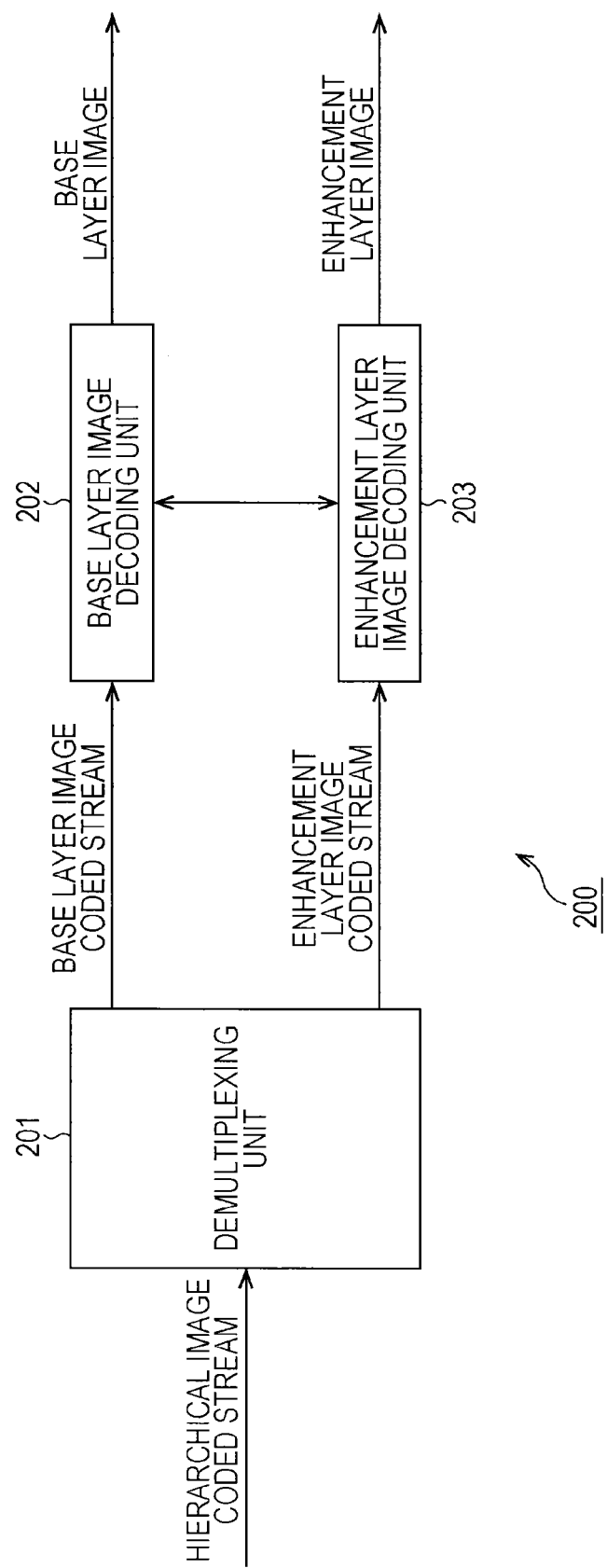
FIG. 44 is a block diagram that illustrates an example of the main configuration of an image decoding apparatus.

Next, decoding of the coded data coded as above will be described. FIG. 44 is a block diagram that illustrates an example of the main configuration of an image decoding apparatus corresponding to the image coding apparatus 100 that is an embodiment of the image processing apparatus to which the present technology is applied. The image decoding apparatus 200 illustrated in FIG. 44 decodes the coded data generated by the image coding apparatus 100 using a decoding method corresponding to the coding method (in other words, performs hierarchical decoding for coded data that is hierarchically coded). As illustrated in FIG. 44, the image decoding apparatus 200 includes: a demultiplexing unit 201; abase layer image decoding unit 202; and an enhancement layer image decoding unit 203.

The demultiplexing unit 201 receives a hierarchical image coded stream in which a base layer image coded stream and an enhancement layer image coded stream are multiplexed, which is transmitted from the coding side, and demultiplexes the hierarchical image coded stream, thereby extracting the base layer image coded stream and the enhancement layer image coded stream. The base layer image decoding unit 202 decodes the base layer image coded stream extracted by the demultiplexing unit 201, thereby acquiring a base layer image. The enhancement layer image decoding unit 203 decodes the enhancement layer image coded stream extracted by the demultiplexing unit 201, thereby acquiring an enhancement layer image.

The base layer image decoding unit 202 supplies the base layer decoded image acquired by decoding the base layer to the enhancement layer image decoding unit 203.

The enhancement layer image decoding unit 203 acquires the base layer decoded image supplied from the base layer image decoding unit 202 and stores the acquired base layer decoded image. The enhancement layer image decoding unit 203 uses the stored base layer decoded image as a reference image for a prediction process performed in the decoding of the enhancement layer.

<Base Layer Image Decoding Unit>

Figure 45:
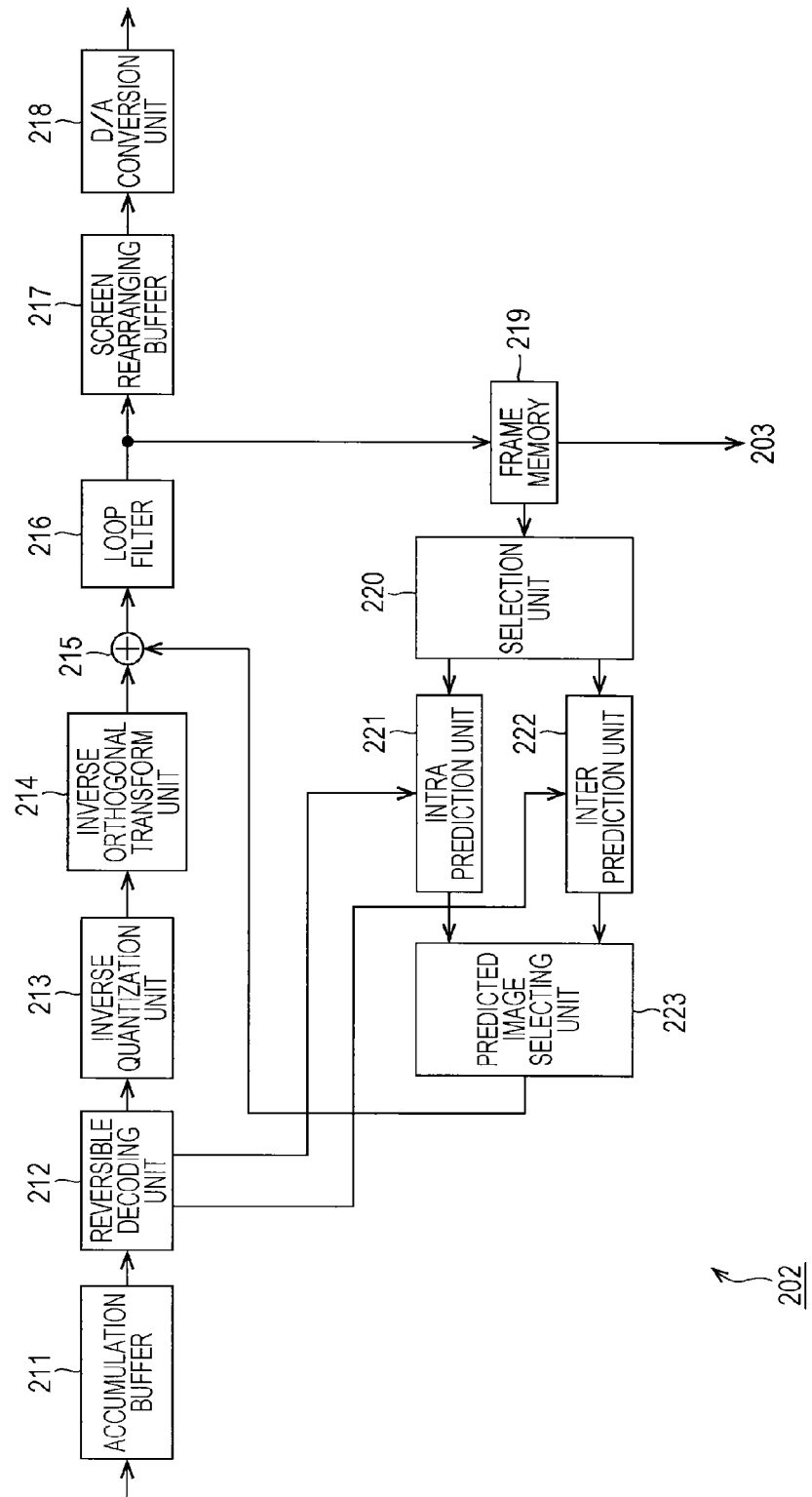
FIG. 45 is a block diagram that illustrates an example of the main configuration of a base layer image decoding unit.

FIG. 45 is a block diagram that illustrates an example of the main configuration of the base layer image decoding unit 202 illustrated in FIG. 44. As illustrated in FIG. 45, the base layer image decoding unit 202 includes: an accumulation buffer 211; a reversible decoding unit 212; an inverse quantization unit 213; an inverse orthogonal transform unit 214; a calculation unit 215; a loop filter 216; a screen rearranging buffer 217; and a D/A conversion unit 218. In addition, the base layer image decoding unit 202 includes: a frame memory 219; a selection unit 220; an intra prediction unit 221; an inter prediction unit 222; and a predicted image selecting unit 223.

The accumulation buffer 211 also serves as a reception unit that receives a transmitted coded data (the base layer image coded stream supplied from the demultiplexing unit 201). The accumulation buffer 211 receives and accumulates the transmitted coded data and supplies the coded data to the reversible decoding unit 212 at predetermined timing. Here, information required for a decoding process such as prediction mode information and the like is added to the coded data.

The reversible decoding unit 212 decodes the information, which is supplied from the accumulation buffer 211, coded by the reversible coding unit 116 using a decoding system corresponding to the coding system. The reversible decoding unit 212 supplies quantized coefficient data of a difference image that is acquired by the decoding process to the inverse quantization unit 213.

In addition, the reversible decoding unit 212 determines whether the intra prediction mode or the inter prediction mode is selected as an optimal prediction mode and supplies information relating to the optimal prediction mode to one of the intra prediction unit 221 and the inter prediction unit 222 that is determined to be selected. In other words, for example, in a case where the intra prediction mode is selected as the optimal prediction mode on the coding side, information (intra prediction mode information) relating to the optimal prediction mode is supplied to the intra prediction unit 221. On the other hand, for example, in a case where the inter prediction mode is selected as the optimal prediction mode on the coding side, information (inter prediction mode information) relating to the optimal prediction mode is supplied to the inter prediction unit 222.

In addition, the reversible decoding unit 212, for example, extracts information required for inverse quantization such as a quantization matrix and quantization parameters from the coded data and supplies the extracted information to the inverse quantization unit 213.

The inverse quantization unit 213 performs inverse quantization of the quantized coefficient data acquired through the decoding process performed by the reversible decoding unit 212 using a system that corresponds to the quantization system of the quantization unit 115. Here, this inverse quantization unit 213 is a processing unit similar to the inverse quantization unit 118. The inverse quantization unit 213 supplies acquired transform data (orthogonal transform coefficients) to the inverse orthogonal transform unit 214.

The inverse orthogonal transform unit 214 performs an inverse orthogonal transform of orthogonal transform coefficients supplied from the inverse quantization unit 213 by using a method corresponding to the orthogonal transform process performed by the orthogonal transform unit 114 as is necessary. Here, this inverse orthogonal transform unit 214 is a processing unit that is similar to the inverse orthogonal transform unit 119.

The image data of a difference image is restored by this inverse orthogonal transform process. The restored image data of the difference image corresponds to image data of the difference image before the orthogonal transform is performed on the coding side. Hereinafter, the restored image data of the difference image, which is acquired by the inverse orthogonal transform process performed by the inverse orthogonal transform unit 214, will be also referred to as a decoded residual data. The inverse orthogonal transform unit 214 supplies the decoded residual data to the calculation unit 215. In addition, the image data of a predicted image is supplied to the calculation unit 215 from the intra prediction unit 221 or the inter prediction unit 222 through the predicted image selecting unit 223.

The calculation unit 215 acquires the image data of a reconstruction image acquired by adding the difference image and the predicted image by using the decoded residual data and the image data of the predicted image. This reconstruction image corresponds to an input image before subtraction of the predicted image that is performed by the calculation unit 113. The calculation unit 215 supplies the reconstruction image to the loop filter 216.

The loop filter 216 generates a decoded image by appropriately performing a loop filter process including a de-blocking filter process, an adaptive loop filter, and the like for the supplied reconstruction image. For example, the loop filter 216 performs a deblocking lock filter process for the reconstruction image, thereby removing a block distortion. In addition, for example, the loop filter 216 performs a loop filter process for a result (the reconstruction image from which the block distortion is removed) of the de-blocking filter process by using a Wiener filter, thereby improving the image quality.

Here, the type of the filter process performed by the loop filter 216 is arbitrary, and a filter process other than that described above may be performed. In addition, the loop filter 216 may be configured to perform the filter process using filter coefficients supplied from the image coding apparatus. Furthermore, the loop filter 216 may be configured to omit the filter process and output input data without performing a filter process for the input data.

The loop filter 216 supplies a decoded image (or the reconstruction image) that is a result of the filter process to the screen rearranging buffer 217 and the frame memory 219.

The screen rearranging buffer 217 performs rearrangement of the order of frames for the decoded image. In other words, the screen rearranging buffer 217 rearranges images of each frame, which are rearranged in the coding order by the screen rearranging buffer 112, in the original display order. In other words, the screen rearranging buffer 217 stores image data of decoded images of each frame supplied in the coding order in that order, reads the image data of the decoded images of each frame stored in the coding order in the display order, and supplies the read image data to the D/A conversion unit 218. The D/A conversion unit 218 performs D/A conversion of the decoded images (digital data) of each frame supplied from the screen rearranging buffer 217 and outputs the decoded images to a display not illustrated as analog data so as to be displayed thereon.

The frame memory 219 stores the supplied decoded image and supplies the stores decoded image to the intra prediction unit 221 or the inter prediction unit 222 through the selection unit 220 as a reference image at predetermined timing or based on an external request from the intra prediction unit 221, the inter prediction unit 222, or the like.

The intra prediction mode information and the like are appropriately supplied to the intra prediction unit 221 from the reversible decoding unit 212. The intra prediction unit 221 performs an intra prediction in the intra prediction mode (optimal intra prediction mode) used by the intra prediction unit 129, thereby generating a predicted image. At that time, the intra prediction unit 221 performs an intra prediction using the image data of the reconstruction image supplied from the frame memory 219 through the selection unit 220. In other words, the intra prediction unit 221 uses the reconstruction image as a reference image (peripheral pixels). The intra prediction unit 221 supplies the generated predicted image to the predicted image selecting unit 223.

Optimal prediction mode information, motion information, and the like are appropriately supplied to the inter prediction unit 222 from the reversible decoding unit 212. The inter prediction unit 222 performs an inter prediction by using the decoded image (reference image) acquired from the frame memory 219 in the inter prediction mode (optimal inter prediction mode) represented in the optimal prediction mode information that is acquired from the reversible decoding unit 212, thereby generating a predicted image.

The predicted image selecting unit 223 supplies the predicted image supplied from the intra prediction unit 221 or the predicted image supplied from the inter prediction unit 222 to the calculation unit 215. Then, the predicted image and the decoded residual data (difference image information) supplied from the inverse orthogonal transform unit 214 are added by the calculation unit 215, whereby a reconstruction image is acquired.

In addition, the frame memory 219 supplies the stored base layer decoded image to the enhancement layer image decoding unit 203.

<Enhancement Layer Image Decoding Unit>

Figure 46:
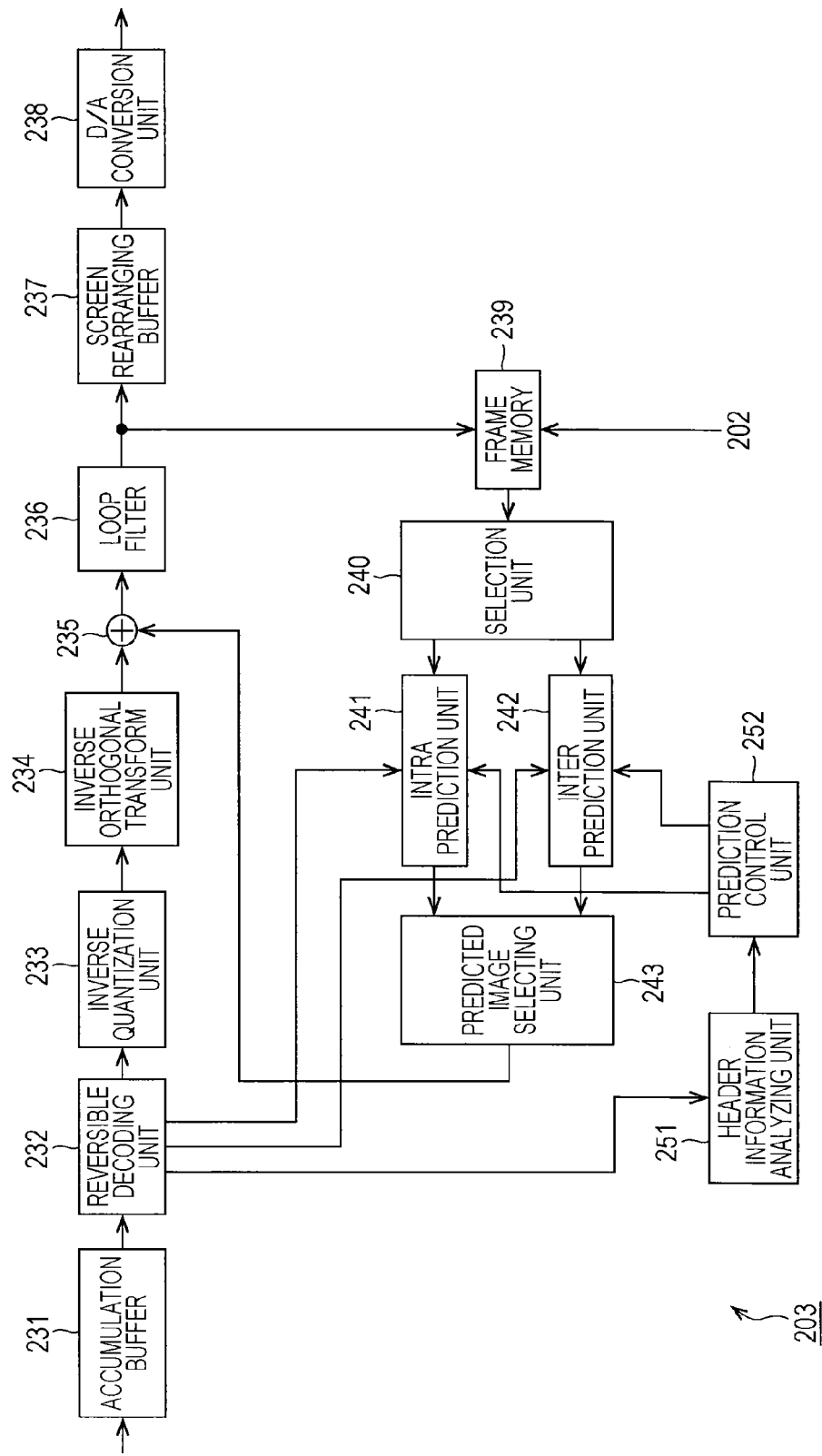
FIG. 46 is a block diagram that illustrates an example of the main configuration of an enhancement layer image decoding unit.

FIG. 46 is a block diagram that illustrates an example of the main configuration of the enhancement layer image decoding unit 203 illustrated in FIG. 44. As illustrated in FIG. 46, the enhancement layer image decoding unit 203 basically has the similar configuration as the base layer image decoding unit 202 illustrated in FIG. 45.

In other words, the enhancement layer image decoding unit 203, as illustrated in FIG. 46, includes: an accumulation buffer 231; a reversible decoding unit 232; an inverse quantization unit 233; an inverse orthogonal transform unit 234; a calculation unit 235; a loop filter 236; a screen rearranging buffer 237; and a D/A conversion unit 238. In addition, the enhancement layer image decoding unit 203 includes: a frame memory 239; a selection unit 240; an intra prediction unit 241; an inter prediction unit 242; and a predicted image selecting unit 243.

The accumulation buffer 231 to the predicted image selecting unit 243 correspond to the accumulation buffer 211 to the predicted image selecting unit 223 illustrated in FIG. 45 and perform processes similar to those of the corresponding processing units. However, each unit of the enhancement layer image decoding unit 203 performs the process not for coding the base layer but for coding the enhancement layer image information. Thus, while the above-presented description of the accumulation buffer 211 to the predicted image selecting unit 223 illustrated in FIG. 45 may be applied to the process of the accumulation buffer 231 to the predicted image selecting unit 243, in such a case, data to be processed need to be not the data of the base layer but the data of the enhancement layer. In addition, it is necessary to replace the processing unit of an input source or an output destination of the data with a corresponding processing unit of the enhancement layer image decoding unit 203.

The frame memory 239 acquires the base layer decoded image supplied from the base layer image decoding unit 202 and, for example, stores the acquired base layer decoded image as a long-term reference image or the like. This base layer decoded image, for example, is used as a reference image for an interlayer prediction in the prediction process performed by the intra prediction unit 241 or the inter prediction unit 242.

In addition, the enhancement layer image decoding unit 203 includes a header information analyzing unit 251 and a prediction control unit 252.

The reversible decoding unit 232, for example, acquires header information such as the sequence parameter set (SPS) or the slice header from the enhancement layer image coded stream. In this header information, there is a possibility that information relating to the interlayer prediction that is transmitted from the coding side is included. The reversible decoding unit 232 supplies the header information to the header information analyzing unit 251.

When the header information supplied from the reversible decoding unit 232 is acquired, the header information analyzing unit 251 analyzes the header information. The header information analyzing unit 251, for example, acquires the information relating to the interlayer prediction from the header information by analyzing the header information using a method corresponding to the control method described in the first embodiment. The information relating to the interlayer prediction is information that is transmitted from the coding side (for example, the image coding apparatus 100) and is information relating to an interlayer prediction performed at the time of coding data. Thus, also on the decoding side (the image decoding apparatus 200), by controlling an interlayer prediction based on the information, similar to that performed at the time of coding data, an interlayer prediction can be performed, whereby decoding can be correctly performed.

Accordingly, the prediction control unit 252 controls an interlayer prediction performed by the intra prediction unit 241 or the inter prediction unit 242 based on the result of the analysis performed by the header information analyzing unit 251.

As above, the image decoding apparatus 200 can realize the improvement of the coding efficiency according to the control process described in the first embodiment.

<Header Information Generating Unit>

Figure 47:
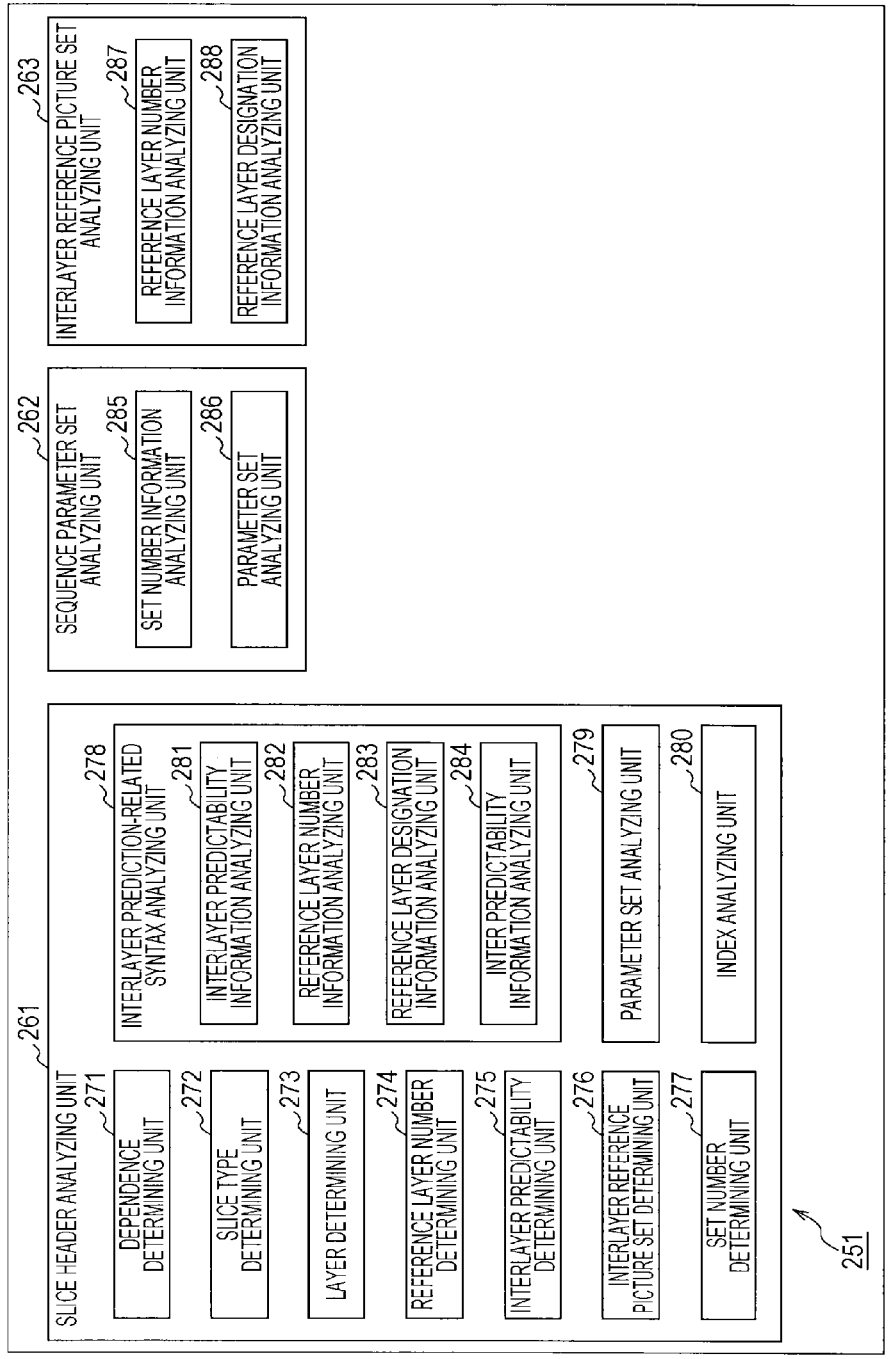
FIG. 47 is a block diagram that illustrates an example of the main configuration of a header information analyzing unit.

FIG. 47 is a block diagram that illustrates a configuration example of the header information analyzing unit 251 illustrated in FIG. 46. In the header information analyzing unit 251, for example, the process described above is performed, for example, by executing a program read from the ROM or the like using the RAM by using the CPU, whereby various functional blocks illustrated in FIG. 47 are realized.

As illustrated in FIG. 47, the header information analyzing unit 251 includes: a slice header analyzing unit 261; a sequence parameter set analyzing unit 262; and an interlayer reference picture set analyzing unit 263.

The slice header analyzing unit 261 analyzes a slice header of the current slice. The sequence parameter set analyzing unit 262 analyzes a sequence parameter set (SPS) of a sequence (also referred to as a current sequence) to which the current slice belongs. The interlayer reference picture set analyzing unit 263 analyzes parameters that configure each interlayer reference picture set defined by the sequence parameter set analyzing unit 262.

The slice header analyzing unit 261 includes: a dependence determining unit 271; a slice type determining unit 272; a layer determining unit 273; a reference layer number determining unit 274; an interlayer predictability determining unit 275; an interlayer reference picture set determining unit 276; a set number determining unit 277; an interlayer prediction-related syntax analyzing unit 278; a parameter set analyzing unit 279; and an index analyzing unit 280.

The dependence determining unit 271 determines whether or not the slice header of the current slice is dependent on another slice. The slice type determining unit 272 determines a slice type of the current slice. The layer determining unit 273 makes a determination relating to the layer of the current slice. The reference layer number determining unit 274 makes a determination relating to the number of reference layers. The interlayer predictability determining unit 275 determines whether or not an interlayer prediction can be made. The interlayer reference picture set determining unit 276 determines whether or not a predefined interlayer reference picture set is used. The set number determining unit 277 determines the number of interlayer reference picture sets. The interlayer prediction-related syntax analyzing unit 278 performs a process relating to the analysis of the information relating to the interlayer prediction. The parameter set analyzing unit 279 performs a process relating to the analysis of an interlayer reference picture set. The index analyzing unit 280 performs a process relating to the analysis of an index that designates the interlayer reference picture set.

The interlayer prediction-related syntax analyzing unit 278 includes: an interlayer predictability information analyzing unit 281; a reference layer number information analyzing unit 282; a reference layer designation information analyzing unit 283; and an inter predictability information analyzing unit 284.

The interlayer predictability information analyzing unit 281 performs a process relating to the analysis of the interlayer predictability information. The reference layer number information analyzing unit 282 performs a process relating to the analysis of the reference layer number information. The reference layer designation information analyzing unit 283 performs a process relating to the analysis of the reference layer designation information. The inter predictability information analyzing unit 284 performs a process relating to the analysis of the inter predictability information.

The sequence parameter set analyzing unit 262 includes a set number information analyzing unit 285 and a parameter set analyzing unit 286.

A set number information analyzing unit 285 analyzes the set number information that represents the number of parameter sets (interlayer reference picture sets) defined in the sequence parameter set. A parameter set analyzing unit 286 analyzes a parameter set (interlayer reference picture set).

The interlayer reference picture set analyzing unit 263 includes a reference layer number information analyzing unit 287 and a reference layer designation information analyzing unit 288.

The reference layer number information analyzing unit 287 is a processing unit that performs a process similar to that of the reference layer number information analyzing unit 282 and analyzes the reference layer number information of the interlayer reference picture set. The reference layer designation information analyzing unit 288 is a processing unit that performs a process similar to that of the reference layer designation information analyzing unit 283 and analyzes reference layer designation information that represents all the reference layers designated in the interlayer reference picture set.

As has been described in the first embodiment, there is a plurality of methods for controlling the information relating to an interlayer prediction, and the methods may be combined. Thus, among the functional blocks illustrated in FIG. 47, functional blocks that are not necessary for an employed control method or a combination of the methods may be omitted as is appropriate.

<Flow of Image Decoding Process>

Next, the flow of each process executed by the image decoding apparatus 200 as described above will be described. First, an example of the flow of the image decoding process will be described with reference to a flowchart represented in FIG. 48.

When the image decoding process is started, in Step S201, the demultiplexing unit 201 of the image decoding apparatus 200 demultiplexes the hierarchical image coded stream transmitted from the coding side for each layer.

In Step S202, the base layer image decoding unit 202 decodes the base layer image coded stream that is extracted by the process of Step S201. The base layer image decoding unit 202 outputs data of a base layer image generated by the decoding.

In Step S203, the enhancement layer image decoding unit 203 decodes the enhancement layer image coded stream that is extracted by the process of Step S201. The enhancement layer image decoding unit 203 outputs data of an enhancement layer image generated by the decoding.

When the process of Step S203 terminates, the image decoding apparatus 200 terminates the image decoding process. One picture is processed by such an image decoding process. Thus, the image decoding apparatus 200 repeatedly executes such an image decoding process for each picture of hierarchical moving image data.

<Flow of Base Layer Decoding Process>

Next, an example of the flow of the base layer decoding process executed in Step S202 represented in FIG. 48 will be described with reference to a flowchart represented in FIG. 49.

When the base layer decoding process is started, in Step S221, the accumulation buffer 211 of the base layer image decoding unit 202 accumulates a transmitted base layer coded stream. In Step S222, the reversible decoding unit 212 decodes a base layer coded stream that is supplied from the accumulation buffer 211. In other words, image data of an I slice, a P slice, a B slice, and the like coded by the reversible coding unit 116 is decoded. At this time various kinds of information other than the image data that is included in the bit stream such as header information is decoded as well.

In Step S223, the inverse quantization unit 213 performs inverse quantization of quantized coefficients that are acquired by the process of Step S222.

In Step S224, the inverse orthogonal transform unit 214 performs an inverse orthogonal transform of the coefficients acquired through the inverse quantization process in Step S223.

In Step S225, the intra prediction unit 221 and the inter prediction unit 222 performs a prediction process, thereby generating a predicted image. In other words, the prediction process is performed in a prediction mode, which is determined by the reversible decoding unit 212, that is applied at the time of coding the data. More specifically, for example, in a case where the intra prediction is applied at the time of coding the data, the intra prediction unit 221 generates a predicted image in the intra prediction mode selected to be optimal at the time of coding the data. On the other hand, for example, in a case where the inter prediction is applied at the time of coding the data, the inter prediction unit 222 generates a predicted image in the inter prediction mode selected to be optimal at the time of coding the data.

In Step S226, the calculation unit 215 adds the predicted image generated in Step S226 to the difference image acquired by performing the inverse orthogonal transform in Step S225. In this way, image data of the reconstruction image is acquired.

In Step S227, the loop filter 216 appropriately performs a loop filter process including a de-blocking filter process, an adaptive loop filter, and the like for the image data of the reconstruction image that is acquired by the process of Step S227.

In Step S228, the screen rearranging buffer 217 rearranges each frame of the reconstruction image for which the filter process is performed in Step S227. In other words, the order of the frames rearranged at the time of coding the data is rearranged to be the original display order.

In Step S229, the D/A conversion unit 218 performs a D/A conversion of the image of which the order of frames is rearranged in Step S228. This image is output to a display not illustrated, whereby the image is displayed.

In Step S230, the frame memory 219 stores data of the decoded image acquired by the process of Step S227, the reconstruction image acquired by the process of Step S226, and the like.

In Step S231, the frame memory 219 supplies the base layer decoded image acquired by the decoding process of the base layer as described above to the decoding process of the enhancement layer.

Figure 48:
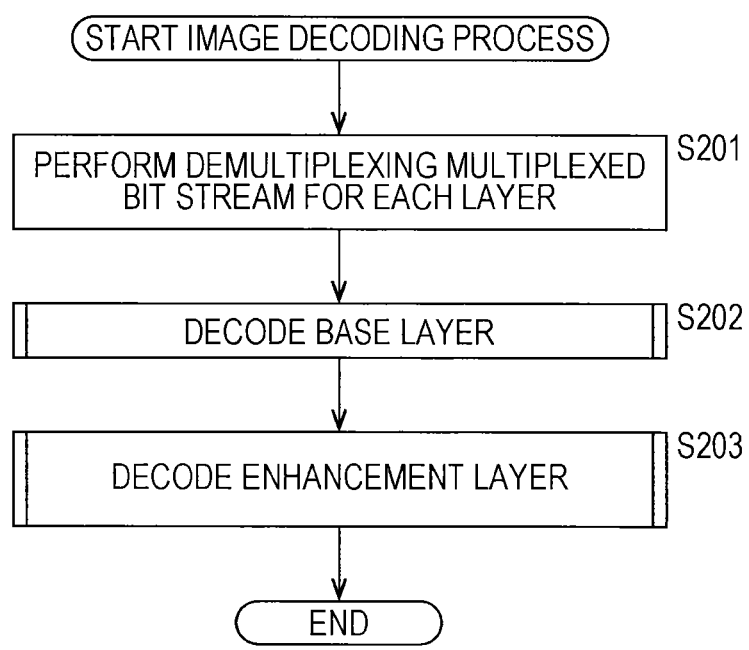
FIG. 48 is a flowchart that illustrates an example of the flow of an image decoding process.

When the process of Step S231 terminates, the base layer decoding process terminates, and the process is returned to the process represented in FIG. 48.

<Flow of Enhancement Layer Decoding Process>

Next, an example of the flow of the enhancement layer decoding process executed in Step S203 represented in FIG. 48 will be described with reference to a flowchart illustrated in FIG. 50.

When the enhancement layer decoding process is started, the header information analyzing unit 251 of the enhancement layer image decoding unit 203 analyzes the header information extracted from the coded stream by the reversible decoding unit 232 in Step S241. The prediction control unit 252 controls an interlayer prediction based on a result of the analysis.

In Step S242, the frame memory 239 acquires and stores the supplied base layer decoded image. For example, the frame memory 239 stores the base layer decoded image in a long-term reference frame.

Figure 49:
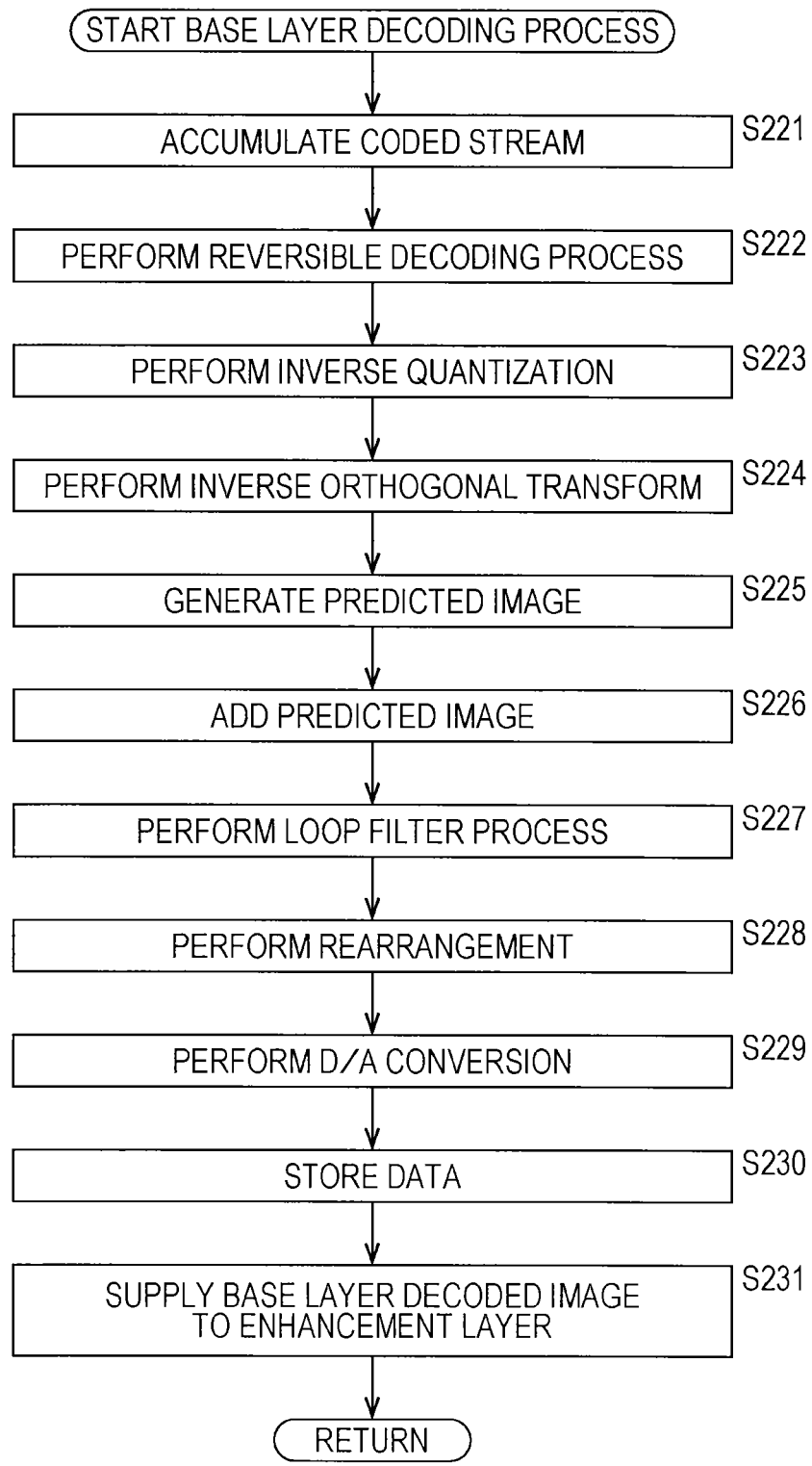
FIG. 49 is a flowchart that illustrates an example of the flow of a base layer decoding process.

Each process of Steps S243 to S252 respectively corresponds to each process of Steps S221 to S230 represented in FIG. 49 and is executed in a basically similar manner as that of such processes. However, while the processes of Steps S221 to S230 represented in FIG. 49 are performed for the base layer, the processes of Steps S243 to S252 are performed for the enhancement layer. In addition, in Step S247, there are cases where an interlayer prediction is performed as a prediction process for generating a predicted image.

When the process of Step S252 terminates, the enhancement layer decoding process terminates, and the process is returned to the process illustrated in FIG. 48.

<Flow of Header Information Analyzing Process relating to Interlayer Prediction>

Figure 50:
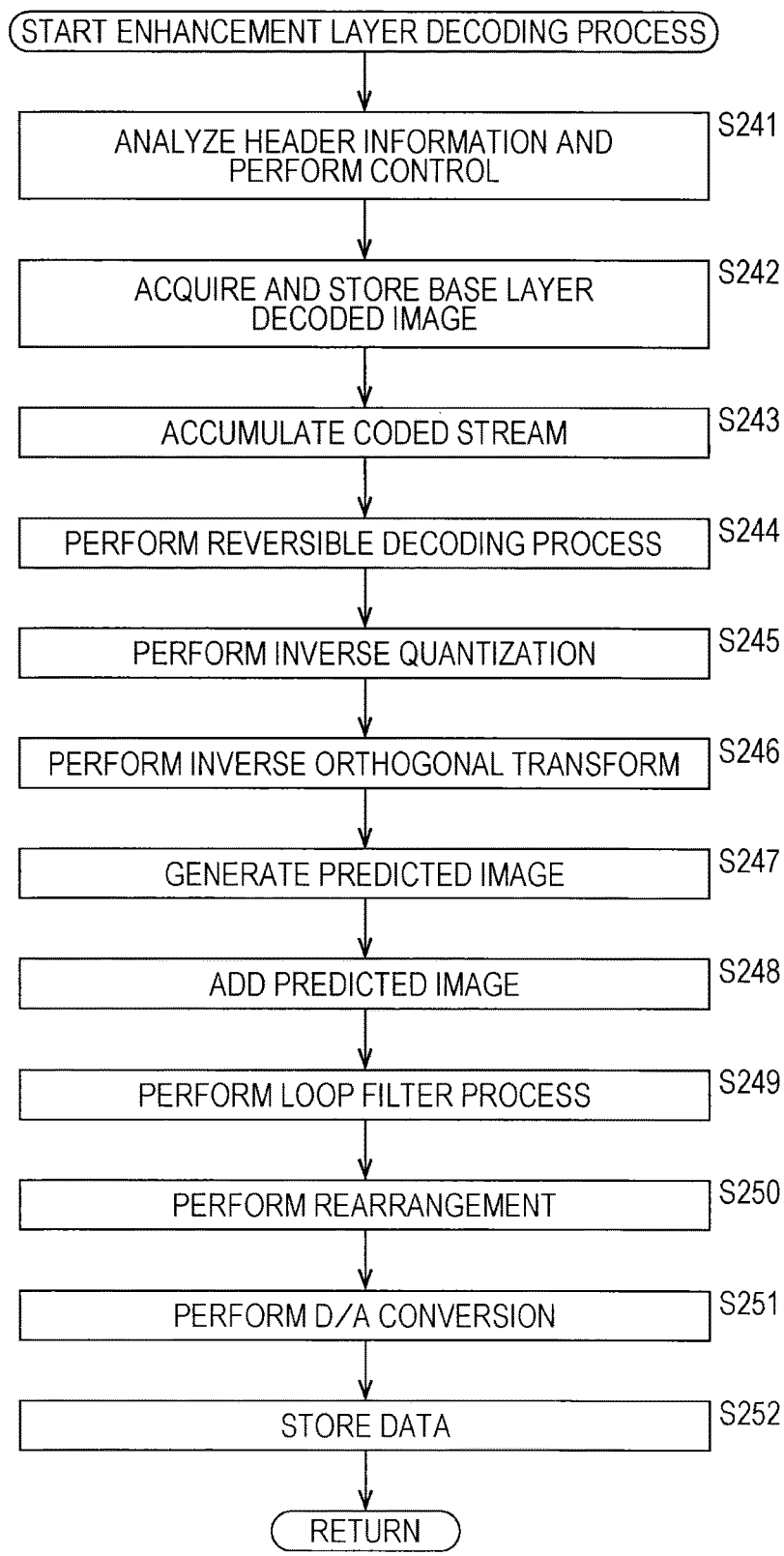
FIG. 50 is a flowchart that illustrates an example of the flow of an enhancement layer decoding process.

The header information analyzing unit 251 and the prediction control unit 252 perform a header information analyzing process relating to an interlayer prediction in Step S241 represented in FIG. 50 and, as described in the first embodiment, perform analysis of the information relating to the interlayer prediction included in the header information (slice header) and control of the interlayer prediction.

Figure 51:
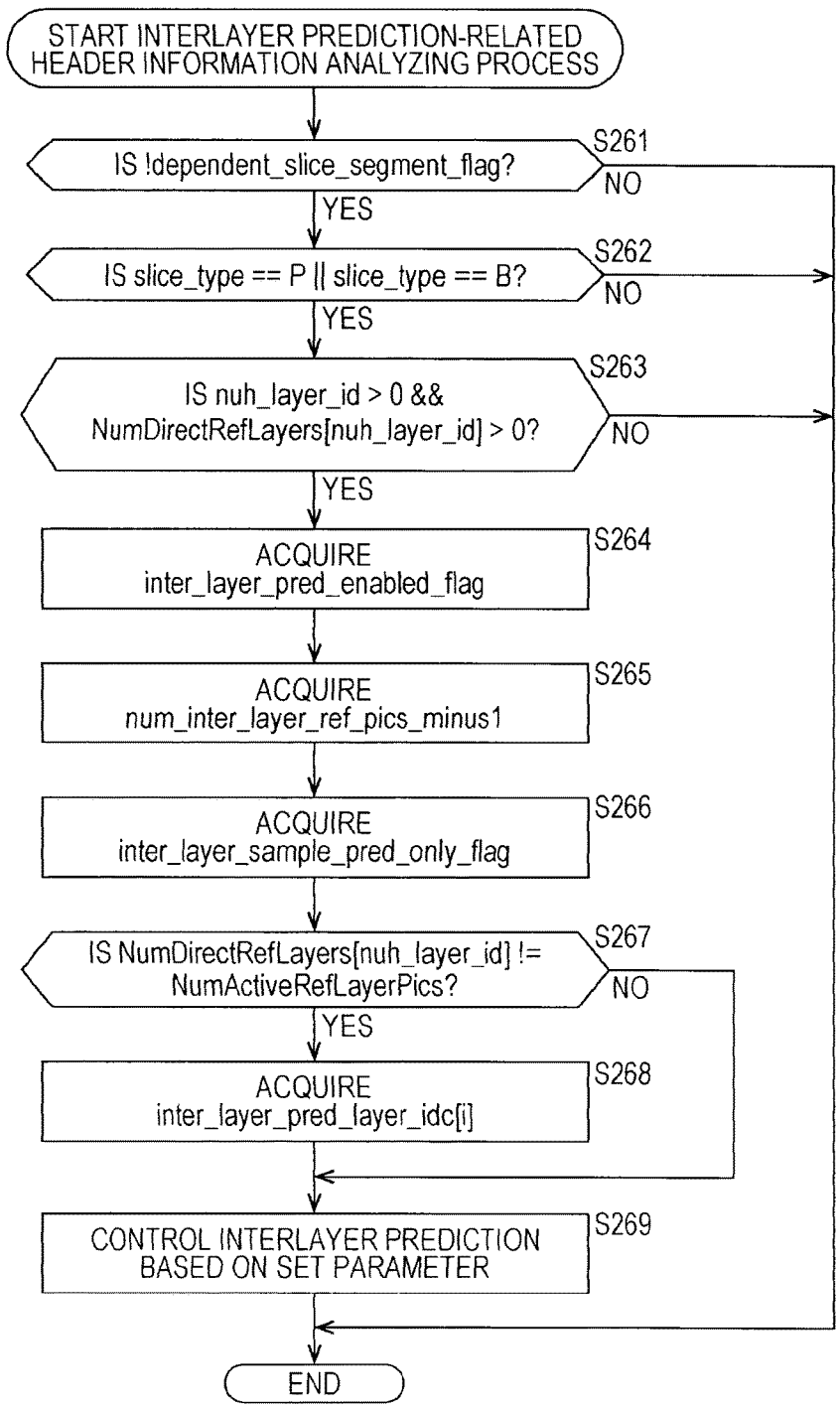
FIG. 51 is a flowchart that illustrates an example of the flow of a header information analyzing process relating to an interlayer prediction.

Next, an example of the flow of the header information analyzing process relating to the interlayer prediction will be described with reference to a flowchart represented in FIG. 51. In FIG. 51, the flow of the process of a case where the method described in <Control according to Slice Type> of the first embodiment and the method described in <Control according to Number of Reference Layers> are combined will be described.

When the header information analyzing process relating to an interlayer prediction is started, the dependence determining unit 271 analyzes a value of the dependence information (dependent_slice_segment_flag) included in the slice header and determines whether or not the slice header of the current slice is dependent on any other slice in Step S261. In a case where the slice is determined to be dependent (!dependent_slice_segment_flag), the process proceeds to Step S262.

In Step S262, the slice type determining unit 272 analyzes the slice type (slice_type) included in the slice header and determines whether or not the slice type of the current slice is a P slice or a B slice. In a case where the slice type of the current slice is determined to be the P slice or the B slice (slice_type==P||slice_type==B), the process proceeds to Step S263.

In Step S263, the layer determining unit 273 analyzes layer information (nuh_layer_id) included in the slice header and reference layer information (NumDirectRefLayers[nuh_layer_id]) relating to the layer of the current slice that is included in the video parameter set (VPS) and determines whether or not the layer of the current slice is an enhancement layer, and one or more layers are defined to be referable in the video parameter set (VPS). In a case where it is determined that the layer of the current slice is an enhancement layer, and one or more layers are defined to be referable in the video parameter set (VPS) (nuh_layer_id>0 && NumDirectRefLayers[nuh_layer_id]>0), the process proceeds to Step S264.

In Step S264, the interlayer predictability information analyzing unit 281 analyzes interlayer predictability information (inter_layer_pred_enabled_flag) included in the slice header and acquires the interlayer predictability information (inter_layer_pred_enabled_flag) as the information relating to an interlayer prediction.

In Step S265, the reference layer number information analyzing unit 282 analyzes reference layer number information (num_inter_layer_ref_pics_minus1) included in the slice header and acquires the reference layer number information (num_inter_layer_ref_pics_minus1) as the information relating to the interlayer prediction.

In Step S266, the inter predictability information analyzing unit 284 analyzes inter predictability information (inter_layer_sample_pred_only_flag) included in the slice header and acquires the inter predictability information (inter_layer_sample_pred_only_flag) as the information relating to the interlayer prediction.

In Step S267, the reference layer number determining unit 274 analyzes reference layer information (NumDirectRefLayers[nuh_layer_id]) relating to the layer of the current slice that is included in the video parameter set (VPS) and active layer number information (!=NumActiveRefLayerPics) included in the slice header and determines whether or not the number of reference layers defined in the video parameter set (VPS) and the number of reference layers defined in the slice header are mutually the same. Ina case where both the numbers of the reference layers are determined not to be mutually the same (NumDirectRefLayers[nuh_layer_id] !=NumActiveRefLayerPics), the process proceeds to Step S268.

In Step S268, the reference layer designation information analyzing unit 283 analyzes reference layer designation information (inter_layer_pred_layer_idc[i]) included in the slice header and acquires the reference layer designation information (inter_layer_pred_layer_idc[i]) as the information relating to an interlayer prediction. When the process of Step S268 terminates, the process proceeds to Step S269.

In addition, in Step S267, in a case where the number of the reference layers defined in the video parameter set (VPS) and the number of the reference layers defined in the slice header are determined to be mutually the same, the process of Step S268 is omitted, and the process proceeds to Step S269.

In Step S269, the prediction control unit 252 controls an interlayer prediction based on each parameter acquired by the header information analyzing unit 251 as above as the information relating to the interlayer prediction. When the process of Step S269 terminates, the header information analyzing process relating to the interlayer prediction terminates.

In addition, in a case where the slice header of the current slice is determined to be dependent on any other slice in Step S261, a case where the slice type of the current slice is determined to be the I slice in Step S262, and a case where the layer of the current slice is the base layer in Step S263 or a case where one or more layers are determined not to be defined to be referable in the video parameter set (VPS), the interlayer prediction is not performed in the coding process, and accordingly, the header information analyzing process relating to the interlayer prediction terminates.

By executing each process as above, the image decoding apparatus 200 can realize suppression of unnecessary transmission of the information relating to the interlayer prediction and suppress a decrease in the coding efficiency.

In a case where only the method described in <Control according to Slice Type> is used, the process of Step S267 represented in FIG. 51 may be omitted. In addition, in a case where only the method described in <Control according to Number of Reference Layers> is used, the process of Step S262 represented in FIG. 51 may be omitted.

<Flow 2 of Header Information Analyzing Process Relating to Interlayer Prediction>

Next, as another example of the header information analyzing process relating to the interlayer prediction, an example of a case where the method described in <Control according to Slice Type> of the first embodiment, the method described in <Control according to Number of Reference Layers>, and the method described in <Predefinition of Reference Pattern> are combined will be described with reference to a flowchart illustrated in FIG. 52.

When the header information analyzing process relating to the interlayer prediction is started, the set number information analyzing unit 285 analyzes set number information (num_inter_layer_ref_pic_sets) of the sequence parameter set and acquires the set number information (num_inter_layer_ref_pic_sets) as the information relating to the interlayer prediction in Step S281.

In Step S282, the parameter set analyzing unit 286 analyzes an interlayer reference picture set (inter_layer_ref_pic_set(i)) of the sequence parameter set and acquires the interlayer reference picture set (inter_layer_ref_pic_set(i)) as the information relating to the interlayer prediction.

In Step S283, the reference layer number information analyzing unit 287 analyzes reference layer number information (num_inter_layer_ref_pics_minus1) of each interlayer reference picture set and acquires the reference layer number information (num_inter_layer_ref_pics_minus1) as the information relating to the interlayer prediction.

In Step S284, the reference layer designation information analyzing unit 288 analyzes reference layer designation information (inter_layer_pred_layer_idc[i]) of each interlayer reference picture set and acquires the reference layer designation information (inter_layer_pred_layer_idc[i]) as the information relating to the interlayer prediction.

In Step S285, the slice type determining unit 272 and the layer determining unit 273 analyze the layer information (Layer_id) and the slice type (slice_type) of the current slice included in the slice header and determines whether or not the layer of the current slice is an enhancement layer, and the slice type of the current slice is a P slice or a B slice. In a case where it is determined that the layer of the current slice is an enhancement layer (Layer_id>0), and the slice type of the current slice is determined to be a P slice or a B slice (slice_type==P∥slice_type==B), the process proceeds to Step S286.

In Step S286, the interlayer predictability information analyzing unit 281 analyzes interlayer predictability information (inter_layer_pred_enabled_flag) included in the slice header and acquires the interlayer predictability information (inter_layer_pred_enabled_flag) as the information relating to the interlayer prediction. Then, the interlayer predictability determining unit 275 determines whether or not an interlayer prediction can be made from the syntax of the video parameter set (VPS) in the current slice based on the interlayer predictability information (inter_layer_pred_enabled_flag). In a case where it is determined that the interlayer prediction can be made, the process proceeds to Step S287.

In Step S287, the interlayer reference picture set determining unit 276 determines whether or not a prediction is made from parameters of the sequence parameter set (SPS), in other words, the interlayer reference picture set based on the value of interlayer reference picture set information (inter_layer_ref_pic_set_sps_flag) included in the slice header. In a case where it is determined that the prediction is made, the process proceeds to Step S288.

In Step S288, the set number determining unit 277 determines whether or not a plurality of interlayer reference picture sets is present based on the set number (num_inter_layer_ref_pic_sets) acquired in Step S281. In a case where a plurality of interlayer reference picture sets is determined to be present (num_inter_layer_ref_pic_sets>1), the process proceeds to Step S289.

In Step S289, the index analyzing unit 280 analyzes an index (inter_layer_ref_pic_set_idx) included in the slice header and acquires the index (inter_layer_ref_pic_set_idx). The index analyzing unit 280 designates an interlayer reference picture set using the index (inter_layer_ref_pic_set_idx). When the process of Step S289 terminates, the process proceeds to Step S292.

On the other hand, in Step S288, in a case where the number of the interlayer reference picture set is determined to be single, the process proceeds to Step S290.

In Step S290, the index analyzing unit 280 omits the analysis of the index (inter_layer_ref_pic_set_idx). In this case, even without any index, since only a zero-th parameter set (interlayer reference picture set) is present, the index analyzing unit 280 designates the zero-th interlayer reference picture set without using the index. When the process of Step S290 terminates, the process proceeds to Step S292.

In addition, in Step S287, in a case where the parameters of the sequence parameter set (SPS), in other words, the interlayer reference picture set is determined not to be used, the process proceeds to Step S291.

In Step S291, the parameter set analyzing unit 279 acquires a parameter set (an interlayer reference picture set dedicated for the current picture) (inter_layer_ref_pic_set (num_inter_layer_ref_pic_sets)) dedicated for the current picture that is included in the slice header. When the process of Step S291 terminates, the process proceeds to Step S292.

In Step S292, the prediction control unit 252 controls an interlayer prediction based on the parameter set (interlayer reference picture set) set as above. When the process of Step S292 terminates, the header information analyzing process relating to the interlayer prediction terminates.

In addition, in Step S285, in a case where the layer determining unit 273 determines that the layer of the current slice is a base layer or determines that the slice type of the current slice is the I slice, or, in a case where it is determined that an interlayer prediction cannot be performed from the syntax of the video parameter set (VPS) in the current slice in Step S286, the interlayer prediction is not performed, and accordingly, the header information generating process relating to the interlayer prediction terminates.

By executing each process as above, the image decoding apparatus 200 can realize suppression of unnecessary transmission of the information relating to the interlayer prediction and suppress a decrease in the coding efficiency.

Figure 52:
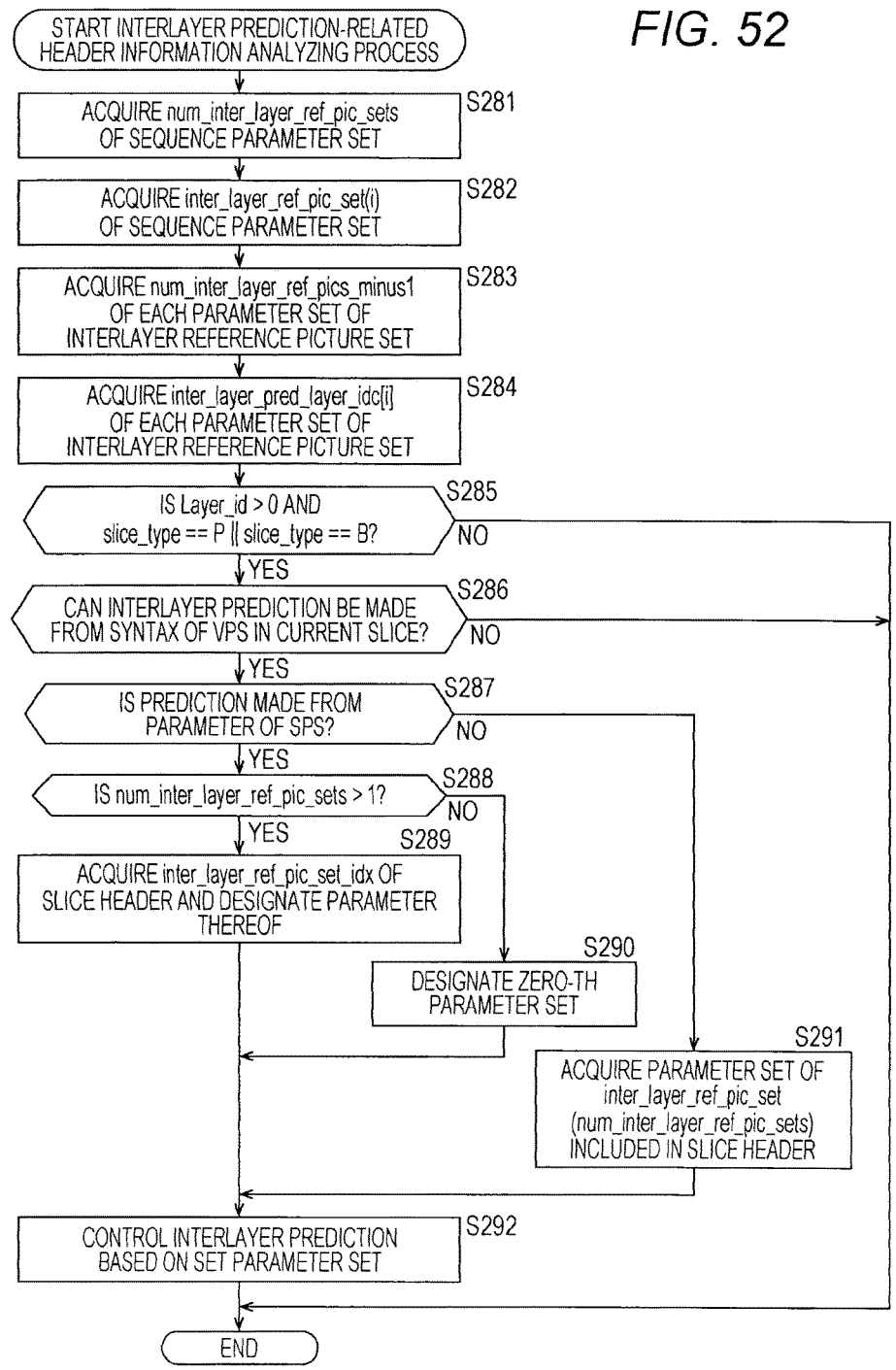
FIG. 52 is a flowchart that illustrates another example of the flow of a header information analyzing process relating to an interlayer prediction.

In the example illustrated in FIG. 52, a comparison between the numbers of the reference layers, as in the process of Step S267 represented in FIG. 51, is performed using the semantics, and thus, the description thereof will not be presented. It is apparent that, similar to the example illustrated in FIG. 52, the comparison may be performed using the syntax.

In a case where the method described in <Control according to Slice Type> is omitted, the process of Step S285 represented in FIG. 52 may be omitted. In addition, in a case where the method described in <Control according to Number of Reference Layers> is omitted, in the process of Step S284 or S291 represented in FIG. 52, a comparison between the numbers of reference layers as in the process of Step S267 represented in FIG. 51 may be configured not be performed.

The configuration of the image decoding apparatus 200 and the processing content of the image decoding process are not limited to those described in the example presented above as long as the transmission of the information relating to the interlayer prediction can be controlled as described in the first embodiment.

As the applicable range of the present technology, the present technology can be applied to all the image coding apparatuses and all the image decoding apparatuses that are based on scalable coding and decoding systems.

In addition, the present technology, for example, may be applied to an image coding apparatus and an image decoding apparatus that are used when image information (bit stream) compressed using an orthogonal transform such as a discrete cosine transform and motion compensation, like MPEG, H.26x, or the like, is received through a network medium such as satellite broadcast, cable television, the Internet, or a mobile phone. In addition, the present technology may be applied to an image coding apparatus and an image decoding apparatus that are used when information is processed on a storage medium such as an optical disc, a magnetic disk, or a flash memory.

4. Fourth Embodiment

<Application to Multiple Viewpoint Image Coding and Multiple Viewpoint Image Decoding>

Figure 53:
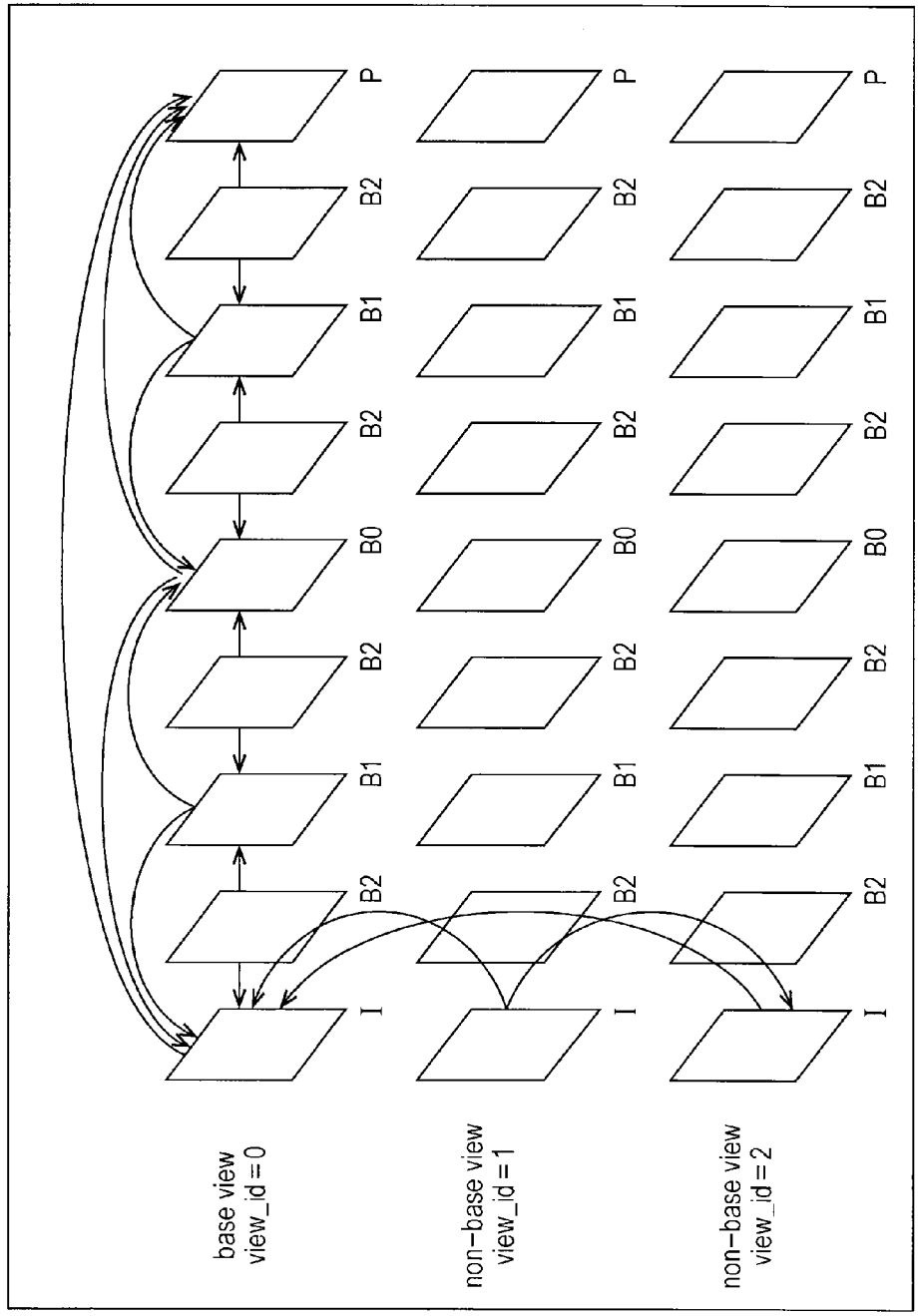
FIG. 53 is a diagram that illustrates an example of a multiple viewpoint image coding system.

A series of the processes described above may be applied to multiple viewpoint image coding/multiple viewpoint image decoding. FIG. 53 is a diagram that illustrates an example of a multiple viewpoint image coding system.

As illustrated in FIG. 53, a multiple viewpoint image includes images of multiple viewpoints (views). The multiple views of the multiple viewpoint image are configured by a base view that is coded and decoded by using only the image of the base view without using information of another view and a non-base view that is coded and decoded using information of other views. For coding/decoding the non-base view, information of the base view or information of any other non-base view may be used.

In other words, a reference relation between views in the multiple viewpoint image coding/decoding is similar to a reference relation between layers in the hierarchical image coding/decoding. Thus, by applying the present technology to the coding/decoding of the multiple viewpoint image as illustrated in FIG. 53, similar to the application to the hierarchical coding/hierarchical decoding described above with reference to FIGS. 1 to 52, advantages similar to the advantages described above with reference to FIGS. 1 to 52 can be acquired.

<Multiple Viewpoint Image Coding Apparatus>

Figure 54:
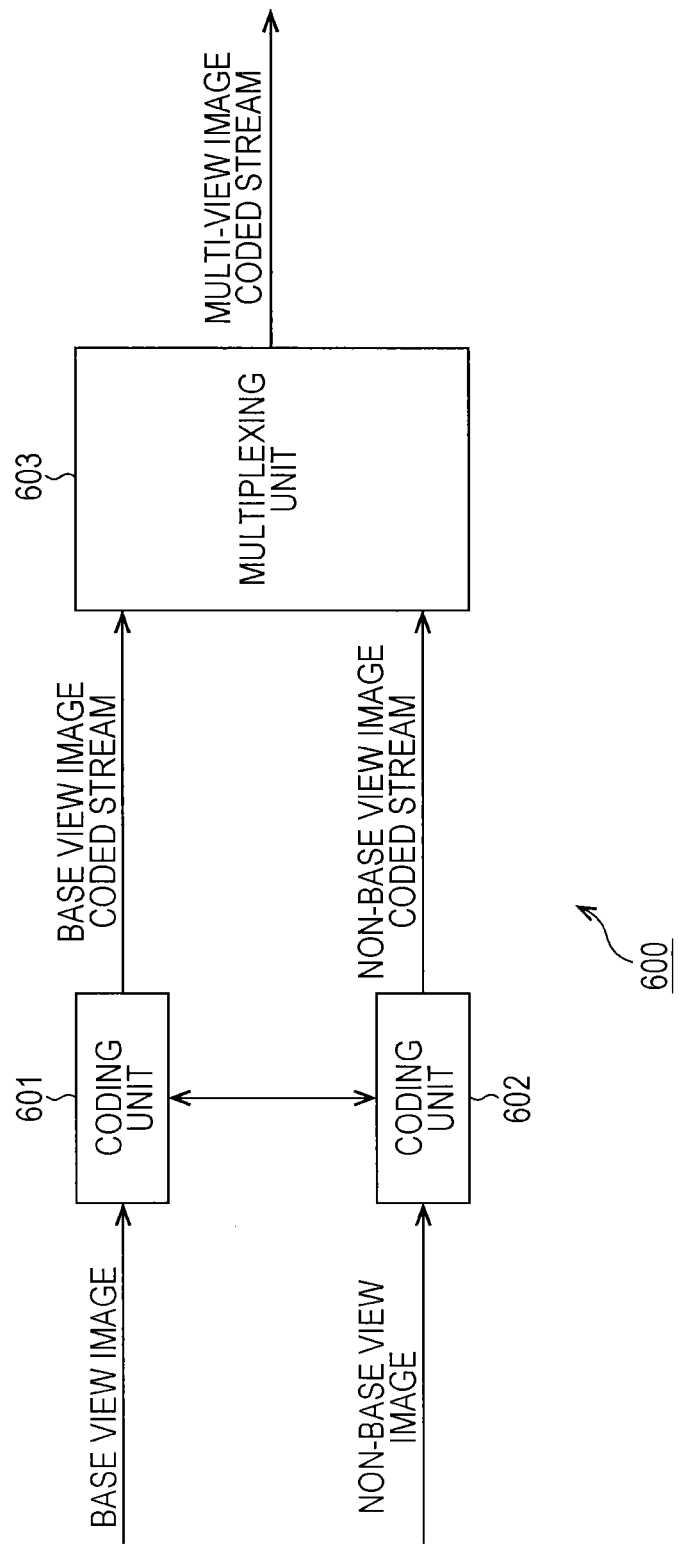
FIG. 54 is a diagram that illustrates an example of the main configuration of a multiple viewpoint image coding apparatus to which the present technology is applied.

FIG. 54 is a diagram that illustrates a multiple viewpoint image coding apparatus performing the multiple viewpoint image coding described above. As illustrated in FIG. 54, the multiple viewpoint image coding apparatus 600 includes: a coding unit 601; a coding unit 602; and a multiplexing unit 603.

The coding unit 601 codes a base view image, thereby generating a base view image coded stream. In addition, the coding unit 602 codes a non-base view image, thereby generating a non-base view image coded stream. The multiplexing unit 603 multiplexes the base view image coded stream generated by the coding unit 601 and the non-base view image coded stream generated by the coding unit 602, thereby generating a multiple viewpoint image coded stream.

By applying the present technology to the multiple viewpoint image coding apparatus 600, similar to the application to the hierarchical coding process described above with reference to FIGS. 1 to 52, advantages similar to those described above with reference to FIGS. 1 to 52 can be acquired.

<Multiple Viewpoint Decoding Apparatus>

Figure 55:
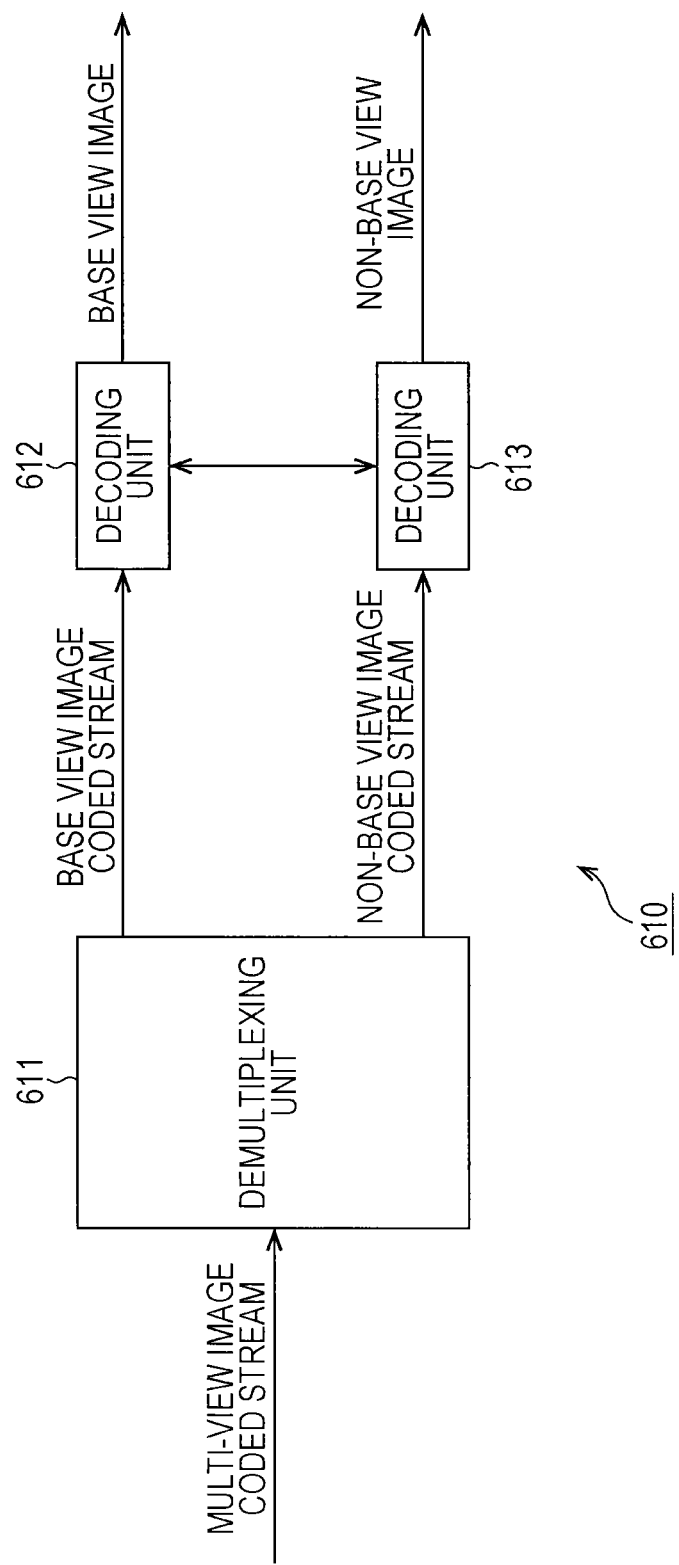
FIG. 55 is a diagram that illustrates an example of the main configuration of a multiple viewpoint image decoding apparatus to which the present technology is applied.

FIG. 55 is a diagram that illustrates a multiple viewpoint image decoding apparatus performing the multiple viewpoint decoding described above. As illustrated in FIG. 55, the multiple viewpoint image decoding apparatus 610 includes: a demultiplexing unit 611; a decoding unit 612; and a decoding unit 613.

The demultiplexing unit 611 demultiplexes a multiple viewpoint image coded stream acquired by multiplexing the base view image coded stream and the non-base view image coded stream, thereby extracting the base view image coded stream and the non-base view image coded stream. The decoding unit 612 decodes the base view image coded stream extracted by the demultiplexing unit 611, thereby acquiring a base view image. The decoding unit 613 decodes the non-base view image coded stream extracted by the demultiplexing unit 611, thereby acquiring a non-base view image.

By applying the present technology to the multiple viewpoint image decoding apparatus 610, similar to the application to the hierarchical decoding process described above with reference to FIGS. 1 to 52, advantages similar to those described above with reference to FIGS. 1 to 52 can be acquired.

5. Fifth Embodiment

<Computer>

A series of the processes described above can be executed either by hardware or by software. In a case where the series of the processes is executed by software, a program configuring the software is installed to a computer. Here, the computer includes a computer that is built in dedicated hardware, a computer such as a general-purpose personal computer that can execute various functions by installing various programs thereto, and the like.

Figure 56:
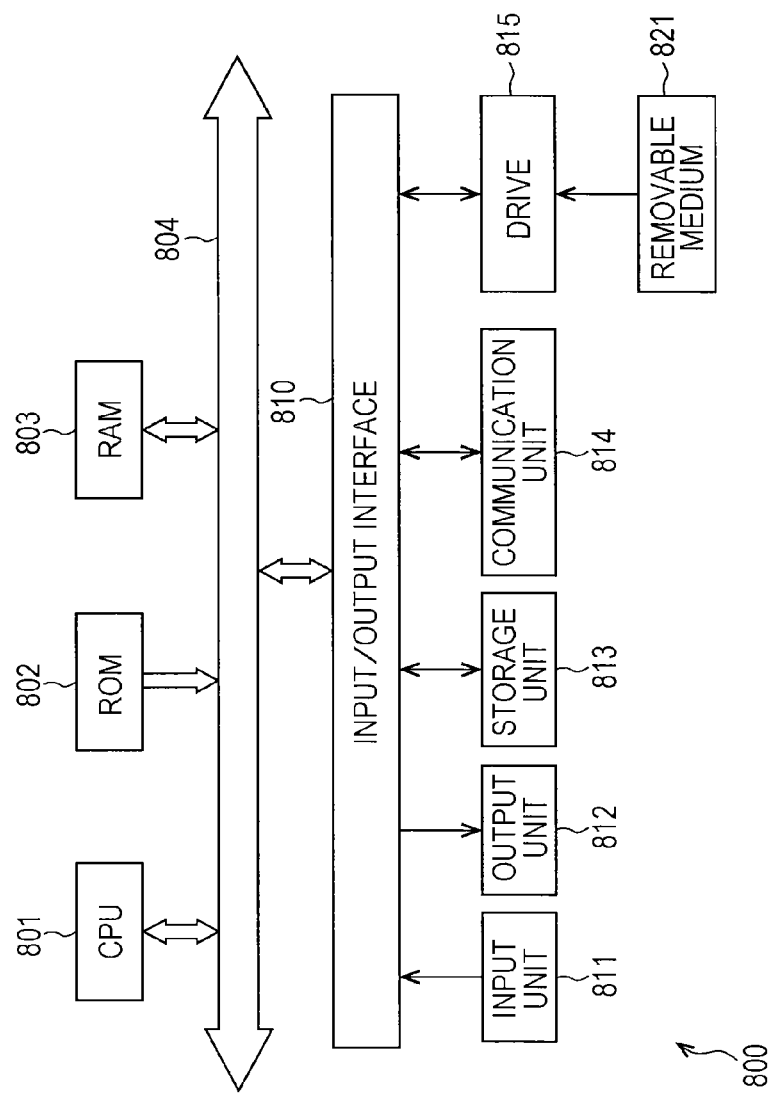
FIG. 56 is a block diagram that illustrates an example of the main configuration of a computer.

FIG. 56 is a block diagram that illustrates an example of the hardware configuration of a computer that executes the series of processes described above according to a program.

In the computer 800 illustrated in FIG. 56, a Central Processing Unit (CPU) 801, a Read Only Memory (ROM) 802, and a Random Access Memory (RAM) 803 are interconnected through a bus 804.

In addition, an input/output interface 810 is connected to the bus 804. An input unit 811, an output unit 812, a storage unit 813, a communication unit 814, and a drive 815 are connected to the input/output interface 810.

The input unit 811, for example, is configured by a keyboard, a mouse, a microphone, a touch panel, an input terminal, and the like. The output unit 812, for example, is configured by a display, a speaker, an output terminal, and the like. The storage unit 813, for example, is configured by a hard disk, a RAM disk, a non-volatile memory, and the like. The communication unit 814, for example, is configured by a network interface. The drive 815 drives a magnetic disk, an optical disc, a magneto-optical disk, or a removable medium 821 such as a semiconductor memory.

In the computer configured as above, the CPU 801, for example, loads a program stored in the storage unit 813 into the RAM 803 through the input/output interface 810 and the bus 804 and executes the loaded program, thereby executing the series of the processes described above. In addition, data required for the CPU 801 to execute various processes and the like are appropriately stored in the RAM 803.

The program executed by the computer (CPU 801), for example, may be used with being recorded on a removable medium 821 as a package medium or the like. In such a case, by loading the removable medium 821 into the drive 815, the program can be installed to the storage unit 813 through the input/output interface 810.

In addition, the program can be provided through a wired or wireless transmission medium such as a local area network, the Internet, or digital satellite broadcast. In such a case, the program may be received by the communication unit 814 and be installed to the storage unit 813.

Furthermore, the program can be installed to the ROM 802 or the storage unit 813 in advance.

In addition, the program executed by the computer may be a computer that executes the processes in a time series along the sequence described in this specification or a program that executes the processes in a parallel manner or at necessary timing such as at the timing of being called.

Furthermore, in this specification, a step describing the program recorded on a recording medium includes not only a process performed in a time series along the described sequence but also a process that is executed in a parallel manner or an individual manner without being necessarily processed in a time series.

In addition, in this specification, a system represents a set of a plurality of constituent elements (a device, a module (component), and the like), and all the constituent elements do not need to be disposed in a same casing. Thus, a plurality of apparatuses that are housed in separate casings and are connected through a network and one apparatus in which a plurality of modules is housed in one casing are systems.

Furthermore, a configuration described above as one device (or one processing unit) may be divided so as to be configured as a plurality of devices (or processing units). To the contrary, a configuration described above as a plurality of devices (or processing units) may be arranged to be configured as one device (or one processing unit). In addition, a configuration that has not been described above may be added to the configuration of each device (or each processing unit). As long as the overall configuration and the overall operation of the system are substantially the same, a part of the configuration of a specific device (or a specific processing unit) may be configured to be included in a configuration of another device (or another processing unit).

While preferred embodiments of the present disclosure have been described in detail with reference to the accompanying drawings, the technical scope of the present disclosure is not limited to such examples. It is apparent that a person having ordinary knowledge in the technical field of the present disclosure can devise various changes or modifications within the scope of the technical idea described in the claims, and, naturally, it is understood that such changes and modifications belong to the technical scope of the present disclosure.

For example, the present technology may take a configuration of cloud computing in which one function is divided and processed cooperatively by a plurality of apparatuses through a network.

In addition, each step described in each flowchart described above may be either executed by one apparatus or executed by a plurality of apparatuses in a shared manner.

Furthermore, in a case where a plurality of processes is included in one step, the plurality of processes included in the one step may be either executed by one apparatus or executed by a plurality of apparatuses in a shared manner.

The image coding apparatus and the image decoding apparatus according to the embodiments described above can be applied to various electronic apparatuses such as a transmitter or a receiver for wired broadcasting such as satellite broadcasting or cable TV, transmission on the Internet, transmission to a terminal through cellular communication, or the like, a recording apparatus that records an image on a medium such as an optical disc, a magnetic disk, or a flash memory, or a reproduction apparatus that reproduces an image from the storage medium. Hereinafter, four application examples will be described.

6. Sixth Embodiment

First Application Example

Television Receiver

Figure 57:
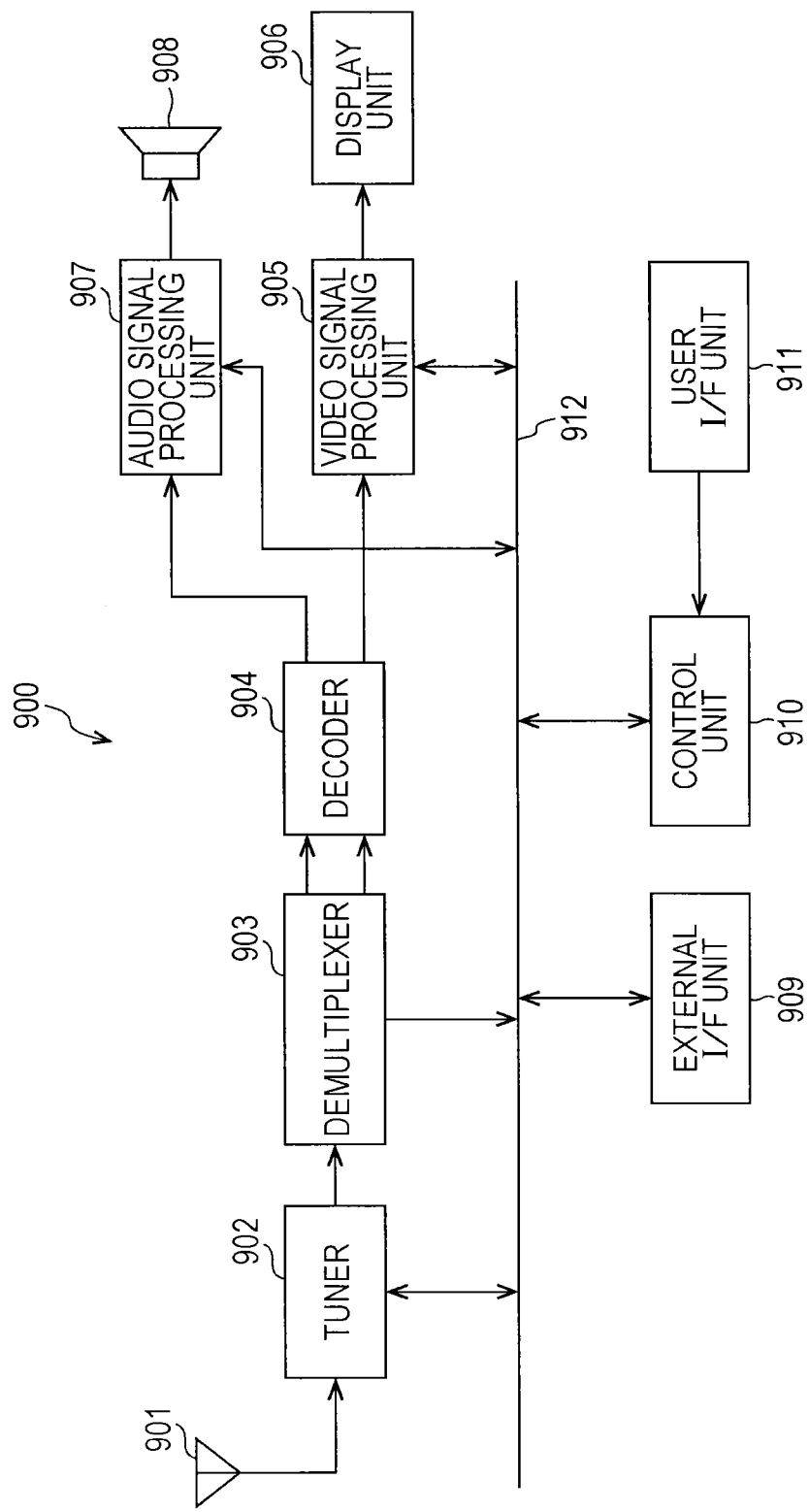
FIG. 57 is block diagram that illustrates an example of the schematic configuration of a television apparatus.

FIG. 57 illustrates an example of the schematic configuration of a television apparatus to which the above-described embodiment is applied. The television apparatus 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a signal of a desired channel from a broadcast signal received through the antenna 901 and demodulates the extracted signal. Then, the tuner 902 outputs a coded bit stream acquired through demodulation to the demultiplexer 903. In other words, the tuner 902 serves as a transmission unit of the television apparatus 900 that receives a coded stream in which an image is coded.

The demultiplexer 903 separates a video stream and an audio stream of a program to be watched from the coded bit stream and outputs each separated stream to the decoder 904. In addition, the demultiplexer 903 extracts auxiliary data such as Electronic Program Guide (EPG) from the coded bit stream and supplies the extracted data to the control unit 910. Furthermore, the demultiplexer 903 may perform descrambling in a case where the coded bit stream is scrambled.

The decoder 904 decodes the video stream and the audio stream input from the demultiplexer 903. Then, the decoder 904 outputs video data generated by a decoding process to the video signal processing unit 905. In addition, the decoder 904 outputs audio data generated by the decoding process to the audio signal processing unit 907.

The video signal processing unit 905 reproduces the video data input from the decoder 909 and causes the display unit 906 to display video. The video signal processing unit 905 may also cause the display unit 906 to display an application screen supplied through the network. In addition, the video signal processing unit 905 may perform an additional process such as noise removal for the video data according to a setting. Furthermore, the video signal processing unit 905 may generate a Graphical User Interface (GUI) image such as a menu, a button, and a cursor and superimpose the generated image on an output image.

The display unit 906 is driven according to a drive signal supplied from the video signal processing unit 905 so as to display a video or image on a video screen of a display device (for example, a liquid crystal display, a plasma display, an OELD (Organic ElectroLuminescence Display (organic EL display), or the like).

The audio signal processing unit 907 performs a reproducing process such as D/A conversion and amplification for the audio data input from the decoder 904 and causes the speaker 908 to output the audio. In addition, the audio signal processing unit 907 may perform an additional process such as noise removal for the audio data.

The external interface unit 909 is an interface for connecting the television apparatus 900 to an external device or the network. For example, a video stream or an audio stream received through the external interface unit 909 may be decoded by the decoder 904. In other words, the external interface unit 909 also serves as a transmission unit of the television apparatus 900 that receives a coded stream in which an image is coded.

The control unit 910 includes a processor such as a CPU and a memory such as a RAM or a ROM. The memory stores a program executed by the CPU, program data, EPG data, data acquired through the network, and the like. The program stored in the memory, for example, is read by the CPU on activation of the television apparatus 900 and is executed. The CPU controls the operation of the television apparatus 900, for example, according to an operation signal input from the user interface unit 911 by executing the program.

The user interface unit 911 is connected to the control unit 910. The user interface unit 911, for example, includes a button and a switch for a user to operate the television apparatus 900, a reception unit for a remote control signal, and the like. The user interface unit 911 detects a user's operation through such components, generates an operation signal, and outputs the generated operation signal to the control unit 910.

The bus 912 connects the tuner 902, the demultiplexer 903, the decoder 904, the video signal processing unit 905, the audio signal processing unit 907, the external interface unit 909, and the control unit 910 to each other.

In the television apparatus 900 configured in this way, the decoder 904 has the function of the image decoding apparatus 200 according to the above-described embodiment. Accordingly, a decrease in the coding efficiency can be suppressed.

Second Application Example

Mobile Phone

Figure 58:
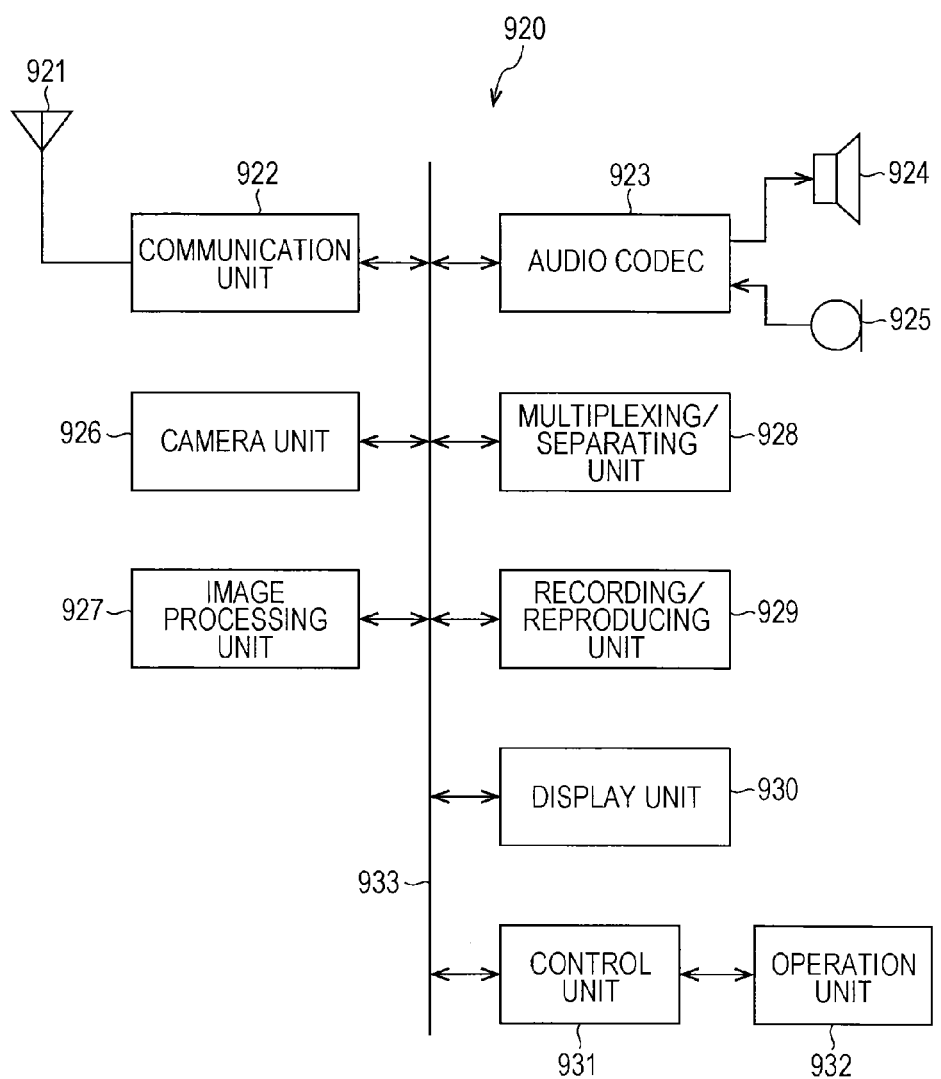
FIG. 58 is a block diagram that illustrates an example of the schematic configuration of a mobile phone.

FIG. 58 illustrates an example of the schematic configuration of a mobile phone to which the above-described embodiment is applied. The mobile phone 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the multiplexing/separating unit 928, the recording/reproducing unit 929, the display unit 930, and the control unit 931 to each other.

The mobile phone 920 performs operation such as transmission/reception of an audio signal, transmission/reception of an e-mail or image data, image capturing, and recording of data in various operation modes including a voice call mode, a data communication mode, an imaging mode, and a television-phone mode.

In the voice call mode, an analog audio signal generated by the microphone 925 is supplied to the audio codec 923. The audio codec 923 converts the analog audio signal into audio data, performs A/D conversion of the converted audio data, and compresses the audio data. Then, the audio codec 923 outputs the compressed audio data to the communication unit 922. The communication unit 922 codes and modulates the audio data to generate a transmission signal. Then, the communication unit 922 transmits the generated transmission signal to a base station (not illustrated) through the antenna 921. In addition, the communication unit 922 amplifies a wireless signal received through the antenna 921 and performs frequency conversion of the wireless signal, thereby acquiring a reception signal. Then, the communication unit 922 generates audio data by demodulating and decoding the reception signal and outputs the generated audio data to the audio codec 923. The audio codec 923 performs decompression and D/A conversion of the audio data, thereby generating an analog audio signal. Then, the audio codec 923 supplies the generated audio signal to the speaker 924 to causes audio to be outputted.

In the data communication mode, for example, the control unit 931 generates character data configuring an e-mail according to a user's operation performed through the operation unit 932. In addition, the control unit 931 causes the display unit 930 to display characters. The control unit 931 generates e-mail data according to a transmission instruction from the user through the operation unit 932 and outputs the generated e-mail data to the communication unit 922. The communication unit 922 codes and modulates the e-mail data, thereby generating a transmission signal. Then, the communication unit 922 transmits the generated transmission signal to a base station (not illustrated) through the antenna 921. In addition, the communication unit 922 performs amplification and frequency conversion of the wireless signal received through the antenna 921, thereby acquiring a reception signal. Then, the communication unit 922 demodulates and decodes the reception signal to restore the e-mail data and outputs the restored e-mail data to the control unit 931. The control unit 931 causes the display unit 930 to display a content of the e-mail data and supplies the e-mail data to the recording/reproducing unit 929 to cause the e-mail data to be written onto a recording medium thereof.

The recording/reproducing unit 929 includes an arbitrary readable and writable storage medium. For example, the storage medium may be a built-in storage medium such as a RAM and a flash memory or may be an external mounting-type storage medium such as a hard disk, a magnetic disk, a magneto-optical disc, an optical disc, a Universal Serial Bus (USB) memory, or a memory card.

In the imaging mode, for example, the camera unit 926 images an object to generate image data and outputs the generated image data to the image processing unit 927. The image processing unit 927 codes the image data input from the camera unit 926 and supplies a coded stream to the recording/reproducing unit 929 to cause the coded stream to be written onto a recording medium thereof.

In an image display mode, the recording/reproducing unit 929 reads a coded stream recorded on the recording medium and outputs the read coded stream to the image processing unit 927. The image processing unit 927 decodes the coded stream input from the recording/reproducing unit 929 and supplies image data to the display unit 930 so as to cause an image thereof to be displayed.

In addition, in the television-phone mode, for example, the multiplexing/separating unit 928 multiplexes the video stream coded by the image processing unit 927 and the audio stream input from the audio codec 923 and outputs a resultant multiplexed stream to the communication unit 922. The communication unit 922 codes and modulates the stream, thereby generating a transmission signal. Then, the communication unit 922 transmits the generated transmission signal to a base station (not illustrated) through the antenna 921. In addition, the communication unit 922 performs amplification and frequency conversion of a wireless signal received through the antenna 921, thereby acquiring a reception signal. The transmission signal and the reception signal are acquired with the coded bit stream being included therein. Then, the communication unit 922 restores the stream by demodulating and decoding the reception signal and outputs the restored stream to the multiplexing/separating unit 928. The multiplexing/separating unit 928 separates a video stream and an audio stream from the input stream and outputs the video stream and the audio stream respectively to the image processing unit 927 and the audio codec 923. The image processing unit 927 decodes the video stream to generate video data. The video data is supplied to the display unit 930, and a series of images is displayed by the display unit 930. The audio codec 923 performs decompression and D/A conversion of the audio stream, thereby generating an analog audio signal. Then, the audio codec 923 supplies the generated audio signal to the speaker 924 to cause an audio to be outputted.

In the mobile phone 920 configured in this way, the image processing unit 927 has the functions of the image coding apparatus 100 and the image decoding apparatus 200 according to the above-described embodiments. Accordingly, a decrease in the coding efficiency can be suppressed.

Third Application Example

Recording and Reproducing Apparatus

Figure 59:
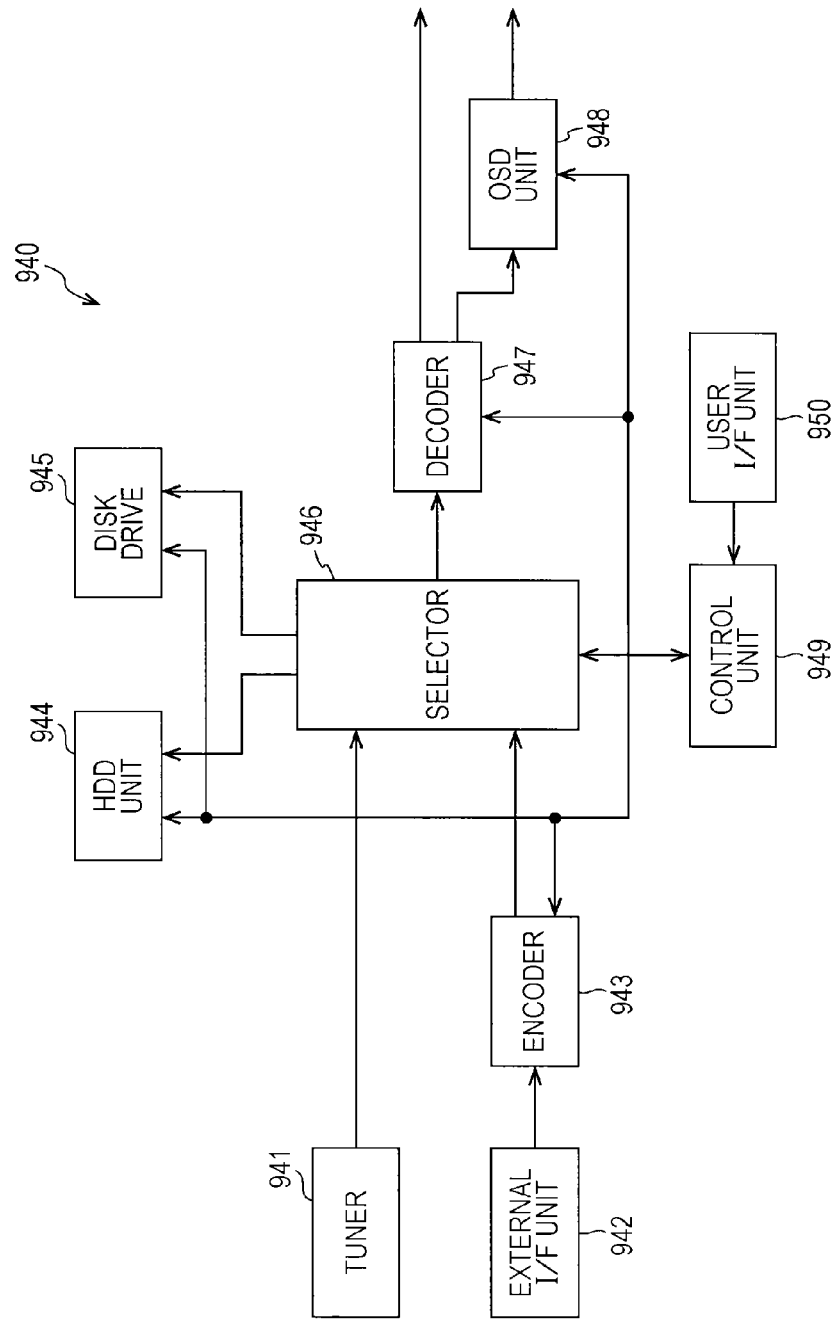
FIG. 59 is a block diagram that illustrates an example of the schematic configuration of a recording/reproducing apparatus.

FIG. 59 is a block diagram that illustrates an example of the schematic configuration of a recording/reproducing apparatus to which the above-described embodiment is applied. The recording/reproducing apparatus 940, for example, codes audio data and video data of a received broadcast program and records the coded data on a recording medium. In addition, the recording/reproducing apparatus 940, for example, may code audio data and video data acquired from another apparatus and record the coded data on a recording medium. Furthermore, the recording/reproducing apparatus 940, for example, reproduces the data recorded on the recording medium using the monitor and the speaker according to a user's instruction. At that time, the recording/reproducing apparatus 940 decodes the audio data and the video data.

The recording/reproducing apparatus 940 includes a tuner 941, an external interface (I/F) unit 942, an encoder 943, a Hard Disk Drive (HDD) 944, a disk drive 945, a selector 946, a decoder 947, an On-Screen Display (OSD) 948, a control unit 949, and a user interface (I/F) unit 950.

The tuner 941 extracts a signal of a desired channel from a broadcast signal received through an antenna (not illustrated) and demodulates the extracted signal. Then, the tuner 941 outputs a coded bit stream acquired by the demodulation process to the selector 946. In other words, the tuner 941 serves as a transmission unit of the recording/reproducing apparatus 940.

The external interface unit 942 is an interface used for connecting the recording/reproducing apparatus 940 and an external device or the network. The external interface unit 942, for example, may be an Institute of Electrical and Electronic Engineers (IEEE) 1394 interface, a network interface, a USB interface, a flash memory interface or the like. For example, the video data and the audio data received through the external interface unit 942 are input to the encoder 943. In other words, the external interface unit 942 serves as the transmission unit of the recording/reproducing apparatus 940.

In a case where the video data and the audio data input from the external interface unit 942 are not coded, the encoder 943 codes the video data and the audio data when the video data and the audio data input from the external interface unit 942. Then, the encoder 943 outputs a coded bit stream to the selector 946.

The HDD 944 records the coded bit stream in which contents data such as a video and am audio is compressed, various programs, and other data in an internal hard disk. When a video and an audio are reproduced, the HDD 944 reads the data from the hard disk.

The disk drive 945 records and reads data on/from a loaded recording medium. The recording medium loaded into the disk drive 945, for example, may be a Digital Versatile Disc (DVD) disc (a DVD-Video, a DVD-RAM (DVD-Random Access Memory), a DVD-Recordable (DVD-R), a DVD-Rewritable (DVD-RW), DVD+Recordable (DVD+R) a DVD+Rewritable (DVD+RW) or the like), a Blu-ray (registered trademark) disc, or the like.

When a video and an audio are recorded, the selector 946 selects a coded bit stream input from the tuner 941 or the encoder 943 and outputs the selected coded bit stream to the HDD 944 or the disk drive 945. In addition, when the video and the audio are reproduced, the selector 946 outputs the coded bit stream input from the HDD 944 or the disk drive 945 to the decoder 947.

The decoder 947 decodes the coded bit stream to generate video data and audio data. Then, the decoder 947 outputs the generated video data to the OSD 948. In addition, the decoder 947 outputs the generated audio data to an external speaker.

The OSD 948 reproduces the video data input from the decoder 947, thereby displaying the video. The OSD 948 may superimpose an image of a GUI such as a menu, a button, a cursor, on the displayed video.

The control unit 949 includes a processor such as a CPU and a memory such as a RAM or a ROM. The memory stores a program executed by the CPU, program data, and the like. The program stored in the memory, for example, is read and executed by the CPU on activation of the recording/reproducing apparatus 940. The CPU controls the operation of the recording/reproducing apparatus 940, for example, according to an operation signal input from the user interface unit 950 by executing the program.

The user interface unit 950 is connected to the control unit 949. The user interface unit 950, for example, includes a button and a switch for the user to operate the recording/reproducing apparatus 940 and a reception unit for a remote control signal. The user interface unit 950 detects a user's operation through the constituent elements to generate an operation signal and outputs the generated operation signal to the control unit 949.

In the recording/reproducing apparatus 940 configured in this way, the encoder 943 has the function of the image coding apparatus 100 according to the above-described embodiment. In addition, the decoder 947 has the function of the image decoding apparatus 200 according to the above-described embodiment. Accordingly, a decrease in the coding efficiency can be suppressed.

Fourth Application Example

Imaging Apparatus

Figure 60:
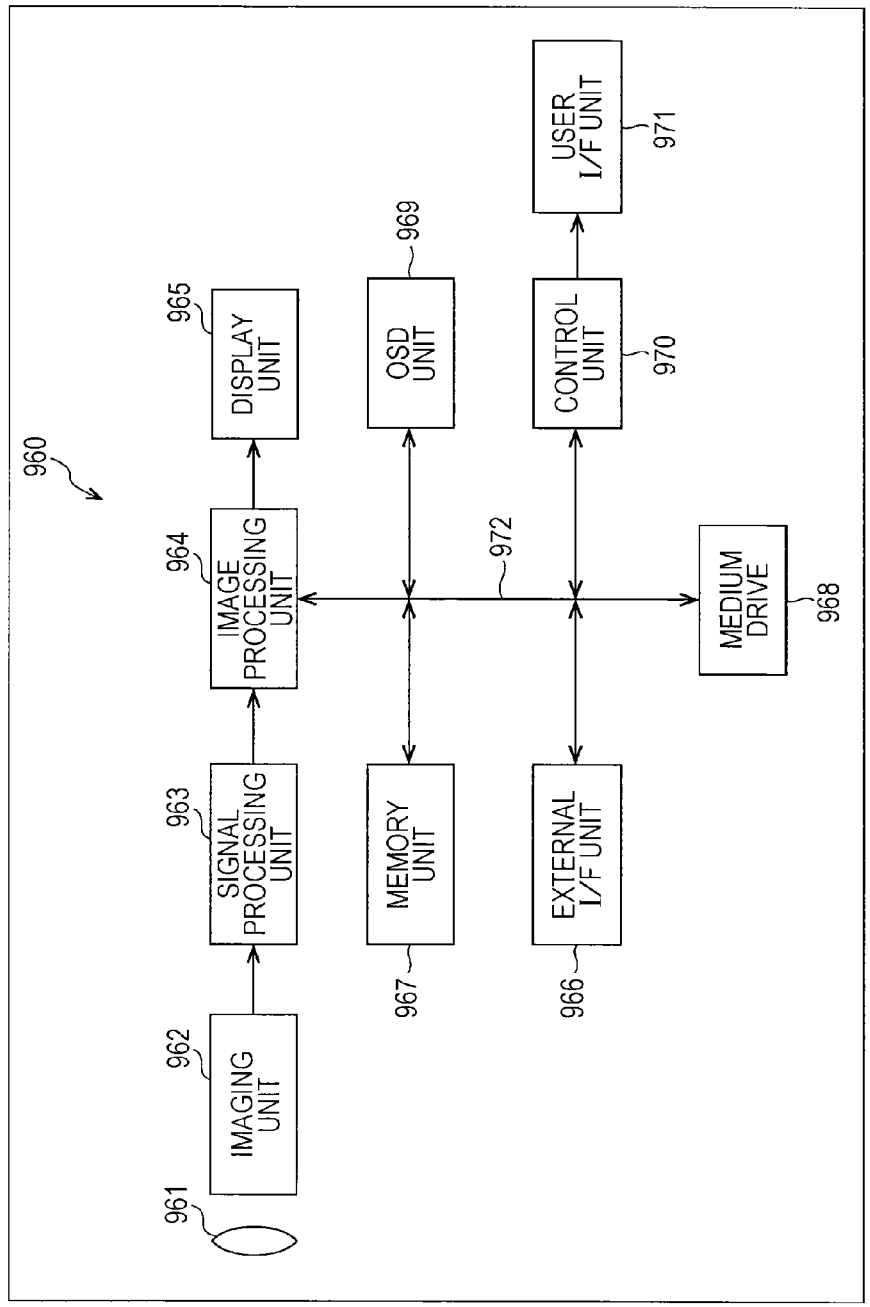
FIG. 60 is a block diagram that illustrates an example of the schematic configuration of an imaging apparatus.

FIG. 60 illustrates an example of the schematic configuration of an imaging apparatus to which the above-described embodiment is applied. The imaging apparatus 960 images an object to generate an image, codes the image data, and records the coded image data on a recording medium.

The imaging apparatus 960 includes an optical block 961, an imaging unit 962, a signal processing unit 963, an image processing unit 964, a display unit 965, an external interface (I/F) unit 966, a memory unit 967, a medium drive 968, an OSD 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 connects the image processing unit 964, the external interface unit 966, the memory unit 967, the medium drive 968, the OSD 969, and the control unit 970 to each other.

The optical block 961 includes a focus lens, a diaphragm mechanism, and the like. The optical block 961 forms an optical image of the object on an imaging surface of the imaging unit 962. The imaging unit 962 includes an image sensor such as a Charge Coupled Device (CCD) and a Complementary Metal Oxide Semiconductor (CMOS) and converts the optical image formed on the imaging surface into an image signal as an electric signal through photoelectric conversion. Then, the imaging unit 962 outputs the image signal to the signal processing unit 963.

The signal processing unit 963 performs various camera signal processes such as a knee correction, a gamma correction, a color correction, and the like for the image signal input from the imaging unit 962. The signal processing unit 963 outputs the image data after the camera signal processes to the image processing unit 964.

The image processing unit 964 codes the image data input from the signal processing unit 963 to generate coded data. Then, the image processing unit 964 outputs the generated coded data to the external interface unit 966 or the medium drive 968. In addition, the image processing unit 964 decodes the coded data input from the external interface unit 966 or the medium drive 968 to generate image data. Then, the image processing unit 964 outputs the generated image data to the display unit 965. In addition, the image processing unit 964 may output the image data input from the signal processing unit 963 to the display unit 965 to display the image. Furthermore, the image processing unit 964 may superimpose data for display that is acquired from the OSD 969 on the image output to the display unit 965.

The OSD 969, for example, generates an image of a GUI such as a menu, a button, a cursor, or the like and outputs the generated image to the image processing unit 964.

The external interface unit 966, for example, is configured as an USB input/output terminal. The external interface unit 966, for example, connects the imaging apparatus 960 and a printer when an image is printed. In addition, a drive is connected to the external interface unit 966 as is necessary. A removable medium such as a magnetic disk or an optical disc is loaded into the drive, and a program read from the removable medium may be installed to the imaging apparatus 960. Furthermore, the external interface unit 966 may be configured as a network interface that is connected to a network such as a LAN, the Internet, or the like. In other words, the external interface unit 966 serves as a transmission unit of the imaging apparatus 960.

The recording medium loaded into the medium drive 968, for example, may be an arbitrary readable/writable removable medium such as a magnetic disk, a magneto-optical disk, an optical disc, or a semiconductor memory. In addition, it may be configured such that a recording medium is fixedly mounted to the medium drive 968 to configure a non-portable storage unit such as a built-in hard disk drive or a Solid State Drive (SSD).

The control unit 970 includes a processor such as a CPU and a memory such as a RAM or a ROM. The memory stores a program executed by the CPU, program data, and the like. The program stored in the memory is read by the CPU, for example, on activation of the imaging apparatus 960 and is executed. The CPU controls the operation of the imaging apparatus 960, for example, according to an operation signal input from the user interface unit 971 by executing the program.

The user interface unit 971 is connected to the control unit 970. The user interface unit 971, for example includes a button, a switch, and the like for a user to operate the imaging apparatus 960. The user interface unit 971 detects a user's operation through the constituent elements to generate an operation signal and outputs the generated operation signal to the control unit 970.

In the imaging apparatus 960 configured in this way, the image processing unit 964 has the functions of the image coding apparatus 100 and the image decoding apparatus 200 according to the above-described embodiments. Accordingly, a decrease in the coding efficiency can be suppressed.

7. Seventh Embodiment

Application Example of Scalable Coding

First System

Next, a specific use example of scalable coded data that is scalably coded (hierarchically (image) coded) will be described. The scalable coding, for example, similar to an example illustrated in FIG. 61, is used for selecting data to be transmitted.

Figure 61:
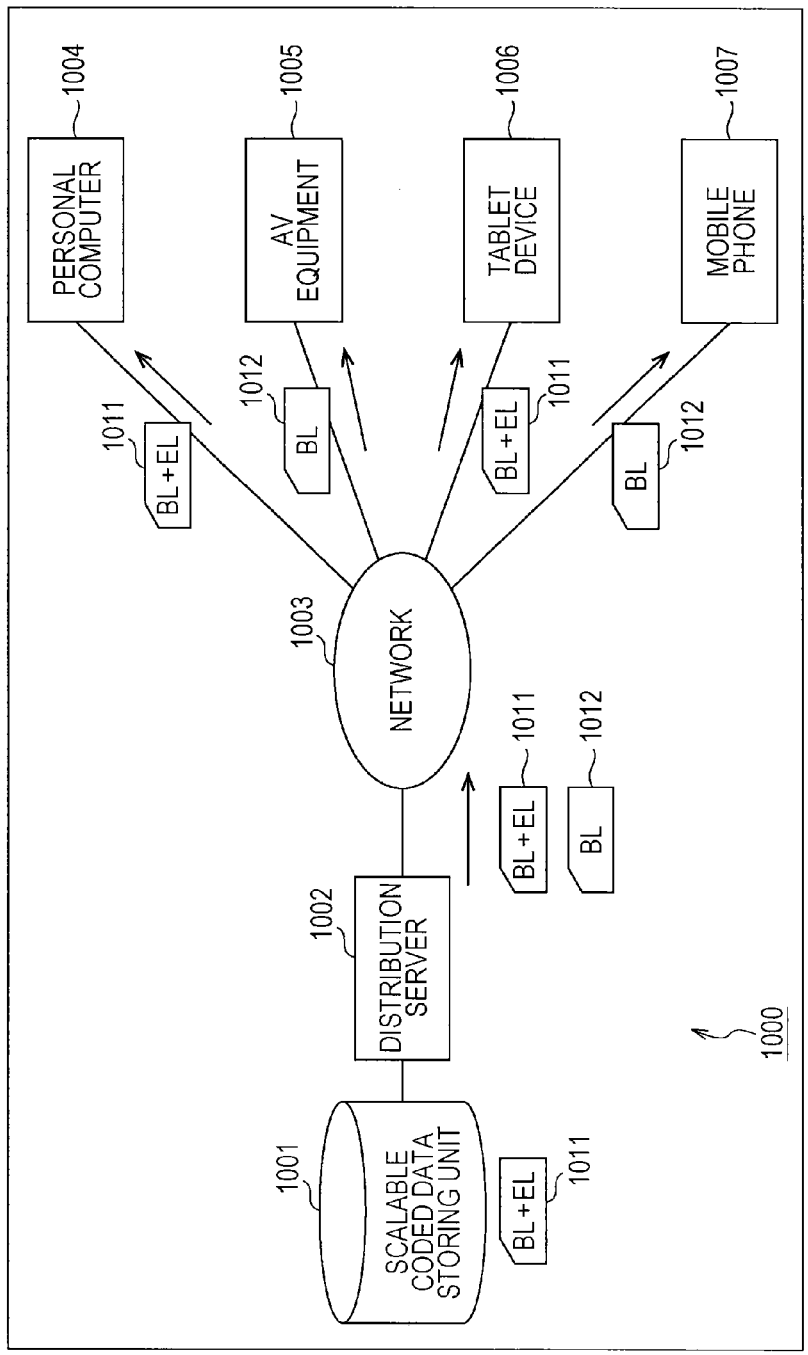
FIG. 61 is a block diagram that illustrates an example of the use of scalable coding.

In a data transmission system 1000 illustrated in FIG. 61, a distribution server 1002 reads scalable coded data stored in a scalable coded data storing unit 1001 and distributes the read scalable coded data to terminal devices such as a personal computer 1004, AV equipment 1005, a tablet device 1006, and a mobile phone 1007 through a network 1003.

At that time, the distribution server 1002 selects coded data having an appropriate quality based on the capacity of a terminal device, communication environments, and the like. Even when the distribution server 1002 transmits data having an unnecessary high quality, an image having a high quality is not acquired in the terminal device, and there is concern that a delay or an overflow may occur. In addition, there is concern that a communication band is unnecessarily occupied, or the load of the terminal device unnecessarily increases. To the contrary, also when the distribution server 1002 transmits data having an unnecessarily low quality, there is concern that an image having a sufficient image quality cannot be acquired in the terminal device. Accordingly, the distribution server 1002 reads the scalable coded data stored in the scalable coded data storing unit 1001 as coded data having an appropriate quality for the capacity of the terminal device, the communication environments, and the like and transmits the read scalable coded data.

For example, the scalable coded data storing unit 1001 is assumed to store scalable coded data (BL+EL) 1011 that is scalably coded. This scalable coded data (BL+EL) 1011 is coded data including both the base layer and the enhancement layer, and, by decoding the scalable coded data, both images of the base layer and the enhancement layer can be acquired.

The distribution server 1002 selects an appropriate layer according to the capacity of the terminal device that transmits data, communication environments, and the like and reads data of the selected layer. For example, the distribution server 1002 reads the scalable coded data (BL+EL) 1011 having a high quality from the scalable coded data storing unit 1001 and transmits the read scalable data as it is to the personal computer 1004 or the tablet device 1006 having a high processing capability. In contrast to this, the distribution server 1002 extracts data of the base layer from the scalable coded data (BL+EL) 1011 and transmits the extracted data, for example, to the AV equipment 1005 and the mobile phone 1007 as scalable coded data (BL) 1012, which is data of the same content as that of the scalable coded data (BL+EL) 1011, having a quality lower than the scalable coded data (BL+EL) 1011.

In this way, by using the scalable coded data, the amount of data can be easily adjusted. Accordingly, the occurrence of a delay or an overflow or an unnecessary increase in the load of the terminal device or the communication medium can be suppressed. In addition, since the scalable coded data (BL+EL) 1011 has low redundancy between layers, the amount of data can be smaller than that of a case where coded data of each layer is configured as individual data. Accordingly, the storage area of the scalable coded data storing unit 1001 can be used more efficiently.

As the terminal device, various devices such as the personal computer 1004 and the mobile phone 1007 can be applied, and the hardware performance of the terminal device is different depending on the applied device. In addition, there are various applications executed by the terminal device, and there are various software capabilities thereof. In addition, as the network 1003 that is a communication medium, all kinds of communication networks including a wired network, a wireless network, and both kinds of networks such as the Internet and a Local Area Network (LAN) can be applied, and thus, the data transmission capability varies. Furthermore, there is concern that the data transmission capability changes according to the other communications and the like.

Thus, before data transmission is started, the distribution server 1002 may communicate with a terminal device that is a transmission destination of data so as to acquire information relating to the capability of the terminal device such as the hardware performance of the terminal device and the performance of an application (software) executed by the terminal device and information relating to the communication environments such as a usable bandwidth of the network 1003. In addition, the distribution server 1002 may be configured to select an appropriate layer based on the information acquired as above.

Furthermore, the extraction of a layer may be performed by the terminal device. For example, the personal computer 1004 may decode the transmitted scalable coded data (BL+EL) 1011 and display an image of the base layer or display an image of the enhancement layer. In addition, the personal computer 1004 may extract the scalable coded data (BL) 1012 of the base layer from the transmitted scalable coded data (BL+EL) 1011, store the extracted scalable coded data or transmit the extracted scalable coded data to another device, decode the extracted scalable coded data, and display the image of the base layer.

It is apparent that all the numbers of the scalable coded data storing units 1001, the distribution servers 1002, the networks 1003, and the terminal devices are arbitrary. In addition, while an example has been described in which the distribution server 1002 transmits data to the terminal device, the use example is not limited thereto. An arbitrary system that selects and transmits an appropriate layer according to the capability of the terminal device, the communication environments, and the like at the time of transmitting the coded data that is scalably coded to the terminal device may be applied as the data transmission system 1000.

Also in the data transmission system 1000 as illustrated in FIG. 61, by applying the present technology, similar to the application to the hierarchical coding/hierarchical decoding described above with reference to FIGS. 1 to 52, advantages similar to the above-described advantages described with reference to FIGS. 1 to 52 can be acquired.

Application Example of Scalable Coding

Second System

Figure 62:
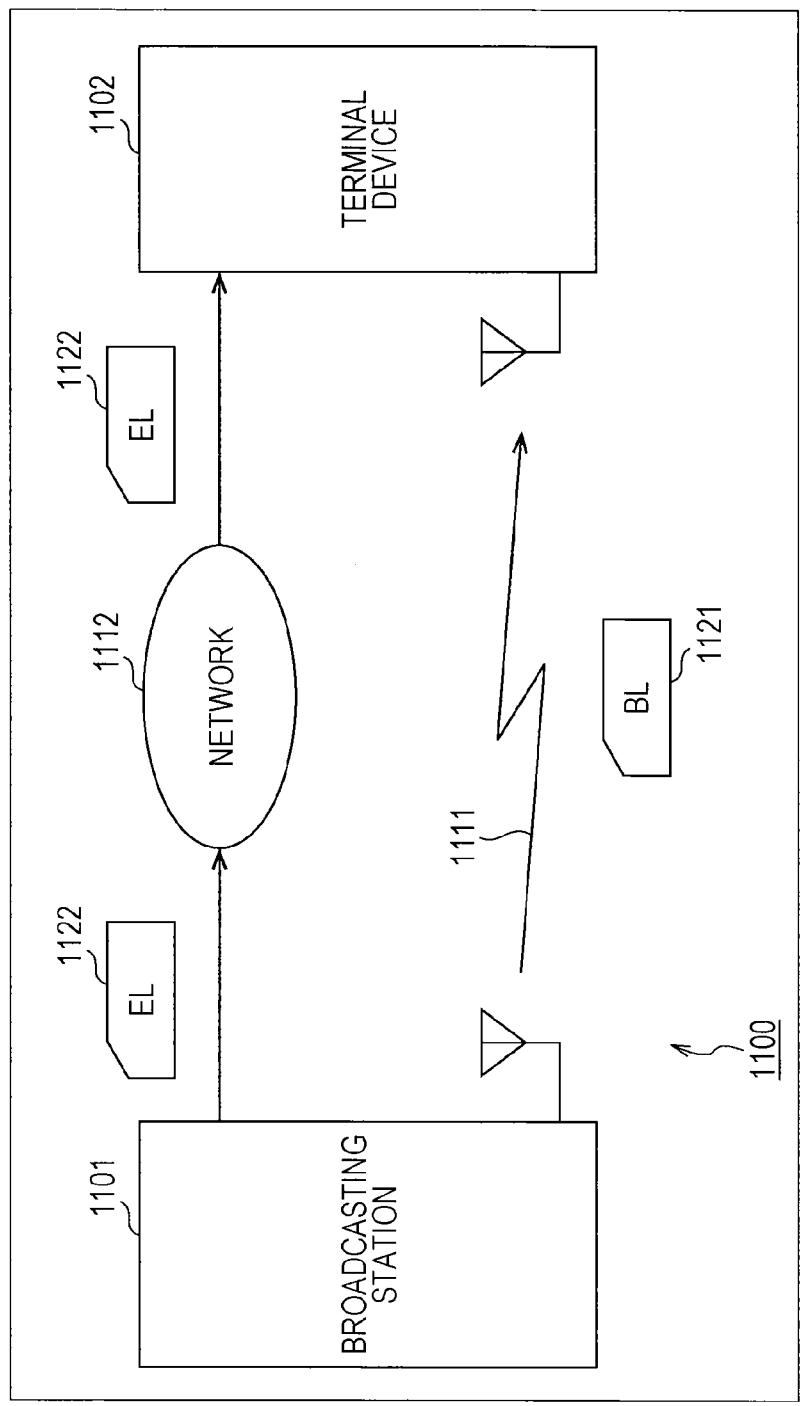
FIG. 62 is a block diagram that illustrates another example of the use of the scalable coding.

In addition, the scalable coding, for example, similar to the example illustrated in FIG. 62, is used for transmission performed through a plurality of communication media.

In the data transmission system 1100 illustrated in FIG. 62, a broadcasting station 1101 transmits the scalable coded data (BL) 1121 of the base layer through terrestrial broadcasting 1111. In addition, the broadcasting station 1101 transmits the scalable coded data (EL) 1122 of the enhancement layer (for example, the data is packetized and is transmitted) through an arbitrary network 1112 that is configured by a wired network, a wireless network, or both kinds of communication networks.

The terminal device 1102 has a reception function of the terrestrial broadcasting 1111 broadcasted by the broadcasting station 1101 and receives the scalable coded data (BL) 1121 of the base layer that is transmitted through the terrestrial broadcasting 1111. In addition, the terminal device 1102 further has a communication function for performing communication through the network 1112 and receives the scalable coded data (EL) 1122 of the enhancement layer that is transmitted through the network 1112.

The terminal device 1102, for example, in accordance with a user instruction or the like, decodes the scalable coded data (BL) 1121 of the base layer that is acquired through the terrestrial broadcasting 1111 and acquires an image of the base layer, stores the image, or transmits the image to another device.

In addition, the terminal device 1102, for example, according to a user instruction or the like, composes the scalable coded data (BL) 1121 of the base layer that is acquired through the terrestrial broadcasting 1111 and the scalable coded data (EL) 1122 of the enhancement layer that is acquired through the network 1112, thereby acquiring scalable coded data (BL+EL), acquiring an image of the enhancement layer by decoding the acquired scalable coded data, storing the acquired scalable coded data, or transmitting the acquired scalable coded data to another device.

As above, the scalable coded data, for example, can be transmitted through a communication medium that is different for each layer. Accordingly, the load can be distributed, whereby the occurrence of a delay or an overflow can be suppressed.

In addition, depending on the situation, the communication medium used for the transmission may be configured to be selectable for each layer. For example, it may be configured such that the scalable coded data (BL) 1121 of the base layer, of which the amount of data is relatively large, is transmitted through a communication medium having a large bandwidth, and the scalable coded data (EL) 1122 of the enhancement layer, of which the amount of data is relatively small, is transmitted through a communication medium having a small bandwidth. In addition, for example, the communication medium through which the scalable coded data (EL) 1122 of the enhancement layer is transmitted may be configured to be switched to the network 1112 or the terrestrial broadcasting 1111 according to the usable bandwidth of the network 1112. It is apparent that this may similarly applies to data of an arbitrary layer.

By performing control in this way, an increase in the load can be further suppressed in the data transmission.

It is apparent that the number of layers is arbitrary, and the number of communication media used for the transmission is arbitrary. In addition, the number of the terminal devices 1102 that are the destinations of data distribution is arbitrary. In the description presented above, while the case of broadcasting from the broadcasting station 1101 has been described as an example, the use example is not limited thereto. As the data transmission system 1100, an arbitrary system that divides coded data, which is scalably coded, into multiple parts in units of layers and transmits the divided coded data through a plurality of communication lines may be applied.

By applying the present technology to such a data transmission system 1100, similar to the application thereof to the hierarchical coding and the hierarchical decoding described above with reference to FIGS. 1 to 52, advantages similar to those described above with reference to FIGS. 1 to 52 can be acquired.

Application Example of Scalable Coding

Third System

Figure 63:
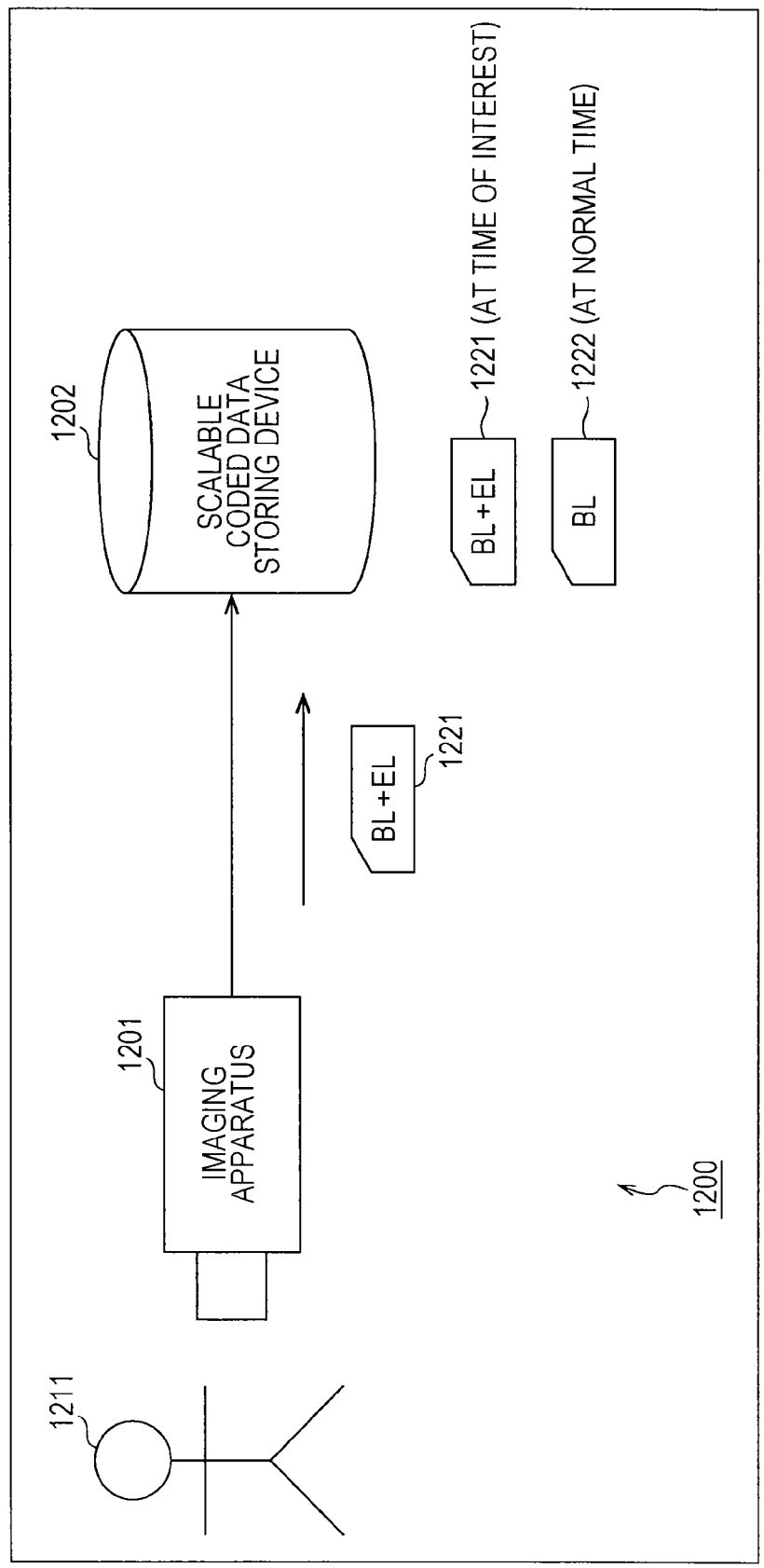
FIG. 63 is a block diagram that illustrates a further another example of the use of the scalable coding.

The scalable coding, for example, similar to the example illustrated in FIG. 63, is used for storing coded data.

In an imaging system 1200 illustrated in FIG. 63, an imaging apparatus 1201 scalably codes image data that is acquired by imaging an object 1211 and supplies acquired data to a scalable coded data storing device 1202 as scalable coded data (BL+EL) 1221.

The scalable coded data storing device 1202 stores the scalably coded data (BL+EL) 1221 supplied from the imaging apparatus 1201 with a quality according to the situation. For example, in the case of a normal time, the scalable coded data storing device 1202 extracts data of a base layer from the scalable coded data (BL+EL) 1221 and stores the extracted data as scalable-coded data (BL) 1222 of the base layer, of which the amount of data is small, having a low quality. In contrast to this, for example, in the case of a time of interest, the scalable coded data storing device 1202 stores data being maintained as the scalable coded data (BL+EL) 1221, of which the amount of data is larger, having a high quality.

By doing as such, the scalable coded data storing device 1202 can store the image with a high image quality only in a necessary case, and accordingly, an increase in the amount of data can be suppressed while a decrease in the value of the image due to degradation of the image quality is suppressed, whereby the use efficiency of the storage area can be improved.

For example, the imaging apparatus 1201 is assumed to be a monitoring camera. In a case where a monitoring target (for example, an intruder) is not shown up in a captured image (in the case of the normal time), there is a high possibility that the content of the captured image is not significant, and thus, a decrease in the amount of data has priority, and the image data (scalable coded data) is stored with a low quality. In contrast to this, in a case where a monitoring target is shown up in the captured image as the object 1211 (in the case of the time of interest), there is a high possibility that the content of the captured image is significant, the image quality has priority, and the image data (scalable coded data) is stored with a high quality.

Here, the normal time or the time of interest may be determined by analyzing the image using the scalable coded data storing device 1202. Alternatively, the imaging apparatus 1201 may be configured to make the determination and transmit a result of the determination to the scalable coded data storing device 1202.

Here, the determination criterion used for determining the normal time or the time of interest is arbitrary, and the content of an image used as the determination criterion is arbitrary. Here, a condition other than the content of the image may be used as the determination criterion. For example, the switching between the normal time and the time of interest may be performed in accordance with the volume, the waveform, and the like of recorded audio, for every predetermined time, or in accordance with an instruction supplied from the external such as a user instruction.

In addition, while an example has been described in which switching is performed between two states of the normal time and the time of interest, the number of states is arbitrary, and, for example, switching among three or more states such as the normal time, the time of low-level interest, the time of interest, and the time of hi-level interest may be configured to be performed. However, the upper limit of the number of states to be switched depends on the number of layers of the scalable coded data.

In addition, the imaging apparatus 1201 may be configured to determine the number of layers of the scalable coding in accordance with the states. For example, in the case of the normal time, the imaging apparatus 1201 may be configured to generate the scalable coded data (BL) 1222 of the base layer, of which the amount of data is small, having a low quality and supply the generated scalable coded data to the scalable coded data storing device 1202. On the other hand, for example, in the case of the time of interest, the imaging apparatus 1201 may be configured to generate the scalable coded data (BL+EL) 1221 of the base layer, of which the amount of data is large, having a high quality and supply the generated scalable coded data to the scalable coded data storing device 1202.

While the monitoring camera has been described as above, the use of the imaging system 1200 is arbitrary and is not limited to the monitoring camera.

Also in the imaging system 1200 as illustrated in FIG. 63, by applying the present technology, similar to the application to the hierarchical coding/hierarchical decoding described above with reference to FIGS. 1 to 52, advantages similar to the above-described advantages described with reference to FIGS. 1 to 52 can be acquired.

In addition, the present technology may be also applied to HTTP streaming such as MPEG or DASH that selects and uses appropriate coded data in units of segments from among a plurality pieces of coded data having mutually-different resolutions and the like that is prepared in advance. In other words, among the plurality of pieces of coded data, information relating to coding and decoding may be shared.

8. Eighth Embodiment

Other Examples

While the examples of the apparatus, the system, and the like to which the present technology is applied have been described as above, the present technology is not limited thereto. Thus, the present technology may be also implemented as all the components mounted in the apparatus or an apparatus configuring the system such as a processor as a system Large Scale Integration (LSI) or the like, a module using a plurality of processors and the like, a unit using a plurality of modules and the like, and a set acquired by adding another function to the unit (in other words, a part of the configuration of the apparatus).

<Video Set>

Figure 64:
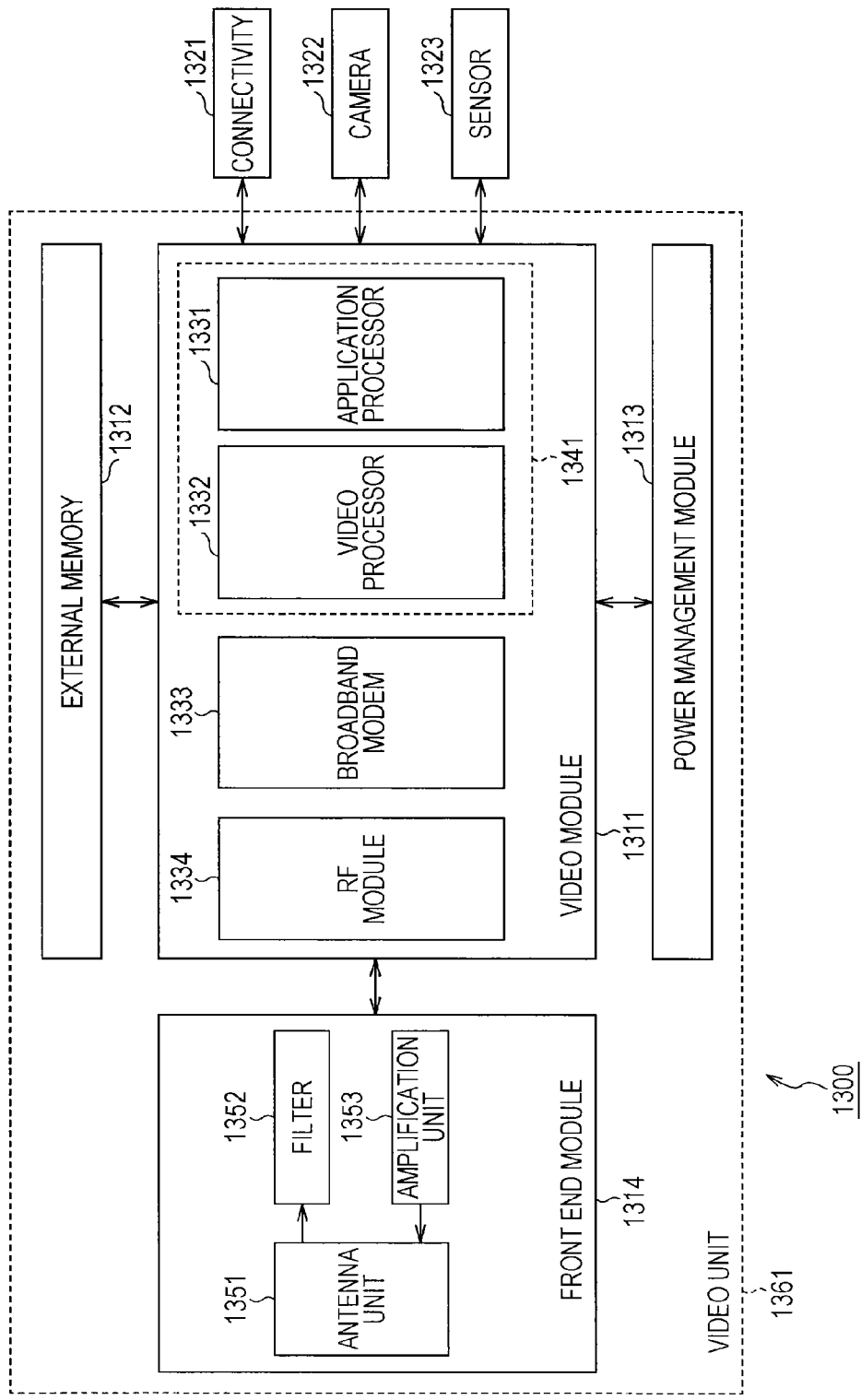
FIG. 64 is a block diagram that illustrates an example of the schematic configuration of a video set.

An example of a case where the present technology is implemented as a set will be described with reference to FIG. 64. FIG. 64 illustrates an example of the schematic configuration of a video set to which the present technology is applied.

Recently, implementation of multiple functions in electronic apparatuses has been progressed, and, in the development or the manufacture of each electronic apparatus, in a case where a part of the configuration is executed in sales, provision, or the like, frequently, there is not only a case where the part is executed as a configuration having one function but also a case where the part is executed as one set having multiple functions by combining a plurality of configurations having related functions.

The video set 1300 illustrated in FIG. 64 has such a configuration that has multiple functions and is acquired by combining a device having a function relating to coding/decoding (one of coding and decoding or both thereof) of an image with devices having other functions relating to the function.

As illustrated in FIG. 64, the video set 1300 includes: a module group such as a video module 1311, an external memory 1312, a power management module 1313, and a front end module 1314 and devices having related functions such as connectivity 1321, a camera 1322, and a sensor 1323.

A module is a component that has functions having coherence acquired by gathering several component functions relating to each other. A specific physical configuration is arbitrary, and, for example, a configuration may be considered in which a plurality of processors having respective functions, electronic circuit components such as a resistor and a capacitor, and other devices are arranged to be integrated in a wiring board or the like. In addition, it may be considered to forma new module by combining a module with other modules, a processor, or the like.

In the case of the example illustrated in FIG. 64, the video module 1311 is constructed by combining configurations having functions relating to image processing and includes: an application processor, a video processor, a broadband modem 1333, and an RF module 1334.

A processor is formed by integrating a configuration having a predetermined function on a semiconductor chip through a System On a Chip (SoC) and, for example, there is a processor called a Large Scale Integration (LSI) or the like. The configuration having a predetermined function may be a logical circuit (hardware configuration), a configuration including a CPU, a ROM, a RAM, and the like and a program (software configuration) executed using the components, or a configuration acquired by combining both. For example, it may be configured such that a processor includes logic circuits, a CPU, a ROM, a RAM, and the like, some functions thereof are realized by logic circuits (hardware configuration), and the other functions are realized by a program (software configuration) executed by the CPU.

An application processor 1331 illustrated in FIG. 64 is a processor that executes an application relating to image processing. In order to realize a predetermined function, the application executed by this application processor 1331 not only executes a calculation process but also may control configurations of the inside/outside of the video module 1311 such as a video processor 1332 and the like as is necessary.

A video processor 1332 is a processor that has a function relating to coding/decoding (one of coding and decoding or both coding and decoding) of an image.

The broadband modem 1333 converts data (digital signal) transmitted through wired or wireless (or wired and wireless) broadband communication that is performed through broadband communication lines such as the Internet or a public telephone switched network into an analog signal through a digital modulation process or the like or converts an analog signal received through the broadband communication into data (digital signal) through a demodulation process. The broadband modem 1333 processes arbitrary information such as image data processed by the video processor 1332, a stream in which the image data is coded, an application program, and setting data.

The RF module 1334 is a module that performs frequency conversion, modulation/demodulation, amplification, a filter process, and the like for a Radio Frequency (RF) signal that is transmitted or received through an antenna. For example, the RF module 1334 performs the frequency conversion and the like for a dedicated line connection system signal generated by the broadband modem 1333, thereby generating an RF signal. In addition, for example, the RF module 1334 performs the frequency conversion and the like for an RF signal received through the front end module 1314, thereby generating a dedicated line connection system signal.

As denoted by a dotted line 1341 in FIG. 64, the application processor 1331 and the video processor 1332 may be integrated so as to be configured as one processor.

The external memory 1312 is a module that is arranged outside the video module 1311 and has a memory device used by the video module 1311. While the memory device of the external memory 1312 may be realized by a certain physical configuration, generally, the memory device is frequently used for storing data of a large volume such as image data configured in units of frames. Accordingly, it is preferable that memory device is realized by a semiconductor memory of a large capacity such as a Dynamic Random Access Memory (DRAM) at a relatively low cost.

The power management module 1313 manages and controls supply of power to the video module 1311 (each configuration arranged inside the video module 1311).

The front end module 1314 is a module that provides a front end function (a circuit at the transmission/reception end on the antenna side) for the RF module 1334. As illustrated in FIG. 64, the front end module 1314, for example, includes an antenna unit 1351, a filter 1352, and an amplification unit 1353.

The antenna unit 1351 includes an antenna that transmits and receives wireless signals and peripheral configurations. The antenna unit 1351 transmits a signal supplied from the amplification unit 1353 as a wireless signal and supplies the received wireless signal to the filter 1352 as an electrical signal (RF signal). The filter 1352 performs a filter process and the like for the RF signal received through the antenna unit 1351 and supplies the RF signal after the process to the RF module 1334. The amplification unit 1353 amplifies the RF signal supplied from the RF module 1334 and supplies the amplified RF signal to the antenna unit 1351.

The connectivity 1321 is a module that has a function relating to a connection with the outside. The physical configuration of the connectivity 1321 is arbitrary. For example, the connectivity 1321 includes a configuration having a communication function according to a communication standard other than a communication standard with which the broadband modem 1333 compliant, an external input/output terminal, and the like.

For example, the connectivity 1321 may be configured to include a module that has a communication function compliant with a radio communication standard such as Bluetooth (registered trademark), IEEE 802.11 (for example, Wireless Fidelity; registered trademark (Wi-Fi)), Near Field Communication (NFC), or InfraRed Data Association (IrDA), an antenna that transmits and receives signals compliant with the standard, and the like. In addition, for example, the connectivity 1321 may be configured to include a module that has a communication function compliant with a wired communication standard such as Universal Serial Bus (USB) or High-Definition Multimedia Interface (HDMI (registered trademark)) and terminals compliant with the standard. Furthermore, for example, the connectivity 1321 may be configured to have another data (signal) transmission function of an analog input/output terminal or the like.

In addition, the connectivity 1321 may be configured to include a device of the transmission destination of data (signal). For example, the connectivity 1321 may be configured to include a drive (including not only a drive of a removable medium but also a hard disk, a Solid State Drive (SSD), a Network Attached Storage (NAS), and the like) that reads/writes data from/into a recording medium such as a magnetic disk, an optical disc, a magneto-optical disk, or a semiconductor memory. In addition, the connectivity 1321 may be configured to include an output device (a monitor, a speaker, or the like) of an image or a voice.

The camera 1322 is a module that has a function for acquiring image data of an object by imaging the object. The image data acquired by the imaging process performed by the camera 1322, for example, is supplied to the video processor 1332 and is coded.

The sensor 1323 is a module that has the function of an arbitrary sensor such a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, a tilt sensor, a magnetic identification sensor, an impact sensor, or a temperature sensor. Data detected by the sensor 1323, for example, is supplied to the application processor 1331 and is used by the application and the like.

The configuration described above as the module may be realized as the processor. To the contrary, the configuration described above as the processor may be realized as the module.

In the video set 1300 having the above-described configuration, as will be described later, the present technology may be applied to the video processor 1332. Accordingly, the video set 1300 may be executed as a set to which the present technology is applied.

Configuration Example of Video Processor

Figure 65:
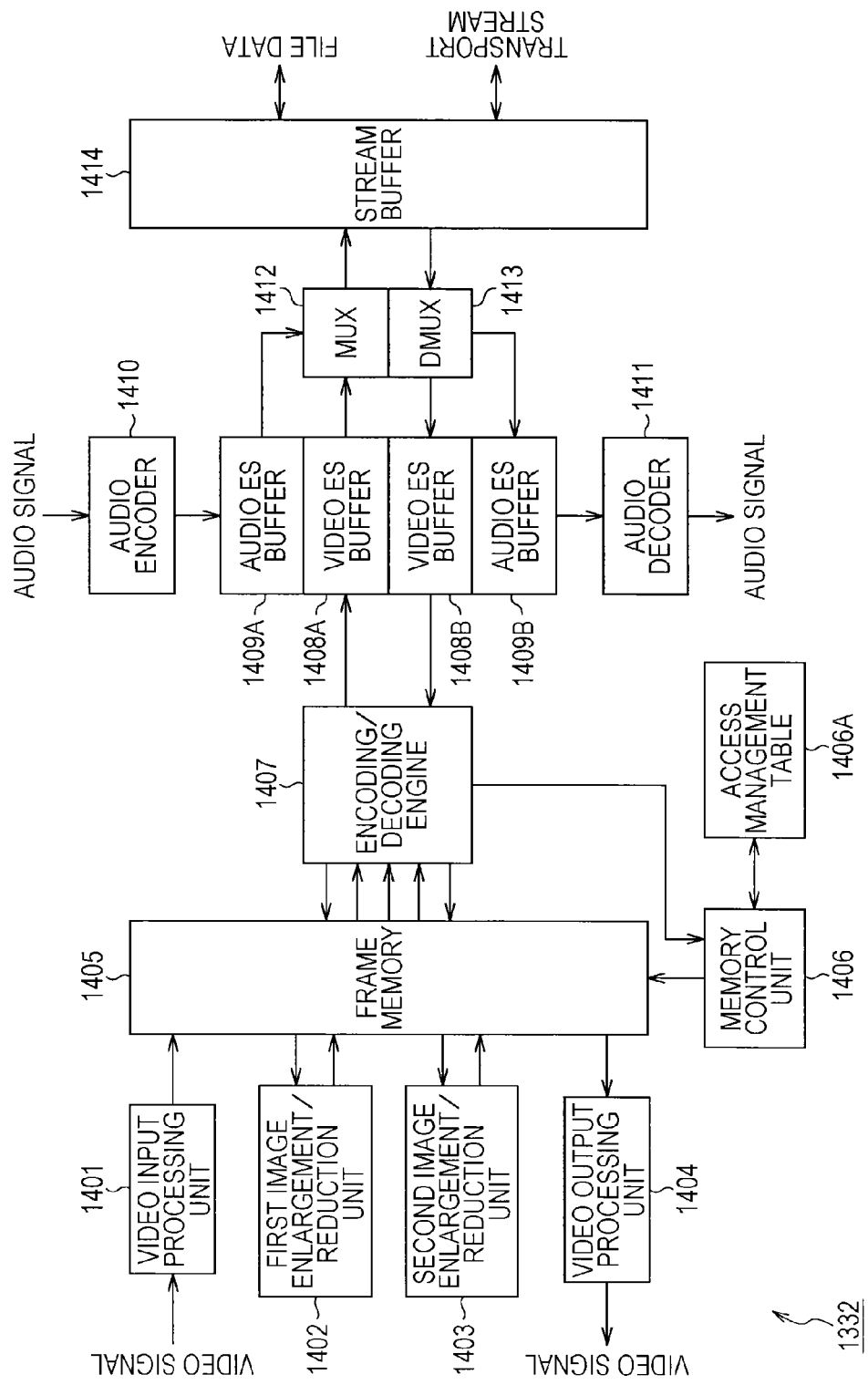
FIG. 65 is a block diagram that illustrates an example of the schematic configuration of a video processor.

FIG. 65 illustrates an example of the schematic configuration of the video processor 1332 (FIG. 64) to which the present technology is applied.

In the case of the example illustrated in FIG. 65, the video processor 1332 has a function for receiving inputs of a video signal and an audio signal and coding the video signal and the audio signal according to a predetermined system and a function for decoding coded video data and coded audio data and reproducing and outputting a video signal and audio signal.

As illustrated in FIG. 65, the video processor 1332 includes: a video input processing unit 1401; a first image enlargement/reduction unit 1402; a second image enlargement/reduction unit 1403; a video output processing unit 1404; a frame memory 1405; and a memory control unit 1406. In addition, the video processor 1332 includes: an encoding/decoding engine 1407; video Elementary Stream (ES) buffers 1408A and 1408B; and audio ES buffers 1409A and 1409B. Furthermore, the video processor 1332 includes: an audio encoder 1410; an audio decoder 1411; a multiplexing unit (Multiplexer (MUX)) 1412; a demultiplexing unit (Demultiplexer (DMUX)) 1413; and a stream buffer 1414.

The video input processing unit 1401, for example, acquires a video signal input from the connectivity 1321 (FIG. 64) or the like and converts the video signal into digital image data. The first image enlargement/reduction unit 1402 performs a format conversion, an image enlargement/reduction process, and the like for the image data. The second image enlargement/reduction unit 1403 performs an image enlargement/reduction process according to a format of the output destination through the video output processing unit 1404, similar format conversion as that of the first image enlargement/reduction unit 1402, an image enlargement/reduction process, and the like for the image data. The video output processing unit 1404 performs a format conversion, a conversion into an analog signal, and the like for the image data and outputs a resultant signal, for example, to the connectivity 1321 (FIG. 64) or the like as a reproduced video signal.

The frame memory 1405 is a memory for image data that is shared by the video input processing unit 1401, the first image enlargement/reduction unit 1402, the second image enlargement/reduction unit 1403, the video output processing unit 1404, and the encoding/decoding engine 1407. The frame memory 1405, for example, is realized by a semiconductor memory such as a DRAM.

The memory control unit 1406 receives a synchronization signal from the encoding/decoding engine 1407 and controls accesses to the frame memory 1405 for writing/reading according to an access schedule for accessing the frame memory 1405 that is written in an access management table 1406A. The access management table 1406A is updated by the memory control unit 1406 in accordance with the processes executed by the encoding/decoding engine 1407, the first image enlargement/reduction unit 1402, the second image enlargement/reduction unit 1403, and the like.

The encoding/decoding engine 1407 performs an encoding process of image data and a decoding process of a video stream that is data acquired by coding the image data. For example, the encoding/decoding engine 1407 codes the image data read from the frame memory 1405 and sequentially writes the image data into the video ES buffer 1408A as a video stream. In addition, for example, the encoding/decoding engine 1407 sequentially reads and decodes video streams supplied from the video ES buffer 1408B and sequentially writes the decoded video streams into the frame memory 1405 as image data. The encoding/decoding engine 1407 uses the frame memory 1405 as a work area in such coding and decoding processes. In addition, the encoding/decoding engine 1407 outputs a synchronization signal to the memory control unit 1406, for example, at timing when a process for each macro block is started.

The video ES buffer 1408A buffers a video stream generated by the encoding/decoding engine 1407 and supplies the buffered video stream to the multiplexing unit (MUX) 1412. The video ES buffer 1408B buffers a video stream supplied from the demultiplexing unit (DMUX) 1413 and supplies the buffered video stream to the encoding/decoding engine 1407.

The audio ES buffer 1409A buffers an audio stream generated by the audio encoder 1410 and supplies the buffered audio stream to the multiplexing unit (MUX) 1412. The audio ES buffer 1409B buffers an audio stream supplied from the demultiplexer (DMUX) 1413 and supplies the buffered audio stream to the audio decoder 1411.

The audio encoder 1410, for example, converts an audio signal, for example, input from the connectivity 1321 or the like into a digital signal and codes the converted digital signal according to a predetermined system such as an MPEG audio system or an Audio Code number 3 (AC3) system. The audio encoder 1410 sequentially writes audio streams each being data acquired by coding an audio signal into the audio ES buffer 1409A. The audio decoder 1411 decodes the audio stream supplied from the audio ES buffer 1409B and, for example, performs a conversion into an analog signal, and the like for the decoded audio stream and supplies a resultant signal, for example, to the connectivity 1321 or the like as a reproduced audio signal.

The multiplexing unit (MUX) 1412 multiplexes a video stream and an audio stream. A method of this multiplexing process (in other words, the format of a bit stream generated by the multiplexing process) is arbitrary. In addition, in the multiplexing process, the multiplexing unit (MUX) 1412 may add predetermined header information and the like to the bit stream. In other words, the multiplexing unit (MUX) 1412 can convert the format of a stream through the multiplexing process. For example, by multiplexing a video stream and an audio stream, the multiplexing unit (MUX) 1412 converts the streams into a transport stream that is a bit stream of a transmission format. In addition, for example, by multiplexing the video stream and the audio stream, the multiplexing unit (MUX) 1412 converts the streams into data (file data) of a recording file format.

The demultiplexing unit (DMUX) 1413 demultiplexes a bit stream in which a video stream and an audio stream are multiplexed using a method corresponding to the multiplexing process performed by the multiplexing unit (MUX) 1412. In other words, the demultiplexing unit (DMUX) 1413 extracts a video stream and an audio stream from the bit stream read from the stream buffer 1414 (separates the video stream and the audio stream from each other). In other words, the demultiplexing unit (DMUX) 1413 can convert the format of a stream through the demultiplexing process (an inverse conversion of the conversion performed by the multiplexing unit (MUX) 1412). For example, the demultiplexing unit (DMUX) 1413 acquires a transport stream supplied, for example, from the connectivity 1321, the broadband modem 1333, or the like through the stream buffer 1414 and demultiplexes the supplied transport stream, thereby converting the transport stream into a video stream and an audio stream. In addition, for example, the demultiplexing unit (DMUX) 1413 acquires file data, for example, read from various recording media by the connectivity 1321 through the stream buffer 1414 and demultiplexes the acquired file data, thereby converting the file data into a video stream and an audio stream.

The stream buffer 1414 buffers the bit stream. For example, the stream buffer 1414 buffers the transport stream supplied from the multiplexing unit (MUX) 1412 and supplies the buffered transport stream, for example, to the connectivity 1321, the broadband modem 1333, or the like at predetermined timing or based on a request from the external, or the like.

In addition, for example, the stream buffer 1414 buffers the file data supplied from the multiplexing unit (MUX) 1412 and supplies the buffered file data, for example, to the connectivity 1321 or the like at predetermined timing, a request from the external, or the like so as to be recorded on various recording media.

Furthermore, the stream buffer 1414 buffers a transport stream, for example, acquired through the connectivity 1321, the broadband modem 1333, or the like and supplies the buffered transport stream to the demultiplexing unit (DMUX) 1413 at predetermined timing or based on a request from the external or the like.

In addition, the stream buffer 1414 buffers file data read from various recording media by the connectivity 1321 or the like and supplies the buffered file data to the demultiplexing unit (DMUX) 1413 at predetermined timing or a request from the external or the like.

Next, an example of the operation of the video processor 1332 having such a configuration will be described. For example, a video signal input from the connectivity 1321 or the like to the video processor 1332 is converted into digital image data of a predetermined system such as a 4:2:2 Y/Cb/Cr system in the video input processing unit 1401 and is sequentially written into the frame memory 1405. This digital image data is read by the first image enlargement/reduction unit 1402 or the second image enlargement/reduction unit 1403, a format conversion into a predetermined system such as a 4:2:0 Y/Cb/Cr system and an enlargement/reduction process are performed for the read digital image data, and resultant digital image data is rewritten into the frame memory 1405. This image data is coded by the encoding/decoding engine 1407 and is written into the video ES buffer 1408A as a video stream.

In addition, an audio signal input from the connectivity 1321 or the like to the video processor 1332 is coded by the audio encoder 1410 and is written into the audio ES buffer 1409A as an audio stream.

A video stream in the video ES buffer 1408A and an audio stream in the audio ES buffer 1409A are read and multiplexed by the multiplexing unit (MUX) 1412 and is converted into a transport stream, file data, or the like. The transport stream generated by the multiplexing unit (MUX) 1412 is buffered in the stream buffer 1414 and then, is output to an external network, for example, through the connectivity 1321, the broadband modem 1333, or the like. In addition, the file data generated by the multiplexing unit (MUX) 1412 is buffered in the stream buffer 1414 and then, is output, for example, to the connectivity 1321 or the like and is recorded on various recording media.

In addition, the transport stream input to the video processor 1332 from an external network, for example, through the connectivity 1321, the broadband modem 1333, or the like is buffered in the stream buffer 1414 and then, is demultiplexed by the demultiplexing unit (DMUX) 1413. In addition, the file data that is read from various recording media and is input to the video processor 1332, for example, by the connectivity 1321 or the like is buffered in the stream buffer 1414 and then, is demultiplexed by the demultiplexing unit (DMUX) 1413. In other words, the transport stream or the file data input to the video processor 1332 is separated into a video stream and an audio stream by the demultiplexing unit (DMUX) 1413.

The audio stream is supplied to the audio decoder 1411 through the audio ES buffer 1409B and is decoded, and an audio signal is reproduced. In addition, the video stream is written into the video ES buffer 1408B and then is sequentially read and decoded by the encoding/decoding engine 1407 and is written into the frame memory 1405. The decoded image data is processed to be enlarged or reduced by the second image enlargement/reduction unit 1403 and is written into the frame memory 1405. Then, the decoded image data is read by the video output processing unit 1404, is converted into another format according to a predetermined system such as the 4:2:2 Y/Cb/Cr system or the like, and is further converted into an analog signal, and a video signal is reproduced and output.

In a case where the present technology is applied to the video processor 1332 configured as such, the present technology relating to each embodiment described above may be applied to the encoding/decoding engine 1407. In other words, for example, the encoding/decoding engine 1407 may be configured to have the functions of the image coding apparatus 100 and the image decoding apparatus 200 described above. By configuring as such, the video processor 1332 can have the same advantages as those described above with reference to FIGS. 1 to 52.

In addition, in the encoding/decoding engine 1407, the present technology (in other words, the functions of the image coding apparatus and the image decoding apparatus according to each embodiment described above) may be realized by hardware such as logic circuits or software such as an embedded program or may be realized by both the hardware and the software.

Another Configuration Example of Video Processor

Figure 66:
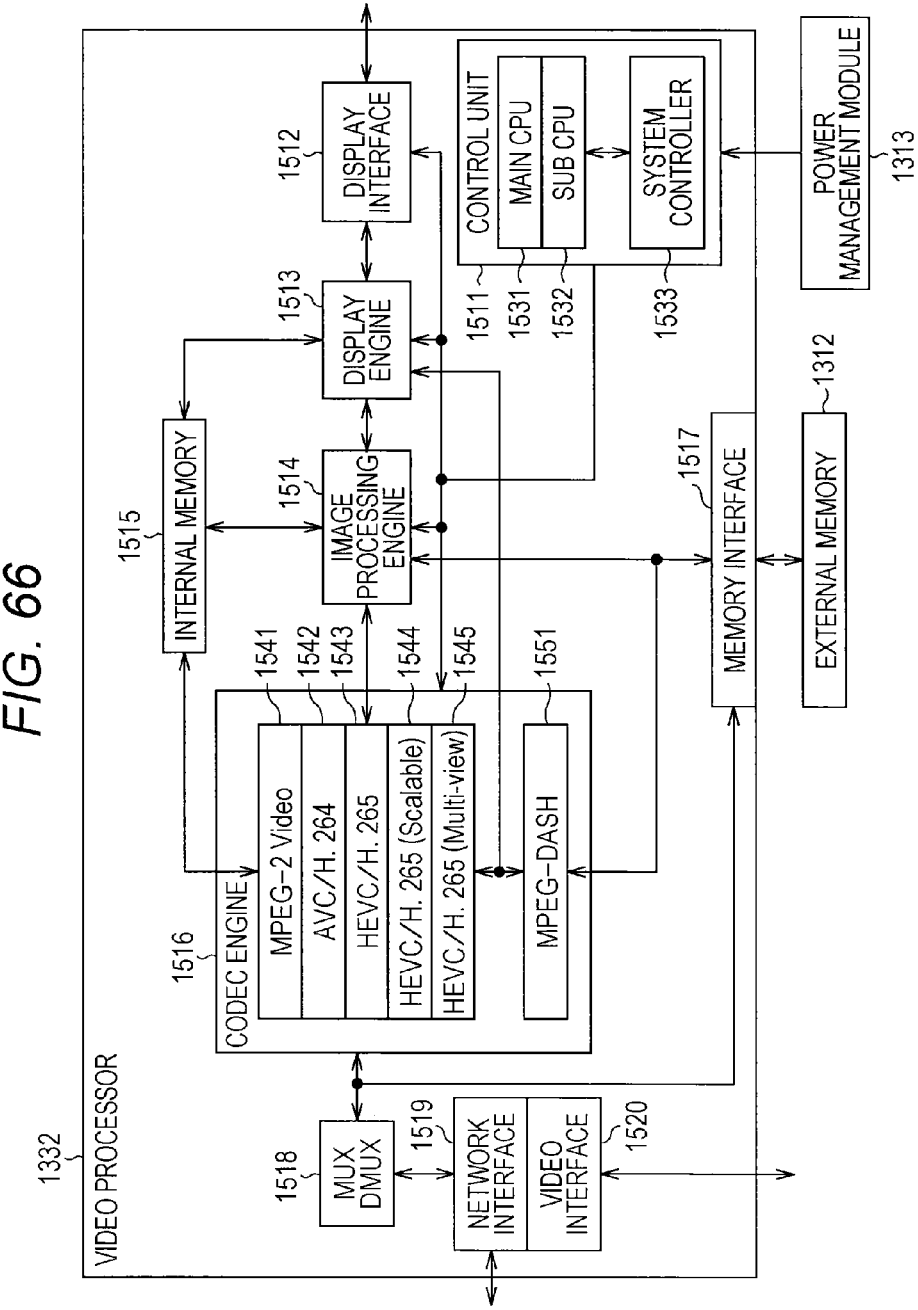
FIG. 66 is a block diagram that illustrates another example of the schematic configuration of a video processor.

FIG. 66 illustrates another example of the schematic configuration of a video processor 1332 (FIG. 64) to which the present technology is applied. In the case of the example illustrated in FIG. 66, the video processor 1332 has a function for coding and decoding video data according to a predetermined system.

More, specifically, as illustrated in FIG. 66, the video processor 1332 includes: a control unit 1511; a display interface 1512; a display engine 1513; an image processing engine 1514; and an internal memory 1515. In addition, the video processor 1332 includes: a codec engine 1516; a memory interface 1517; a multiplexing/demultiplexing unit (MUX DMUX) 1518; a network interface 1519; and a video interface 1520.

The control unit 1511 controls the operations of each processing unit arranged inside the video processor 1332 such as the display interface 1512, the display engine 1513, the image processing engine 1514, and the codec engine 1516.

As illustrated in FIG. 66, the control unit 1511, for example, includes a main CPU 1531, a sub CPU 1532, and a system controller 1533. The main CPU 1531 executes a program used for controlling the operation of each processing unit arranged inside the video processor 1332 and the like. The main CPU 1531 generates a control signal according to the program or the like and supplies the control signal to each processing unit (in other words, controls the operation of each processing unit). The sub CPU 1532 achieves an auxiliary role of the main CPU 1531. For example, the sub CPU 1532 executes a child process, a subroutine, or the like of a program executed by the main CPU 1531. The system controller 1533 controls the operations of the main CPU 1531 and the sub CPU 1532 by performing designation of programs to be executed by the main CPU 1531 and the sub CPU 1532 and the like.

The display interface 1512 outputs image data, for example, to the connectivity 1321 and the like under the control of the control unit 1511. For example, the display interface 1512 converts image data that is digital data into an analog signal and outputs the analog signal as a reproduced video signal or the image data that is the digital data to a monitor device of the connectivity 1321 or the like.

The display engine 1513, under the control of the control unit 1511, performs various conversion processes such as a format conversion, a size conversion, and a color gamut conversion for the image data so as to match the hardware specification of a monitor device displaying the image and the like.

The image processing engine 1514 performs predetermined image processing such as a filter process used for improving the image quality and the like for the image data under the control of the control unit 1511.

The internal memory 1515 is a memory that is shared by the display engine 1513, the image processing engine 1514, and the codec engine 1516 and is disposed inside the video processor 1332. The internal memory 1515, for example, is used for data transfer among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as is necessary (for example, according to a request). This internal memory 1515 may be realized by using any kind of memory device. However, generally, the internal memory is frequently used for storing data having a small volume such as image data in units of blocks and parameters, and accordingly, it is preferable to realize the internal memory using a semiconductor memory having a relatively small capacity (compared to the external memory 1312) and having high response speed such as a Static Random Access Memory (SRAM).

The codec engine 1516 performs processes relating to coding and decoding of image data. The coding/decoding system with which the codec engine 1516 is compliant is arbitrary, and the number of coding/decoding systems may be one or plural. For example, it may be configured such that the codec engine 1516 may have a codec function for a plurality of coding/decoding systems and be configured to perform coding of image data or decoding of coded data by using selected one of the coding/decoding systems.

In the example illustrated in FIG. 66, the codec engine 1516, for example, includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as functional blocks for the process relating to the codec.

The MPEG-2 Video 1541 is a functional block that codes or decodes image data according to the MPEG-2 system. The AVC/H.264 1542 is a functional block that codes or decodes image data according to the AVC system. The HEVC/H.265 1543 is a functional block that codes or decodes image data according to the HEVC system. The HEVC/H.265 (Scalable) 1544 is a functional block that performs scalable coding or scalable decoding of image data according to the HEVC system. The HEVC/H. 265 (Multi-view) 1545 is a functional block that performs multi-view coding or multi-view decoding of image data according to the HEVC system.

The MPEG-DASH 1551 is a functional block that transmits and receives image data according to a MPEG-Dynamic Adaptive Streaming over HTTP (MPEG-DASH) system. MPEG-DASH is a technology for performing video streaming using a HyperText Transfer Protocol (HTTP), and one of features thereof is that appropriate coded data among a plurality of pieces of coded data having mutually-different resolutions and the like, which is prepared in advance, is selected and transmitted in units of segments. The MPEG-DASH 1551 performs generation of a stream that is compliant with the standard, transmission control of the stream, and the like and uses the MPEG-2 Video 1541 to HEVC/H.265 (Multi-view) 1545 described above for coding and decoding image data.

The memory interface 1517 is an interface for the external memory 1312. The data supplied from the image processing engine 1514 or the codec engine 1516 is supplied to the external memory 1312 through the memory interface 1517. In addition, the data read from the external memory 1312 is supplied to the video processor 1332 (the image processing engine 1514 or the codec engine 1516) through the memory interface 1517.

The multiplexing/demultiplexing unit (MUX DMUX) 1518 performs multiplexing and demultiplexing of various kinds of data relating to an image such as a bit stream of coded data, image data, and a video signal. A method of the multiplexing/demultiplexing is arbitrary. For example, at the time of performing the multiplexing, the multiplexing/demultiplexing unit (MUX DMUX) 1518 may not only arrange a plurality of pieces of data into one but also add predetermined header information or the like to the data. In addition, at the time of performing the demultiplexing, the multiplexing/demultiplexing unit (MUX DMUX) 1518 may not only divide one piece of data into multiple parts but also add predetermined header information or the like to each divided data part. In other words, the multiplexing/demultiplexing unit (MUX DMUX) 1518 can convert the format of data through the multiplexing/demultiplexing process. For example, the multiplexing/demultiplexing unit (MUX DMUX) 1518 can convert a bit stream into a transport stream that is a bit stream of the transmission format or data (file data) of the recording file format by multiplexing the bitstream. It is apparent that an inverse conversion thereof can be performed by the demultiplexing process.

The network interface 1519 is an interface, for example, dedicated for the broadband modem 1333, the connectivity 1321, or the like. The video interface 1520 is an interface, for example, dedicated for the connectivity 1321, the camera 1322, or the like.

Next, an example of the operation of such a video processor 1332 will be described. For example, when a transport stream is received from an external network through the connectivity 1321, the broadband modem 1333, or the like, the transport stream is supplied to the multiplexing/demultiplexing unit (MUX DMUX) 1518 through the network interface 1519, is demultiplexed, and is decoded by the codec engine 1516. For the image data acquired by the decoding process performed by the codec engine 1516, predetermined image processing is performed, for example, by the image processing engine 1514, and a predetermined conversion is performed by the display engine 1513. Then, resultant image data is supplied, for example, to the connectivity 1321 or the like through the display interface 1512, and an image thereof is displayed on a monitor. In addition, the image data, for example, acquired by the decoding process performed by the codec engine 1516 is recoded by the codec engine 1516, is multiplexed by the multiplexing/demultiplexing unit (MUX DMUX) 1518, is converted into file data, is output, for example, to the connectivity 1321 or the like through the video interface 1520, and is recorded on various recording media.

In addition, the file data of the coded data acquired by coding the image data, which is read from a recording medium not illustrated, for example, by the connectivity 1321 or the like is supplied to the multiplexing/demultiplexing unit (MUX DMUX) 1518 through the video interface 1520, is demultiplexed, and is decoded by the codec engine 1516. For the image data acquired by the decoding process performed by the codec engine 1516, predetermined image processing is performed by the image processing engine 1514 and a predetermined conversion is performed by the display engine 1513. Then, resultant image data is supplied, for example, to the connectivity 1321 or the like through the display interface 1512, and an image thereof is displayed on the monitor. In addition, the image data, for example, acquired by the decoding process performed by the codec engine 1516 is recoded by the codec engine 1516, is multiplexed by the multiplexing/demultiplexing unit (MUX DMUX) 1518, is converted into a transport stream, is supplied, for example, to the connectivity 1321, the broadband modem 1333, or the like through the network interface 1519, and is transmitted to another apparatus not illustrated.

Here, the transmission/reception of the image data and the other data between each processing unit arranged inside the video processor 1332, for example, is performed using the internal memory 1515 or the external memory 1312. In addition, the power management module 1313, for example, controls the supply of power to the control unit 1511.

In a case where the present technology is applied to the video processor 1332 configured as such, the present technology according to each embodiment described above may be applied to the codec engine 1516. In other words, for example, the codec engine 1516 may be configured to include the functional blocks realizing the image coding apparatus 100 and the image decoding apparatus 200 according to the embodiment described above. By configuring as such, the video processor 1332 can acquire advantages similar to the advantages described above with reference to FIGS. 1 to 52.

In addition, in the codec engine 1516, the present technology (in other words, the functions of the image coding apparatus and the image decoding apparatus according to each embodiment described above) may be realized by hardware such as logic circuits or software such as an embedded program or may be realized by both the hardware and the software.

While two examples of the configuration of the video processor 1332 have been described as above, the configuration of the video processor 1332 is arbitrary and may be a configuration other than the two examples described above. Here, the video processor 1332 may be configured as either one semiconductor chip or a plurality of semiconductor chips. For example, the video processor may be configured as a three-dimensional stacked LSI. In addition, the video processor may be realized by a plurality of LSIs.

Example of Application to Apparatus

The video set 1300 may be built in various apparatuses that process image data. For example, the video set 1300 may be built in the television apparatus 900 (FIG. 57), the mobile phone 920 (FIG. 58), the recording/reproducing apparatus 940 (FIG. 59), the imaging apparatus 960 (FIG. 60), and the like. By building the video set 1300 therein, the apparatus can acquire advantages similar to those described above with reference to FIGS. 1 to 52.

In addition, for example, the video set 1300, for example, may be also built in terminal devices such as the personal computer 1004, the AV equipment 1005, the tablet device 1006, and the mobile phone 1007 of the data transmission system 1000 illustrated in FIG. 61, the broadcasting station 1101 and the terminal device 1102 of the data transmission system 1100 illustrated in FIG. 62, the imaging apparatus 1201 and the scalable coded data storing device 1202 of the imaging system 1200 illustrated in FIG. 63, and the like. By building the video set 1300 therein, the apparatus can acquire advantages similar to those described above with reference to FIGS. 1 to 52.

In addition, although a configuration is a part of each configurations of the video set 1300 described above, in a case where the configuration includes the video processor 1332, the configuration may be executed as a configuration to which the present technology is applied. For example, only the video processor 1332 may be executed as a video processor to which the present technology is applied. In addition, for example, as described above, the processor denoted by the dotted line 1341, the video module 1311, and the like may be executed as a processor, a module, and the like to which the present technology is applied. Furthermore, for example, the video module 1311, the external memory 1312, the power management module 1313, and the front end module 1314 may be combined so as to be executed as a video unit 1361 to which the present technology is applied. According to any of the configurations, advantages similar to those described above with reference to FIGS. 1 to 52 can be acquired.

In other words, any configuration may be built in various apparatuses that process image data, similar to the case of the video set 1300, as long as the configuration includes the video processor 1332. For example, the video processor 1332, the processor denoted by the dotted line 1341, the video module 1311, or the video unit 1361 may be built in the television apparatus 900 (FIG. 57), the mobile phone 920 (FIG. 58), the recording/reproducing apparatus 940 (FIG. 59), the imaging apparatus 960 (FIG. 60), terminal devices such as the personal computer 1004, the AV equipment 1005, the tablet device 1006, the mobile phone 1007, and the like of the data transmission system 1000 illustrated in FIG. 61, the broadcasting station 1101 and the terminal device 1102 of the data transmission system 1100 illustrated in FIG. 62, the imaging apparatus 1201 and the scalable coded data storing device 1202 of the imaging system 1200 illustrated in FIG. 63, and the like. By building any one configuration to which the present technology is desired to be applied into an apparatus, similar to the case of the video set 1300, the apparatus can acquire advantages similar to those described above with reference to FIGS. 1 to 52.

9. Ninth Embodiment

Application Example of MPEG-DASH

In addition, the present technology may be also applied to a content reproduction system of an HTTP streaming such as MPEG DASH to be described later that selects and uses appropriate data in units of segments from among a plurality of pieces of coded data, which is prepared in advance, having mutually-different resolutions and the like.

<Overview of Content Reproduction System>

First, a content reproduction system to which the present technology can be applied will be schematically described with reference to FIGS. 67 to 69.

Hereinafter, first, a basic configuration that is common to such each embodiment will be described with reference to FIGS. 67 and 68.

Figure 67:
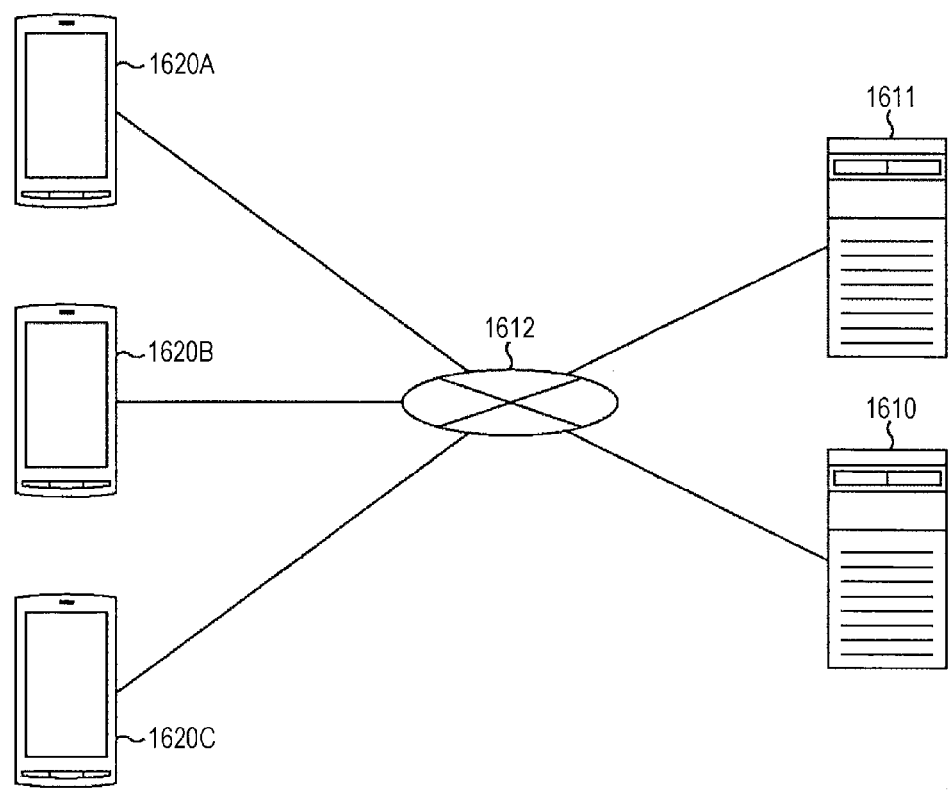
FIG. 67 is an explanatory diagram that illustrates the configuration of a content reproduction system.

FIG. 67 is an explanatory diagram that illustrates the configuration of the content reproduction system. As illustrated in FIG. 67, the content reproduction system includes: content servers 1610 and 1611; a network 1612; and a content reproduction apparatus 1620 (client apparatus).

The content servers 1610 and 1611 and the content reproduction apparatus 1620 are connected through the network 1612. This network 1612 is a wired or wireless transmission line of information that is transmitted from an apparatus connected to the network 1612.

For example, the network 1612 includes the Internet, a telephone network, a public network such as a satellite communication network, various Local Area Network (LANs) including Ethernet (registered trademark), a Wide Area Network (WAN), and the like. In addition, the network 1612 may include a dedicated network such as an Internet Protocol-Virtual Private Network (IP-VPN).

The content server 1610 codes contents data and generates and stores a data file that includes coded data and meta information of the coded data. In a case where the content server 1610 generates a data file of an MP4 format, the coded data corresponds to "mdat", and the meta information corresponds to "moov".

Here, the contents data may be music data of music, a lecture, a radio program, or the like, video data such as a movie, a television program, a video program, a photograph, a document, a painting, or a chart, a game, software.

Here, the content server 1610 generates a plurality of data files with different bit rates for a same content. In addition, in response to a content reproduction request from the content reproduction apparatus 1620, the content server 1611, in information of a URL of the content server 1610, includes information of parameters added to the URL by the content reproduction apparatus 1620 and transmits resultant information to the content reproduction apparatus 1620. Hereinafter, related matters will be described more specifically with reference to FIG. 68.

Figure 68:
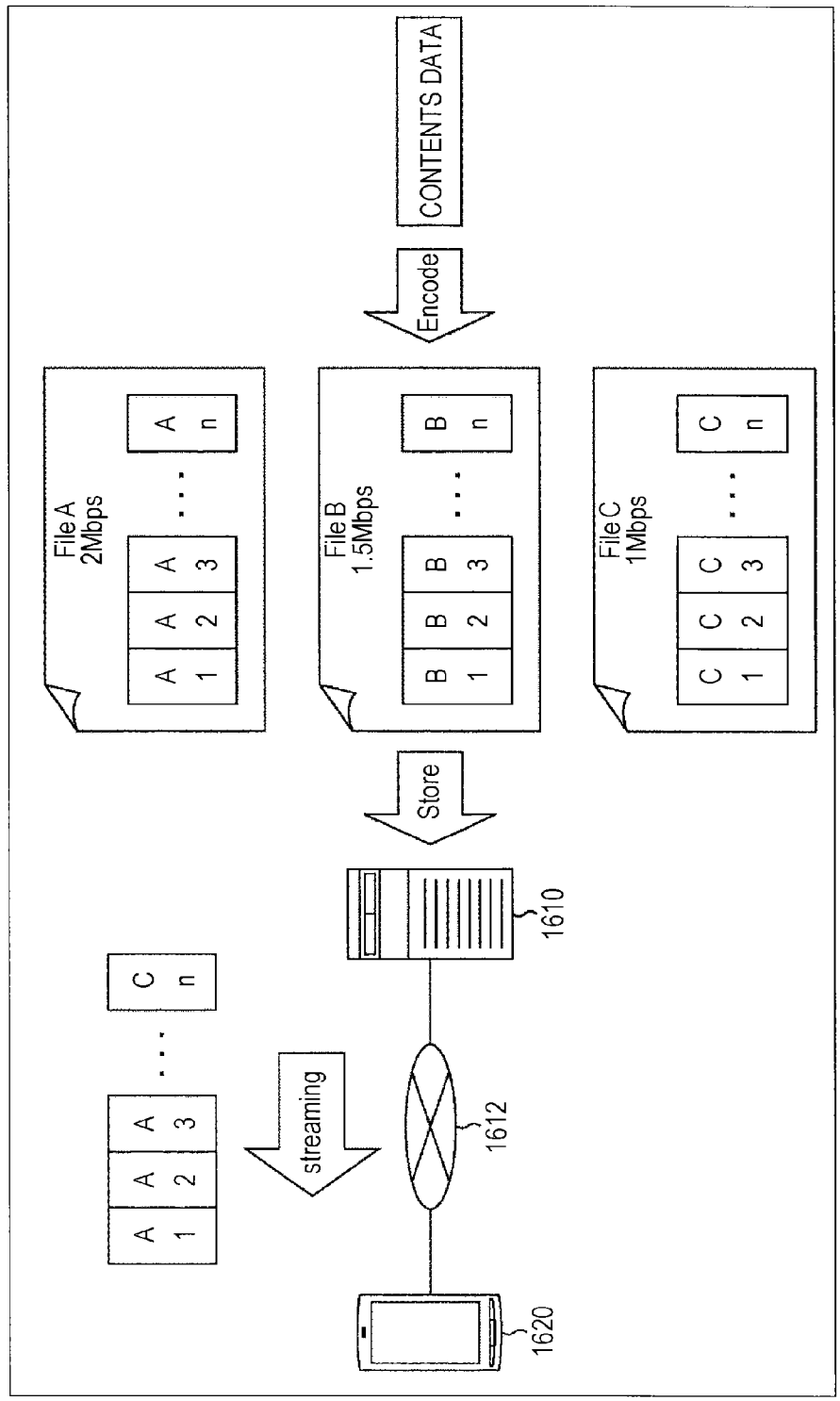
FIG. 68 is an explanatory diagram that illustrates the flow of data in the content reproduction system.

FIG. 68 is an explanatory diagram that illustrates the flow of data in the content reproduction system illustrated in FIG. 67. The content server 1610 codes the same contents data with different bit rates and, as illustrated in FIG. 68, for example, thereby generating a file A of 2 Mbps, a file B of 1.5 Mbps, and a file C of 1 Mbps. Relatively, the file A has a high bit rate, the file B has a standard bit rate, and the file C has a low bit rate.

As illustrated in FIG. 68, coded data of each file is partitioned into a plurality of segments. For example, the coded data of the file A is partitioned into segments of "A1", "A2", "A3", . . . , "An", the coded data of the file B is partitioned into segments of "B1", "B2", "B3", . . . , "Bn", and the coded data of the file C is partitioned into segments of "C1", "C2", "C3", . . . , "Cn".

In addition, each segment may be configured as a configuration sample using one or two or more pieces of video coded data and audio coded data starting with a synchronization sample (for example, an IDR-picture in video coding of AVC/H.264) of the MP4 that can be independently reproduced. For example, in a case where video data of 30 frames per second is coded with a Group of Picture (GOP) having a 15-frame fixed length, each segment may be video and audio coded data of two seconds corresponding to 4 GOPs or video and audio coded data of 10 seconds corresponding to 20 GOPs.

In addition, reproduction ranges (range of a time position from the start of the content) of segments having the same arrangement order in each file are the same. For example, the reproduction ranges of the segment "A2", the segment "B2", and the segment "C2" are the same. In addition, in a case where each segment is coded data of two seconds, each of the reproduction ranges of the segment "A2", the segment "B2", and the segment "C2" is two seconds to four seconds of a corresponding content.

When the files A to C each configured by such a plurality of segments are generated, the content server 1610 stores the files A to C. Then, the content server 1610, as illustrated in FIG. 68, sequentially transmits the segments configuring different files to the content reproduction apparatus 1620, and the content reproduction apparatus 1620 performs streaming reproduction of received segments.

Here, the content server 1610 according to this embodiment transmits a play list file (hereinafter, referred to as a Media Presentation Description (MPD)) including bit rate information and access information of each coded data to the content reproduction apparatus 1620, and the content reproduction apparatus 1620 selects one bit rate from among a plurality of bit rates based on the MPD and requests the content server 1610 to transmit segments corresponding to the selected bit rate.

While only one content server 1610 is illustrated in FIG. 67, it is apparent that the present disclosure is not limited to such a related example.

FIG. 69 is an explanatory diagram that illustrates a specific example of the MPD. As illustrated in FIG. 69, in the MPD, the access information relating to a plurality of pieces of coded data having mutually-different bit rates (BANDWIDTH) is included. For example, the MPD illustrated in FIG. 69 represents the presence of each coded data of 256 Kbps, 1.024 Mbps, 1.384 Mbps, 1.536 Mbps, and 2.048 Mbps and includes the access information relating to each coded data. The content reproduction apparatus 1620 can dynamically change the bit rate of the coded data that is reproduced in a streaming manner based on the MPD.

In FIG. 67, while the mobile terminal is illustrated as an example of the content reproduction apparatus 1620, the content reproduction apparatus 1620 is not limited to such an example. For example, the content reproduction apparatus 1620 may be an information processing apparatus such as a Personal Computer (PC), a home video processing apparatus (a DVD recorder, a video deck, or the like), a Personal Digital Assistants (PDA), a home gaming device, or a household electrical appliance. In addition, the content reproduction apparatus 1620 may be an information processing apparatus such as a mobile phone, a Personal Handyphone System (PHS), a mobile music reproduction device, a mobile video processing device, or a mobile gaming device.

<Configuration of Content Server 1610>

As above, the overview of the content reproduction system has been described with reference to FIGS. 67 to 69. Subsequently, the configuration of the content server 1610 will be described with reference to FIG. 70.

Figure 70:
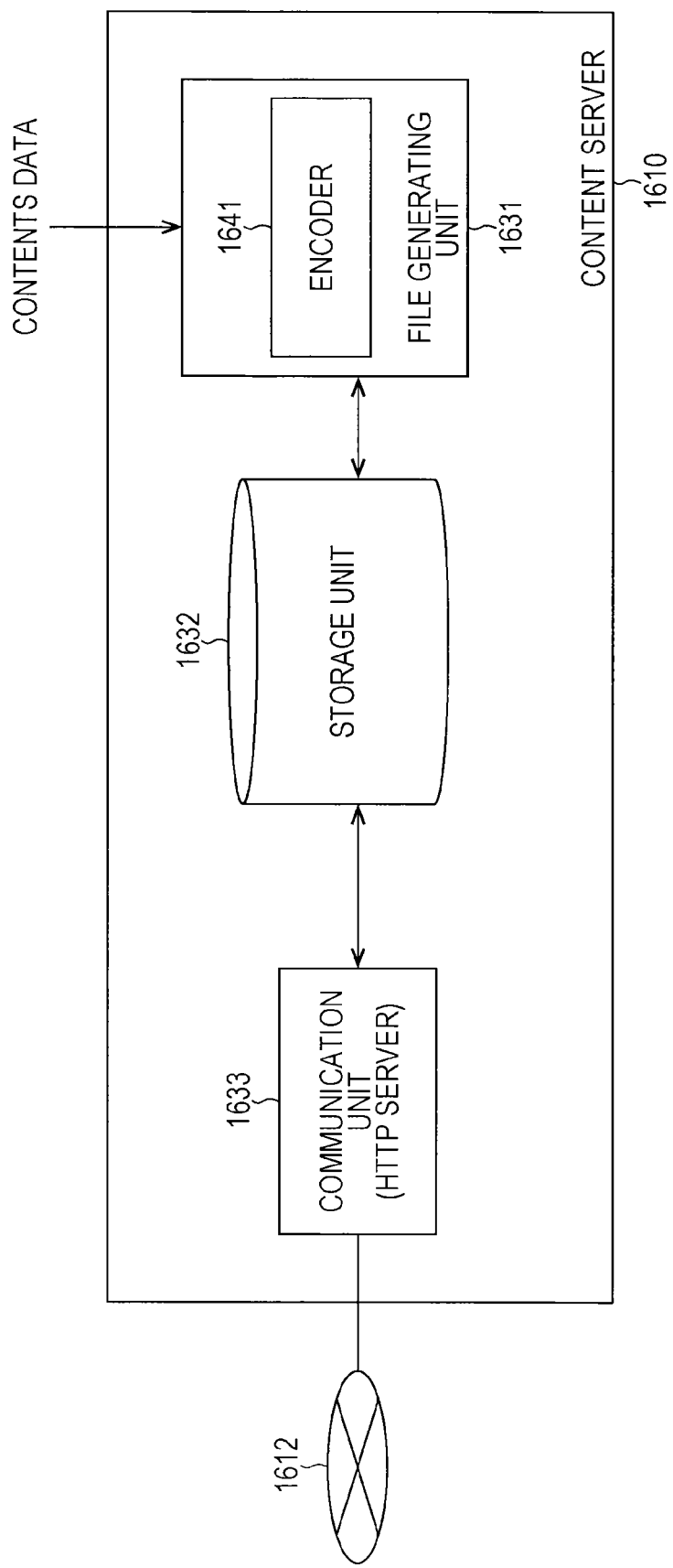
FIG. 70 is a functional block diagram that illustrates the configuration of a content server of a content reproduction system.

FIG. 70 is a functional block diagram that illustrates the configuration of the content server 1610. As illustrated in FIG. 70, the content server 1610 includes: a file generating unit 1631; a storage unit 1632; and a communication unit 1633.

The file generating unit 1631 includes an encoder 1641 that codes contents data and generates a plurality of pieces of coded data having mutually-different bit rates using a same content and the MPD described above. For example, in a case where coded data of each of 256 Kbps, 1.024 Mbps, 1.384 Mbps, 1.536 Mbps, and 2.048 Mbps is generated, the file generating unit 1631 generates the MPD as illustrated in FIG. 69.

The storage unit 1632 stores the plurality of pieces of coded data having different bit rates and the MPD generated by the file generating unit 1631. This storage unit 1632 may be a storage medium such as a non-volatile memory, a magnetic disk, an optical disc, or a Magneto Optical (MO) disk. Examples of the non-volatile memory include an Electrically Erasable Programmable Read-Only Memory (EEPROM) and an Erasable Programmable ROM (EPROM). In addition, examples of the magnetic disk include a hard disk and a disk-shaped magnetic material disk. Examples of the optical disc include a Compact Disc (CD), a Digital Versatile Disc Recordable (DVD-R), and a Blu-Ray Disc (BD (registered trademark)).

The communication unit 1633 is an interface with the content reproduction apparatus 1620 and communicates with the content reproduction apparatus 1620 through the network 1612. Described in more detail, the communication unit 1633 has a function as an HTTP server for communicating with the content reproduction apparatus 1620 according to the HTTP. For example, the communication unit 1633 transmits the MPD to the content reproduction apparatus 1620, extracts coded data from the storage unit 1632 that is requested according to the HTTP from the content reproduction apparatus 1620 based on the MPD, and transmits the coded data to the content reproduction apparatus 1620 as an HTTP response.

<Configuration of Content Reproduction Apparatus 1620>

As above, the configuration of the content server 1610 according to this embodiment has been described. Subsequently, the configuration of the content reproduction apparatus 1620 will be described with reference to FIG. 71.

Figure 71:
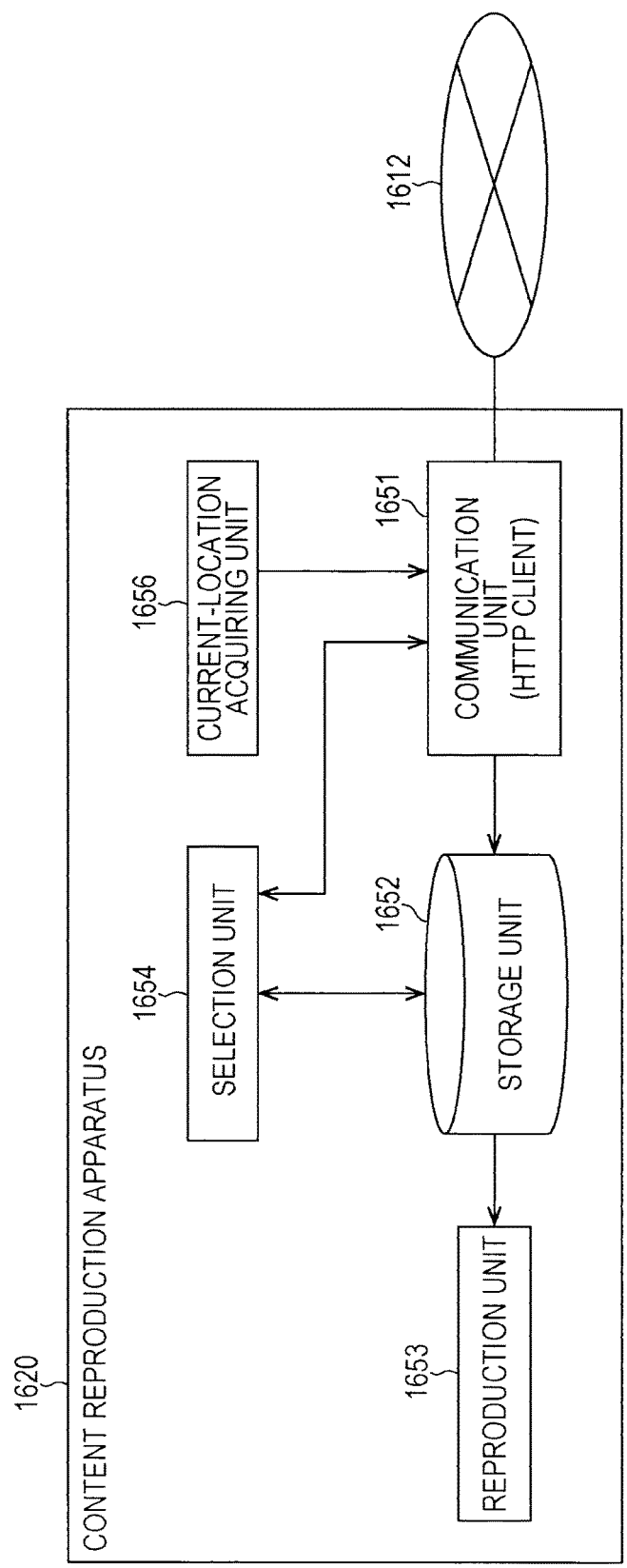
FIG. 71 is a functional block diagram that illustrates the configuration of a content reproduction apparatus of a content reproduction system.

FIG. 71 is a functional block diagram that illustrates the configuration of the content reproduction apparatus 1620. As illustrated in FIG. 71, the content reproduction apparatus 1620 includes: a communication unit 1651; a storage unit 1652; a reproduction unit 1653; a selection unit 1654; and a current-location acquiring unit 1656.

The communication unit 1651 is an interface with the content server 1610 and requests data from the content server 1610, and acquires the data from the content server 1610. Described in more detail, the communication unit 1651 has a function as an HTTP client communicating with the content reproduction apparatus 1620 according to the HTTP. For example, by using the HTTP Range, the communication unit 1651 can selectively acquire the MPD and the segments of the coded data from the content server 1610.

The storage unit 1652 stores various kinds of information relating to reproduction of contents. For example, the storage unit 1652 sequentially buffers segments acquired by the communication unit 1651 from the content server 1610. The segments of the coded data buffered in the storage unit 1652 are sequentially supplied to the reproduction unit 1653 according to First In First Out (FIFO).

In addition, the storage unit 1652, based on an instruction for adding a parameter to a URL of the content described in the MPD, which is requested from the content server 1611 to be described later, adds the parameter to the URL using the communication unit 1651 and stores a definition for accessing the URL.

The reproduction unit 1653 sequentially reproduces the segments supplied from the storage unit 1652. More specifically, the reproduction unit 1653 performs decoding, a DA conversion, rendering, and the like of the segments.

The selection unit 1654 sequentially selects segments of the coded data corresponding to one bit rate included in the MPD, which are to be acquired, within the same content. For example, when the selection unit 1654 sequentially selects segments "A1", "B2", and "A3" according to the band of the network 1612, as illustrated in FIG. 68, the communication unit 1651 sequentially acquires the segments "A1", "B2", and "A3" from the content server 1610.

The current-location acquiring unit 1656 acquires the current location of the content reproduction apparatus 1620 and, for example, may be configured by a module that acquires the current location of a Global Positioning System (GPS) receiver or the like. In addition, the current-location acquiring unit 1656 may be configured to acquire the current location of the content reproduction apparatus 1620 using a wireless network.

<Configuration of Content Server 1611>

Figure 72:
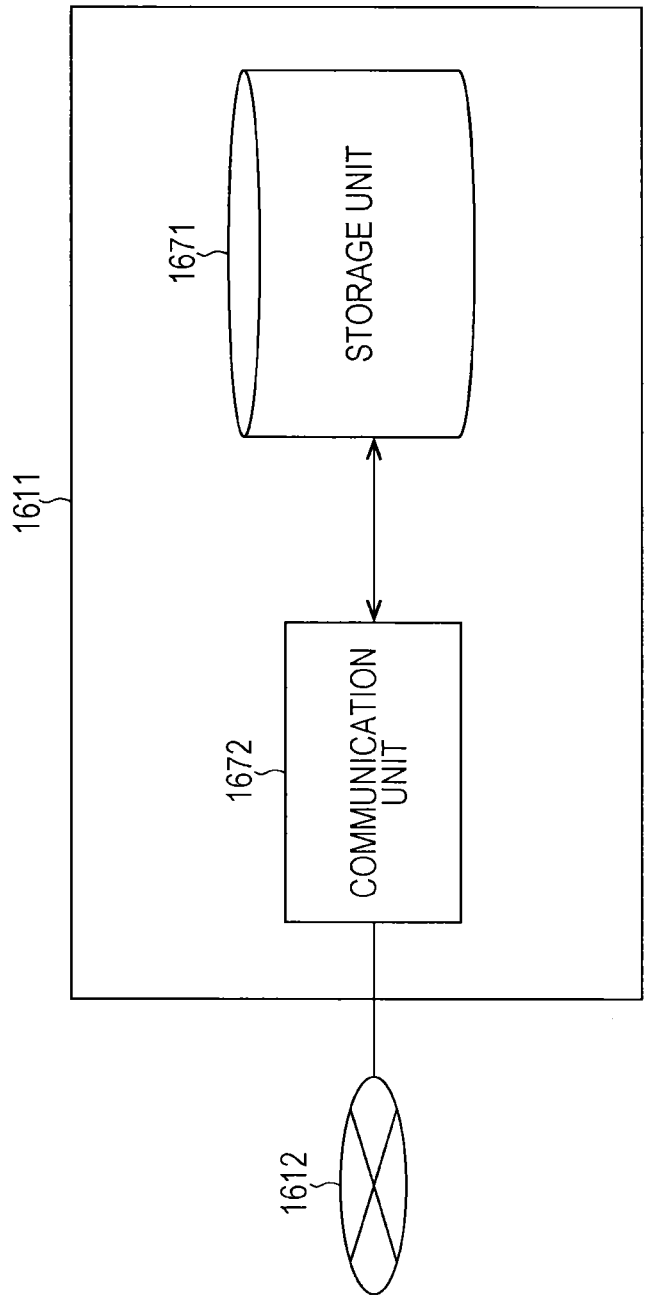
FIG. 72 is a functional block diagram that illustrates the configuration of a content server of a content reproduction system.

FIG. 72 is a functional block diagram that illustrates a configuration example of the content server 1611. As illustrated in FIG. 72, the content server 1611 includes a storage unit 1671 and a communication unit 1672.

The storage unit 1671 stores information of the URL of the MPD. The information of the URL of the MPD is transmitted from the content server 1611 to the content reproduction apparatus 1620 in response to a request from the content reproduction apparatus 1620 that requests reproduction of a content. In addition, when the information of the URL of the MPD is provided for the content reproduction apparatus 1620, the storage unit 1671 stores definition information at the time of adding the parameter to the URL described in the MPD to the content reproduction apparatus 1620.

The communication unit 1672 is an interface with the content reproduction apparatus 1620 and communicates with the content reproduction apparatus 1620 through the network 1612. In other words, the communication unit 1672 receives a request for the information of the URL of the MPD from the content reproduction apparatus 1620 requesting for the reproduction of a content and transmits the information of the URL of the MPD to the content reproduction apparatus 1620. In the URL of the MPD that is transmitted from the communication unit 1672, information used for adding a parameter by using the content reproduction apparatus 1620 is included.

The parameter added to the URL of the MPD by the content reproduction apparatus 1620 may be variously set in the definition information that is shared by the content server 1611 and the content reproduction apparatus 1620. For example, information of the current location of the content reproduction apparatus 1620, a user ID of a user using the content reproduction apparatus 1620, a memory size of the content reproduction apparatus 1620, a storage capacity of the content reproduction apparatus 1620, and the like may be added to the URL of the MPD by the content reproduction apparatus 1620.

In the content reproduction system having the above-described configuration, by applying the present technology as described above with reference to FIGS. 1 to 52, advantages similar to those described above with reference to FIGS. 1 to 52 can be acquired.

In other words, the encoder 1641 of the content server 1610 has the function of the image coding apparatus 100 according to the embodiment described above. In addition, the reproduction unit 1653 of the content reproduction apparatus 1620 has the function of the image decoding apparatus 200 according to the embodiment described above. Accordingly, the coding efficiency of an intra prediction of a case where the format of a color difference signal is 4:2:2 in the image can be improved.

In addition, in the content reproduction system, by transmitting and receiving data coded according to the present technology, the coding efficiency of an intra prediction of a case where the format of a color difference signal is 4:2:2 in the image can be improved.

10. Tenth Embodiment

Application Example of Radio Communication System of Wi-Fi Standard

In addition, the present technology may be also applied to a radio communication system of the Wi-Fi standard that selects and uses appropriate coded data in units of segments from among a plurality of pieces of coded data, which is prepared in advance, having mutually-different resolutions and the like.

Example of Basic Operation of Radio Communication Device

An example of the basic operation of a radio communication device of a radio communication system to which the present technology can be applied will be described.

First, a Peer to Peer (P2P) connection is established, and wireless packets until the operation of a specific application are transmitted and received.

Next, before a connection at a second layer, after a specific application to be used is designated, a P2P connection is established, and wireless packets until the operation of the specific application are transmitted and received. Thereafter, after the connection at the second layer, wireless packets of a case where the specific application is activated are transmitted and received.

Figure 73:
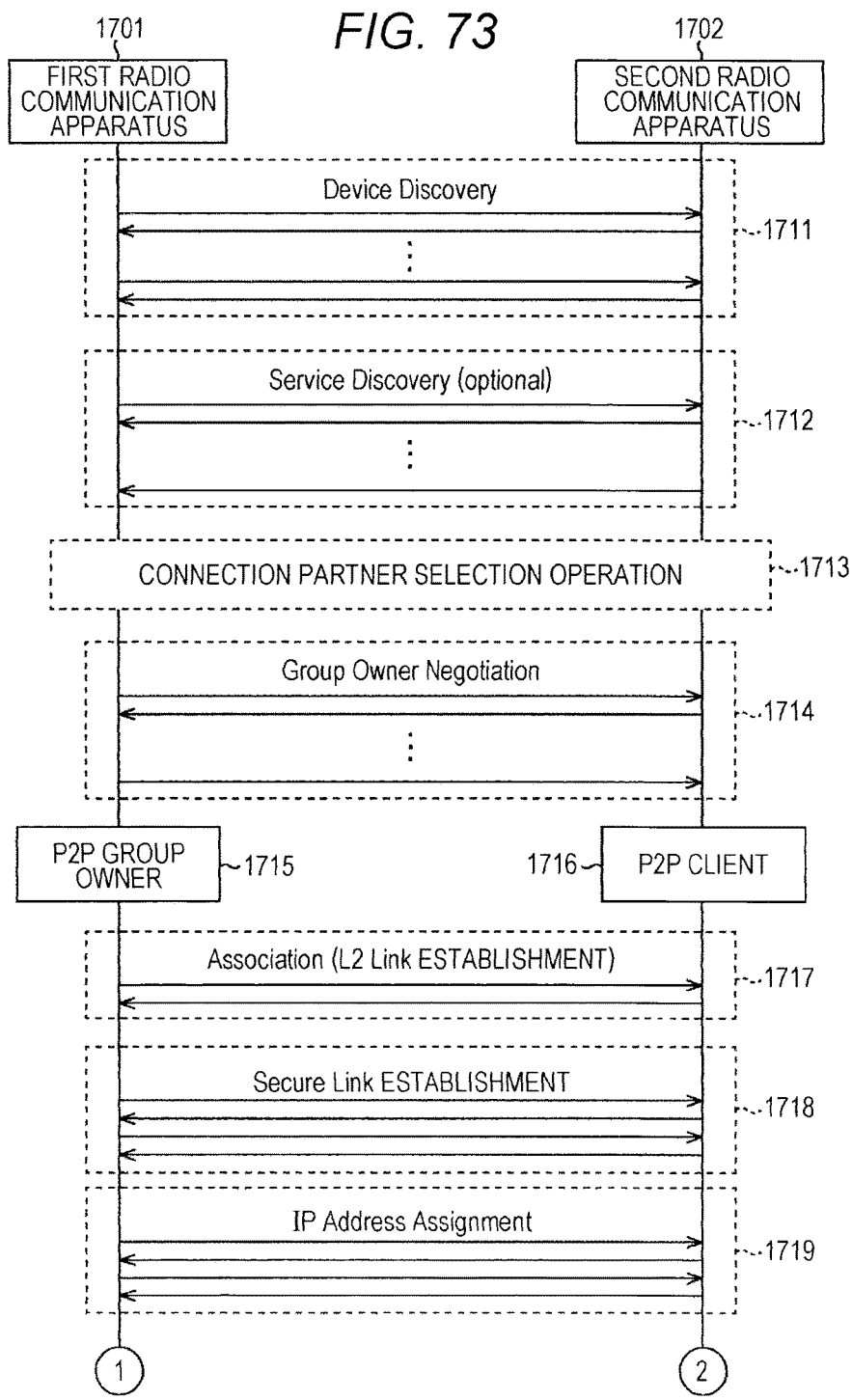
FIG. 73 is a sequence chart that illustrates an example of a communication process performed by each device of a radio communication system.
Figure 74:
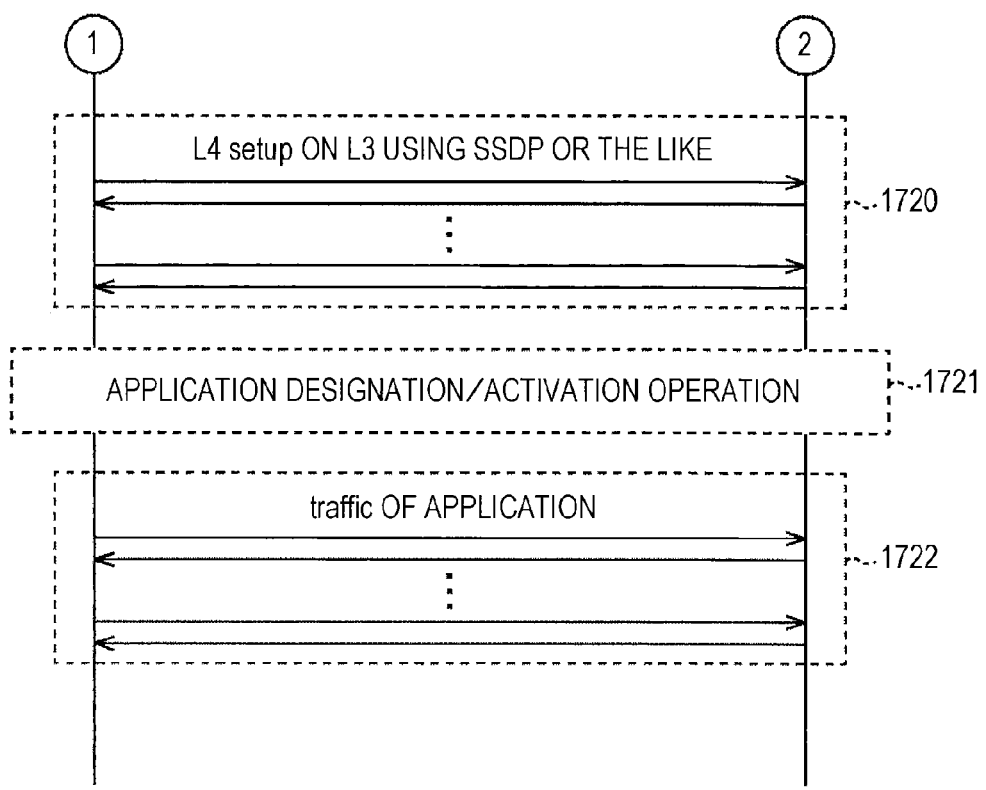
FIG. 74 is a sequence chart that illustrates an example of the communication process performed by each device of the radio communication system.

Example of Communication at Time of Starting Operation of Specific Application FIGS. 73 and 74 illustrate an example of transmission/reception of wireless packets until the Peer to Peer (P2P) connection is established, and a specific application is operated and are sequence charts that illustrate an example of a communication process performed by each device that forms a base of the radio communication. More specifically, an example of a direct connection establishment sequence leading to a connection of a Wi-Fi Direct standard (it may be also called Wi-Fi P2P) that is standardized by the Wi-Fi Alliance is illustrated.

Here, in the Wi-Fi Direct, a plurality of radio communication devices respectively detects the presence of the others (device discovery, service discovery). Then, when a connection device selection is performed, between the selected devices, device authentication is performed using WPS (Wi-Fi Protected Setup), whereby a direct connection is established. In addition, in the Wi-Fi Direct, either a role of a group owner or a role of a client that is taken by each of a plurality of radio communication devices is determined, whereby a communication group is formed.

However, in the example of the communication process, some packet transmission/reception processes are not illustrated. For example, at the time of the first connection, as described above, packet exchanges are necessary for using the WPS, and packet exchanges are necessary also in exchanges of Authentication Request/Response and the like. However, in FIGS. 73 and 74, such packet exchanges are not illustrated, and those in only a second connection and subsequent connections are illustrated.

In FIGS. 73 and 74, while an example of a communication process between a first radio communication device 1701 and a second radio communication device 1702 is illustrated, a communication process between the other radio communication devices is similar thereto.

First, a device discovery is performed between the first radio communication device 1701 and the second radio communication device 1702 (1711). For example, the first radio communication device 1701 transmits a probe request (response request signal) and receives a probe response (response signal) for this probe request from the second radio communication device 1702. Accordingly, one of the first radio communication device 1701 and the second radio communication device 1702 can discover the presence of the other. In addition, through the device discovery, a device name and a type (a TV, a PC, a smartphone, or the like) of the partner device can be acquired.

Subsequently, a service discovery is performed between the first radio communication device 1701 and the second radio communication device 1702 (1712). For example, the first radio communication device 1701 transmits a service discovery query for querying a service supported by the second radio communication device 1702 that is discovered through the device discovery. Then, the first radio communication device 1701 receives a service discovery response from the second radio communication device 1702, thereby acquiring a service that is supported by the second radio communication device 1702. In other words, a service and the like that can be executed by the partner can be acquired through the service discovery. Examples of the service that can be executed by the partner include a service and a protocol (Digital Living Network Alliance (DLNA), Digital Media Renderer (DMR), and the like).

Subsequently, an operation of selecting a connection partner (connection partner selection operation) is performed by the user (1713). This connection partner selection operation may be performed in only one of the first radio communication device 1701 and the second radio communication device 1702. For example, a connection partner selection screen is displayed in a display unit of the first radio communication device 1701, and the second radio communication device 1702 is selected by a user operation as a connection partner on this connection partner selection screen.

When the connection partner selection operation is performed by the user (1713), a group owner negotiation is performed between the first radio communication device 1701 and the second radio communication device 1702 (1714). In FIGS. 73 and 74, an example is illustrated in which, as a result of the group owner negotiation, the first radio communication device 1701 becomes a group owner 1715, and the second radio communication device 1702 becomes a client 1716.

Subsequently, by performing processes (1717 to 1720) between the first radio communication device 1701 and the second radio communication device 1702, a direct connection is established. In other words, association (L2 (second layer) link establishment) (1717) and secure link establishment (1718) are sequentially performed. In addition, L4 setup (1720) on L3 according to IP address assignment (1719), a Simple Service Discovery Protocol (SSDP), and the like are sequentially performed. Here, L2 (layer 2) represents a second layer (data link layer), L3 (layer 3) represents a third layer (network layer), and L4 (layer 4) represents a fourth layer (transport layer).

Subsequently, a designation/activation operation of a specific application (application designation/activation operation) is performed by the user (1721). This application designation/activation operation may be performed in only one of the first radio communication device 1701 and the second radio communication device 1702. For example, an application designation/activation operation screen is displayed on the display unit of the first radio communication device 1701, and a specific application is selected by a user operation on this application designation/activation operation screen.

When the application designation/activation operation is performed by the user (1721), a specific application corresponding to this application designation/activation operation is executed between the first radio communication device 1701 and the second radio communication device 1702 (1722).

Here, a case will be considered in which a connection between an Access Point (AP) and a Station (STA) is performed within the range of a standard (specification standardized by IEEE 802.11) before the Wi-Fi Direct standard. In this case, before a connection is performed in the second layer (before association in terms of IEEE 802.11), a device with which a connection is to be made cannot be known in advance.

In contrast to this, as illustrated in FIGS. 73 and 74, in the Wi-Fi Direct, when a search for a connection candidate partner is performed in the device discovery or the service discovery (option), information of connection partners can be acquired. This information of connection partners, for example, is a basic device type, a specific application with which each connection partner is compliant, and the like. Then, based on the acquired information of connection partners, the user can be allowed to select a connection partner.

By extending this structure, a radio communication system can be realized in which, before a connection is performed in the second layer, a specific application is designated, a connection partner is selected, and, after this selection, a specific application is automatically activated. An example of the sequence up to a connection of such a case is illustrated in FIG. 76. In addition, a configuration example of the frame format of frames that are transmitted and received in this communication process is illustrated in FIG. 75.

Configuration Example of Frame Format

Figure 75:
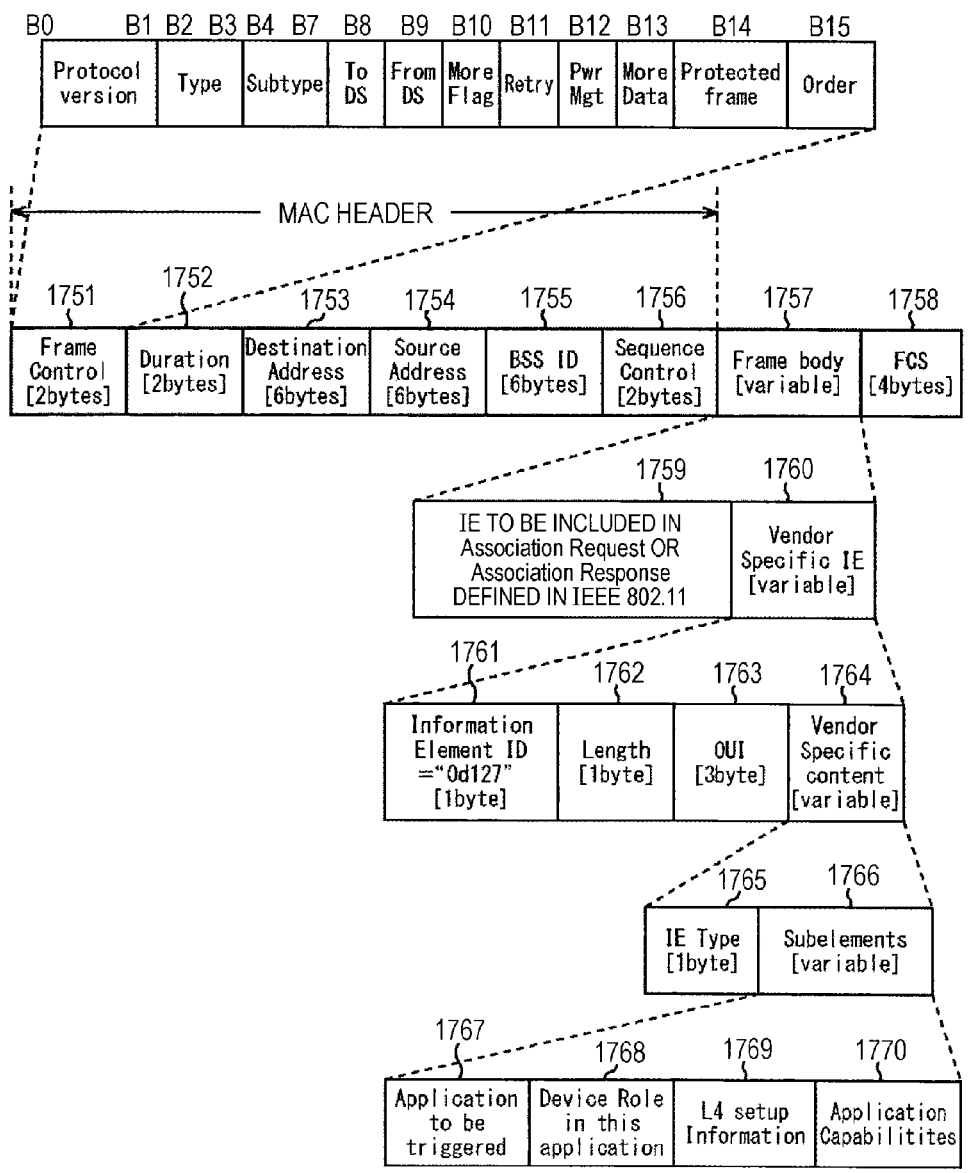
FIG. 75 is a diagram that schematically illustrates a configuration example of a frame format of a frame that is transmitted and received in a communication process performed by each apparatus of a radio communication system.

FIG. 75 is a diagram that schematically illustrates a configuration example of a frame format of a frame that is transmitted and received in the communication process performed by each apparatus of the radio communication system. In other words, FIG. 75 illustrates a configuration example of a MAC frame used for establishing a connection in the second layer. More specifically, FIG. 75 is an example of the frame format of an association request/response (1787) used for realizing the sequence illustrated in FIG. 76.

Here, a MAC header is configured by a frame control (1751) to a sequence control (1756). In order to transmit an association request, B3B2="0b00" and B7B6B5B4="0b0000" are set in the frame control (1751). In addition, in order to encapsulate an association response, B3B2="0b00" and B7B6B5B4="0b0001" are set in the frame control (1751). Here, "0b00" represents binary "00", "0b0000" represents binary "0000", and "0b0001" represents binary "0001".

Here, the MAC frame illustrated in FIG. 75 basically has an association request/response frame format described in Sections 7.2.3.4 and 7.2.3.5 of IEEE 802.11-2007 specification. However, the MAC frame includes not only an information element (hereinafter, abbreviated as IE) defined in the specification of IEEE 802.11 but also an extended IE that is uniquely extended, which is different from that defined in the specification.

In addition, in order to represent a vendor specific IE (1760), "127" that is a decimal number is set in the IE type (information element ID (1761)). In this case, according to Section 7.3.2.26 of the IEEE 802.11-2007 specification, a length field (1762) and an OUI field (1763) follow the IE type, and thereafter, a vendor specific content (1764) is arranged.

As a content of the vendor specific content (1764), first, a field (IE type (1765)) representing the type of vendor specific IE is arranged. Thereafter, a configuration may be considered in which a plurality of subelements (1766) can be stored.

A content of the subelement (1766) may be considered to include a name (1767) of a specific application to be used and a role (1768) of the device at the time of operating the specific application. In addition, information (information used for L4 setup) (1769) such as a port number used for the specific application or the control thereof and information (capability information) relating to the capability inside the specific application may be considered to be included therein. Here, for example, in a case where the designated specific application is the DLNA, the capability information is information used for specifying compliance with audio transmission/reproduction, compliance with video transmission/reproduction, or the like.

In the radio communication system having the configuration as described above, by applying the present technology as described above with reference to FIGS. 1 to 52, advantages similar to the advantages described above with reference to FIGS. 1 to 52 can be acquired. In other words, the coding efficiency of an intra prediction of a case where the format of a color difference signal is 4:2:2 in the image can be improved. In addition, in the radio communication system described above, by transmitting and receiving coded data to which the present technology is applied, the coding efficiency of an intra prediction of a case where the format of a color difference signal is 4:2:2 in the image can be improved.

In this specification, an example has been described in which various kinds of information is multiplexed in a coded stream and is transmitted from the coding side to the decoding side. However, a technique for transmitting such information is not limited to such a technique. For example, such information may be transmitted or recorded as individual data associated with a coded bit stream without being multiplexed in the coded stream. Here, the term "associated" represents that an image (it may be a part of an image such as a slice, block, or the like) included in a bit stream and information corresponding to the image are acquired with being linked to each other at the time of decoding the image and the information. In other words, the information may be transmitted in a transmission line other than that of the image (or the bit stream). In addition, the information may be recorded on a recoding medium other than that for the image (or the bit stream) (or a different recording area of the same recording medium). Furthermore, the information and the image (or the bit stream), for example, may be associated with each other in units of arbitrary parts such as multiple frames, one frame, or a part of the frame.

The present technology may take a configuration as described below.

(1) An image coding apparatus including: a reference layer designation information generating unit that generates reference layer designation information designating a layer that is referred to in an interlayer prediction in a case where a maximum number of another layer referred to at the time of performing the interlayer prediction and the number of another layer referred to at the time of performing the interlayer prediction, which are set for the whole image data configured by a plurality of layers, do not coincide with each other; and a coding unit that codes the image data.

(2) The image coding apparatus described in (1), further including a prediction control unit that controls the interlayer prediction based on the reference layer designation information generated by the reference layer designation information generating unit.

(3) The image coding apparatus described in (1) or (2), further including a transmission unit that transmits the reference layer designation information with a slice header.

(4) The image coding apparatus described in any one of (1) to (3), wherein the reference layer designation information generating unit generates the reference layer designation information in a case where a current layer is not layer 0, and the number of reference layers of the current layer is not "0".

(5) The image coding apparatus described in (4), further including an interlayer predictability information generating unit that generates interlayer predictability information representing whether an interlayer prediction is permitted.

(6) The image coding apparatus described in (5), wherein the reference layer designation information generating unit further generates the reference layer designation information in a case where the interlayer prediction is represented to be permitted by the interlayer predictability information, and the number of the reference layers of the current layer is plural.

(7) The image coding apparatus described in (6), further including a reference layer number information generating unit that generates reference layer number information representing the number of another layer referred to at the time of performing the interlayer prediction.

(8) The image coding apparatus described in (7), wherein the reference layer number information generating unit generates the reference layer number information in a case where the number of referable layers in the interlayer prediction is not limited to single.

(9) An image coding method including: generating reference layer designation information designating a layer that is referred to in an interlayer prediction in a case where a maximum number of another layer referred to at the time of performing the interlayer prediction and the number of another layer referred to at the time of performing the interlayer prediction, which are set for the whole image data configured by a plurality of layers, do not coincide with each other; and coding the image data.

REFERENCE SIGNS LIST

100 Image coding apparatus
101 Base layer image coding unit
102 Enhancement layer image coding unit
103 Multiplexing unit
104 Control unit
151 Header information generating unit
152 Prediction control unit
161 Slice header generating unit
162 Sequence parameter set generating unit
163 Interlayer reference picture set generating unit
171 Dependence determining unit
172 Slice type determining unit
173 Layer determining unit
174 Reference layer number determining unit
175 Interlayer predictability determining unit
176 Interlayer reference picture set determining unit
177 Set number determining unit
178 Interlayer prediction-related syntax generating unit
179 Parameter set generating unit
180 Index generating unit
181 Interlayer predictability information generating unit
182 Reference layer number information generating unit
183 Reference layer designation information generating unit
184 Inter predictability information generating unit
185 Set number information generating unit
186 Parameter set generating unit
187 Reference layer number information generating unit
188 Reference layer designation information generating unit
200 Image decoding apparatus
201 Demultiplexing unit
202 Base layer image decoding unit
203 Enhancement layer image decoding unit
251 Header information analyzing unit
252 Prediction control unit
261 Slice header analyzing unit
262 Sequence parameter set analyzing unit
263 Interlayer reference picture set analyzing unit
271 Dependence determining unit
272 Slice type determining unit
273 Layer determining unit
274 Reference layer number determining unit
275 Interlayer predictability determining unit
276 Interlayer reference picture set determining unit
277 Set number determining unit
278 Interlayer prediction-related syntax analyzing unit
279 Parameter set analyzing unit
280 Index analyzing unit
281 Interlayer predictability information analyzing unit
282 Reference layer number information analyzing unit
283 Reference layer designation information analyzing unit
284 Inter predictability information analyzing unit
285 Set number information analyzing unit
286 Parameter set analyzing unit
287 Reference layer number information analyzing unit
288 Reference layer designation information analyzing unit

The invention claimed is:

1. An image coding apparatus comprising:
circuitry configured to:
determine a slice type of a slice;
prohibit an interlayer prediction when the determined slice type is neither P slice nor B slice;
when the slice type is P slice or B slice, determine whether (i) a layer of the slice is an enhancement layer and (ii) one or more layers are defined to be referable in a video parameter set;
prohibit the interlayer prediction when the layer is not the enhancement layer or no layers are defined to be referable in the video parameter set;
generate (i) an interlayer predictability information indicating whether the interlayer prediction is permitted, (ii) reference layer number information indicating a number of another layer referred to at a time of performing the interlayer prediction, and (iii) inter predictability information indicating whether an inter prediction is permitted for the slice in a case where the layer is the enhancement layer and the one or more layers are defined to be referable in the video parameter set;
generate reference layer designation information designating the layer of the slice that is referred to in the interlayer prediction only in a case where a maximum number of another layer referred to at a time of performing the interlayer prediction and the number of another layer referred to at the time of performing the interlayer prediction do not coincide with each other;
control the interlayer prediction based on the generated interlayer predictability information, reference layer number information, inter predictability information, and reference layer designation information; and
code image data by performing the interlayer prediction controlled.

2. The image coding apparatus according to claim 1, wherein the circuitry is further configured to control the interlayer prediction based on the generated reference layer designation information.

3. The image coding apparatus according to claim 1, wherein the circuitry is further configured to transmit the generated reference layer designation information with a slice header.

4. The image coding apparatus according to claim 1, wherein the circuitry is further configured to generate the reference layer designation information in a case where a current layer is not layer 0, and a number of reference layers of the current layer is not "0".

5. The image coding apparatus according to claim 4, wherein the circuitry is further configured to generate interlayer predictability information representing whether the interlayer prediction is permitted.

6. The image coding apparatus according to claim 5, wherein the circuitry is further configured to generate the reference layer designation information in a case where the interlayer prediction is represented to be permitted by the interlayer predictability information, and the number of the reference layers of the current layer is plural.

7. The image coding apparatus according to claim 6, wherein the circuitry is further configured to generate reference layer number information representing the number of another layer referred to at the time of performing the interlayer prediction.

8. The image coding apparatus according to claim 7, wherein the circuitry is further configured to generate the reference layer number information in a case where a number of referable layers in the interlayer prediction is not limited to single.

9. An image coding method comprising:
determining a slice type of a slice;
prohibiting an interlayer prediction when the determined slice type is neither P slice nor B slice;
when the slice type is P slice or B slice, determine whether (i) a layer of the slice is an enhancement layer and (ii) one or more layers are defined to be referable in a video parameter set;
prohibiting the interlayer prediction when the layer is not the enhancement layer or no layers are defined to be referable in the video parameter set;
generating (i) an interlayer predictability information indicating whether the interlayer prediction is permitted, (ii) reference layer number information indicating a number of another layer referred to at a time of performing the interlayer prediction, and (iii) inter predictability information indicating whether an inter prediction is permitted for the slice in a case where the layer is the enhancement layer and the one or more layers are defined to be referable in the video parameter set;
generating, by circuitry, reference layer designation information designating the layer of the slice that is referred to in the interlayer prediction only in a case where a maximum number of another layer referred to at a time of performing the interlayer prediction and the number of another layer referred to at the time of performing the interlayer prediction do not coincide with other;
controlling the interlayer prediction based on the generated interlayer predictability information, reference layer number information, inter predictability information, and reference layer designation information; and
coding, by the circuitry, image data by performing the interlayer prediction controlled.

* * * * *